(12) United States Patent
Brav et al.

(10) Patent No.: US 9,942,583 B2
(45) Date of Patent: Apr. 10, 2018

(54) DEVICES, METHODS AND SYSTEMS FOR MULTI-USER CAPABLE VISUAL IMAGING ARRAYS

(71) Applicant: Elwha LLC, Bellevue, WA (US)

(72) Inventors: Ehren Brav, Bainbridge Island, WA (US); Russell Hannigan, Sammamish, WA (US); Roderick A. Hyde, Redmond, WA (US); Muriel Y. Ishikawa, Livermore, CA (US); 3ric Johanson, Seattle, WA (US); Jordin T. Kare, San Jose, CA (US); Tony S Pan, Bellevue, WA (US); Phillip Rutschman, Seattle, WA (US); Clarence T. Tegreene, Mercer Island, WA (US); Charles Whitmer, North Bend, WA (US); Lowell L. Wood, Jr., Bellevue, WA (US); Victoria Y. H. Wood, Livermore, CA (US)

(73) Assignee: The Invention Science Fund II, LLC, Bellevue, WA (US)

( * ) Notice: Subject to any disclaimer, the term of this patent is extended or adjusted under 35 U.S.C. 154(b) by 0 days.

(21) Appl. No.: 14/945,342

(22) Filed: Nov. 18, 2015

(65) Prior Publication Data
US 2016/0309207 A1   Oct. 20, 2016

Related U.S. Application Data

(63) Continuation-in-part of application No. 14/714,239, filed on May 15, 2015, and a continuation-in-part of
(Continued)

(51) Int. Cl.
H04N 21/239   (2011.01)
H04N 21/81    (2011.01)
(Continued)

(52) U.S. Cl.
CPC ..... *H04N 21/2393* (2013.01); *H04N 5/23206* (2013.01); *H04N 5/23229* (2013.01);
(Continued)

(58) Field of Classification Search
CPC ............. H04N 21/2393; H04N 21/812; H04N 21/2662; H04N 21/21805;
(Continued)

(56) References Cited

U.S. PATENT DOCUMENTS 5,262,856 A   11/1993 Lippman et al.
7,623,152 B1  11/2009 Kaplinsky
(Continued)

FOREIGN PATENT DOCUMENTS

KR   1020110072846   6/2011

OTHER PUBLICATIONS

PCT International Search Report; International App. No. PCT/US 15/61439; dated Mar. 7, 2016; pp. 1-2.
(Continued)

*Primary Examiner* — Albert Cutler

(57) ABSTRACT

Computationally implemented methods and systems include accepting input of a request for a particular image of a scene that is larger than the particular image, transmitting the request for the particular image to an image sensor array that includes more than one image sensor and that is configured to capture the scene and retain a subset of the scene that includes the request for the particular image of the scene, receiving only the particular image from the image sensor array, wherein the particular image represents a subset of the scene, and wherein a size characteristic of the particular image is at least partially based on a property of a requestor, and presenting the received particular image to the requestor. In addition to the foregoing, other aspects are described in the claims, drawings, and text.

37 Claims, 90 Drawing Sheets

Related U.S. Application Data application No. 14/791,160, filed on Jul. 2, 2015, now Pat. No. 9,866,765, and a continuation-in-part of application No. 14/791,127, filed on Jul. 2, 2015, and a continuation-in-part of application No. 14/838,114, filed on Aug. 27, 2015, and a continuation-in-part of application No. 14/838,128, filed on Aug. 27, 2015.

(60) Provisional application No. 62/081,559, filed on Nov. 18, 2014, provisional application No. 62/081,560, filed on Nov. 18, 2014, provisional application No. 62/082,001, filed on Nov. 19, 2014, provisional application No. 62/082,002, filed on Nov. 19, 2014, provisional application No. 62/156,162, filed on May 1, 2015, provisional application No. 62/180,040, filed on Jun. 15, 2015.

(51) Int. Cl.
| | |
|---|---|
| *H04N 21/218* | (2011.01) |
| *H04N 21/234* | (2011.01) |
| *H04N 21/2183* | (2011.01) |
| *H04N 21/2662* | (2011.01) |
| *H04N 5/232* | (2006.01) |
| *H04N 5/247* | (2006.01) |

(52) U.S. Cl.
CPC ..... *H04N 5/23238* (2013.01); *H04N 5/23293* (2013.01); *H04N 5/247* (2013.01); *H04N 21/2183* (2013.01); *H04N 21/21805* (2013.01); *H04N 21/23418* (2013.01); *H04N 21/2662* (2013.01); *H04N 21/812* (2013.01)

(58) Field of Classification Search
CPC ......... H04N 21/23418; H04N 21/2183; H04N 5/247; H04N 5/23293; H04N 5/23238; H04N 5/23229; H04N 5/23206
See application file for complete search history.

(56) References Cited

U.S. PATENT DOCUMENTS

| | | | |
|---|---|---|---|
| 7,675,549 B1 * | 3/2010 | Brower | H04N 1/00244 348/157 |
| 7,720,282 B2 | 5/2010 | Blake et al. | |
| 7,733,371 B1 | 6/2010 | Monroe | |
| 2002/0092029 A1 * | 7/2002 | Smith | H04N 1/32776 725/105 |
| 2003/0025803 A1 | 2/2003 | Nakamura et al. | |
| 2004/0010803 A1 | 1/2004 | Berstis | |
| 2005/0157173 A1 | 7/2005 | Kurebayashi et al. | |
| 2006/0125921 A1 | 6/2006 | Foote | |
| 2007/0030353 A1 | 2/2007 | Novak | |
| 2007/0126863 A1 | 6/2007 | Prechtl et al. | |
| 2007/0171301 A1 | 7/2007 | Tatsumi | |
| 2007/0182819 A1 | 8/2007 | Monroe | |
| 2007/0279494 A1 | 12/2007 | Aman et al. | |
| 2008/0036864 A1 | 2/2008 | McCubbrey et al. | |
| 2008/0036875 A1 | 2/2008 | Jones et al. | |
| 2008/0143842 A1 | 6/2008 | Gillard et al. | |
| 2008/0309970 A1 | 12/2008 | Kobayashi | |
| 2009/0251530 A1 * | 10/2009 | Cilia | B60R 11/04 348/39 |
| 2010/0053443 A1 | 3/2010 | Tsukagoshi | |
| 2010/0123872 A1 | 5/2010 | Aikawa et al. | |
| 2010/0304731 A1 | 12/2010 | Bratton et al. | |
| 2011/0164108 A1 | 7/2011 | Bates et al. | |
| 2012/0169842 A1 | 7/2012 | Chuang et al. | |
| 2012/0274899 A1 | 11/2012 | Wang et al. | |
| 2013/0070047 A1 * | 3/2013 | DiGiovanni | H04N 5/222 348/36 |
| 2013/0141523 A1 | 6/2013 | Banta et al. | |
| 2013/0321635 A1 | 12/2013 | Finn et al. | |
| 2015/0211870 A1 | 7/2015 | Nickolaou | |
| 2016/0213249 A1 | 7/2016 | Cornsweet et al. | |

OTHER PUBLICATIONS

Samaneigo et al.; "A Portable, Scalable Retinal Imaging System"; TI Engibous Competition Report; Rice University; Spring 2012; pp. 1-96; mobileVision.

PCT International Search Report; International App. No. PCT/US2015/061389; dated Feb. 23, 2016; pp. 1-3.

PCT International Search Report; International App. No. PCT/US2015/061384; dated Feb. 23, 2016; pp. 1-4.

PCT International Search Report; International App. no. PCT/US2017/050498; dated Dec. 15, 2017; pp. 1-3.

* cited by examiner

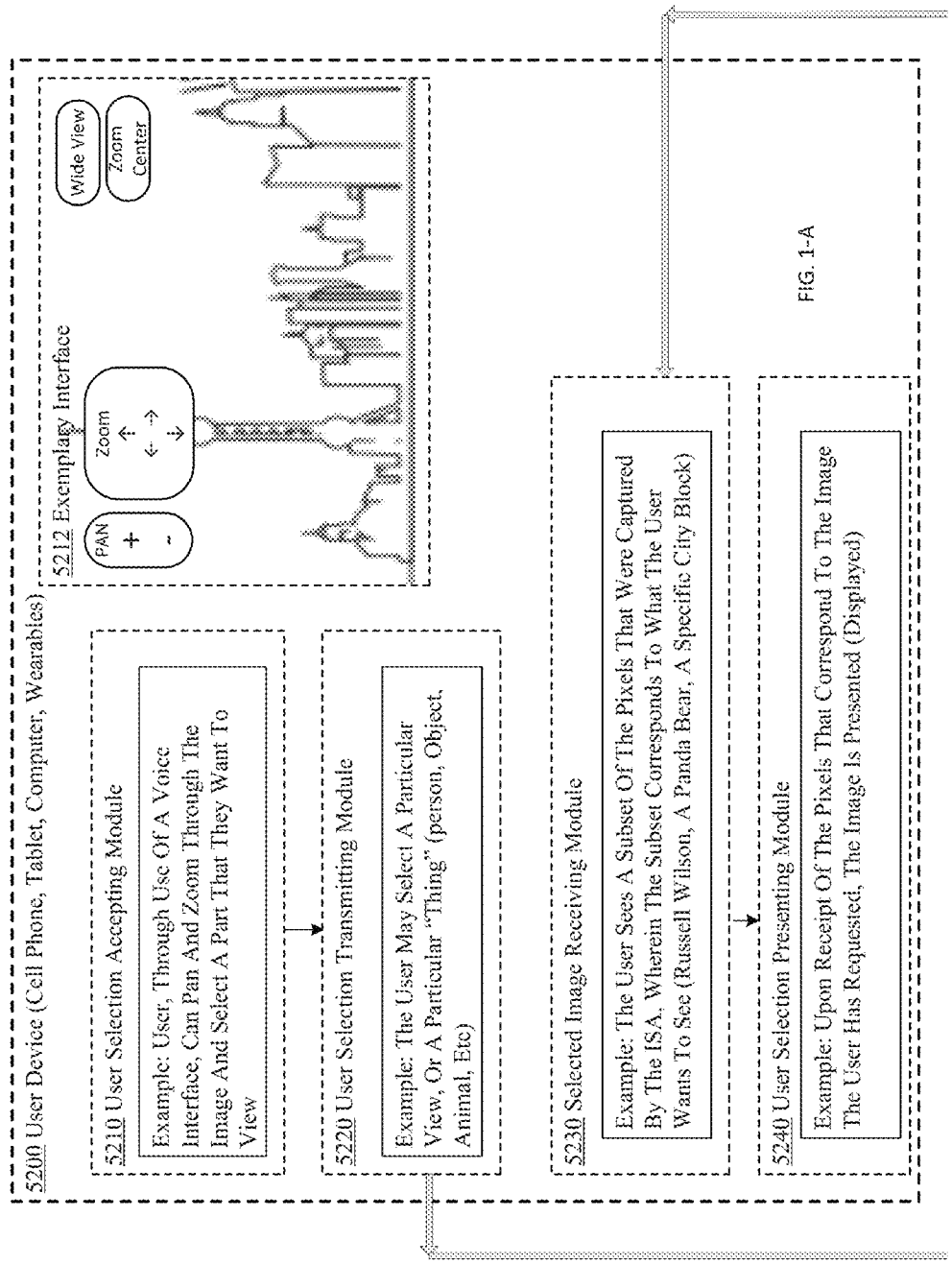
FIG. 1-A

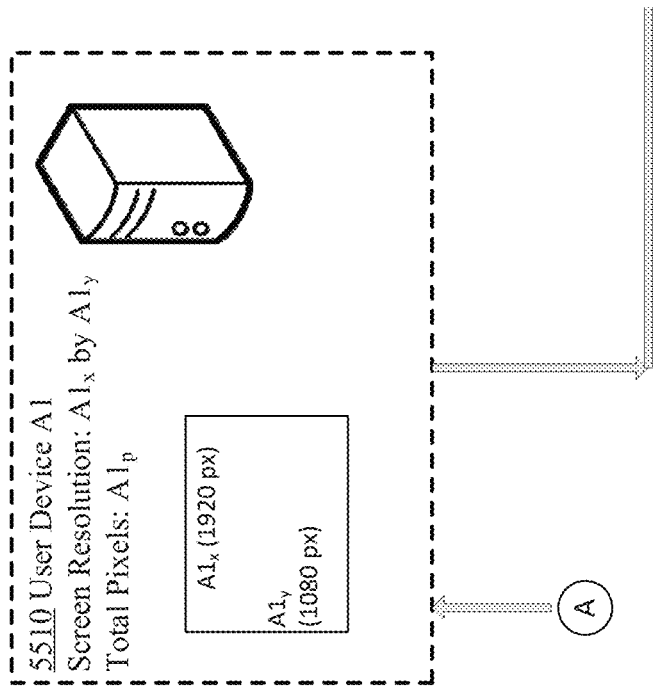
FIG. 1-B

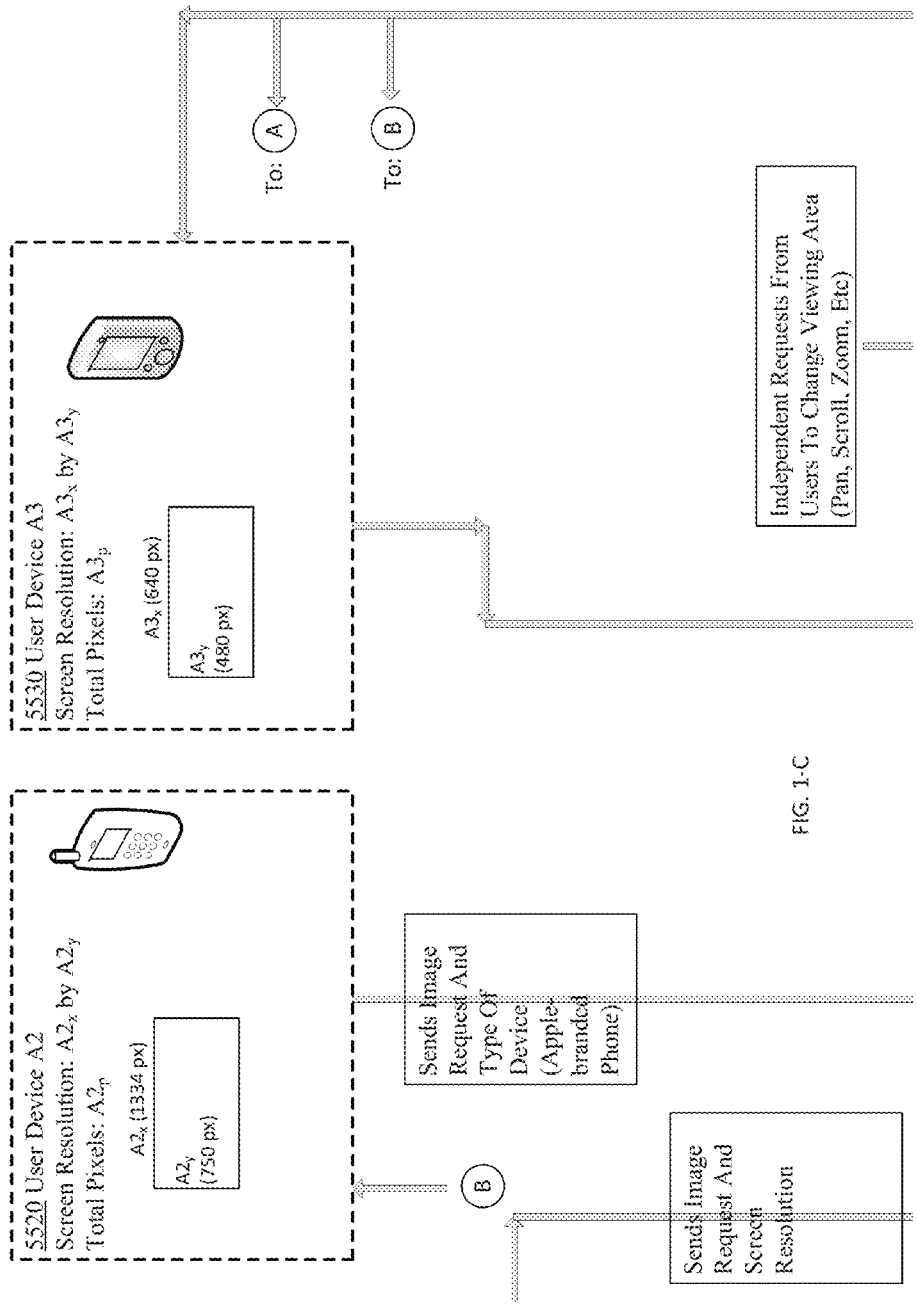
FIG. 1-C

| FIG. 1-A | FIG. 1-B | FIG. 1-C | FIG. 1-D | FIG. 1-E | FIG. 1-F | FIG. 1-G | FIG. 1-H | FIG. 1-I | FIG. 1-J |
| FIG. 1-K | FIG. 1-L | FIG. 1-M | FIG. 1-N | FIG. 1-O | FIG. 1-P | FIG. 1-Q | FIG. 1-R | FIG. 1-S | FIG. 1-T |
| FIG. 1-U | FIG. 1-V | FIG. 1-W | FIG. 1-X | FIG. 1-Y | FIG. 1-Z | FIG. 1-AA | FIG. 1-AB | FIG. 1-AC | FIG. 1-AD |
| FIG. 1-AE | FIG. 1-AF | FIG. 1-AG | FIG. 1-AH | FIG. 1-AI | FIG. 1-AJ | FIG. 1-AK | FIG. 1-AL | FIG. 1-AM | FIG. 1-AN |

FIG. 1

There Are No Modules On This Page, But It Is Required To Show The Complete View Of The Entire System. This Page Fits Into Position (1,4) Of The Grid

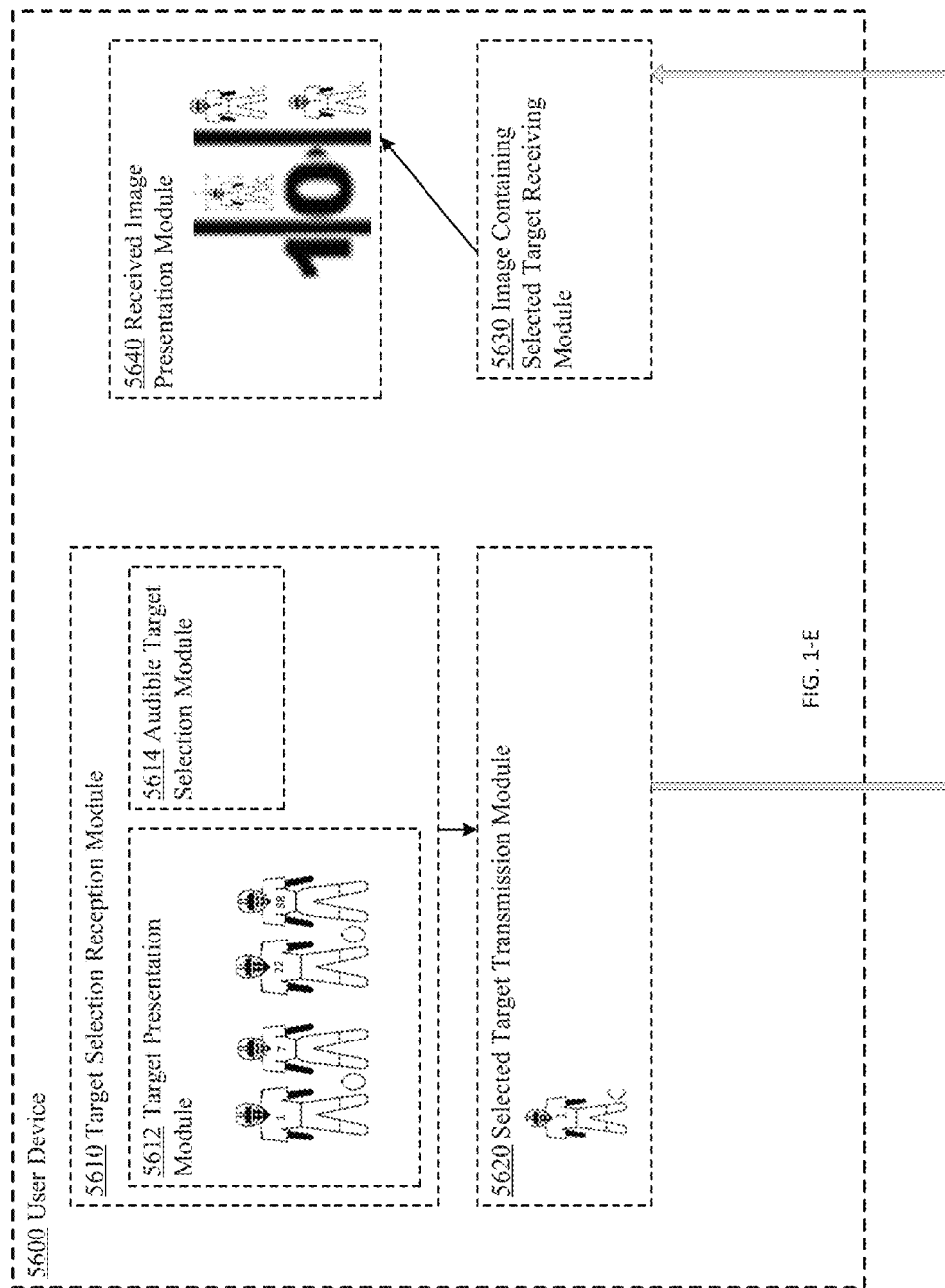
FIG. 1-E

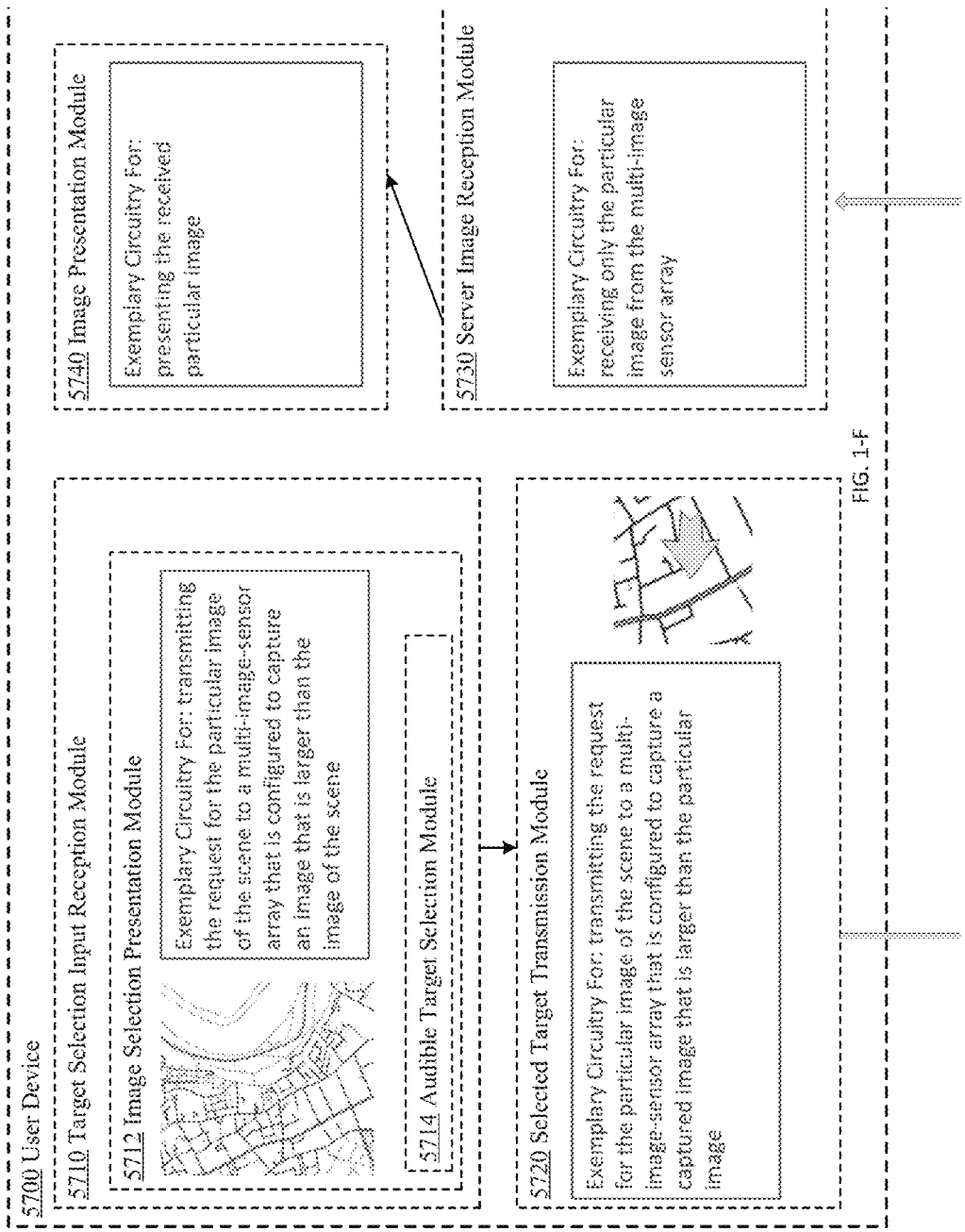

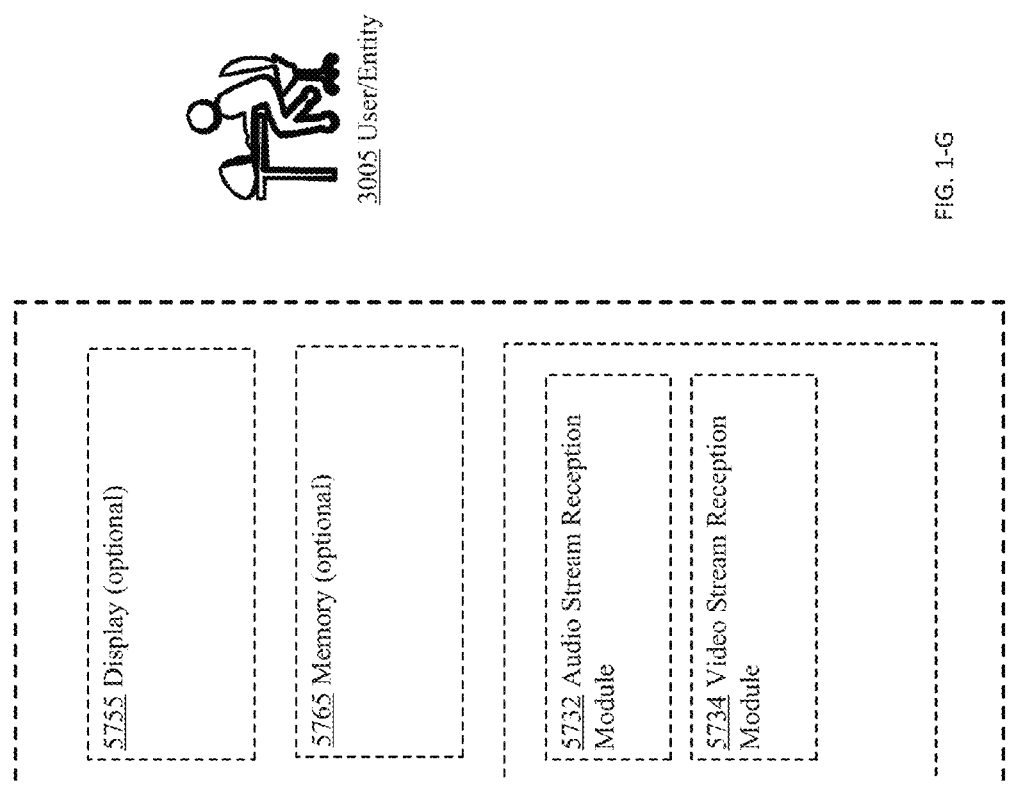

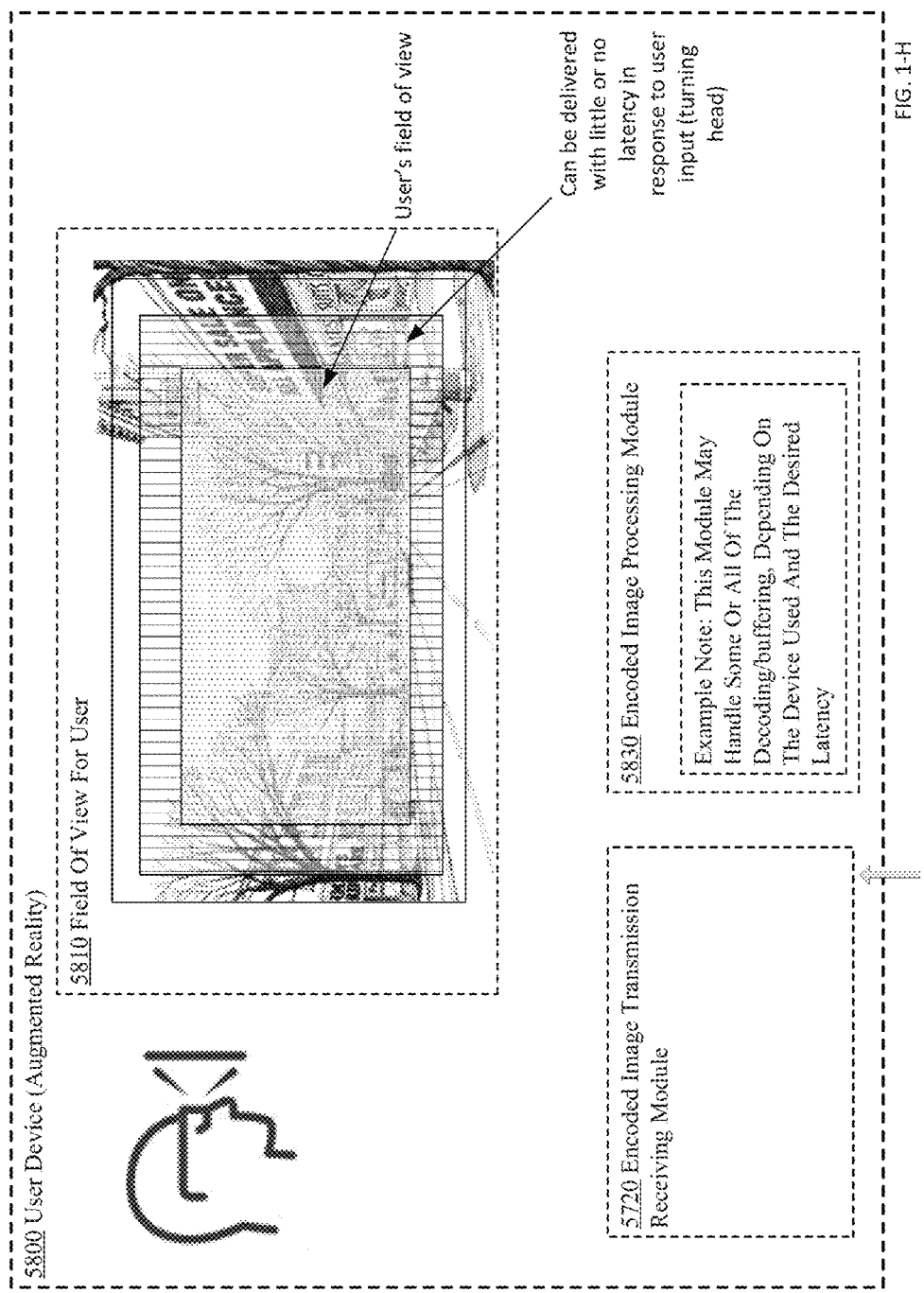

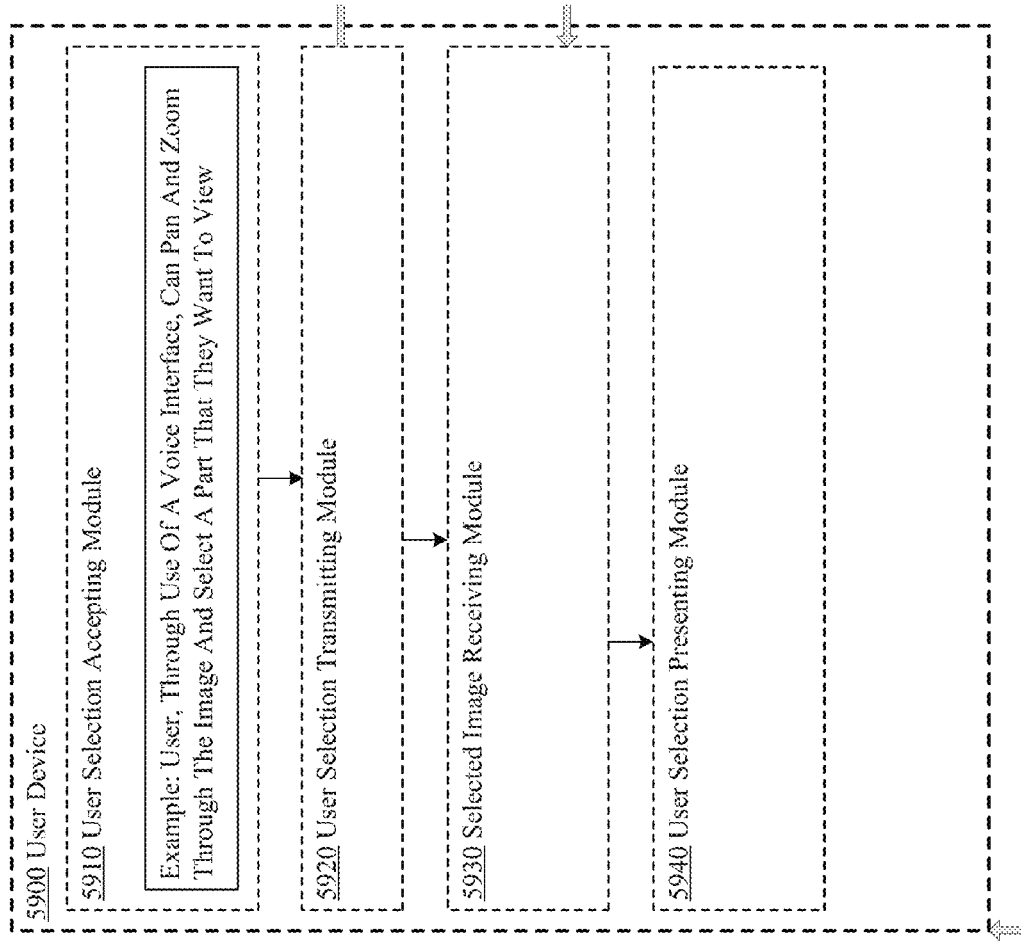
FIG. 1-I

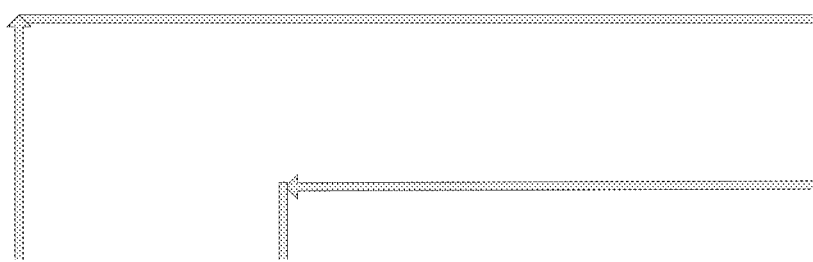

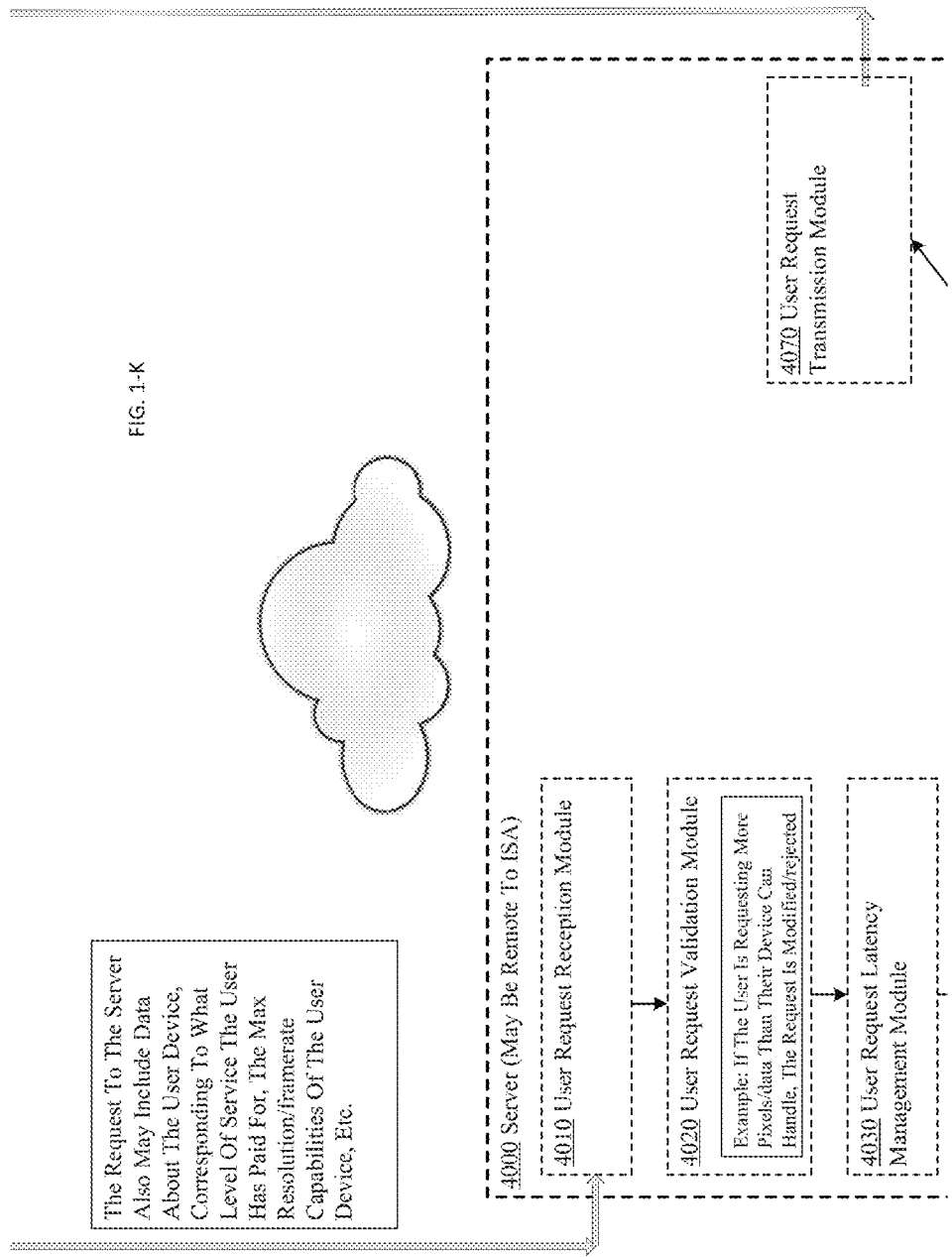
FIG. 1-K

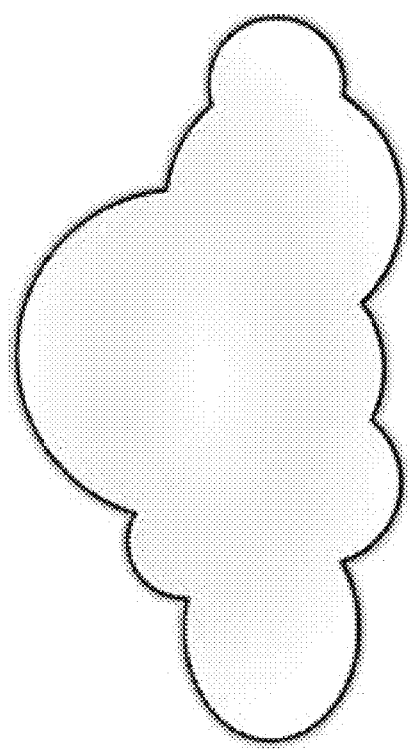
FIG. 1-L

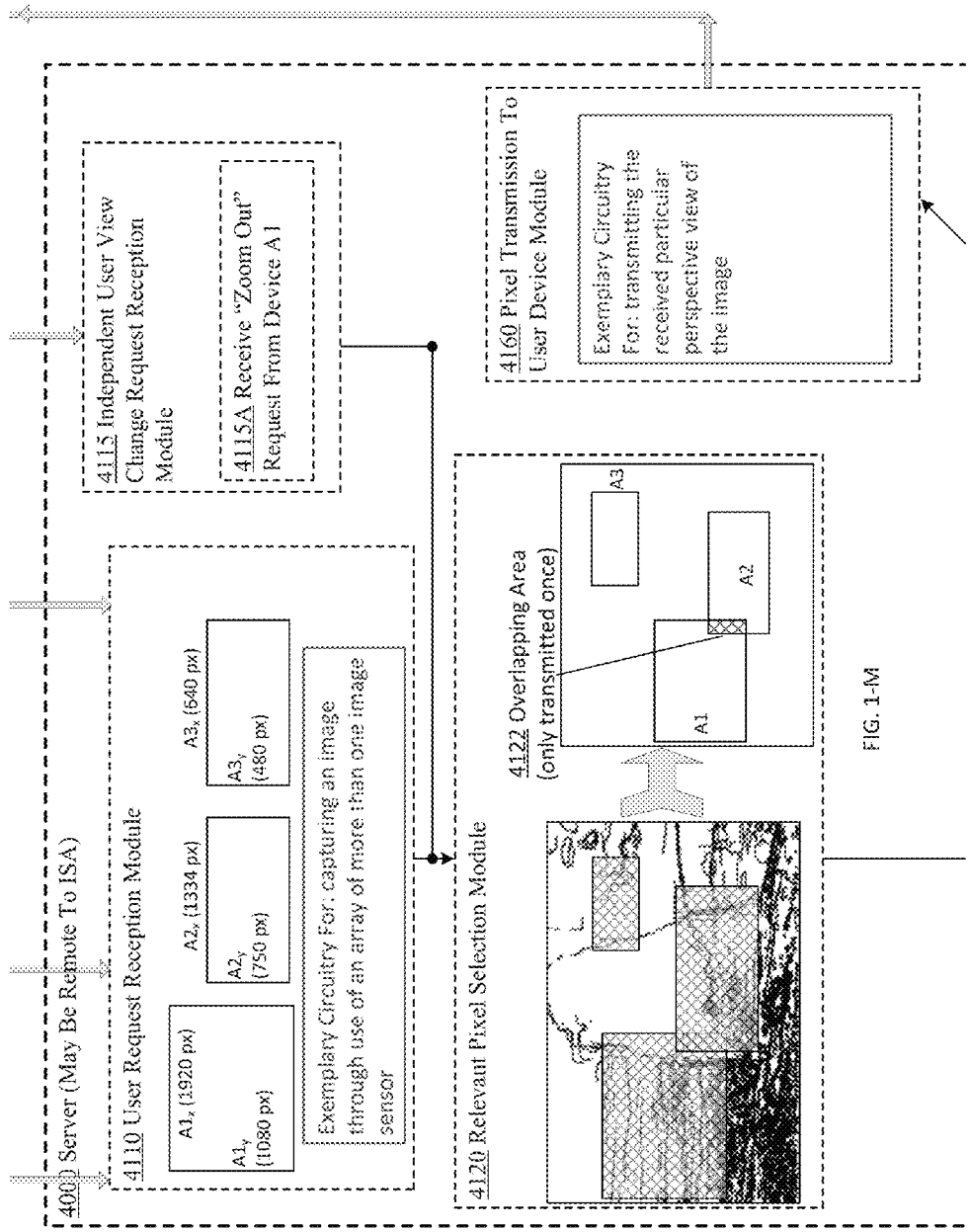
FIG. 1-M

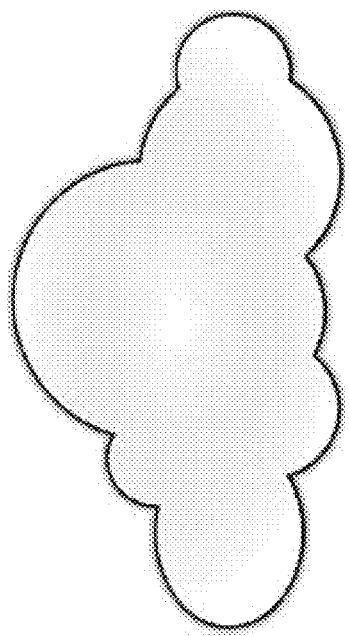
FIG. 1-N
4000 Server/Cloud (May Be Remote To ISA)

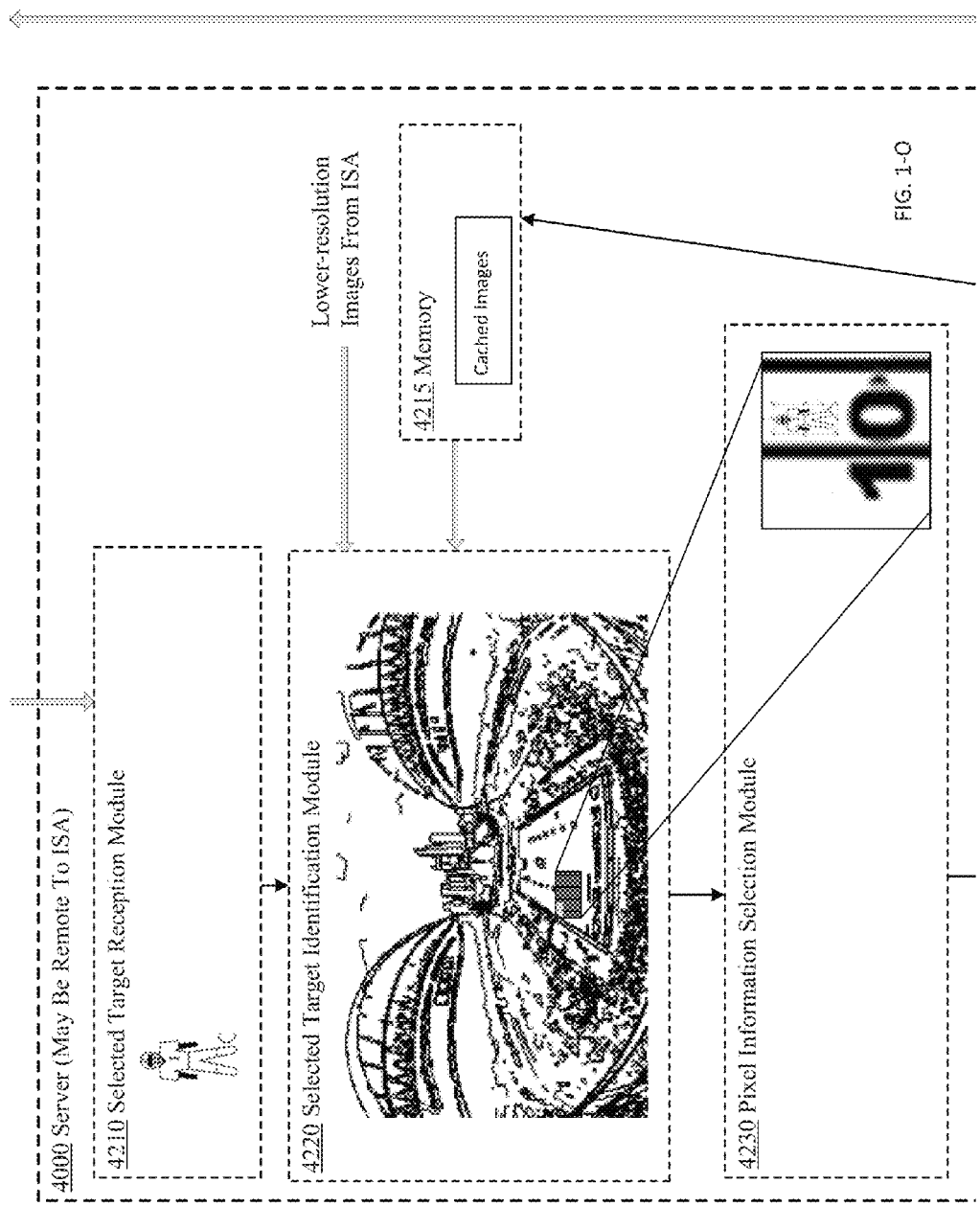

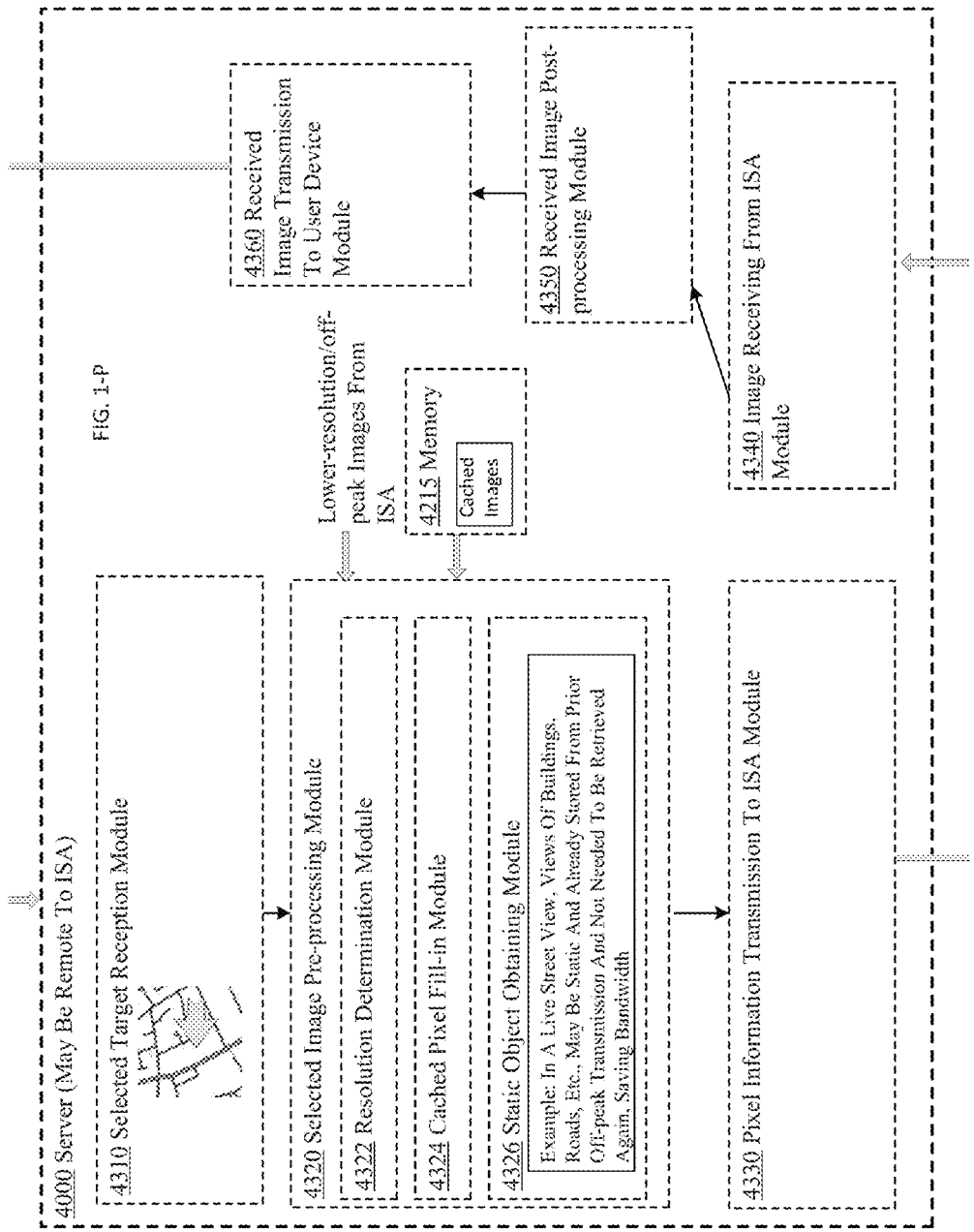

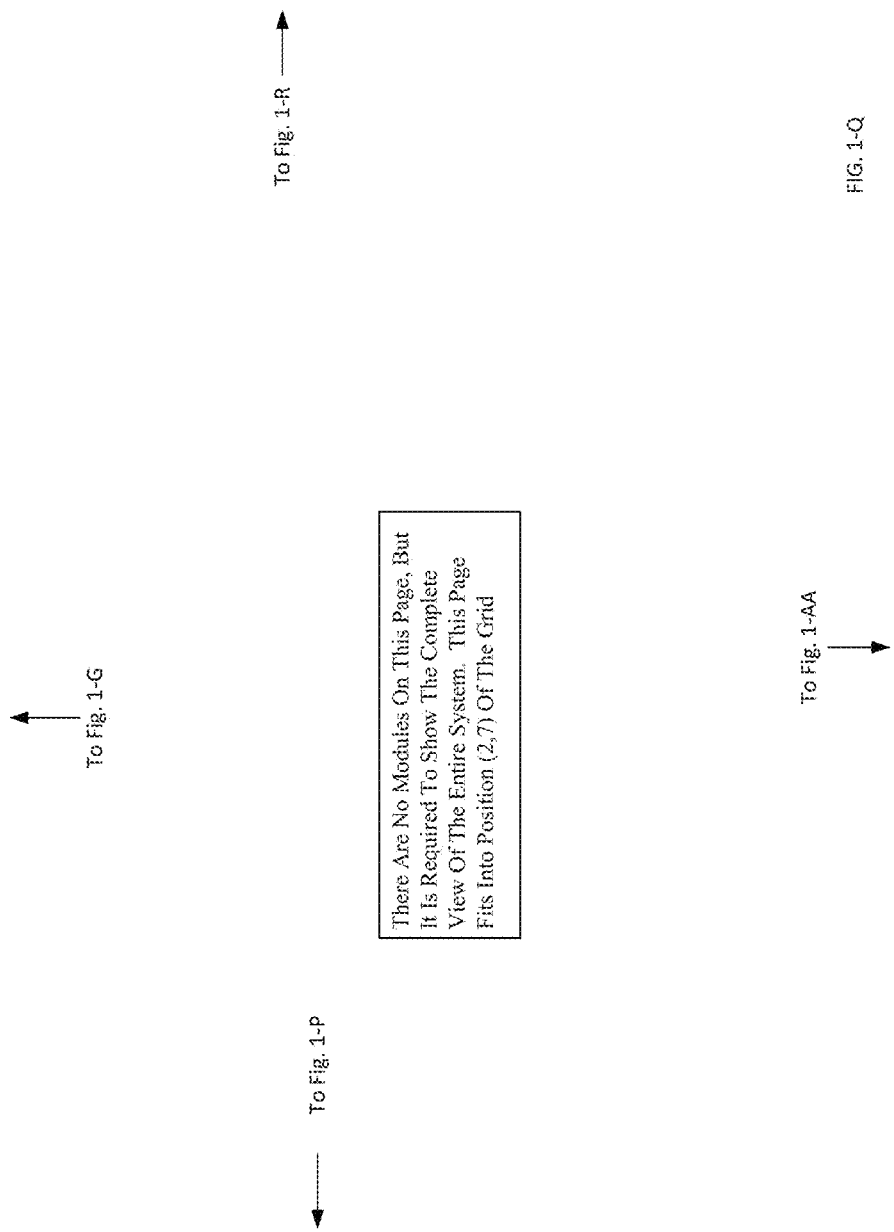
FIG. 1-Q

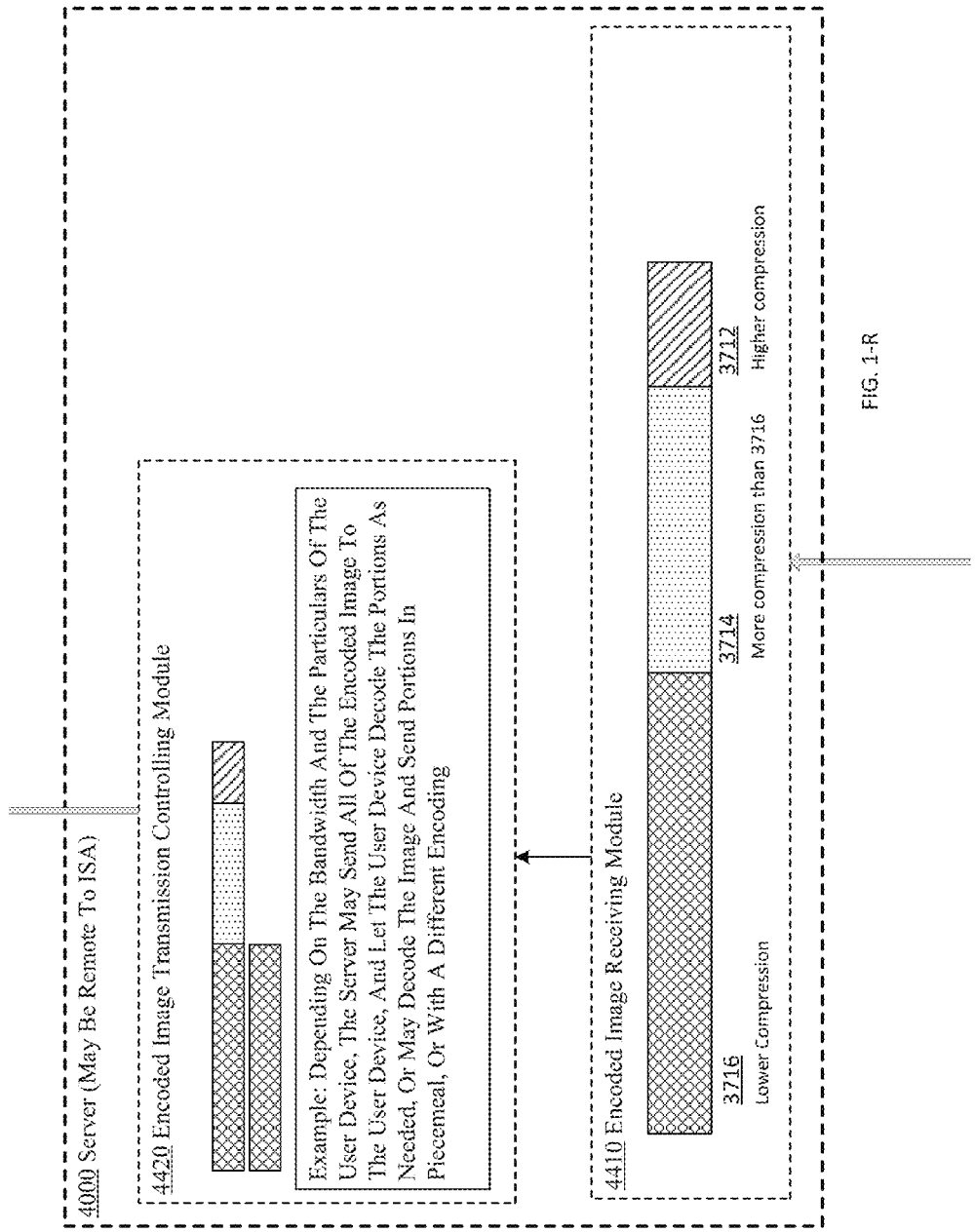
FIG. 1-R

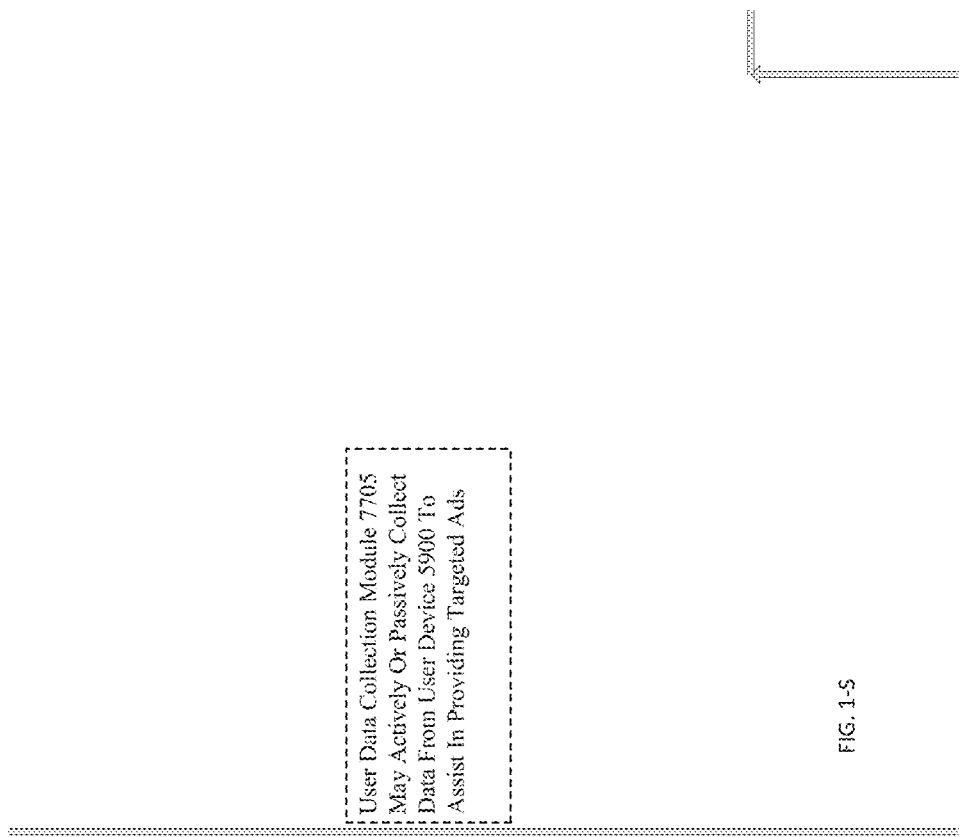

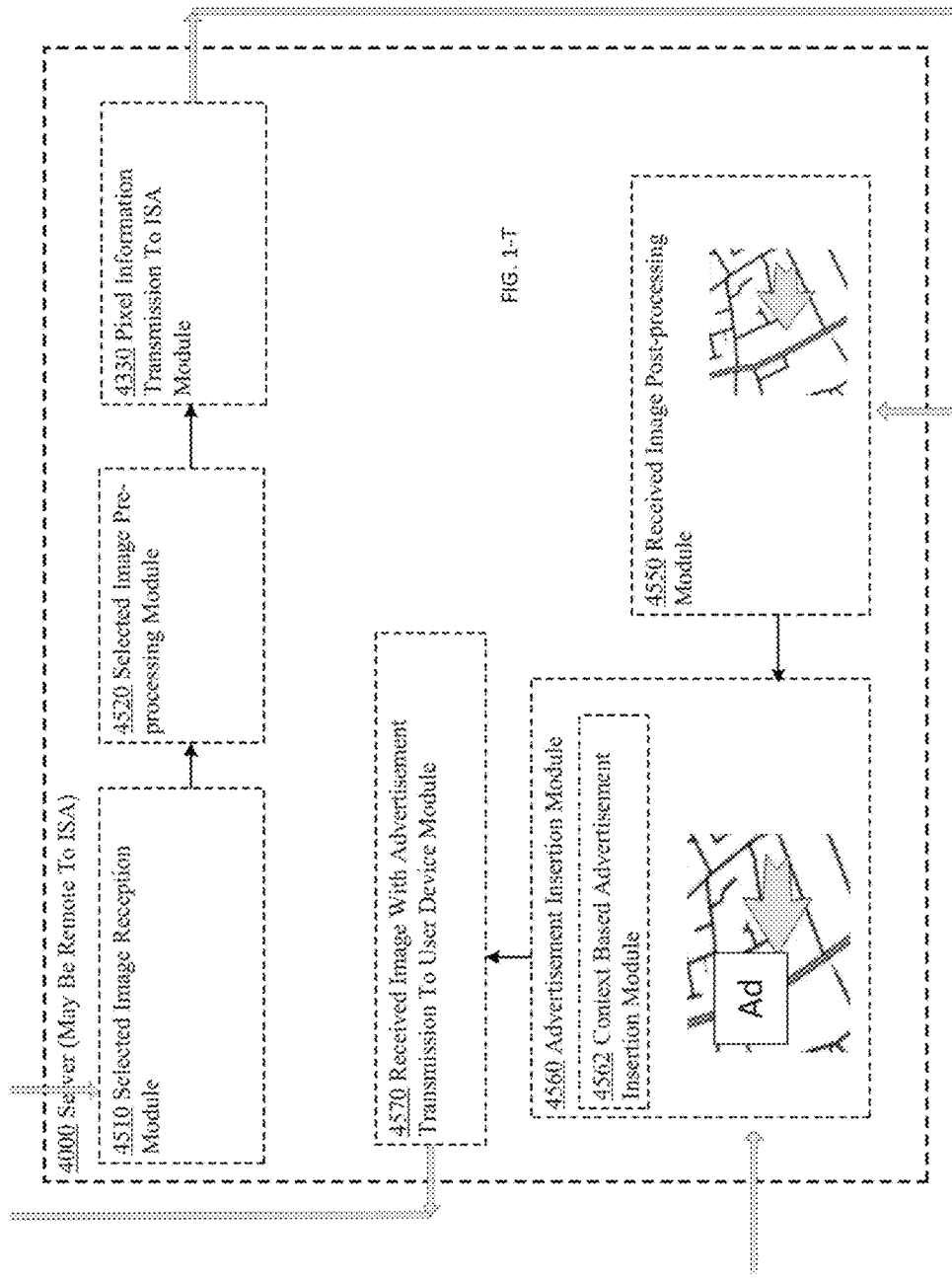
FIG. 1-T

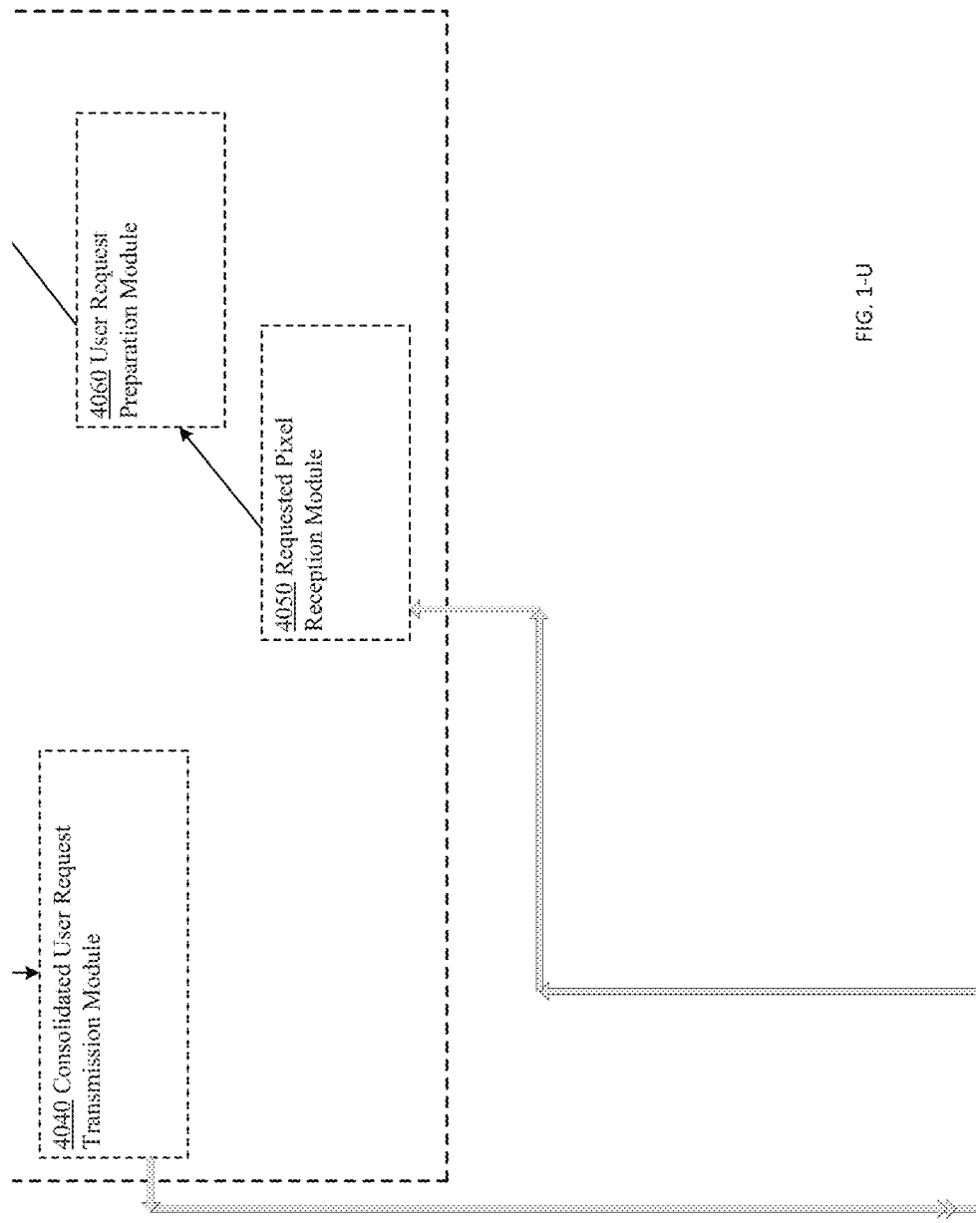
FIG. 1-U

There Are No Modules On This Page, But It Is Required To Show The Complete View Of The Entire System. This Page Fits Into Position (3,2) Of The Grid To Fig. 1-U ↓

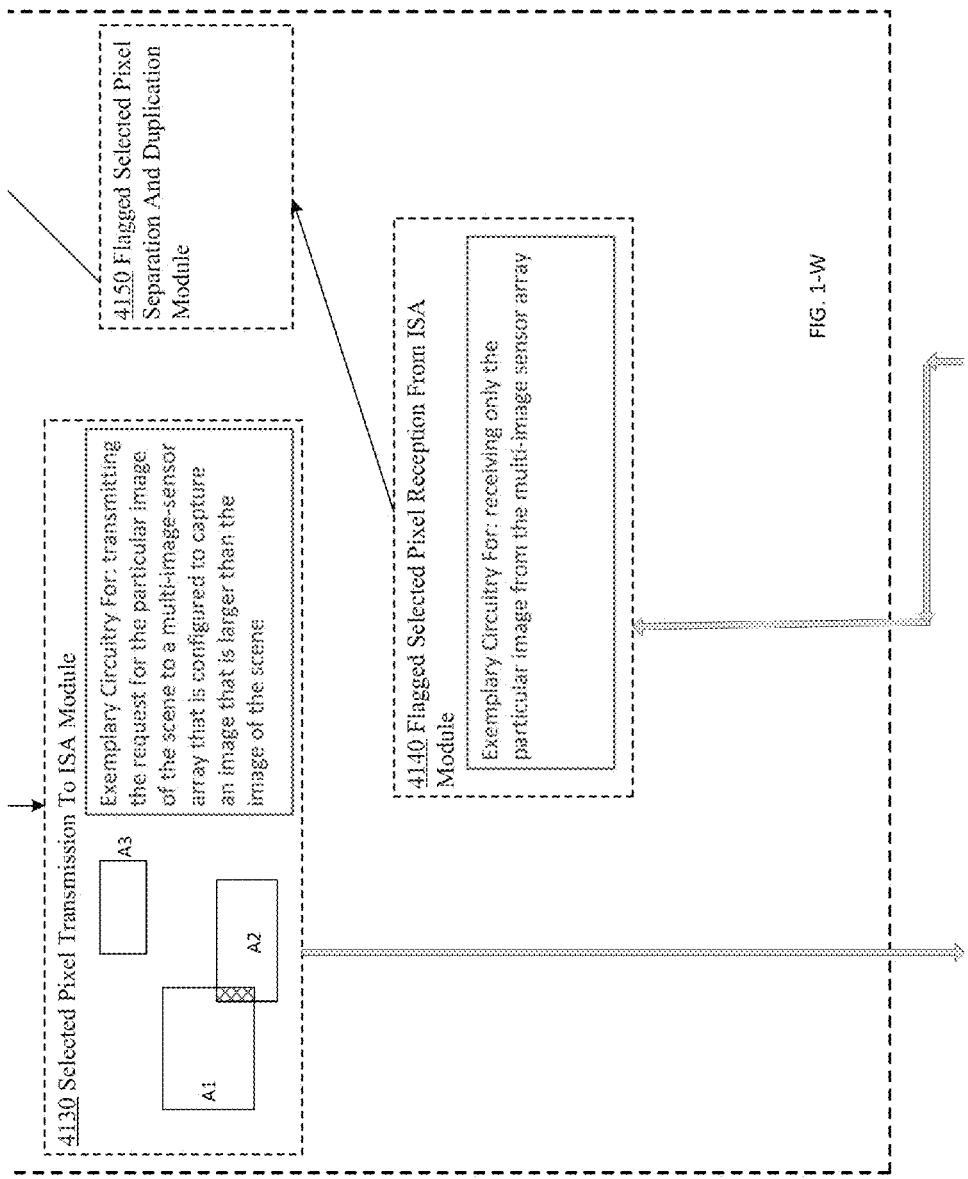

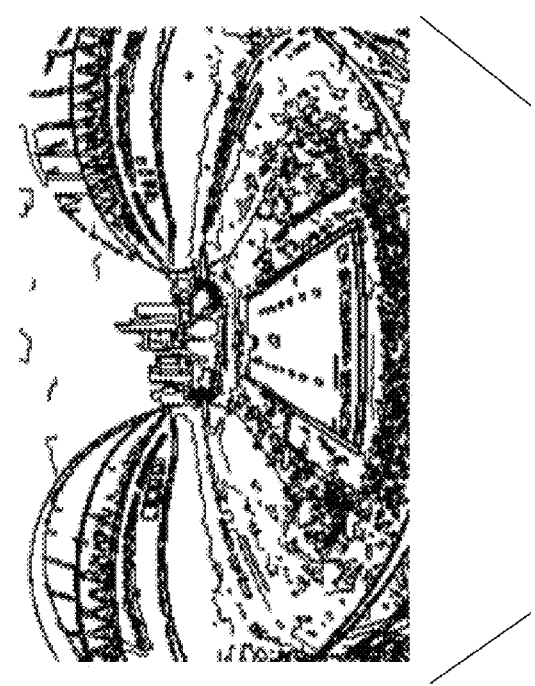

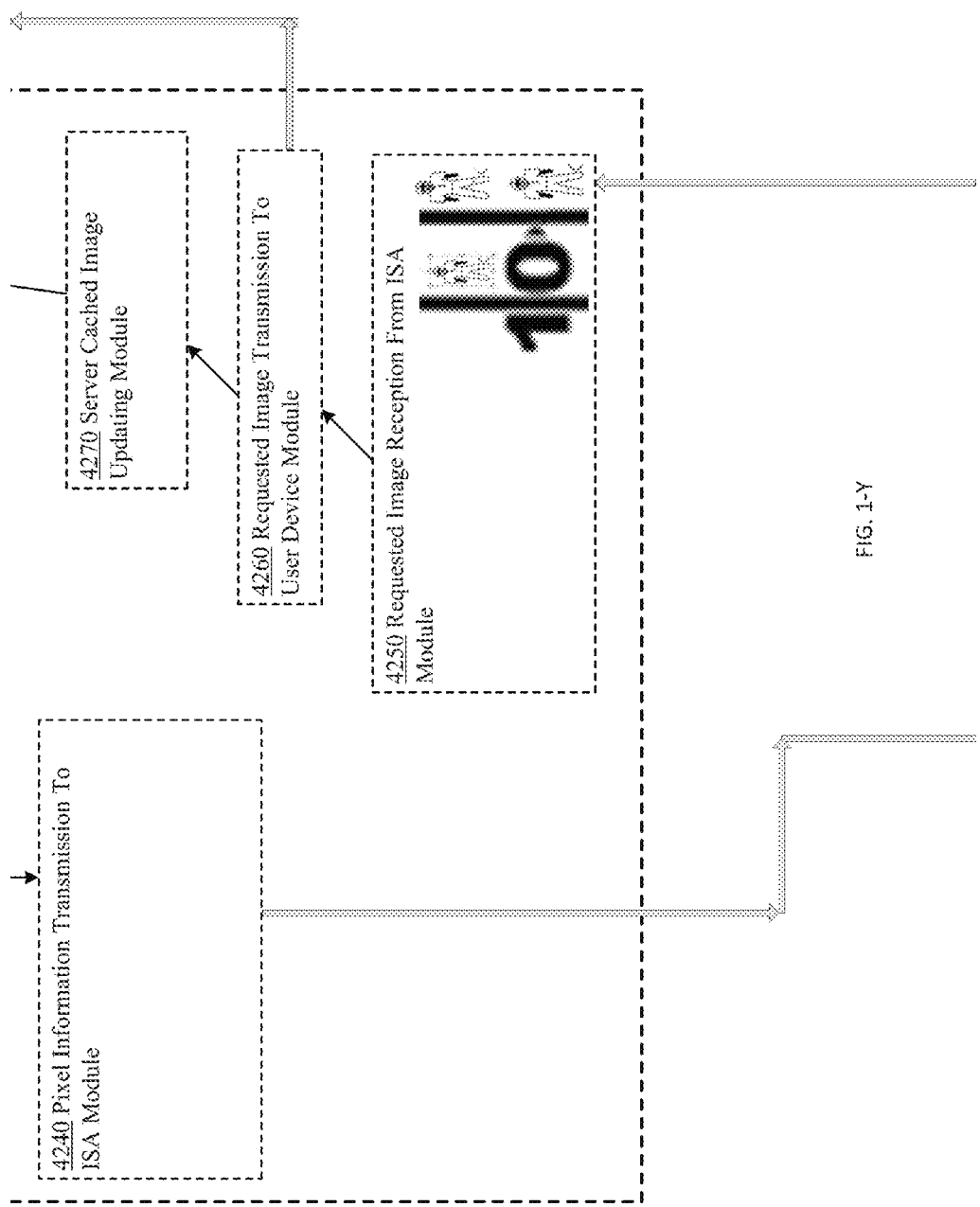
FIG. 1-Y

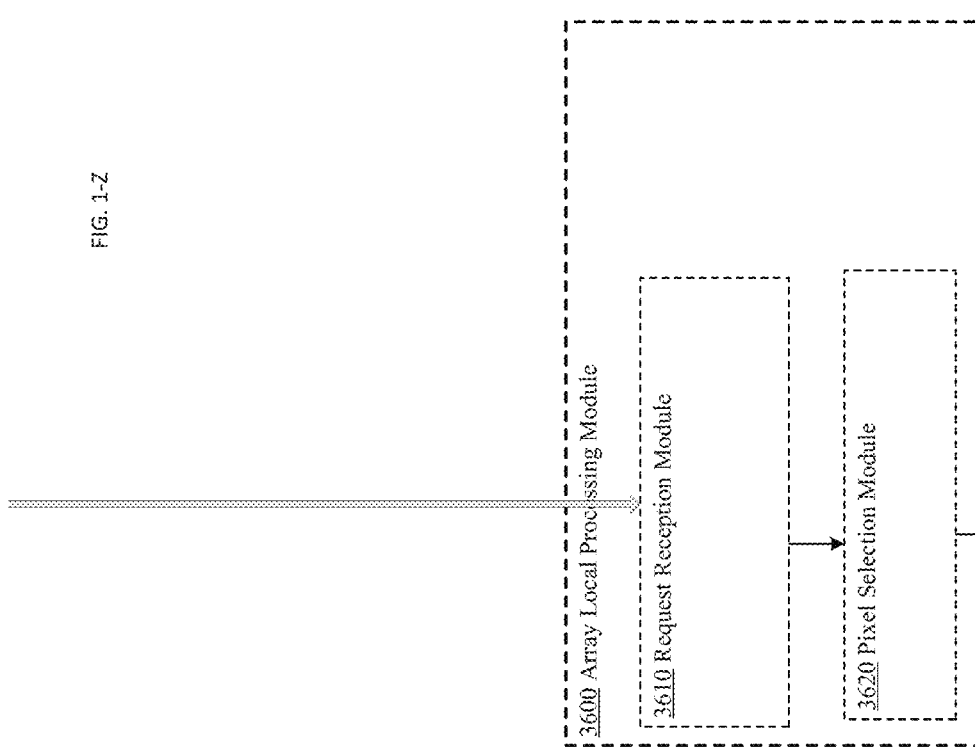

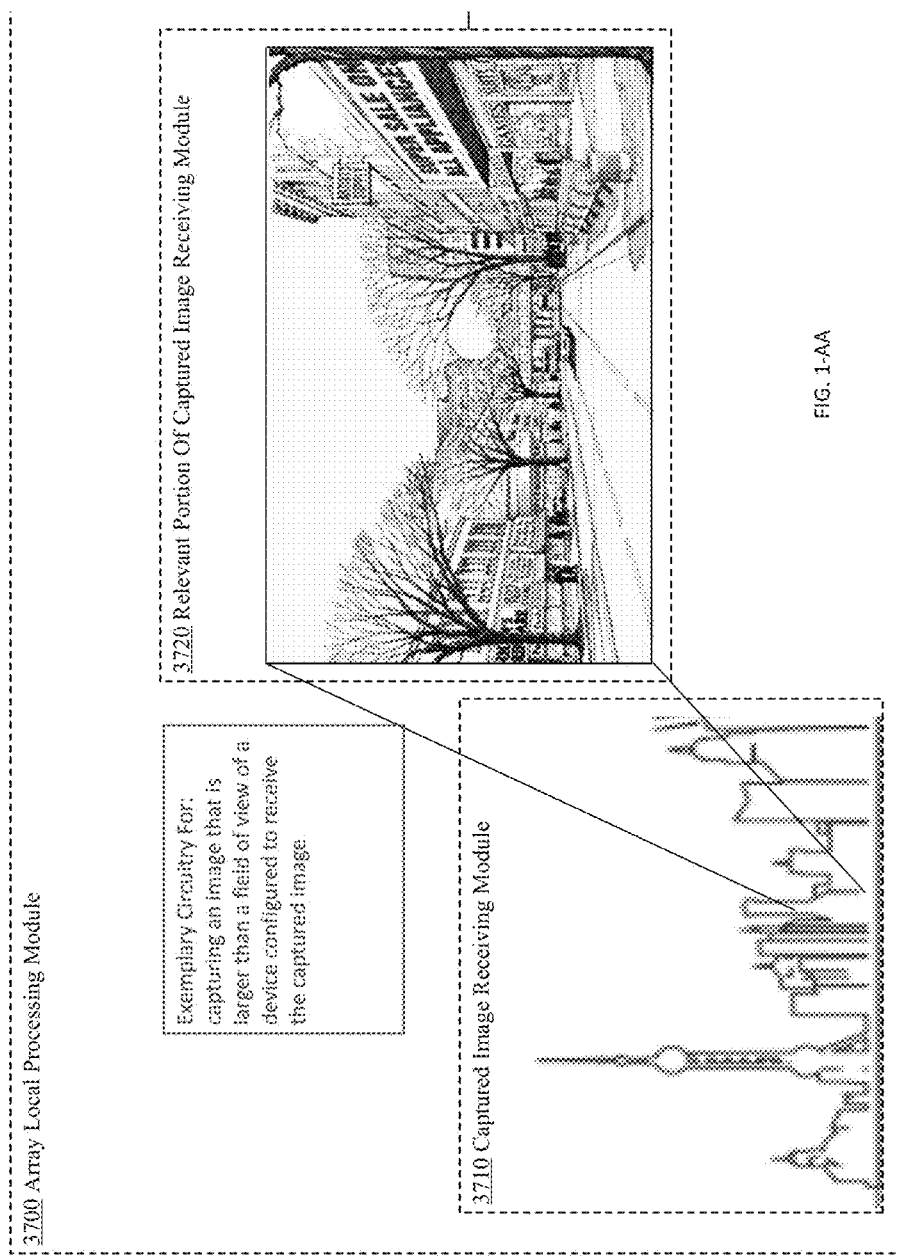
FIG. 1-AA

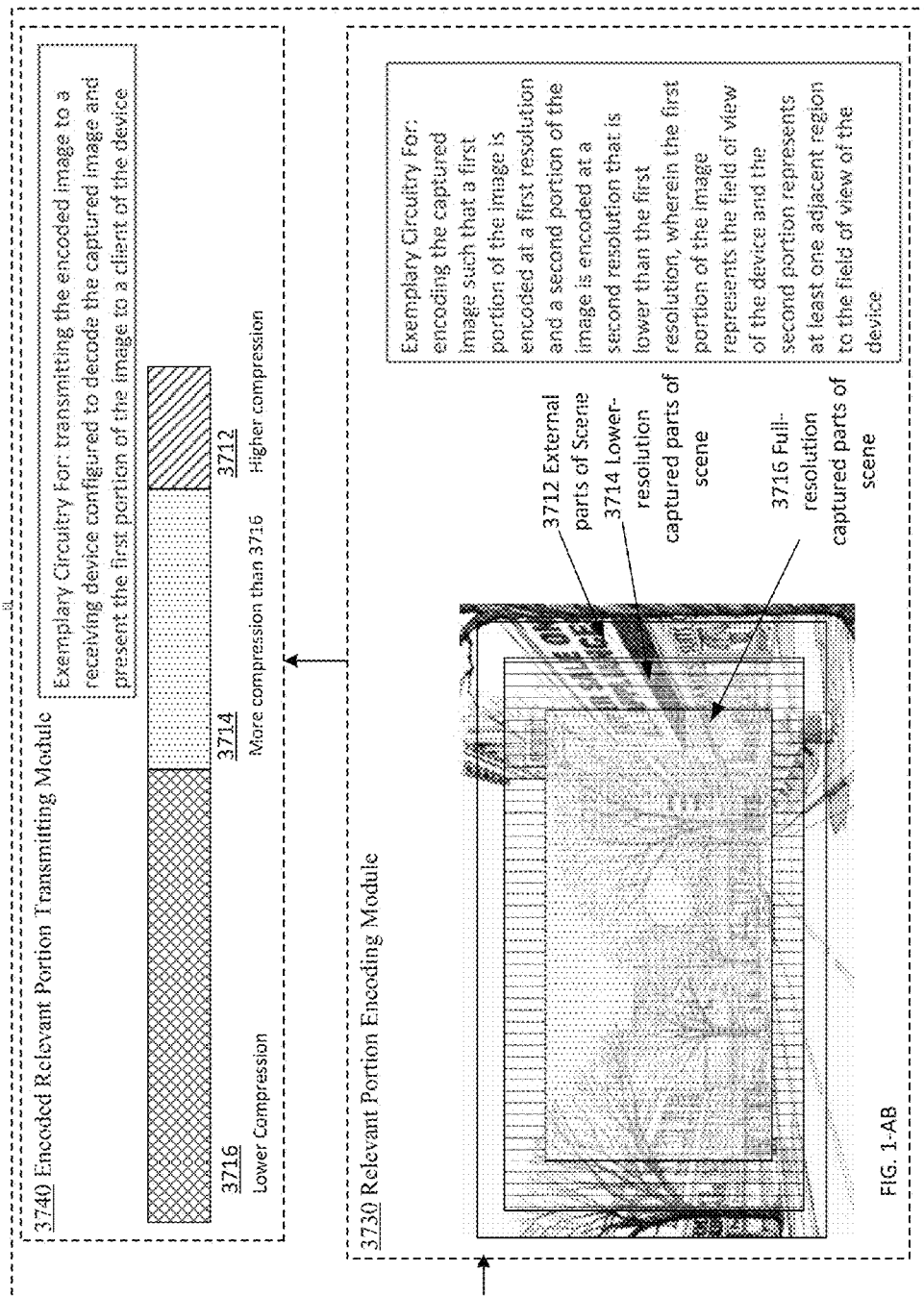
FIG. 1-AB

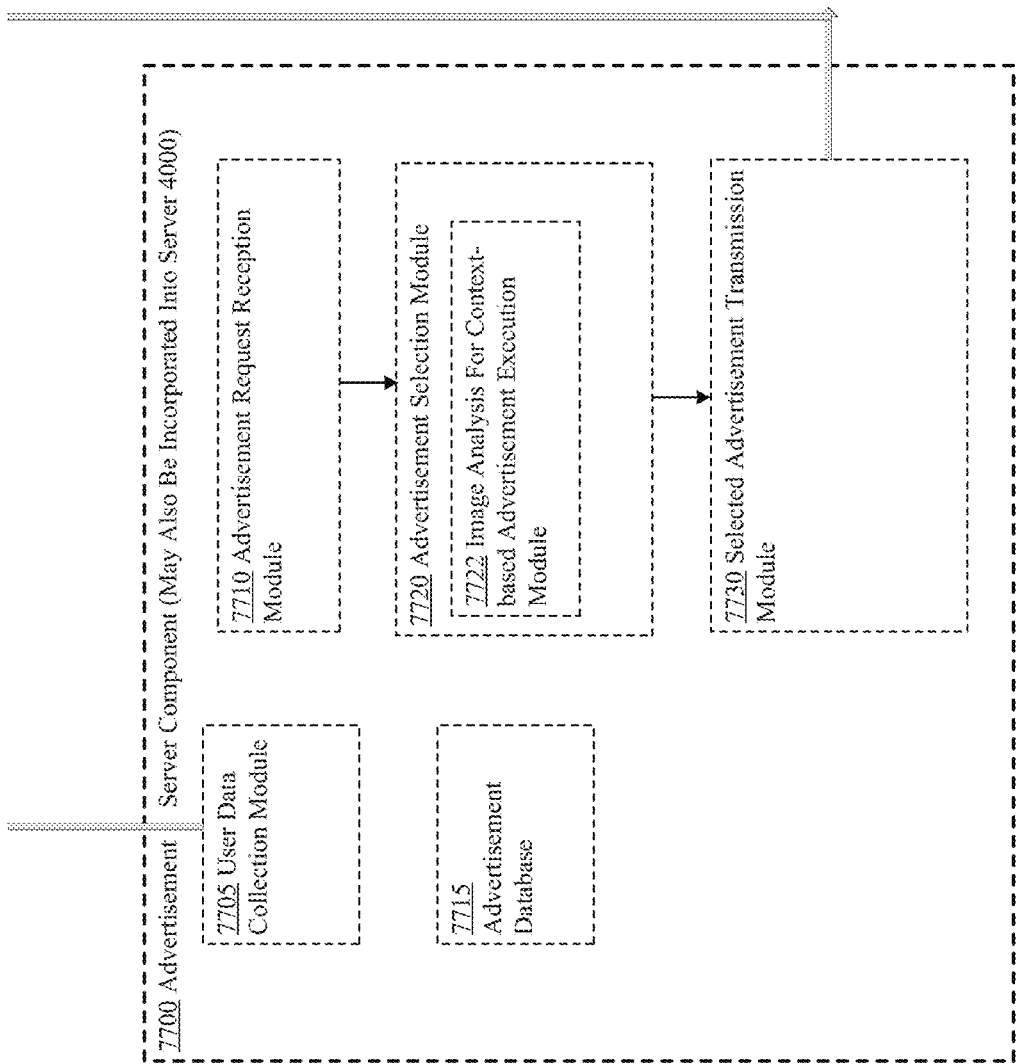
FIG. 1-AC

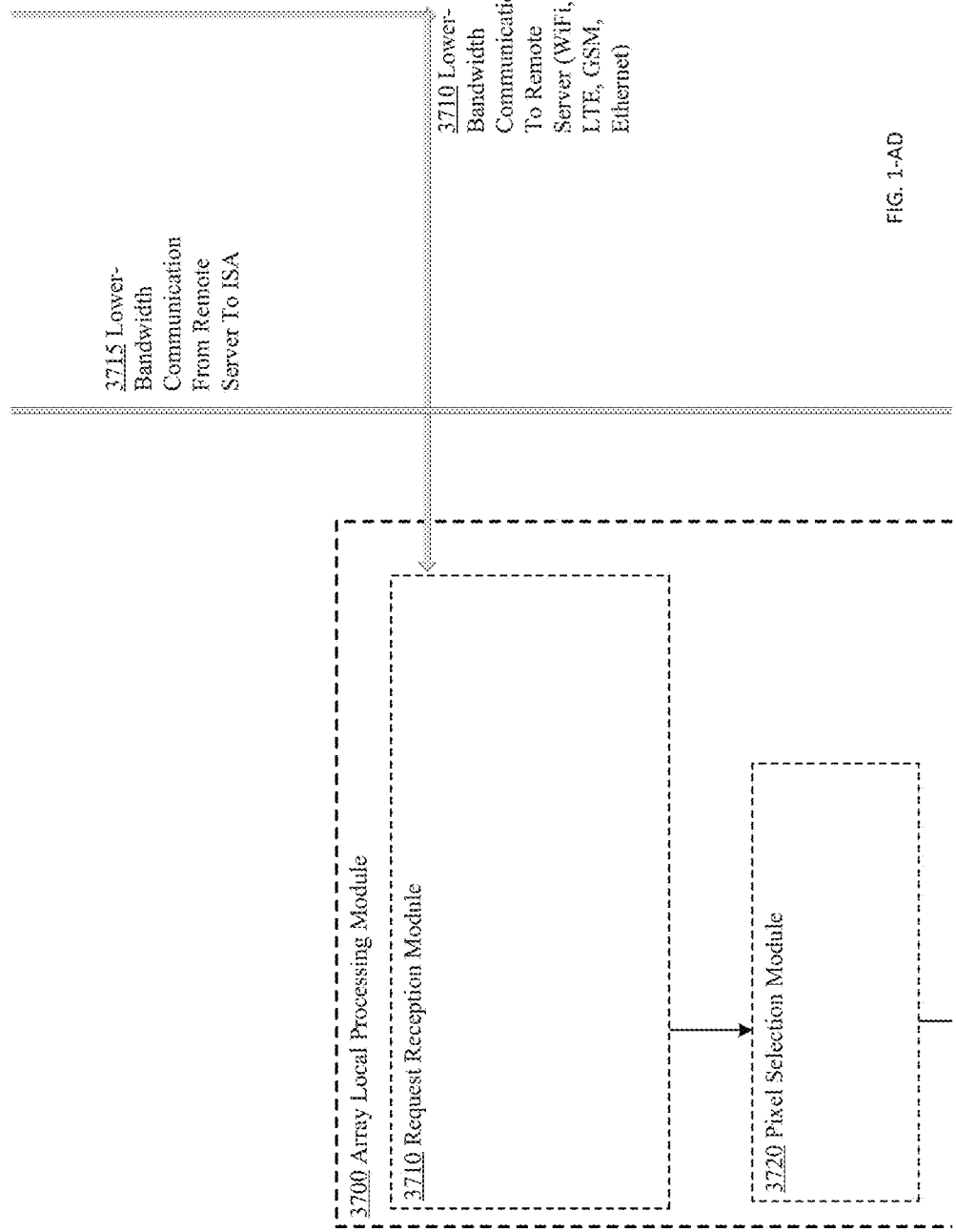
FIG. 1-AD

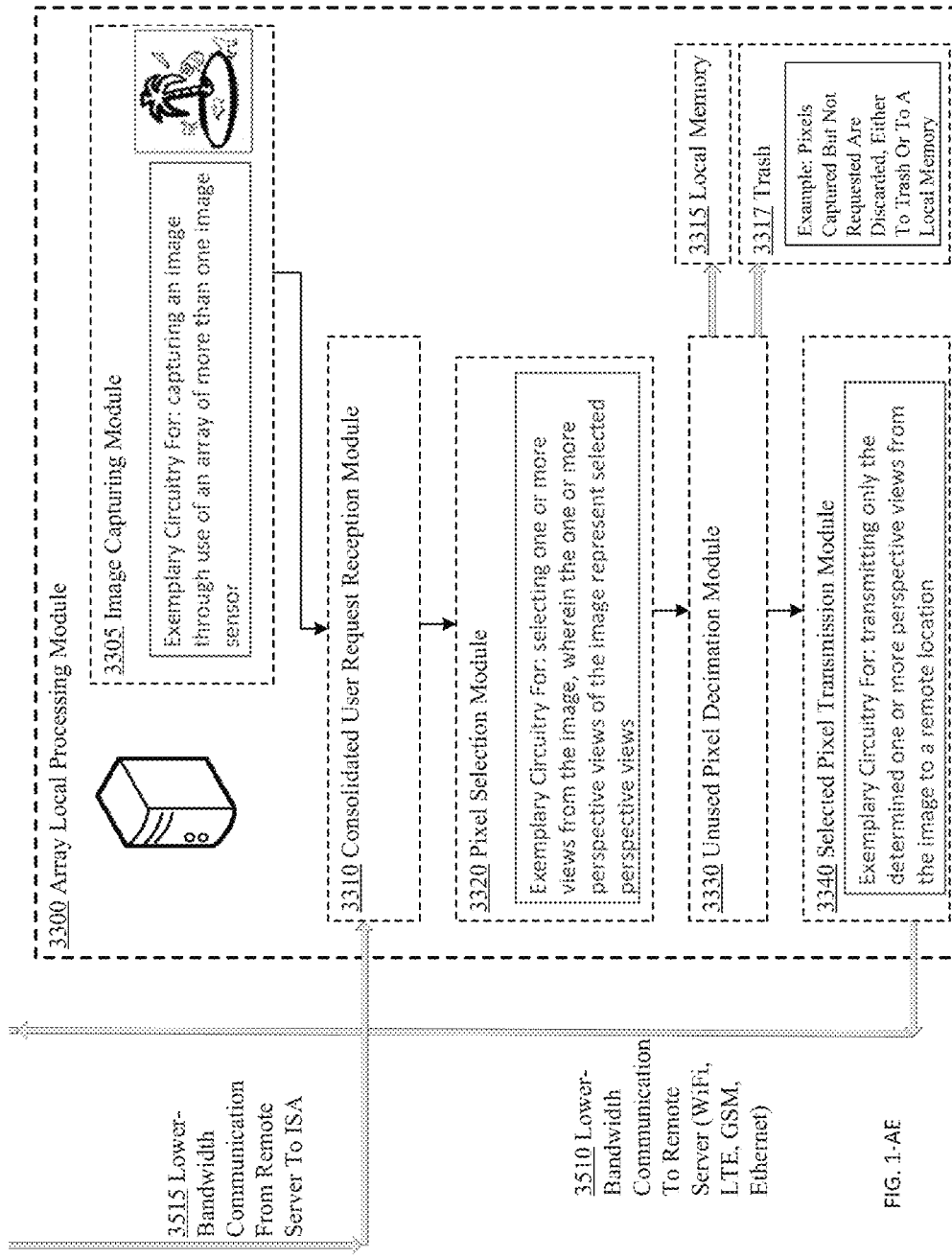
FIG. 1-AE

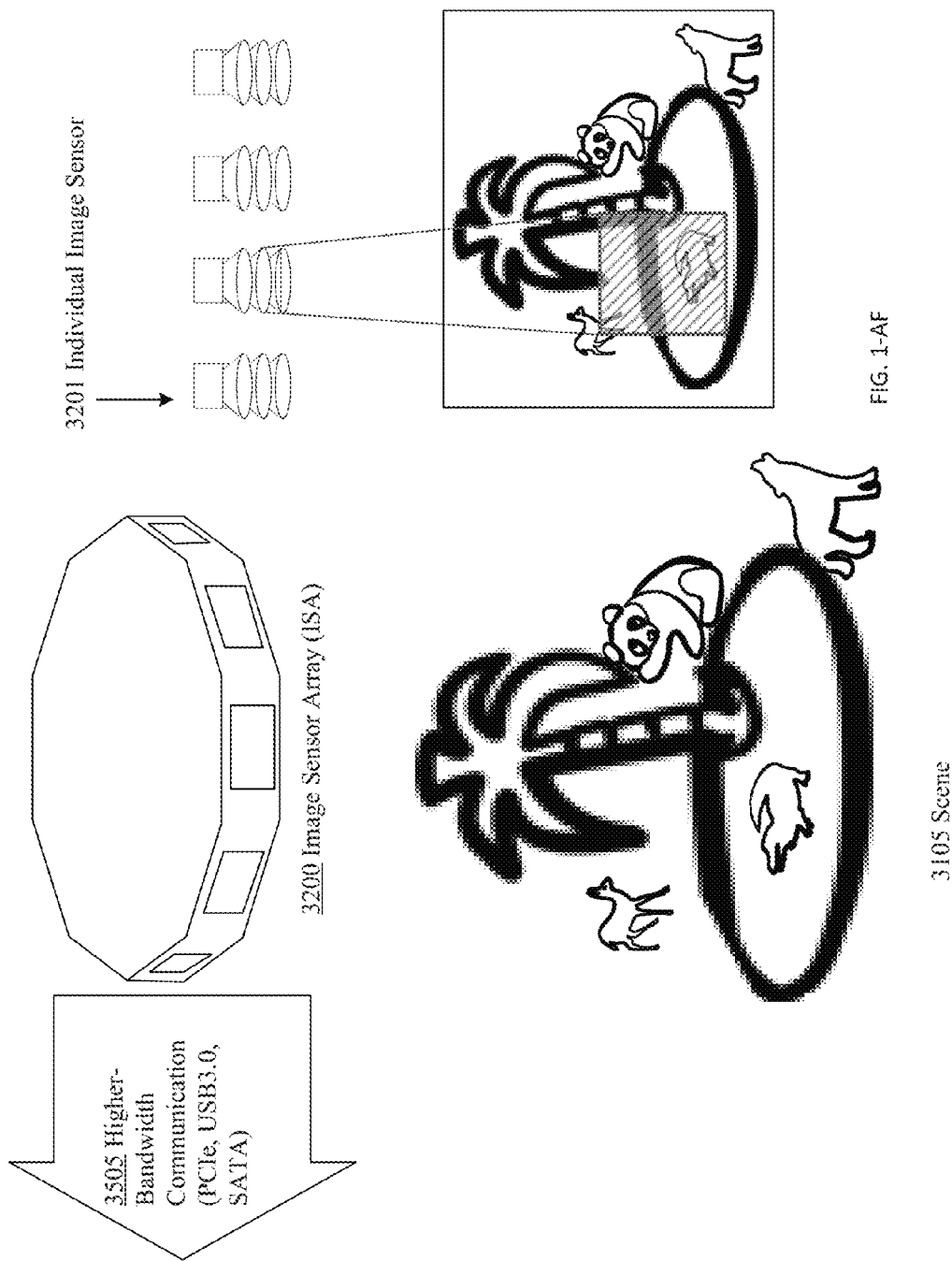

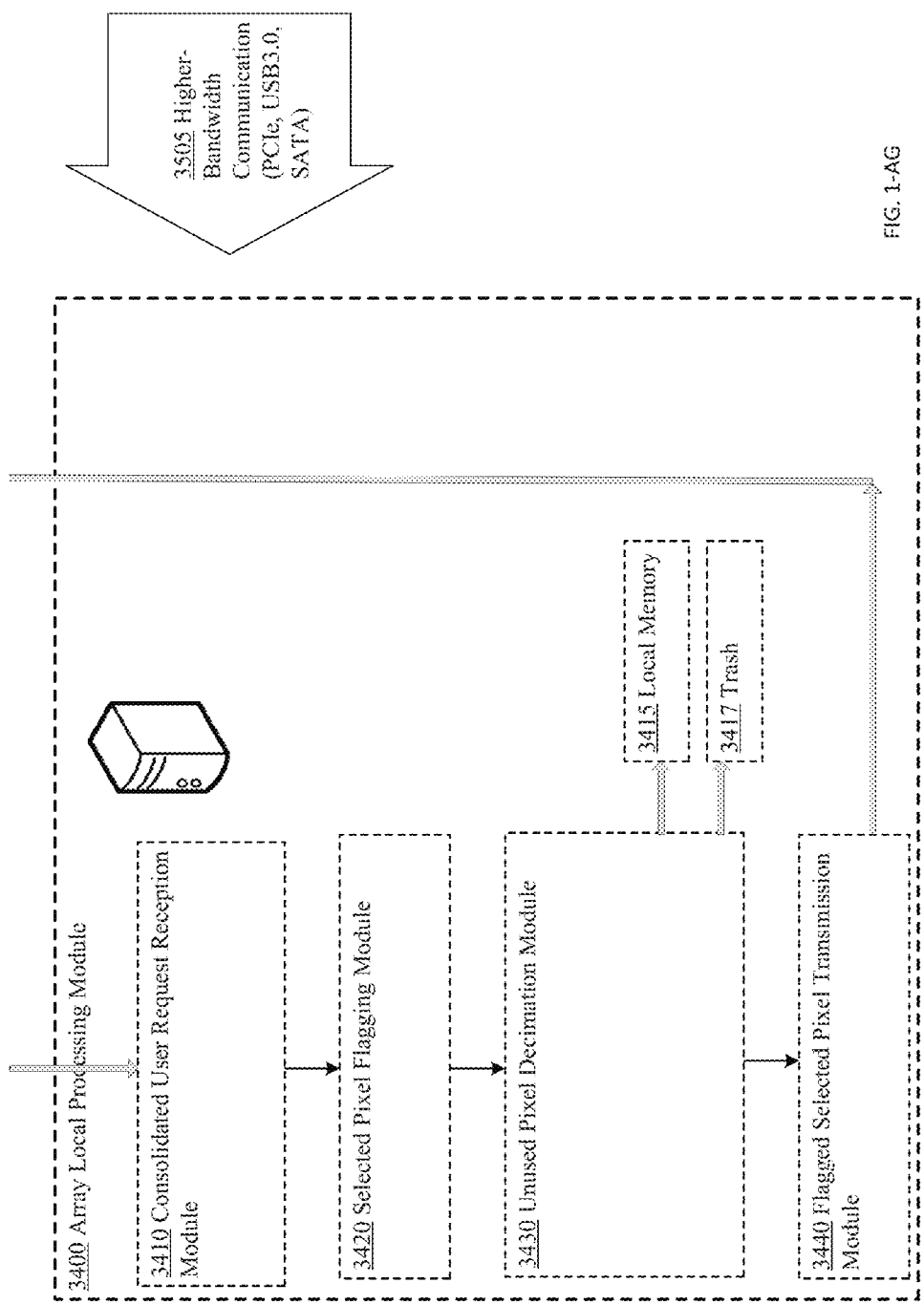
FIG. 1-AG

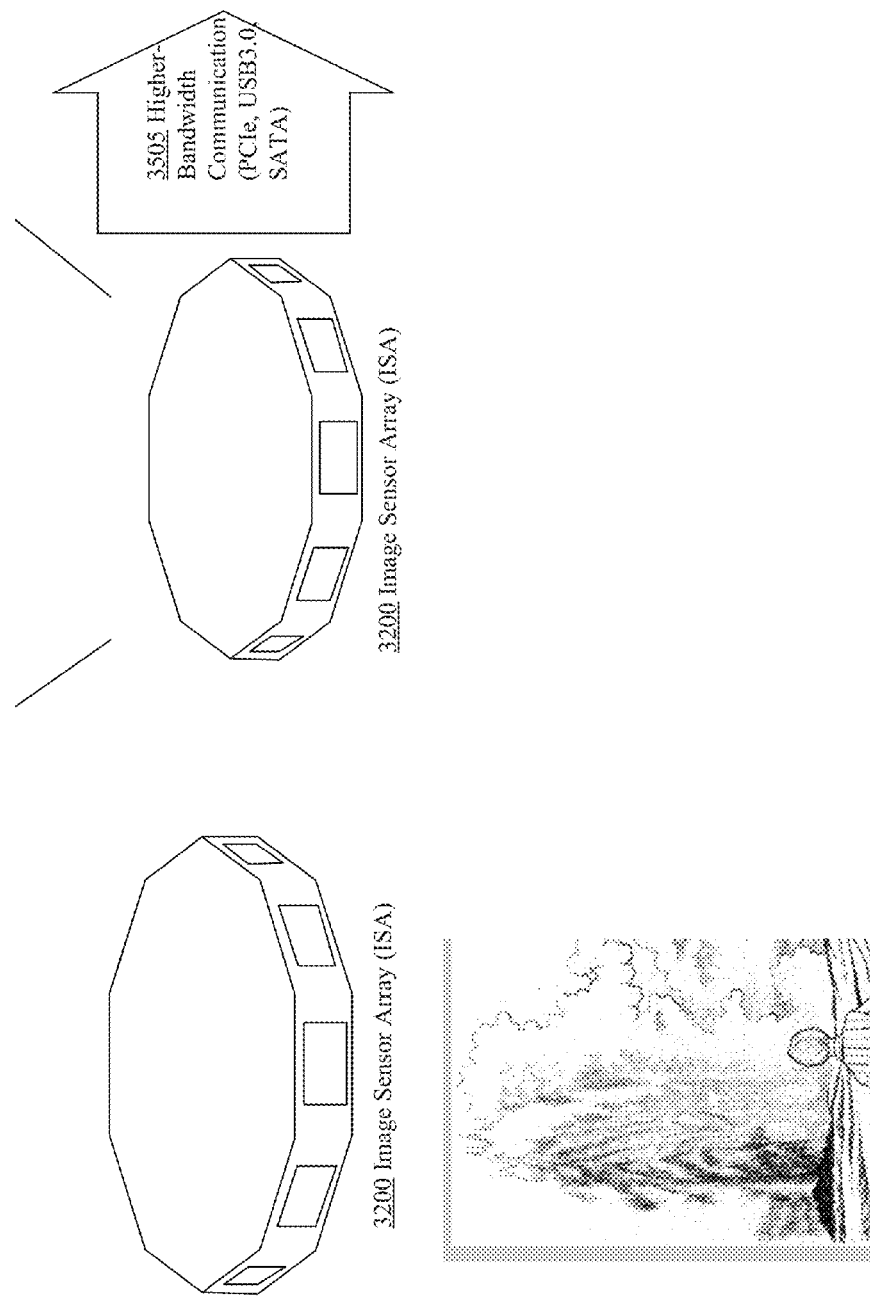

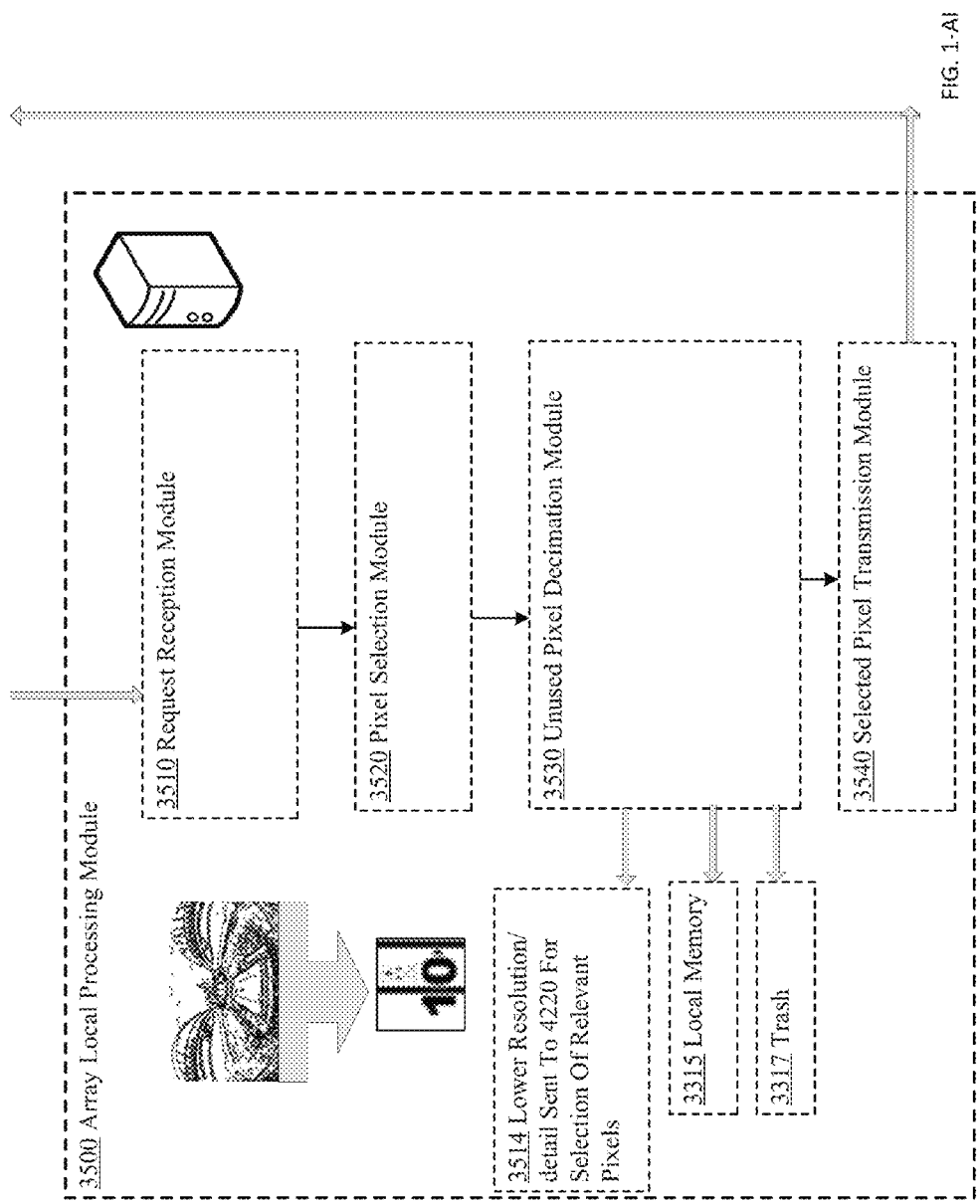

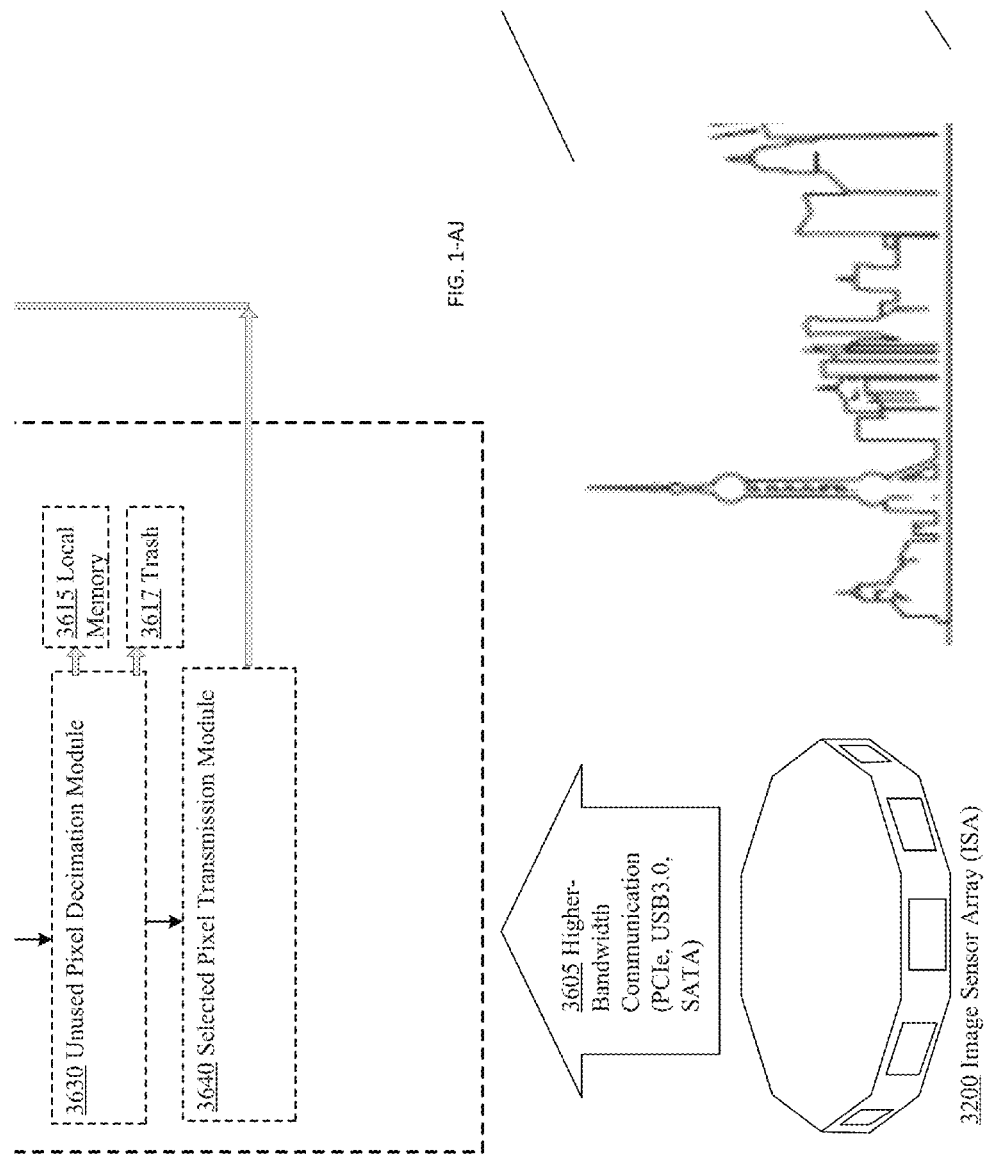

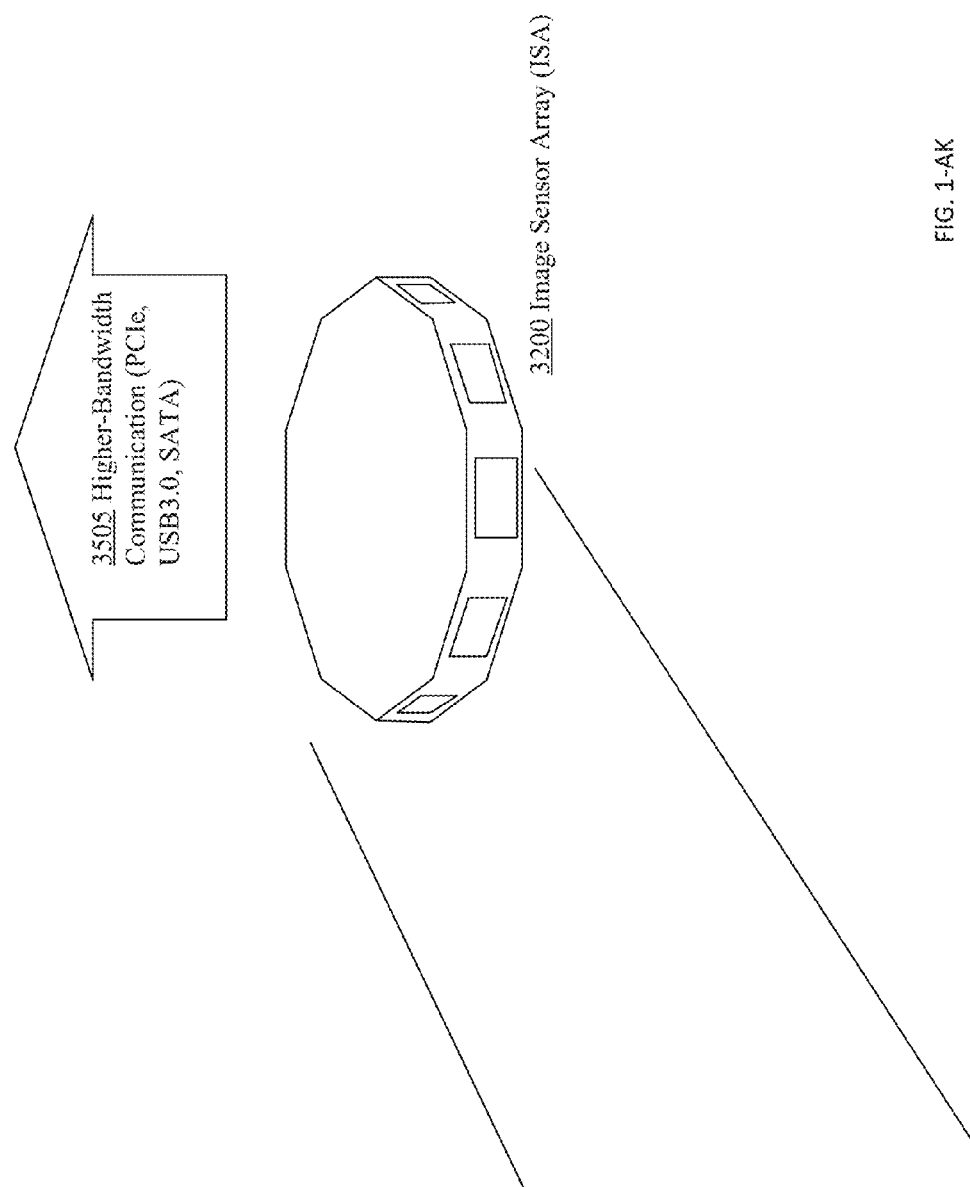
FIG. 1-AK

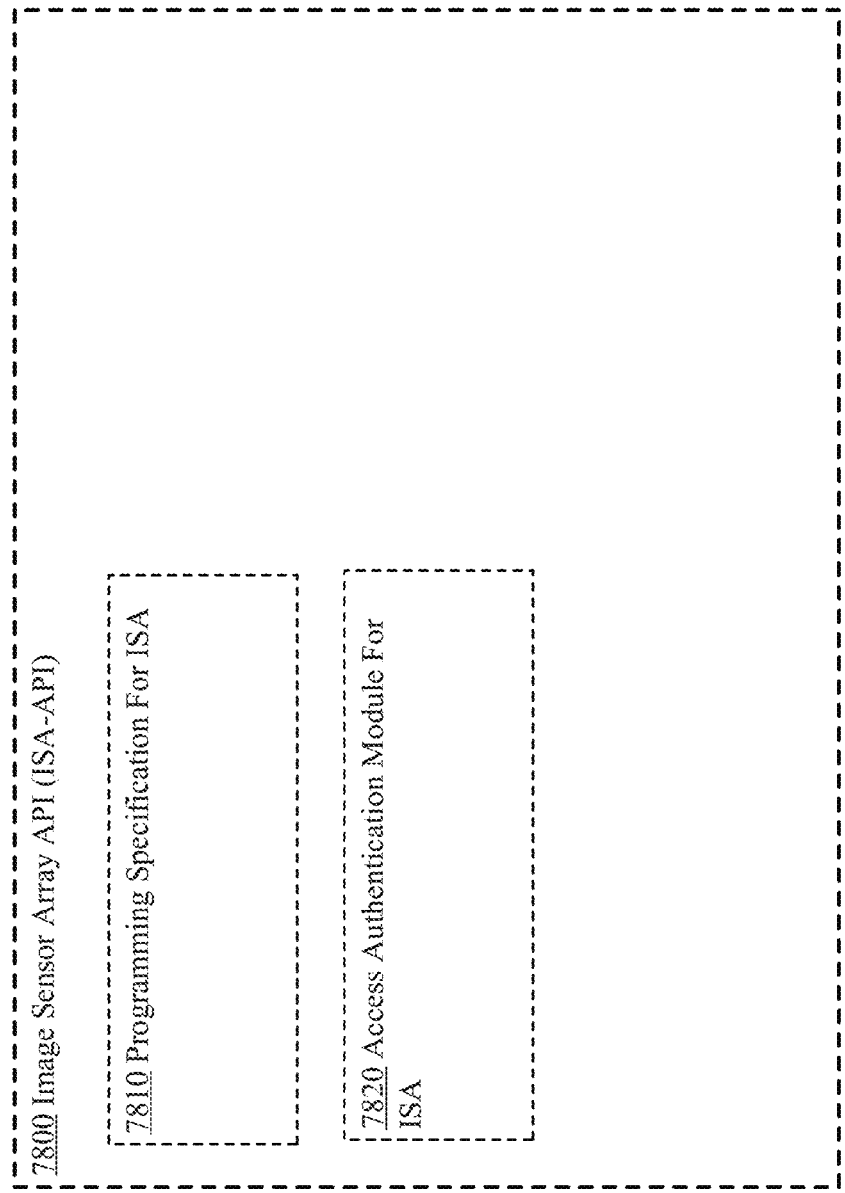
FIG. 1-AL

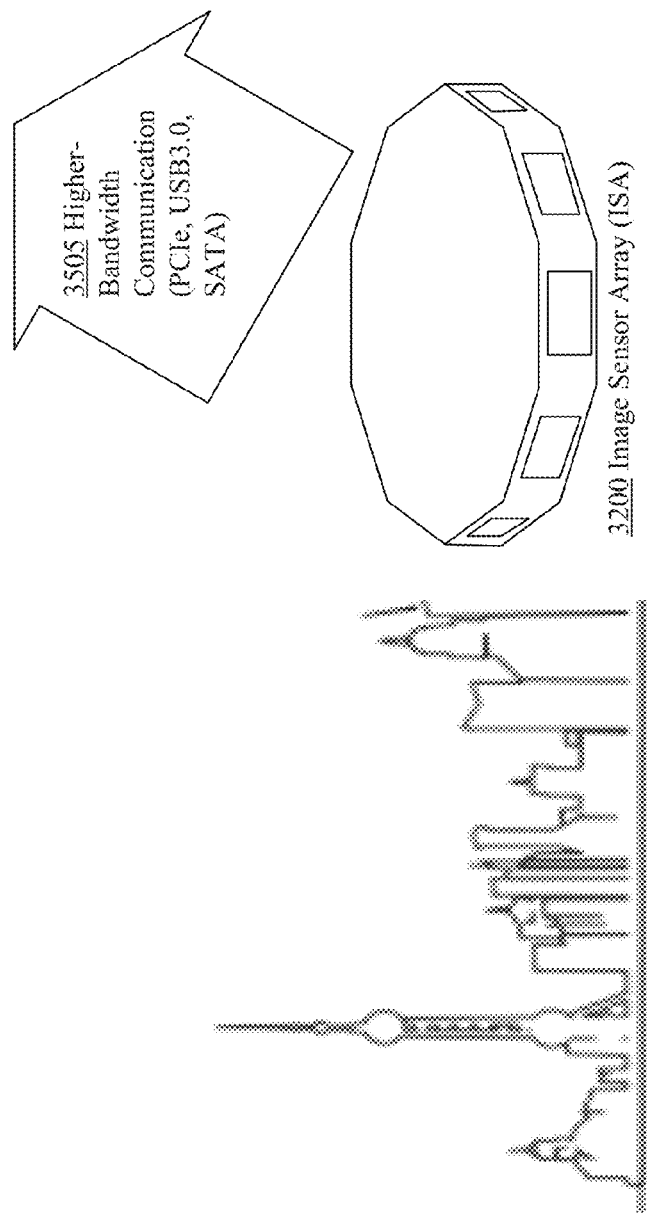
FIG. 1-AM

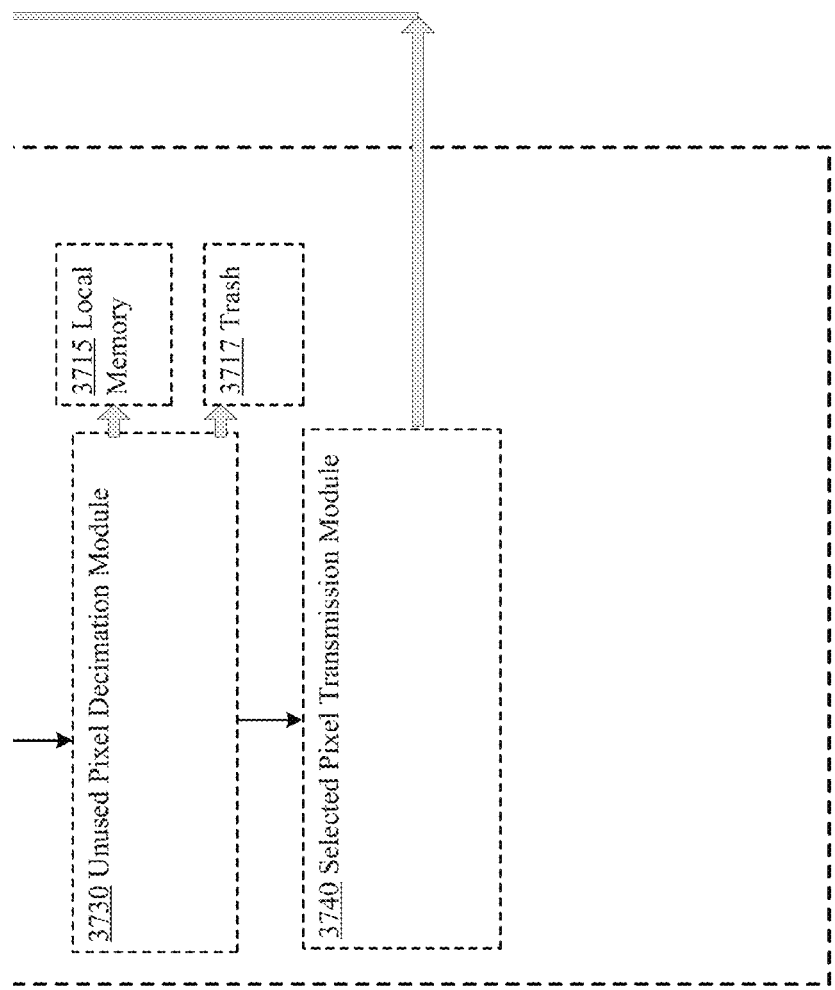
FIG. 1-AN

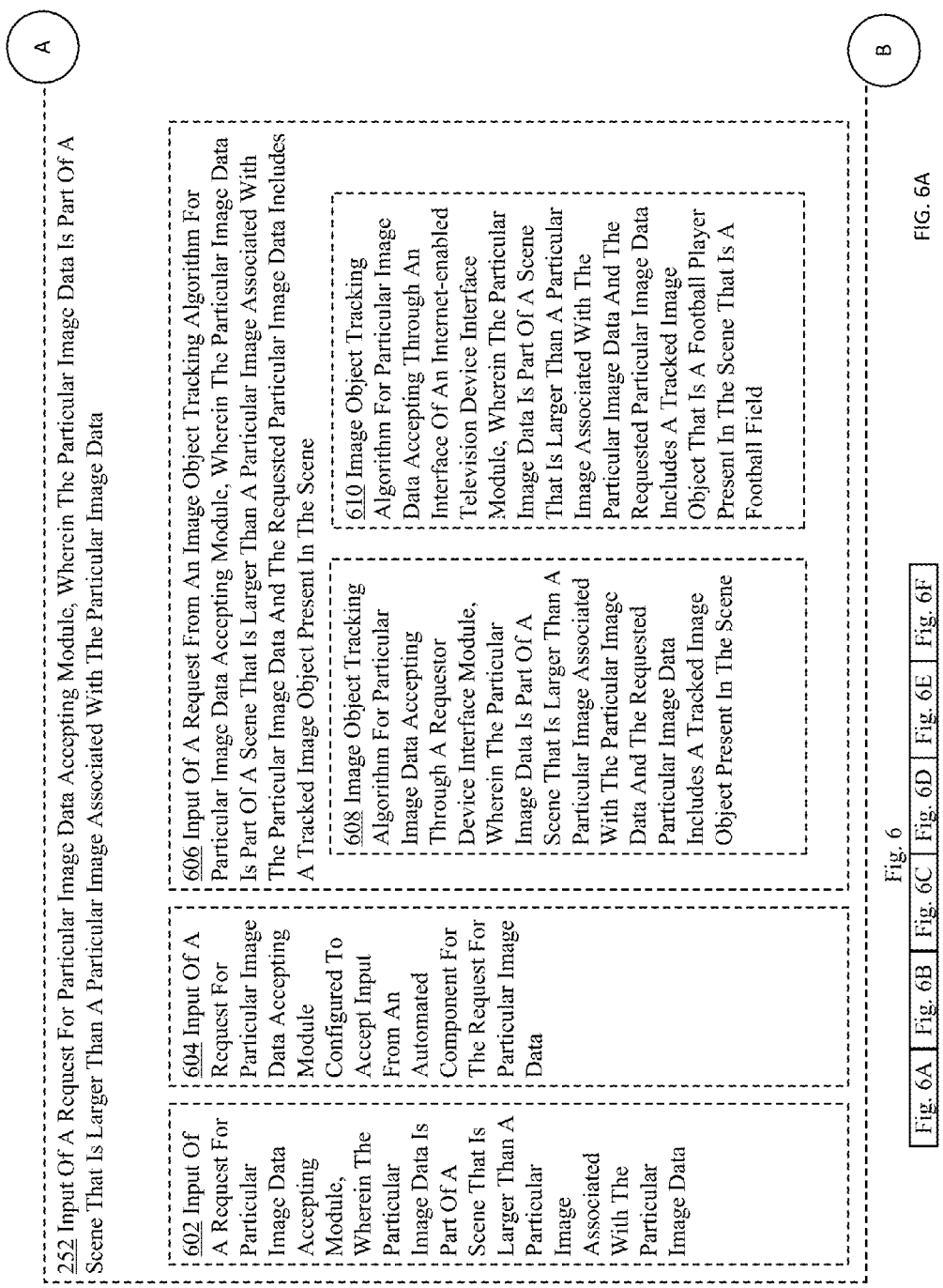

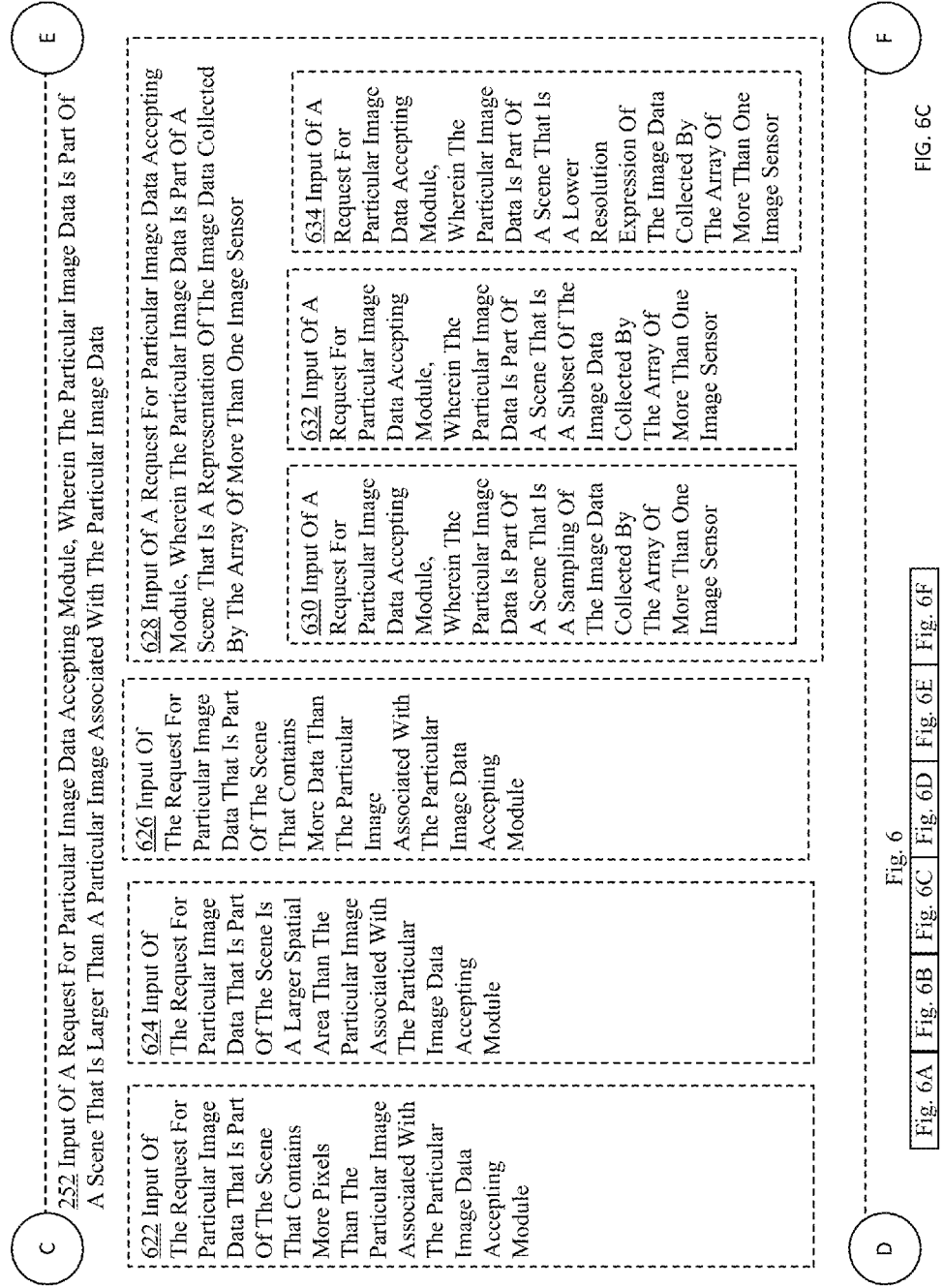

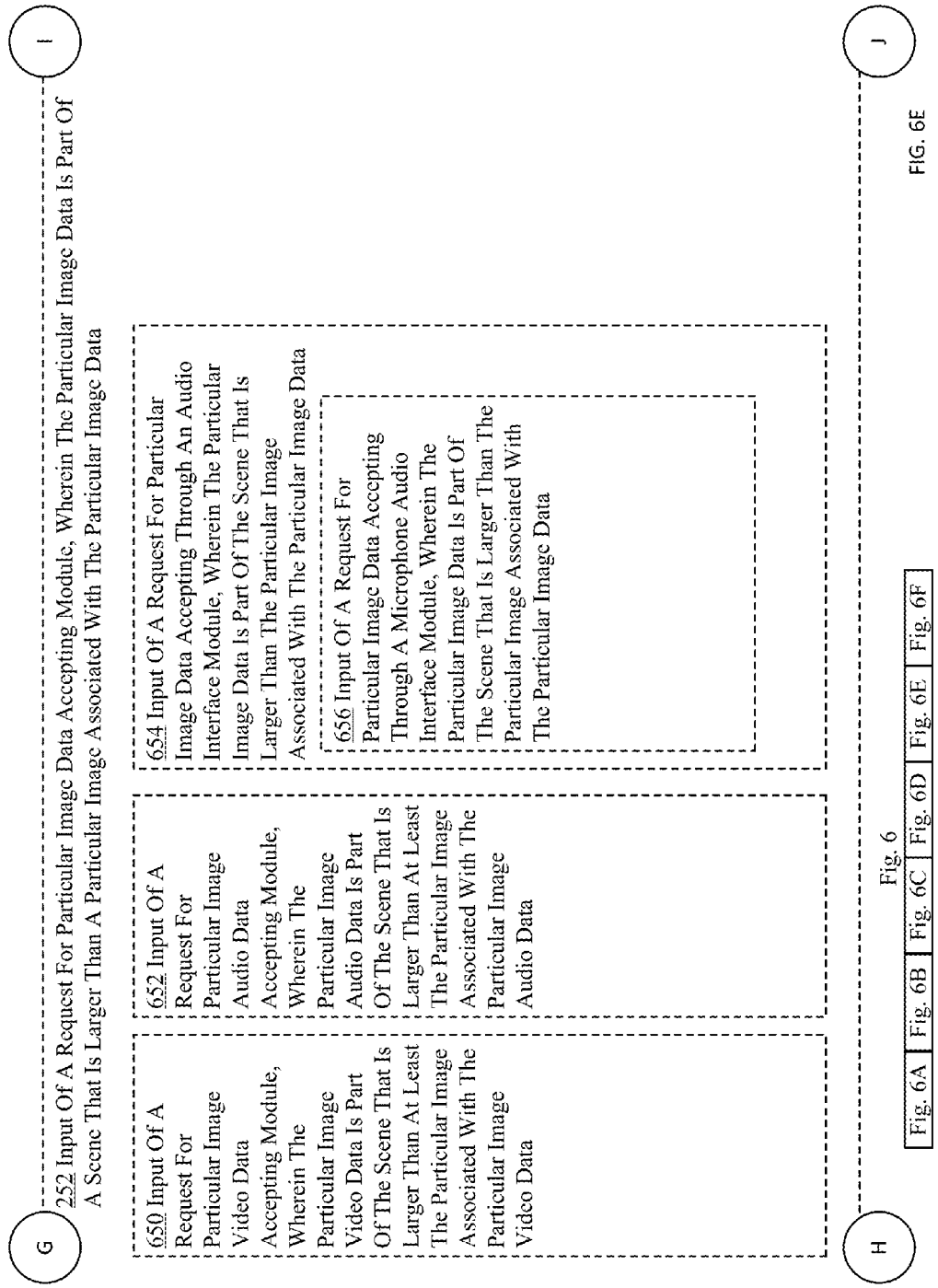

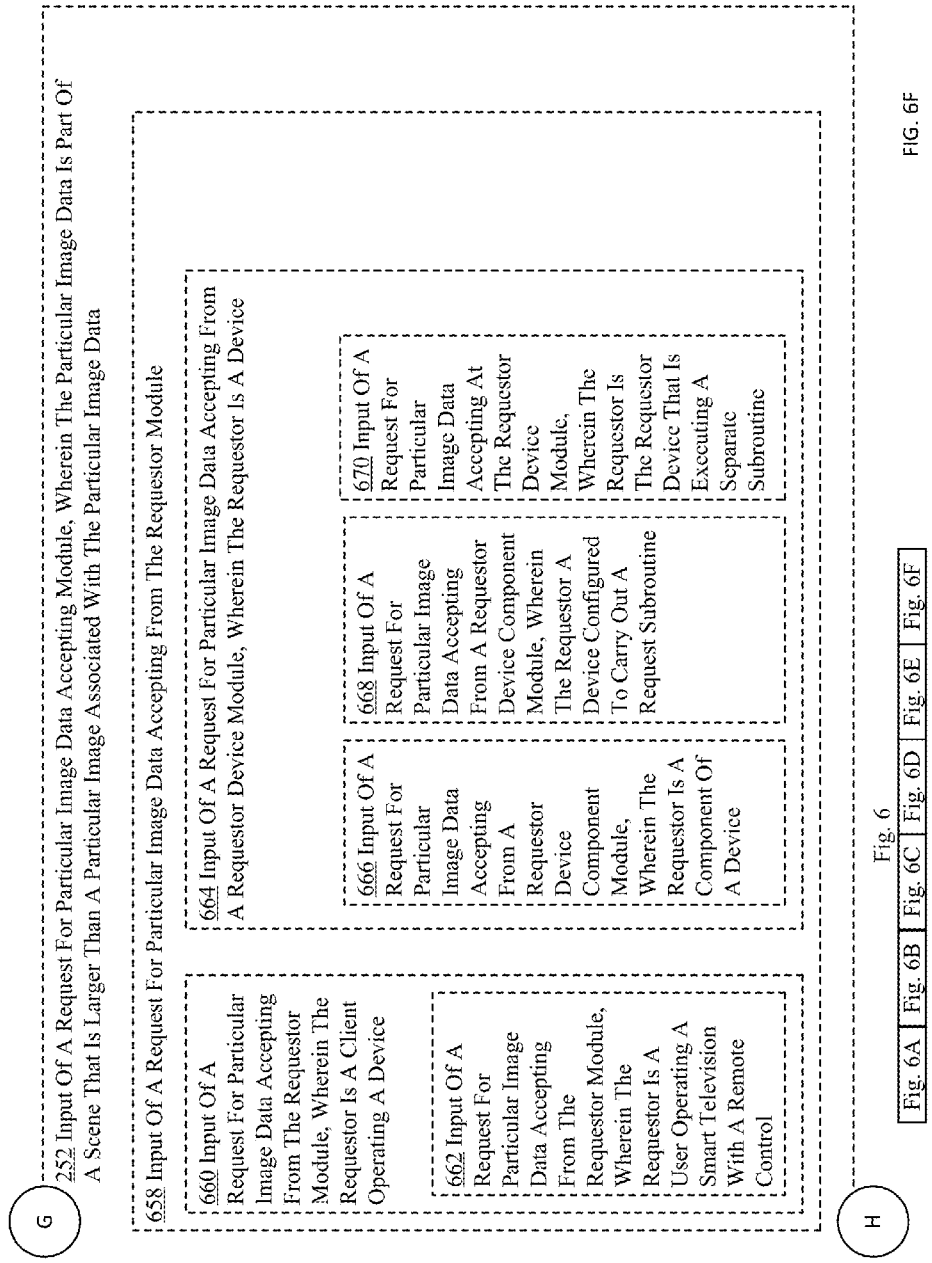

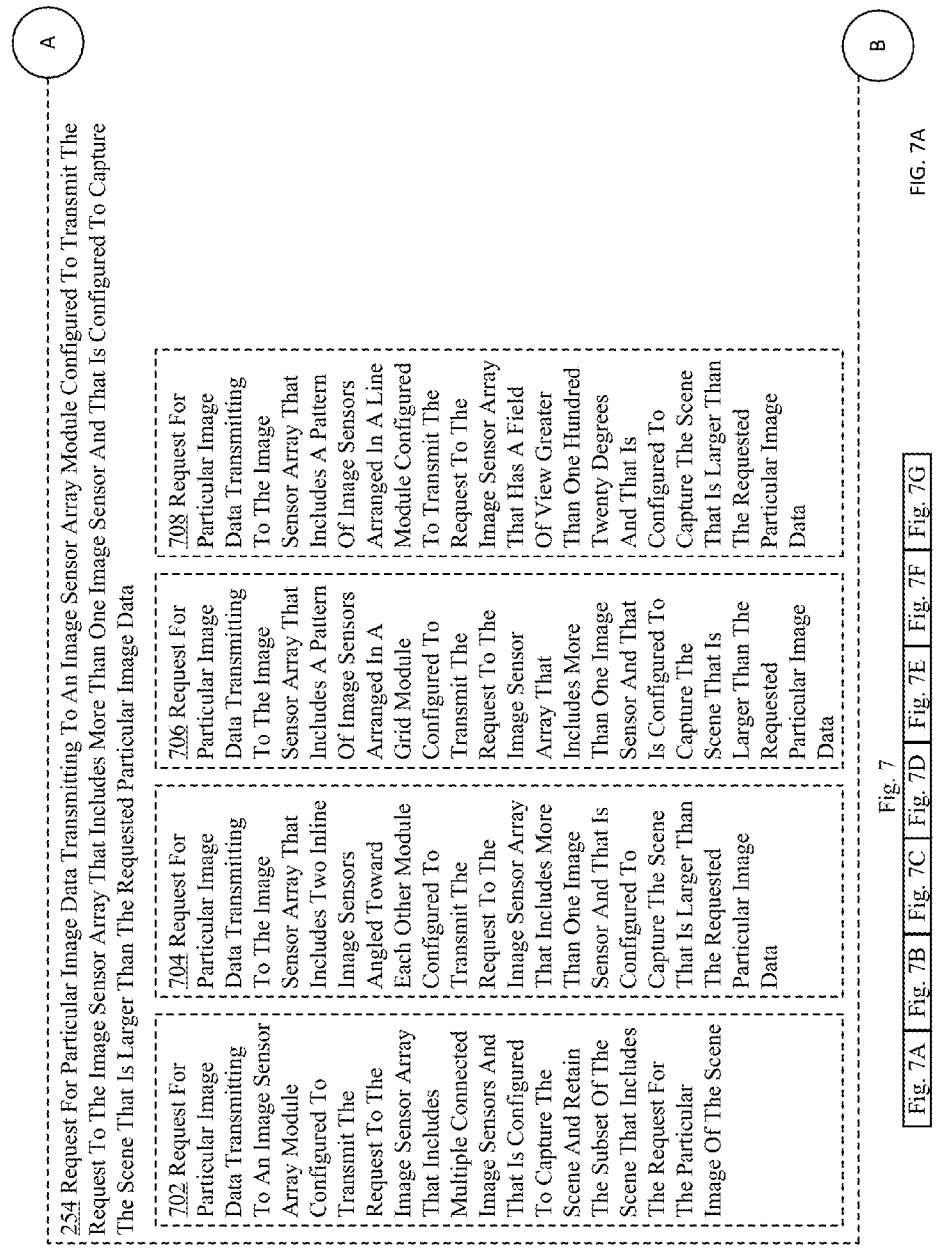

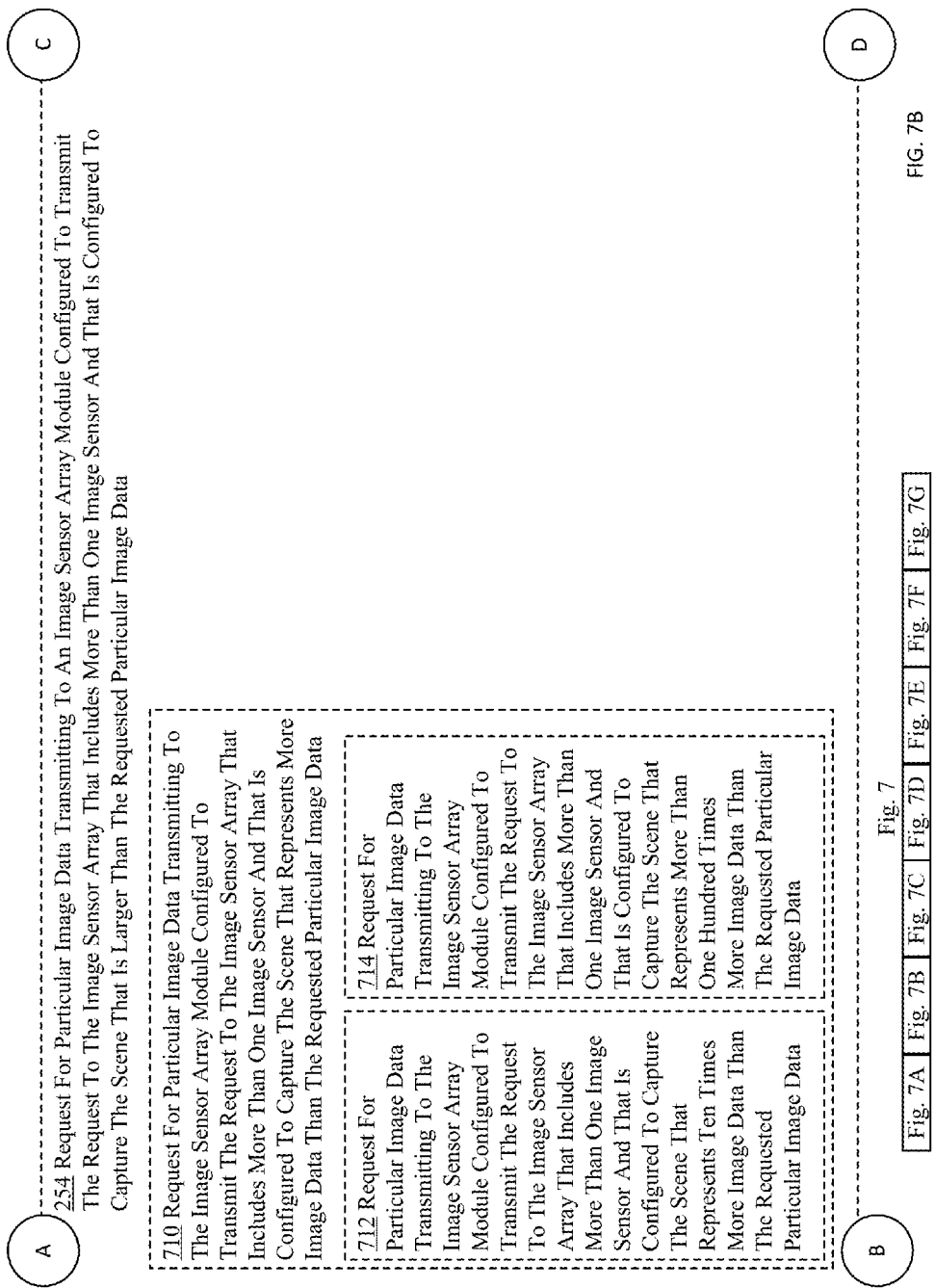

254 Request For Particular Image Data Transmitting To An Image Sensor Array Module Configured To Transmit The Request To The Image Sensor Array That Includes More Than One Image Sensor And That Is Configured To Capture The Scene That Is Larger Than The Requested Particular Image Data 716 Request For Particular Image Data Transmitting To A Remote Server Deployed To Relay The Request To The Image Sensor Array Module Configured To Transmit The Request To The Remote Server That Is Configured To Package The Request For Particular Image Data And Relay The Request For Particular Image Data To The Image Sensor Array 718 Request For Particular Image Data Transmitting To A Remote Server Deployed To Relay The Request To The Image Sensor Array Module Configured To Transmit The Request To The Remote Server That Is Configured To Package The Request For Particular Image Data And Relay The Request For Particular Image Data Along With One Or More Other Image Data Requests To The Image Sensor Array 720 Request For Particular Image Data Transmitting To A Remote Server Deployed To Relay The Request To The Image Sensor Array Module Configured To Transmit The Request To The Remote Server That Is Configured To Package Multiple Requests That Include The Request For Particular Image Data And Relay The Package Of Multiple Requests To The Image Sensor Array 722 Request For Particular Image Data Transmitting To A Remote Server Deployed To Relay The Request To The Image Sensor Array Module Configured To Transmit The Request To The Remote Server That Is Configured To Package Multiple Requests That Include The Request For Particular Image Data And Relay The Package Of Multiple Requests To The Image Sensor Array 724 Request For Particular Image Data Transmitting To A Remote Server Deployed To Relay The Request To The Image Sensor Array Module Configured To Transmit The Request To The Remote Server That Is Configured To Combine Multiple Requests That Include The Request For Particular Image Data And Transmit The Combined Multiple Requests As A Single Combined Request For Image Data To The Image Sensor Array

| Fig. 7A | Fig. 7B | Fig. 7C | Fig. 7D | Fig. 7E | Fig. 7F | Fig. 7G |

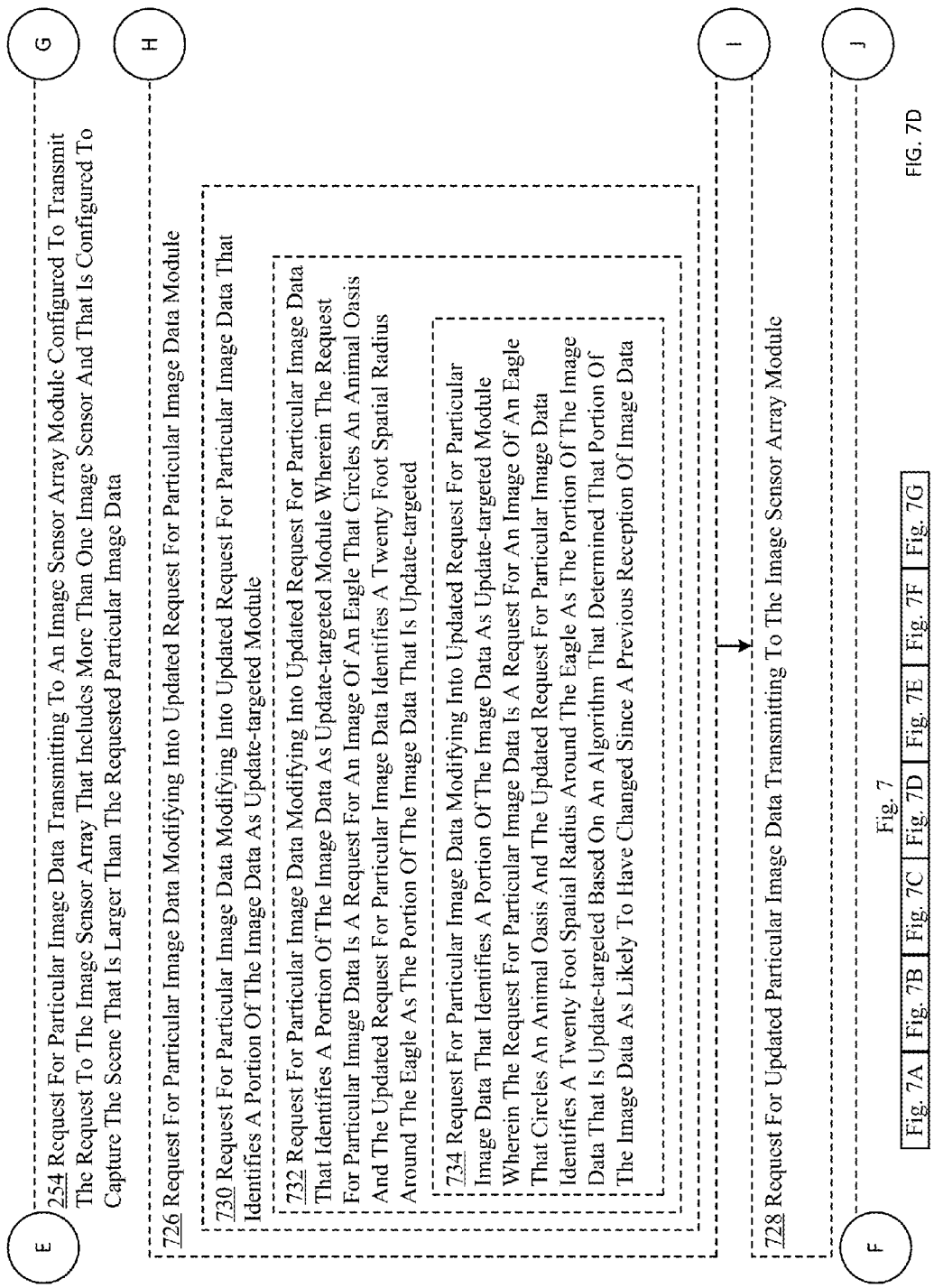

FIG. 7D

726 Request For Particular Image Data Modifying Into Updated Request For Particular Image Data Module 730 Request For Particular Image Data Modifying Into Updated Request For Particular Image Data That Identifies A Portion Of The Image Data As Update-targeted Module 732 Request For Particular Image Data Modifying Into Updated Request For Particular Image Data That Identifies A Portion Of The Image Data As Update-targeted Module Wherein The Request For Particular Image Data Is A Request For An Image Of An Eagle That Circles An Animal Oasis And The Updated Request For Particular Image Data Identifies A Twenty Foot Spatial Radius Around The Eagle As The Portion Of The Image Data That Is Update-targeted 734 Request For Particular Image Data Modifying Into Updated Request For Particular Image Data That Identifies A Portion Of The Image Data As Update-targeted Module Wherein The Request For Particular Image Data Is A Request For An Image Of An Eagle That Circles An Animal Oasis And The Updated Request For Particular Image Data Identifies A Twenty Foot Spatial Radius Around The Eagle As The Portion Of The Image Data That Is Update-targeted Based On An Algorithm That Determined That Portion Of The Image Data As Likely To Have Changed Since A Previous Reception Of Image Data 254 Request For Particular Image Data Transmitting To An Image Sensor Array Module Configured To Transmit The Request To The Image Sensor Array That Includes More Than One Image Sensor And That Is Configured To Capture The Scene That Is Larger Than The Requested Particular Image Data 728 Request For Updated Particular Image Data Transmitting To The Image Sensor Array Module

Fig. 7

| Fig. 7A | Fig. 7B | Fig. 7C | Fig. 7D | Fig. 7E | Fig. 7F | Fig. 7G |

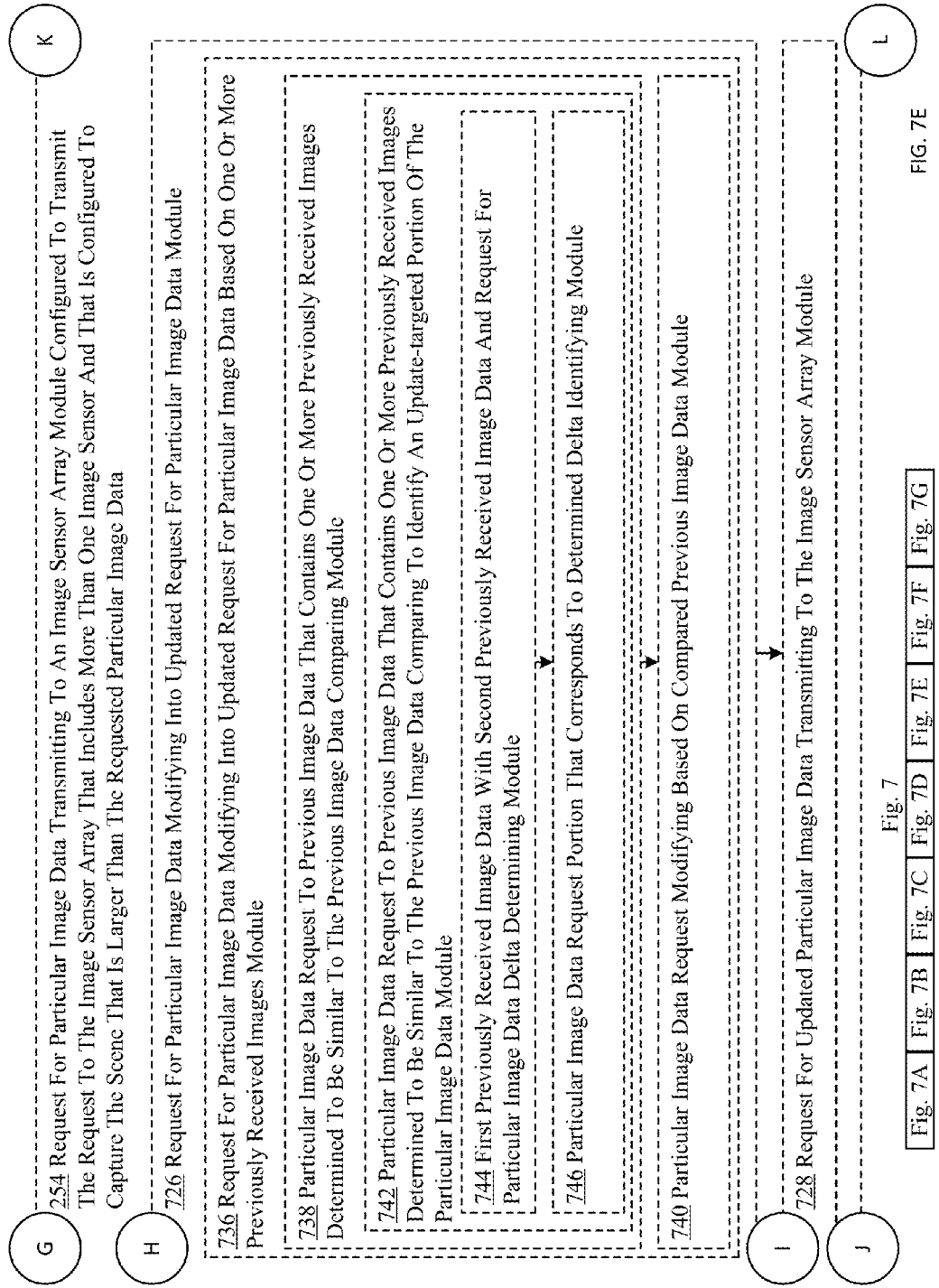

Fig. 7

748 Expanded Request For Particular Image Data Generating Module

752 Expanded Request For Particular Image Data That Includes The Request For Particular Image Data That Borders The Particular Image Data Generating Module 754 Expanded Request For Particular Image Data That Includes The Request For Particular Image Data And Border Image Data That Borders The Particular Image Data On All Four Sides Generating Module 756 Projected Next Side Image Data That Is Image Data Corresponding To An Image That Borders The Particular Image Of The Particular Image Data Determining Module 760 Projected Next Side Image Data That Is Image Data Corresponding To An Image That Borders The Particular Image Of The Particular Image Data Determining At Least Partially Based On A Detected Motion Of The Device Associated With The Requestor Module 762 Projected Next Side Image Data That Is Image Data Corresponding To An Image That Borders The Particular Image Of The Particular Image Data Determining At Least Partially Based On A Detected Head Turn Of The Requestor That Wears The Device Associated With The Requestor Module 758 Expanded Request For Particular Image Data That Includes The Request For Particular Image Data And Next Side Image Data Generating Module 254 Request For Particular Image Data Transmitting To An Image Sensor Array Module Configured To Transmit The Request To The Image Sensor Array That Includes More Than One Image Sensor And That Is Configured To Capture The Scene That Is Larger Than The Requested Particular Image Data 750 Expanded Request For Particular Image Data Transmitting To The Image Sensor Array Module Configured To Transmit The Request To The Image Sensor Array That Includes More Than One Image Sensor And That Is Configured To Capture The Scene That Is Larger Than The Requested Particular Image Data

| Fig. 7A | Fig. 7B | Fig. 7C | Fig. 7D | Fig. 7E | Fig. 7F | Fig. 7G |

FIG. 7F (M)

254 Request For Particular Image Data Transmitting To An Image Sensor Array Module Configured To Transmit The Request To The Image Sensor Array That Includes More Than One Image Sensor And That Is Configured To Capture The Scene That Is Larger Than The Requested Particular Image Data (N)

748 Expanded Request For Particular Image Data Generating Module

752 Expanded Request For Particular Image Data That Includes The Request For Particular Image Data And Border Image Data That Borders The Particular Image Data Generating Module 764 Expanded Request For Particular Image Data That Includes The Request For Particular Image Data, First Border Image Data That Borders The Particular Image Data, And Second Border Image Data That Borders The First Border Image Data Generating Module 766 Expanded Request For Particular Image Data That Includes The Request For Particular Image Data, First Border Image Data, And Second Border Image Data That Borders The First Border Image Data Generating Module Configured To Generate The Expanded Request For The Particular Image Data That Includes The Request For The Particular Image Data At A First Resolution, The Request For The First Border Image Data At A Second Resolution Less Than The First Resolution, And The Request For The Second Border Image Data At A Third Resolution Less Than Or Equal To The Second Resolution (O)

750 Expanded Request For Particular Image Data Transmitting To The Image Sensor Array Module Configured To Transmit The Request To The Image Sensor Array That Includes More Than One Image Sensor And That Is Configured To Capture The Scene That Is Larger Than The Requested Particular Image Data (P)

Fig. 7

| Fig. 7A | Fig. 7B | Fig. 7C | Fig. 7D | Fig. 7E | Fig. 7F | Fig. 7G |

FIG. 7G

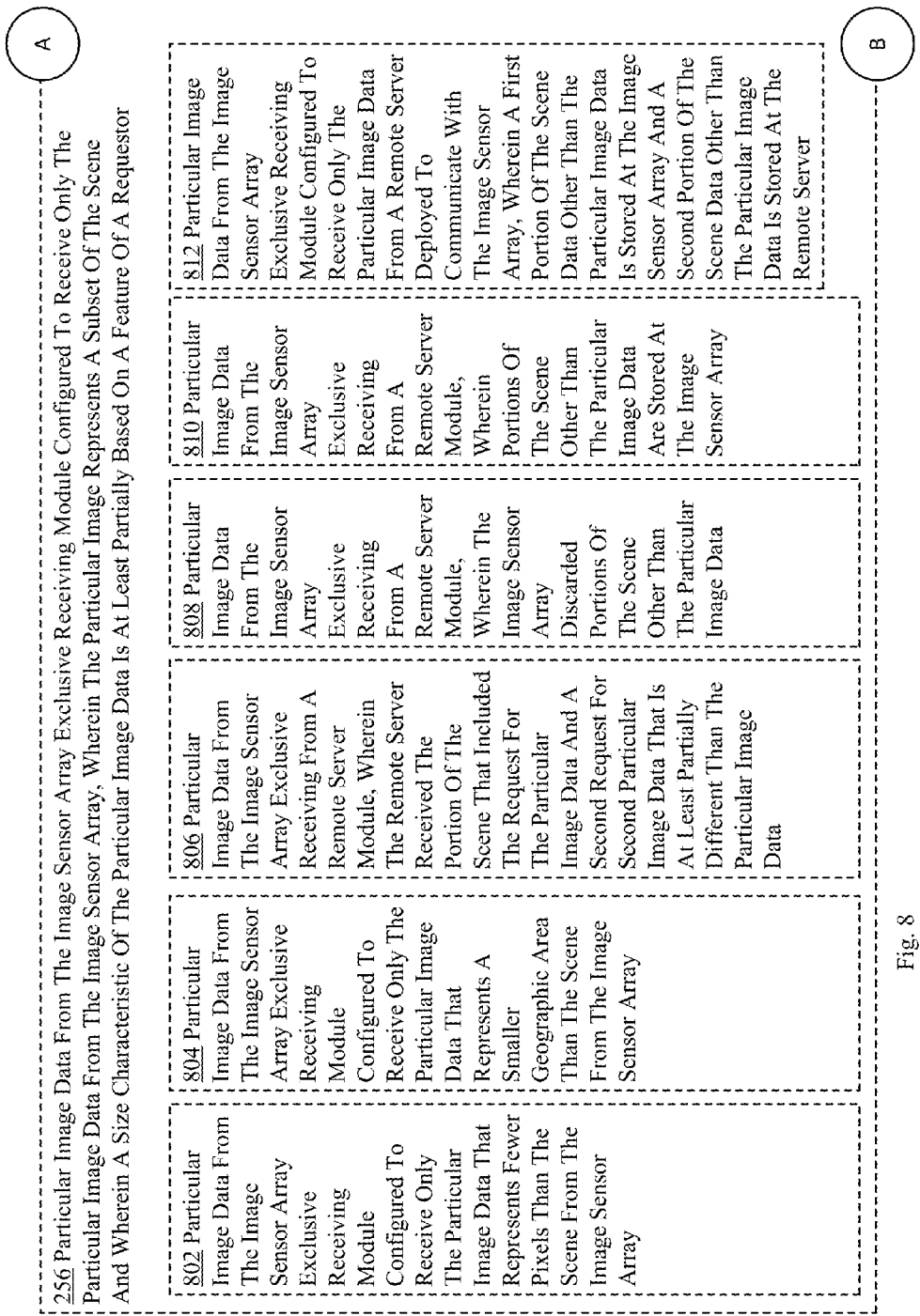

256 Particular Image Data From The Image Sensor Array Exclusive Receiving Module Configured To Receive Only The Particular Image Data From The Image Sensor Array, Wherein The Particular Image Represents A Subset Of The Scene And Wherein A Size Characteristic Of The Particular Image Data Is At Least Partially Based On A Feature Of A Requestor 814 Particular Image Data From The Image Sensor Array Exclusive Receiving Module Configured To Receive Only The Particular Image Data From The Image Sensor Array, Wherein The Particular Image Represents A Subset Of The Scene And Wherein A Size Characteristic Of The Particular Image Data Is At Least Partially Based On A Feature Of A Requestor Device That Is Associated With The Requestor 816 Particular Image Data From The Image Sensor Array Exclusive Receiving Module Configured To Receive Only The Particular Image Data From The Image Sensor Array, Wherein The Size Characteristic Of The Particular Image Data Is At Least Partially Based On A Feature Of A Requestor Device That Is Deployed To Store Data About With The Requestor 818 Particular Image Data From The Image Sensor Array Exclusive Receiving Module Configured To Receive Only The Particular Image Data From The Image Sensor Array, Wherein The Size Characteristic Of The Particular Image Data Is At Least Partially Based On A Bandwidth Available To The Requestor Device 820 Particular Image Data From The Image Sensor Array Exclusive Receiving Module Configured To Receive Only The Particular Image Data From The Image Sensor Array, Wherein The Size Characteristic Of The Particular Image Data Is At Least Partially Based On A Bandwidth Between The Requestor Device And A Remote Server That Communicates With The Image Sensor Array

Fig. 8

| Fig. 8A | Fig. 8B | Fig. 8C |

FIG. 8B

256 Particular Image Data From The Image Sensor Array Exclusive Receiving Module 822 Particular Image Data From The Image Sensor Array Exclusive Receiving Module Configured To Receive Only The Particular Image Data From The Image Sensor Array, Wherein The Particular Image Represents A Subset Of The Scene And Wherein A Size Characteristic Of The Particular Image Data Is At Least Partially Based On A Screen Size Of A Requestor Device That Is Associated With The Requestor 824 Particular Image Data From The Image Sensor Array Exclusive Receiving Module Configured To Receive Only The Particular Image Data From The Image Sensor Array, Wherein The Particular Image Represents A Subset Of The Scene And Wherein A Size Characteristic Of The Particular Image Data Is At Least Partially Based On A Maximum Resolution Of A Requestor Device That Is Associated With The Requestor

| Fig. 8A | Fig. 8B | Fig. 8C |

FIG. 8C

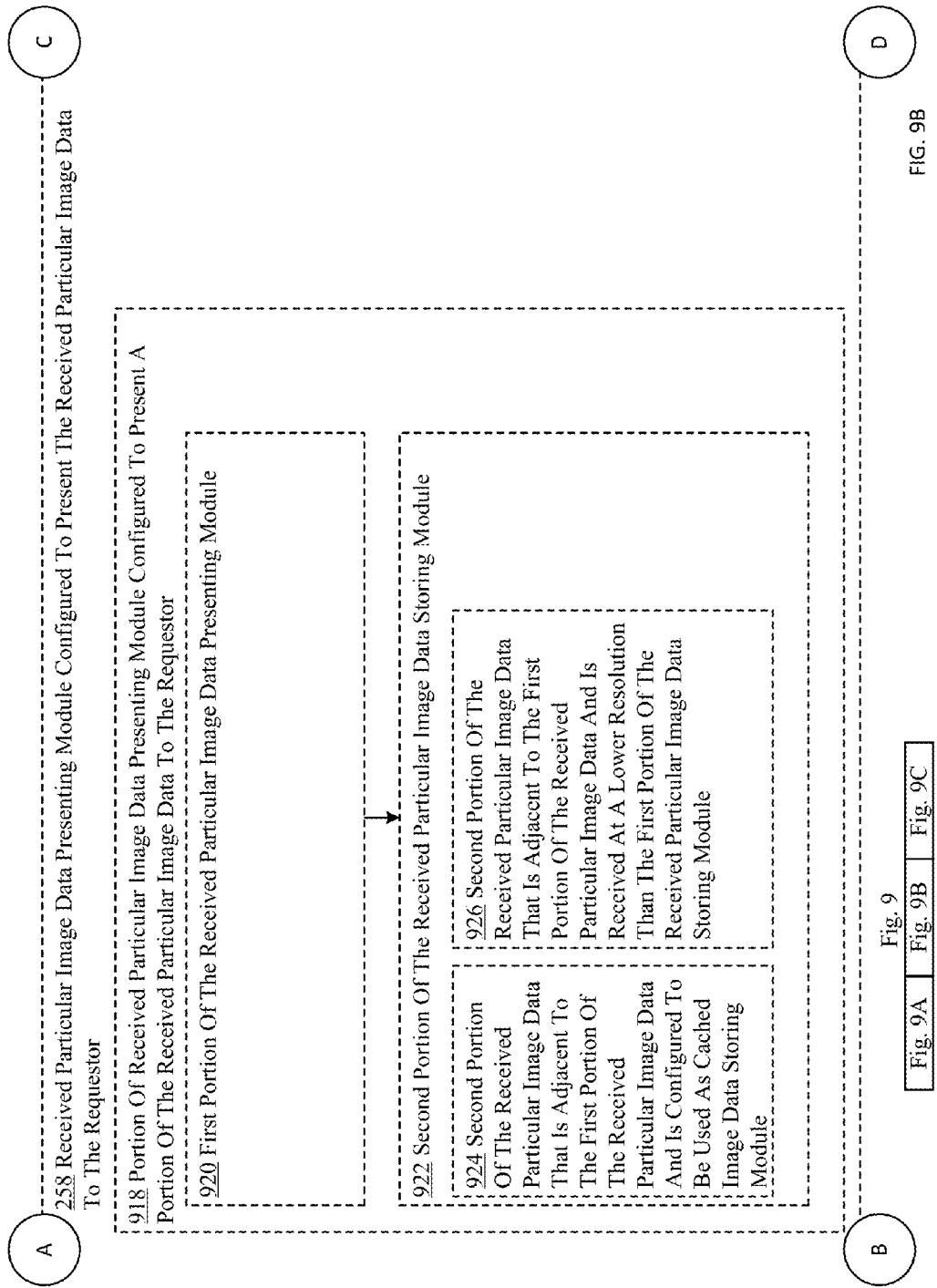

| Fig. 9A | Fig. 9B | Fig. 9C |

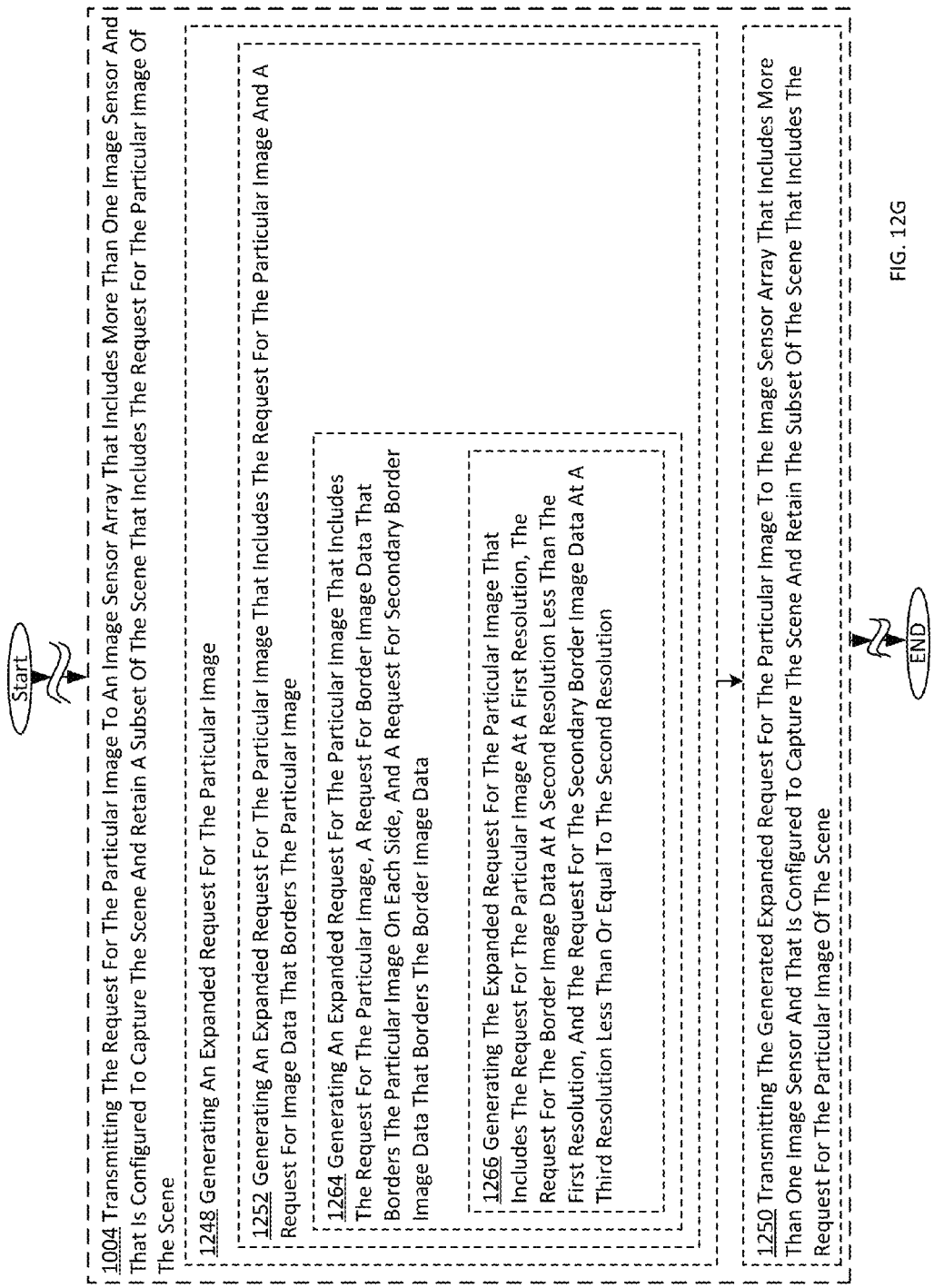

1006 Receiving Only The Particular Image From The Image Sensor Array, Wherein The Particular Image Represents A Subset Of The Scene, And Wherein A Size Characteristic Of The Particular Image Is At Least Partially Based On A Property Of A Requestor

| 1302 Receiving Only The Particular Image From The Image Sensor Array, Wherein The Particular Image Represents Fewer Pixels Than The Scene | 1304 Receiving Only The Particular Image From The Image Sensor Array, Wherein The Particular Image Represents A Representation Of A Smaller Geographic Area Than A Geographic Area Represented By The Scene | 1306 Receiving Only The Particular Image From A Remote Server That Received A Portion Of The Scene, Wherein The Remote Server Received The Portion Of The Scene That Included The Request For The Particular Image And A Second Request For A Second Particular Image That Is At Least Partially Different Than The First Particular Image | 1308 Receiving Only The Particular Image From The Image Sensor Array, Wherein The Particular Image Represents The Subset Of The Scene, And Wherein The Image Sensor Array Discarded Portions Of The Scene Other Than The Particular Image | 1310 Receiving Only The Particular Image Data From The Image Sensor Array, Wherein Data From The Scene Other Than The Particular Image Data Is Stored At The Image Sensor Array | 1312 Receiving Only The Particular Image Data From A Remote Server Configured To Communicate With The Image Sensor Array, Wherein A First Portion Of The Scene Data Other Than The Particular Image Is Stored At The Image Sensor Array, And A Second Portion Of The Scene Data Other Than The Particular Image Is Stored At The Remote Server |

FIG. 13A

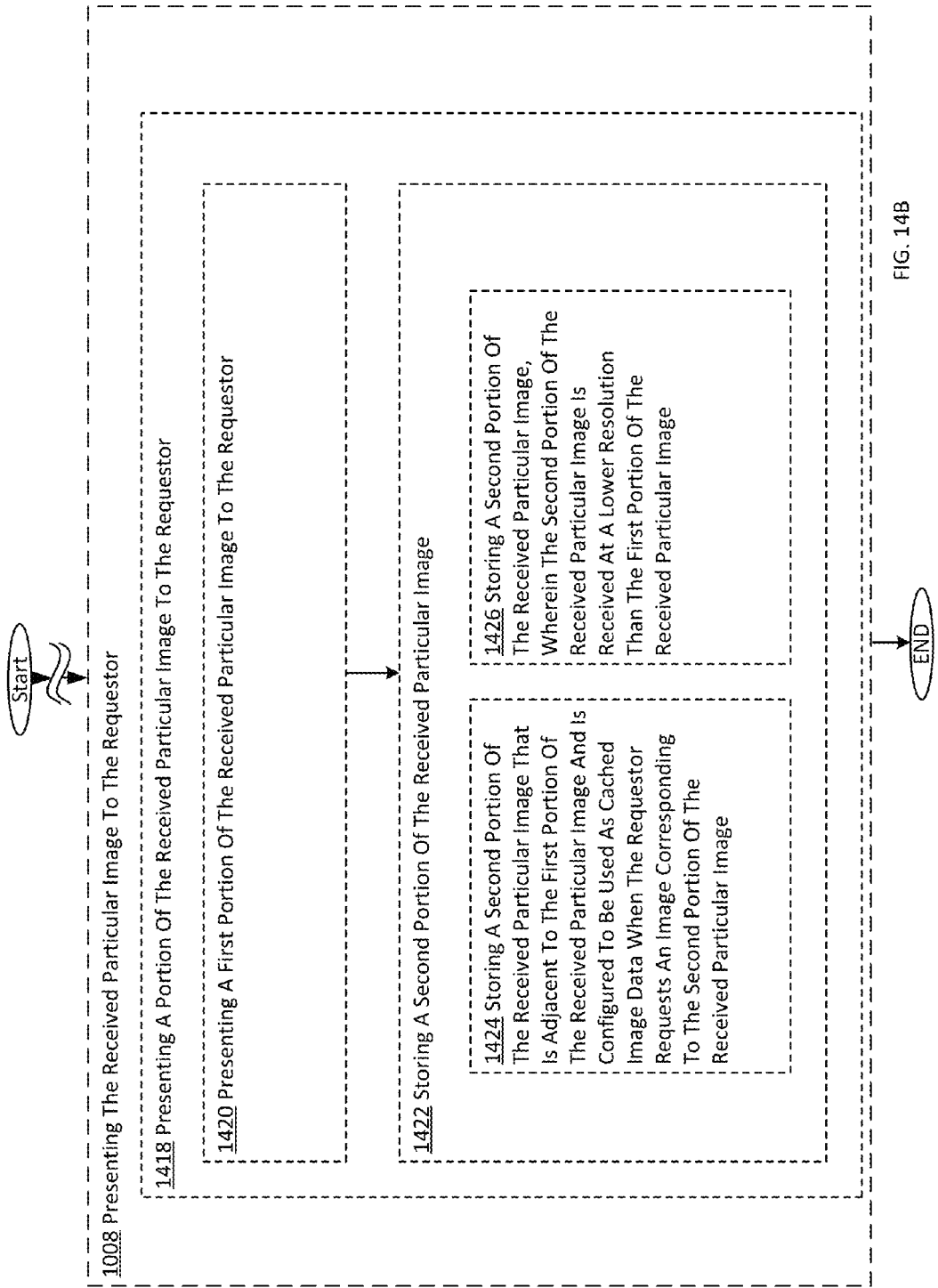

DEVICES, METHODS AND SYSTEMS FOR MULTI-USER CAPABLE VISUAL IMAGING ARRAYS

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. § § 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application claims benefit of priority of U.S. Provisional Patent Application No. 62/081,559 titled DEVICES, METHODS, AND SYSTEMS FOR INTEGRATING MULTIPLE USER VIDEO IMAGING ARRAY, naming Russell Hannigan as inventor, filed 18 Nov. 2014, which was filed within the twelve months preceding the filing date of the present application or is an application of which a currently co-pending application is entitled to the benefit of the filing date.

For purposes of the USPTO extra-statutory requirements, the present application claims benefit of priority of U.S. Provisional Patent Application No. 62/081,560 titled DEVICES, METHODS, AND SYSTEMS FOR IMPLEMENTATION OF MULTIPLE USER VIDEO IMAGING ARRAY (MUVIA), naming Russell Hannigan, Roderick A. Hyde, Muriel Y. Ishikawa, 3ric Johanson, Jordin T. Kare, Tony S. Pan, Clarence T. Tegreene, Charles Whitmer, Lowell L. Wood, Jr., and Victoria Y. H. Wood, filed 18 Nov. 2014, which was filed within the twelve months preceding the filing date of the present application or is an application of which a currently co-pending application is entitled to the benefit of the filing date.

For purposes of the USPTO extra-statutory requirements, the present application claims benefit of priority of U.S. Provisional Patent Application No. 62/082,001 titled DEVICES, METHODS, AND SYSTEMS FOR INTEGRATING MULTIPLE USER ACCESS CAMERA ARRAY, naming Russell Hannigan, Ehren Bray, and 3ric Johanson as inventors, filed 19 Nov. 2014 which was filed within the twelve months preceding the filing date of the present application or is an application of which a currently co-pending application is entitled to the benefit of the filing date.

For purposes of the USPTO extra-statutory requirements, the present application claims benefit of priority of U.S. Provisional Patent Application No. 62/082,002 titled DEVICES, METHODS, AND SYSTEMS FOR INTEGRATING MULTIPLE USER VIDEO IMAGING ARRAY, naming Russell Hannigan, Ehren Bray, and 3ric Johanson as inventors, filed 19 Nov. 2014, which was filed within the twelve months preceding the filing date of the present application or is an application of which a currently co-pending application is entitled to the benefit of the filing date.

For purposes of the USPTO extra-statutory requirements, the present application claims benefit of priority of U.S. Provisional Patent Application No. 62/156,162 titled DEVICES, METHODS, AND SYSTEMS FOR INTEGRATING MULTIPLE USER VIDEO IMAGING ARRAY, naming Russell Hannigan, Ehren Bray, 3ric Johanson, and Phil Rutschman as inventors, filed 1 May 2015 which was filed within the twelve months preceding the filing date of the present application or is an application of which a currently co-pending application is entitled to the benefit of the filing date.

For purposes of the USPTO extra-statutory requirements, the present application constitutes a continuation-in-part of U.S. patent application Ser. No. 14/714,239, entitled DEVICES, METHODS AND SYSTEMS FOR VISUAL IMAGING ARRAYS, filed 15 May 2015, which is currently co-pending or is an application of which a currently co-pending application is entitled to the benefit of the filing date.

For purposes of the USPTO extra-statutory requirements, the present application claims benefit of priority of U.S. Provisional Patent Application No. 62/180,040 titled DEVICES, METHODS, AND SYSTEMS FOR INTEGRATING MULTIPLE USER ACCESS CAMERA ARRAY, naming Russell Hannigan, Ehren Bray, 3ric Johanson, and Phil Rutschman as inventors, filed 15 Jun. 2015 which was filed within the twelve months preceding the filing date of the present application or is an application of which a currently co-pending application is entitled to the benefit of the filing date.

For purposes of the USPTO extra-statutory requirements, the present application constitutes a continuation-in-part of U.S. patent application Ser. No. 14/791,160, entitled DEVICES, METHODS, AND SYSTEMS FOR VISUAL IMAGING ARRAYS, filed 2 Jul. 2015, which is currently co-pending or is an application of which a currently co-pending application is entitled to the benefit of the filing date, and which is a continuation of U.S. patent application Ser. No. 14/791,127, entitled DEVICES, METHODS, AND SYSTEMS FOR VISUAL IMAGING ARRAYS, filed 2 Jul. 2015.

For purposes of the USPTO extra-statutory requirements, the present application constitutes a continuation-in-part of United States patent application No. For purposes of the USPTO extra-statutory requirements, the present application constitutes a continuation-in-part of U.S. Utility patent application Ser. No. 14/838,114, entitled DEVICES, METHODS, AND SYSTEMS FOR VISUAL IMAGING ARRAYS, filed 27 Aug. 2015, which is currently co-pending or is an application of which a currently co-pending application is entitled to the benefit of the filing date.

For purposes of the USPTO extra-statutory requirements, the present application constitutes a continuation-in-part of U.S. Utility patent application Ser. No. 14/838,128, entitled DEVICES, METHODS AND SYSTEMS FOR VISUAL IMAGING ARRAYS, filed 27 Aug. 2015, which is currently co-pending or is an application of which a currently co-pending application is entitled to the benefit of the filing date.

RELATED APPLICATIONS

None.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BACKGROUND

This application is related to video imaging arrays that may be capable of handling multiple users and which may transmit less data than they collect.

SUMMARY

In one or more various aspects, a method includes but is not limited to that which is illustrated in the drawings. In addition to the foregoing, other method aspects are described in the claims, drawings, and text forming a part of the disclosure set forth herein.

In one or more various aspects, a method includes, but is not limited to, accepting input of a request for a particular image of a scene that is larger than the particular image, transmitting the request for the particular image to an image sensor array that includes more than one image sensor and that is configured to capture the scene and retain a subset of the scene that includes the request for the particular image of the scene, and receiving only the particular image from the image sensor array, wherein the particular image represents a subset of the scene, and wherein a size characteristic of the particular image is at least partially based on a property of a requestor. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for carrying out the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for accepting input of a request for a particular image of a scene that is larger than the particular image, means for transmitting the request for the particular image to an image sensor array that includes more than one image sensor and that is configured to capture the scene and retain a subset of the scene that includes the request for the particular image of the scene, and means for receiving only the particular image from the image sensor array, wherein the particular image represents a subset of the scene, and wherein a size characteristic of the particular image is at least partially based on a property of a requestor. In addition to the foregoing, other system aspects are described in the claims, drawings, and text forming a part of the disclosure set forth herein.

In one or more various aspects, a system includes, but is not limited to, circuitry for accepting input of a request for a particular image of a scene that is larger than the particular image, circuitry for transmitting the request for the particular image to an image sensor array that includes more than one image sensor and that is configured to capture the scene and retain a subset of the scene that includes the request for the particular image of the scene, and circuitry for receiving only the particular image from the image sensor array, wherein the particular image represents a subset of the scene, and wherein a size characteristic of the particular image is at least partially based on a property of a requestor. In addition to the foregoing, other system aspects are described in the claims, drawings, and text forming a part of the disclosure set forth herein.

In one or more various aspects, a computer program product, comprising a signal bearing medium, bearing one or more instructions including, but not limited to, one or more instructions for accepting input of a request for a particular image of a scene that is larger than the particular image, one or more instructions for transmitting the request for the particular image to an image sensor array that includes more than one image sensor and that is configured to capture the scene and retain a subset of the scene that includes the request for the particular image of the scene, and one or more instructions for receiving only the particular image from the image sensor array, wherein the particular image represents a subset of the scene, and wherein a size characteristic of the particular image is at least partially based on a property of a requestor. In addition to the foregoing, other computer program product aspects are described in the claims, drawings, and text forming a part of the disclosure set forth herein.

In one or more various aspects, a device is defined by a computational language, such that the device comprises one or more interchained physical machines ordered for accepting input of a request for a particular image of a scene that is larger than the particular image, one or more interchained physical machines ordered for transmitting the request for the particular image to an image sensor array that includes more than one image sensor and that is configured to capture the scene and retain a subset of the scene that includes the request for the particular image of the scene, and one or more interchained physical machines ordered for receiving only the particular image from the image sensor array, wherein the particular image represents a subset of the scene, and wherein a size characteristic of the particular image is at least partially based on a property of a requestor.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1, including FIG. 1-A through 1-AN, shows a high-level system diagram of one or more exemplary environments in which transactions and potential transactions may be carried out, according to one or more embodiments. FIG. 1 forms a partially schematic diagram of an environment(s) and/or an implementation(s) of technologies described herein when FIG. 1-A through 1-AN are stitched together in the manner shown in FIG. 1-D, which is reproduced below in table format.

In accordance with 37 C.F.R. § 1.84(h)(2), FIG. 1 shows "a view of a large machine or device in its entirety . . . broken into partial views . . . extended over several sheets" labeled FIG. 1-A through FIG. 1-AN (Sheets 1-40). The "views on two or more sheets form, in effect, a single complete view, [and] the views on the several sheets . . . [are] so arranged that the complete figure can be assembled" from "partial views drawn on separate sheets . . . linked edge to edge. Thus, in FIG. 1, the partial view FIG. 1-A through 1-AN are ordered alphabetically, by increasing in columns from left to right, and increasing in rows top to bottom, as shown in the following table:

Figure 2A:
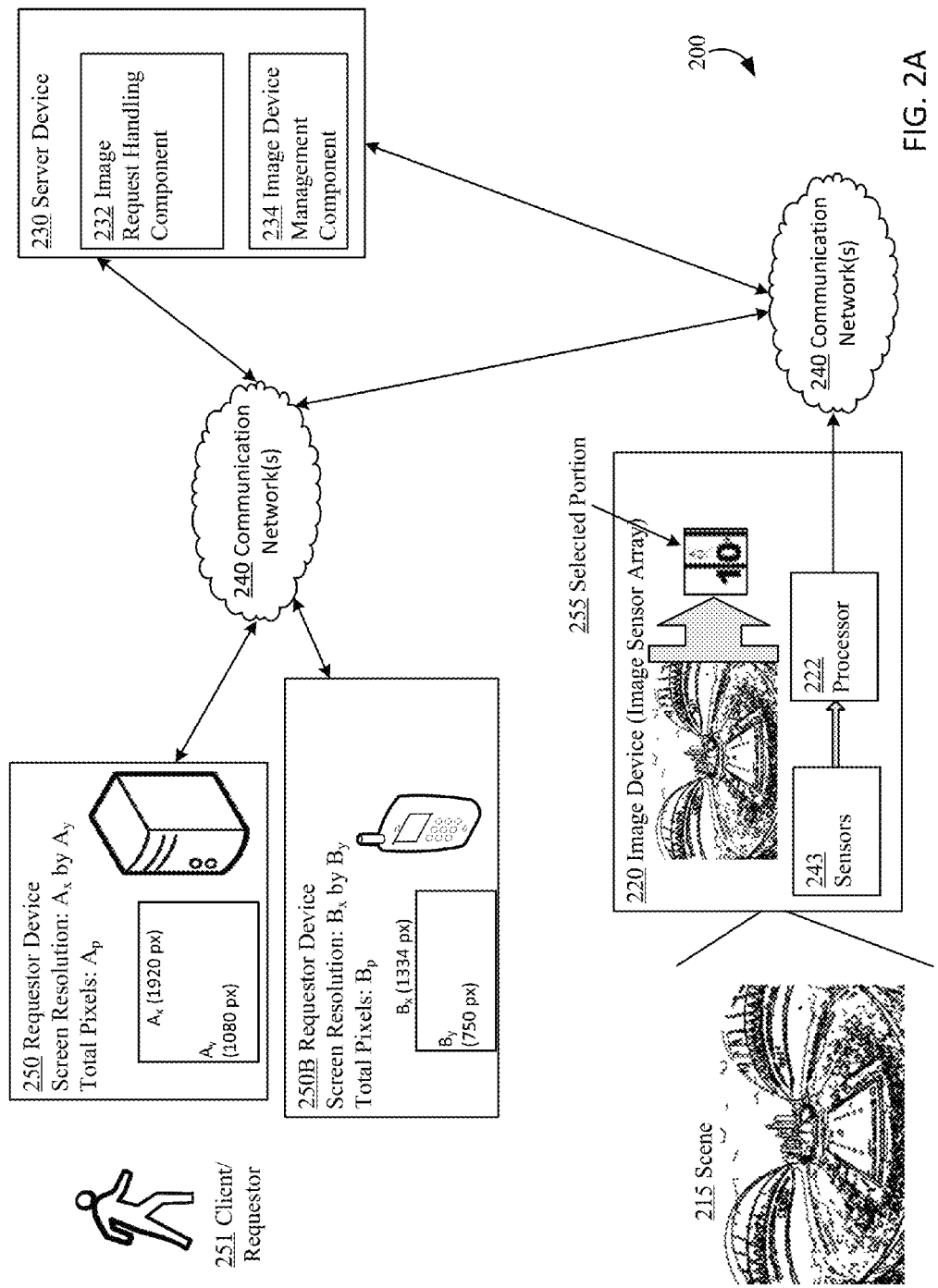

the view." The partial views drawn on the several sheets indicated in the above table are capable of being linked edge to edge, so that no partial view contains parts of another partial view. As here, "where views on two or more sheets form, in effect, a single complete view, the views on the several sheets are so arranged that the complete figure can be assembled without concealing any part of any of the views appearing on the various sheets." 37 C.F.R. § 1.84(h)(2).

It is noted that one or more of the partial views of the drawings may be blank, or may be absent of substantive elements (e.g., may show only lines, connectors, arrows, and/or the like). These drawings are included in order to assist readers of the application in assembling the single complete view from the partial sheet format required for submission by the USPTO, and, while their inclusion is not required and may be omitted in this or other applications without subtracting from the disclosed matter as a whole, their inclusion is proper, and should be considered and treated as intentional.

FIG. 1-A, when placed at position (1,1), forms at least a portion of a partially schematic diagram of an environment(s) and/or an implementation(s) of technologies described herein.

FIG. 1-B, when placed at position (1,2), forms at least a portion of a partially schematic diagram of an environment(s) and/or an implementation(s) of technologies described herein.

FIG. 1-C, when placed at position (1,3), forms at least a portion of a partially schematic diagram of an environment(s) and/or an implementation(s) of technologies described herein.

FIG. 1-D, when placed at position (1,4), forms at least a portion of a partially schematic diagram of an environment(s) and/or an implementation(s) of technologies described herein.

FIG. 1-E, when placed at position (1,5), forms at least a portion of a partially schematic diagram of an environment(s) and/or an implementation(s) of technologies described herein.

FIG. 1-F, when placed at position (1,6), forms at least a portion of a partially schematic diagram of an environment(s) and/or an implementation(s) of technologies described herein.

FIG. 1-G, when placed at position (1,7), forms at least a portion of a partially schematic diagram of an environment(s) and/or an implementation(s) of technologies described herein.

TABLE 1

Table showing alignment of enclosed drawings to form partial schematic of one or more environments.

| Pos. (0, 0) | X-Pos 1 | X-Pos 2 | X-Pos 3 | X-Pos 4 | X-Pos 5 | X-Pos 6 | X-Pos 7 | X-Pos 8 | X-Pos 9 | X-Pos 10 |
|---|---|---|---|---|---|---|---|---|---|---|
| Y-Pos. 1 | (1, 1): FIG. 1-A | (1, 2): FIG. 1-B | (1, 3): FIG. 1-C | (1, 4): FIG. 1-D | (1, 5): FIG. 1-E | (1, 6): FIG. 1-F | (1, 7): FIG. 1-G | (1, 8): FIG. 1-H | (1, 9): FIG. 1-I | (1, 10): FIG. 1-J |
| Y-Pos. 2 | (2, 1): FIG. 1-K | (2, 2): FIG. 1-L | (2, 3): FIG. 1-M | (2, 4): FIG. 1-N | (2, 5): FIG. 1-O | (2, 6): FIG. 1-P | (2, 7): FIG. 1-Q | (2, 8): FIG. 1-R | (2, 9): FIG. 1-S | (2, 10): FIG. 1-T |
| Y-Pos. 3 | (3, 1): FIG. 1-U | (3, 2): FIG. 1-V | (3, 3): FIG. 1-W | (3, 4): FIG. 1-X | (3, 5): FIG. 1-Y | (3, 6): FIG. 1-Z | (3, 7): FIG. 1-AA | (3, 8): FIG. 1-AB | (3, 9): FIG. 1-AC | (3, 10): FIG. 1-AD |
| Y-Pos. 4 | (4, 1): FIG. 1-AE | (4, 2): FIG. 1-AF | (4, 3): FIG. 1-AG | (4, 3): FIG. 1-AH | (4, 5): FIG. 1-AI | (4, 6): FIG. 1-AJ | (4, 7): FIG. 1-AK | (4, 8): FIG. 1-AL | (4, 8): FIG. 1-AM | (4, 10): FIG. 1-AN |

In accordance with 37 C.F.R. § 1.84(h)(2), FIG. 1 is " . . . a view of a large machine or device in its entirety . . . broken into partial views . . . extended over several sheets . . . [with] no loss in facility of understanding FIG. 1-H, when placed at position (1,8), forms at least a portion of a partially schematic diagram of an environment(s) and/or an implementation(s) of technologies described herein.

FIG. 1-I, when placed at position (1,9), forms at least a portion of a partially schematic diagram of an environment(s) and/or an implementation(s) of technologies described herein.

FIG. 1-J, when placed at position (1,10), forms at least a portion of a partially schematic diagram of an environment(s) and/or an implementation(s) of technologies described herein.

FIG. 1-K, when placed at position (2,1), forms at least a portion of a partially schematic diagram of an environment(s) and/or an implementation(s) of technologies described herein.

FIG. 1-L, when placed at position (2,2), forms at least a portion of a partially schematic diagram of an environment(s) and/or an implementation(s) of technologies described herein.

FIG. 1-M, when placed at position (2,3), forms at least a portion of a partially schematic diagram of an environment(s) and/or an implementation(s) of technologies described herein.

FIG. 1-N, when placed at position (2,4), forms at least a portion of a partially schematic diagram of an environment(s) and/or an implementation(s) of technologies described herein.

FIG. 1-O (which format is changed to avoid confusion as Figure "10" or "ten"), when placed at position (2,5), forms at least a portion of a partially schematic diagram of an environment(s) and/or an implementation(s) of technologies described herein.

FIG. 1-P, when placed at position (2,6), forms at least a portion of a partially schematic diagram of an environment(s) and/or an implementation(s) of technologies described herein.

FIG. 1-Q, when placed at position (2,7), forms at least a portion of a partially schematic diagram of an environment(s) and/or an implementation(s) of technologies described herein.

FIG. 1-R, when placed at position (2,8), forms at least a portion of a partially schematic diagram of an environment(s) and/or an implementation(s) of technologies described herein.

FIG. 1-S, when placed at position (2,9), forms at least a portion of a partially schematic diagram of an environment(s) and/or an implementation(s) of technologies described herein.

FIG. 1-T, when placed at position (2,10), forms at least a portion of a partially schematic diagram of an environment(s) and/or an implementation(s) of technologies described herein.

FIG. 1-U, when placed at position (3,1), forms at least a portion of a partially schematic diagram of an environment(s) and/or an implementation(s) of technologies described herein.

FIG. 1-V, when placed at position (3,2), forms at least a portion of a partially schematic diagram of an environment(s) and/or an implementation(s) of technologies described herein.

FIG. 1-W, when placed at position (3,3), forms at least a portion of a partially schematic diagram of an environment(s) and/or an implementation(s) of technologies described herein.

FIG. 1-X, when placed at position (3,4), forms at least a portion of a partially schematic diagram of an environment(s) and/or an implementation(s) of technologies described herein.

FIG. 1-Y, when placed at position (3,5), forms at least a portion of a partially schematic diagram of an environment(s) and/or an implementation(s) of technologies described herein.

FIG. 1-Z, when placed at position (3,6), forms at least a portion of a partially schematic diagram of an environment(s) and/or an implementation(s) of technologies described herein.

FIG. 1-AA, when placed at position (3,7), forms at least a portion of a partially schematic diagram of an environment(s) and/or an implementation(s) of technologies described herein.

FIG. 1-AB, when placed at position (3,8), forms at least a portion of a partially schematic diagram of an environment(s) and/or an implementation(s) of technologies described herein.

FIG. 1-AC, when placed at position (3,9), forms at least a portion of a partially schematic diagram of an environment(s) and/or an implementation(s) of technologies described herein.

FIG. 1-AD, when placed at position (3,10), forms at least a portion of a partially schematic diagram of an environment(s) and/or an implementation(s) of technologies described herein.

FIG. 1-AE, when placed at position (4,1), forms at least a portion of a partially schematic diagram of an environment(s) and/or an implementation(s) of technologies described herein.

FIG. 1-AF, when placed at position (4,2), forms at least a portion of a partially schematic diagram of an environment(s) and/or an implementation(s) of technologies described herein.

FIG. 1-AG, when placed at position (4,3), forms at least a portion of a partially schematic diagram of an environment(s) and/or an implementation(s) of technologies described herein.

FIG. 1-AH, when placed at position (4,4), forms at least a portion of a partially schematic diagram of an environment(s) and/or an implementation(s) of technologies described herein.

FIG. 1-AI, when placed at position (4,5), forms at least a portion of a partially schematic diagram of an environment(s) and/or an implementation(s) of technologies described herein.

FIG. 1-AJ, when placed at position (4,6), forms at least a portion of a partially schematic diagram of an environment(s) and/or an implementation(s) of technologies described herein.

FIG. 1-AK, when placed at position (4,7), forms at least a portion of a partially schematic diagram of an environment(s) and/or an implementation(s) of technologies described herein.

FIG. 1-AL, when placed at position (4,8), forms at least a portion of a partially schematic diagram of an environment(s) and/or an implementation(s) of technologies described herein.

FIG. 1-AM, when placed at position (4,9), forms at least a portion of a partially schematic diagram of an environment(s) and/or an implementation(s) of technologies described herein.

FIG. 1-AN, when placed at position (4,10), forms at least a portion of a partially schematic diagram of an environment(s) and/or an implementation(s) of technologies described herein.

FIG. 2A shows a high-level block diagram of an exemplary environment 200, including a requestor device 250, according to one or more embodiments.

Figure 2B:

FIG. 2B shows a high-level block diagram of a computing device, e.g., a requestor device 250 operating in an exemplary environment 200, according to one or more embodiments.

Figure 3A:
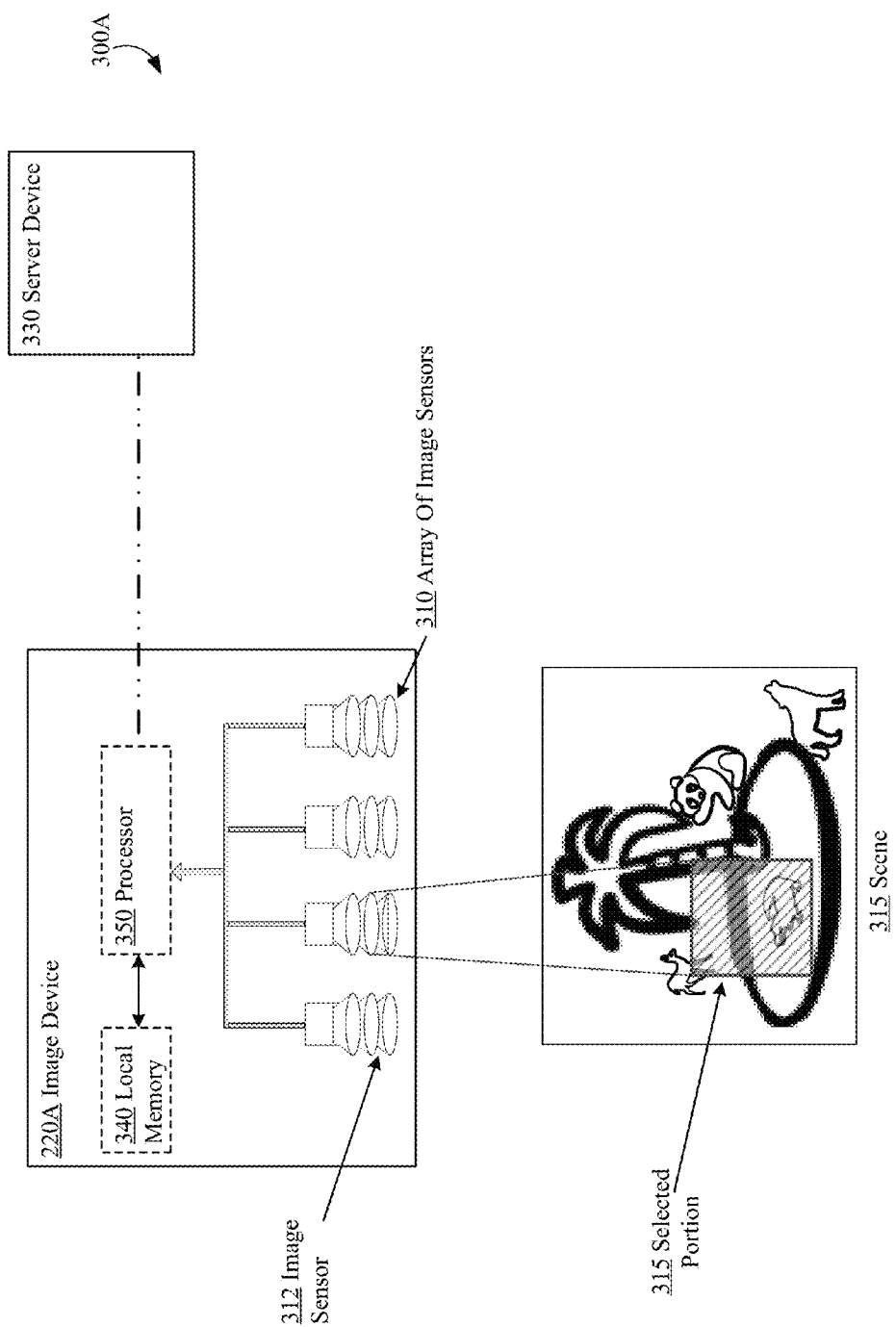

FIG. 3A shows a high-level block diagram of an exemplary operation of a device 220A in an exemplary environment 300A, according to embodiments.

Figure 3B:
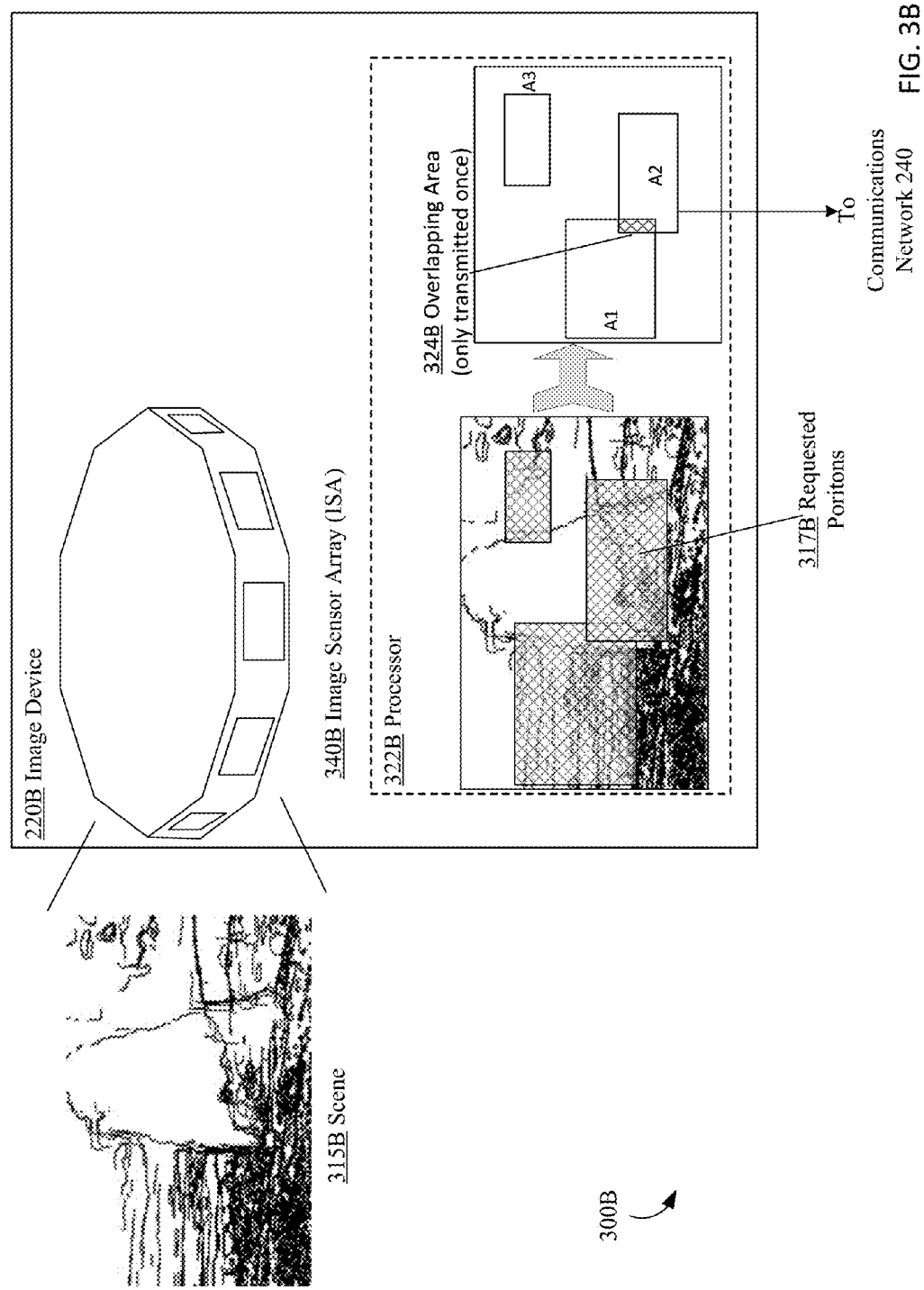

FIG. 3B shows a high-level block diagram of an exemplary operation of a device 220B in an exemplary environment 300B, according to embodiments.

Figure 3C:
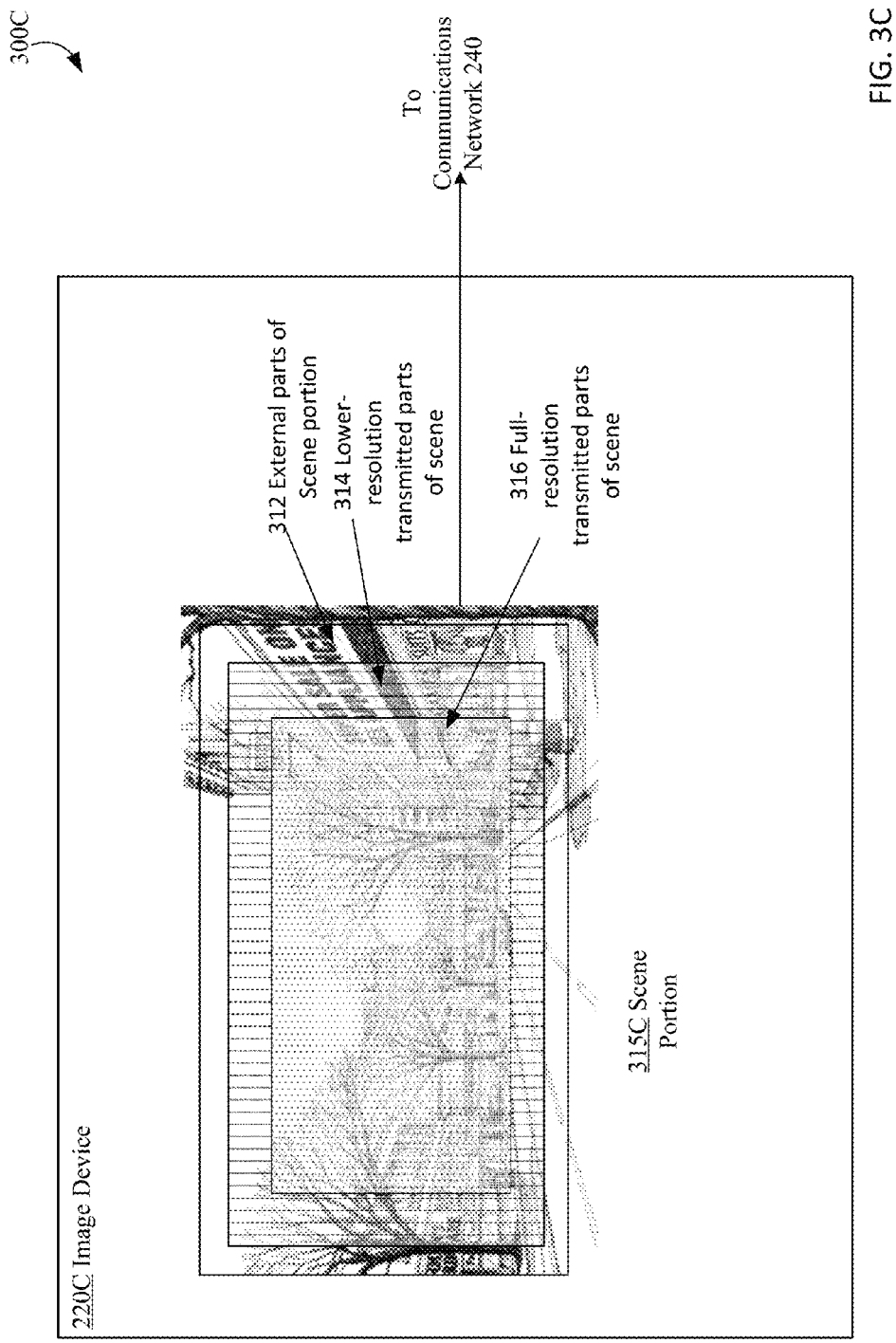

FIG. 3C shows a high-level block diagram of an exemplary operation of a device 220C in an exemplary environment 300C, according to embodiments.

Figure 4A:
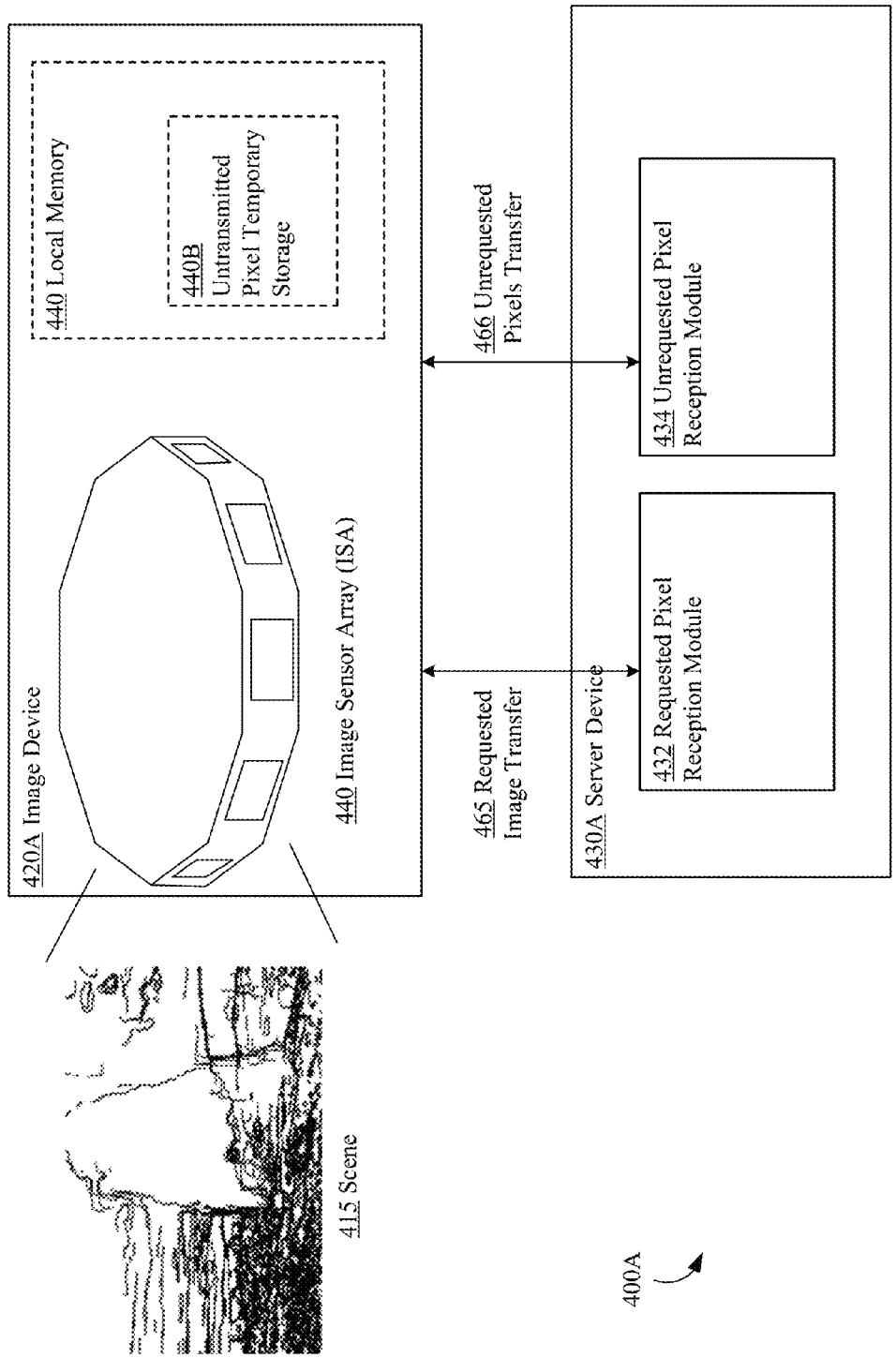

FIG. 4A shows a high-level block diagram of an exemplary operation of an image device 420 in an exemplary environment 400A, according to embodiments.

Figure 4B:
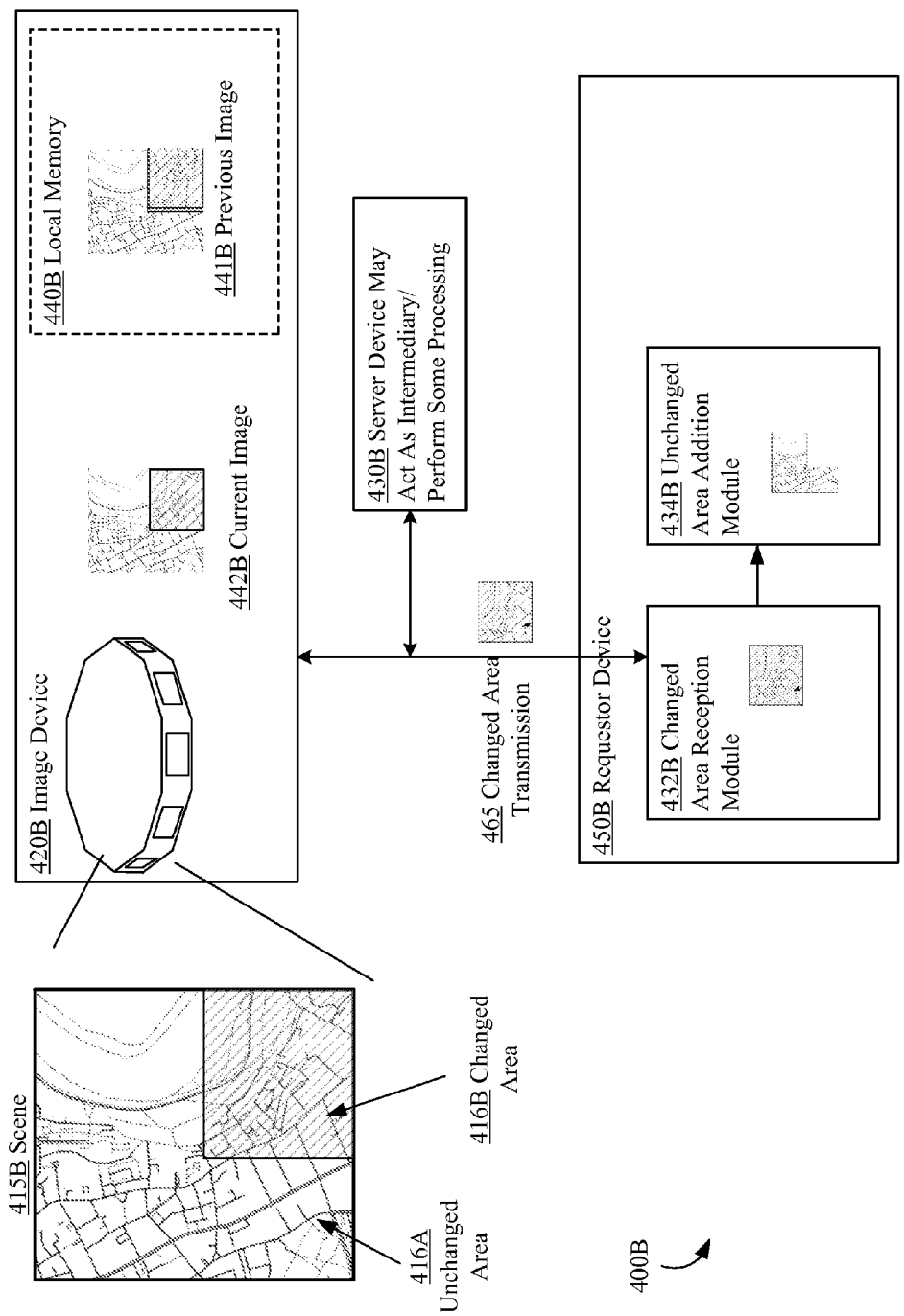

FIG. 4B shows a high-level block diagram of an exemplary operation of an image device 420B in an exemplary environment 400B, according to embodiments.

Figure 5A:
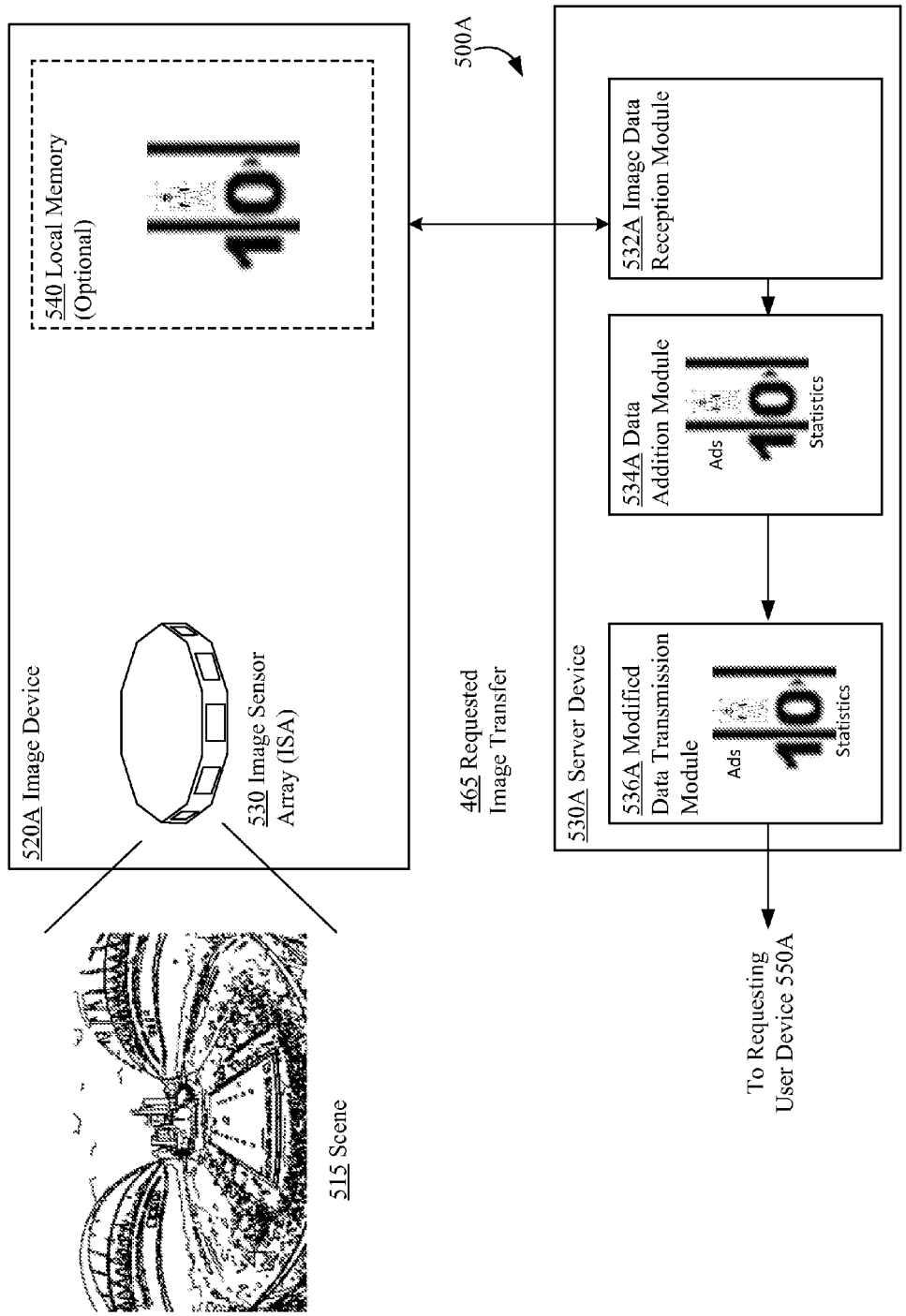

FIG. 5A shows a high-level block diagram of an exemplary operation of a server device 530A in an exemplary environment 500A, according to embodiments.

Figure 5B:
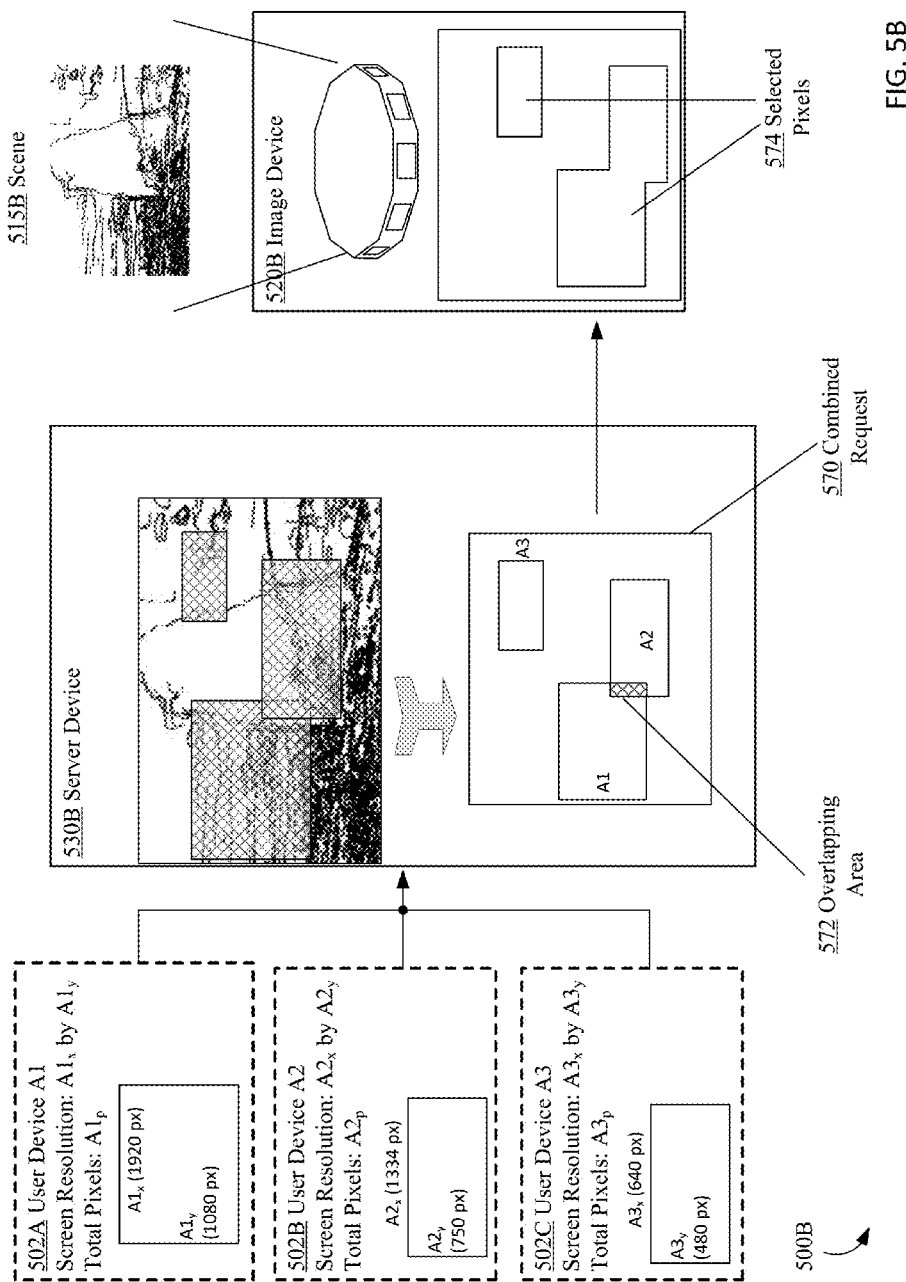

FIG. 5B shows a high-level block diagram of an exemplary operation of a server device 530B in an exemplary environment 500B, according to embodiments.

Figure 5C:
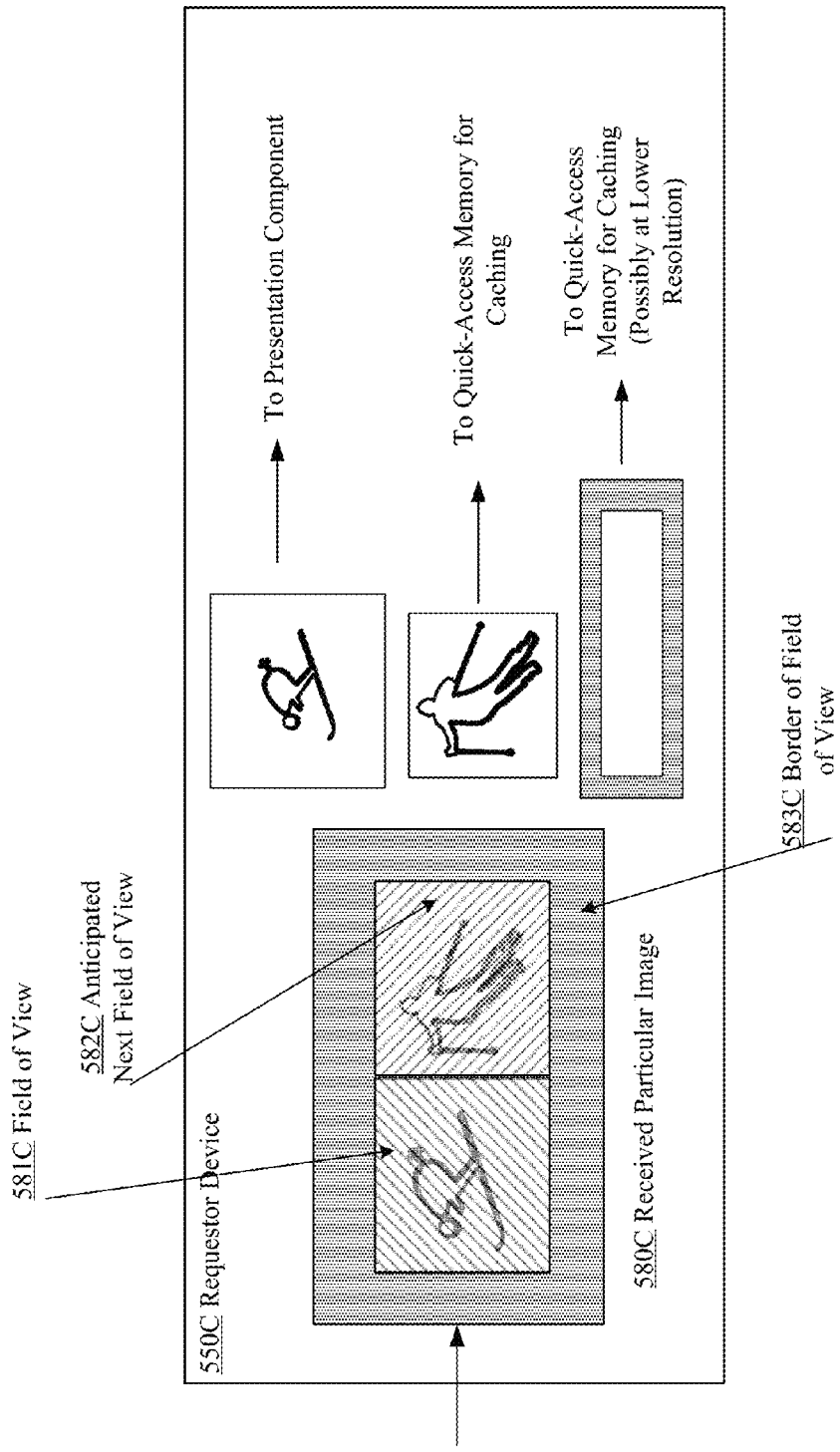

FIG. 5C shows a high-level block diagram of an exemplary operation of a requestor device 530C in an exemplary environment 500C, according to embodiments.

Figure 5D:
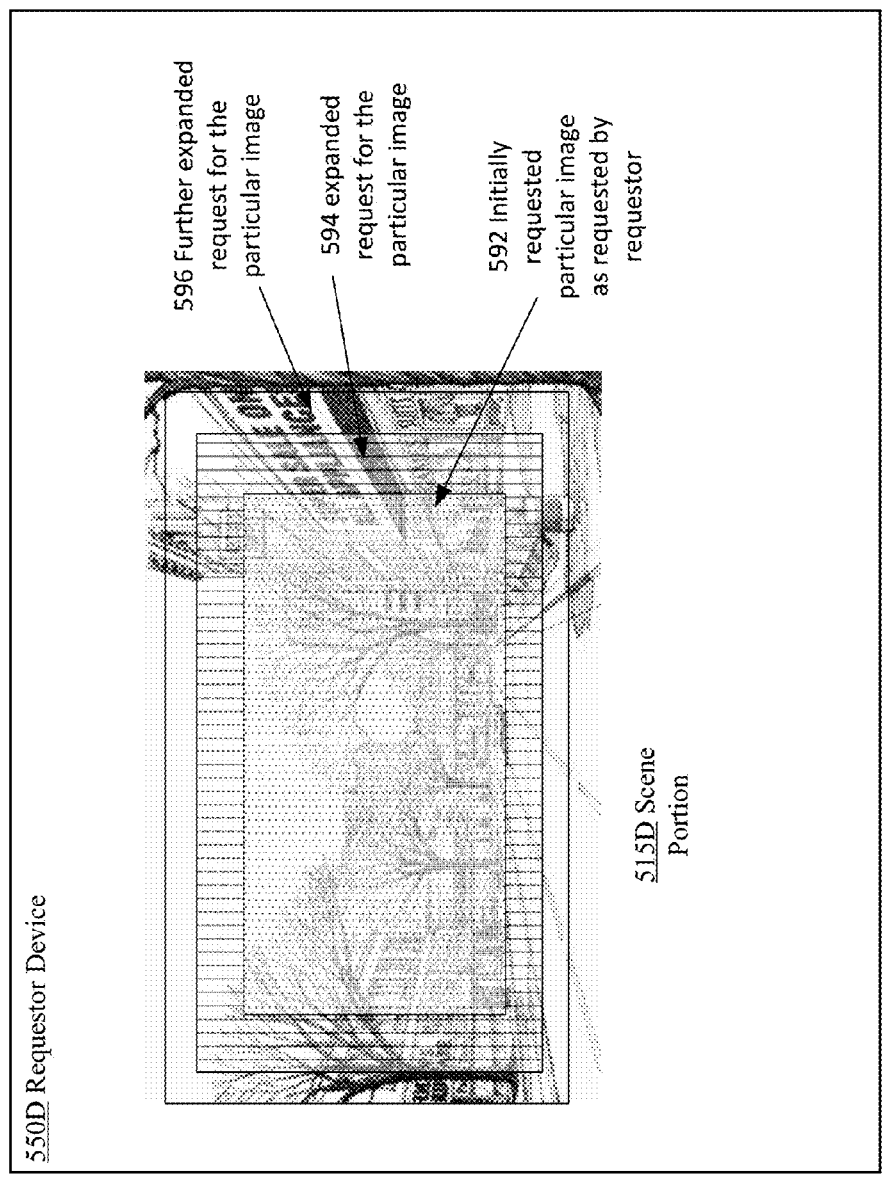

FIG. 5D shows a high-level block diagram of an exemplary operation of a requestor device 530D in an exemplary environment 500D, according to embodiments.

Figure 6B:
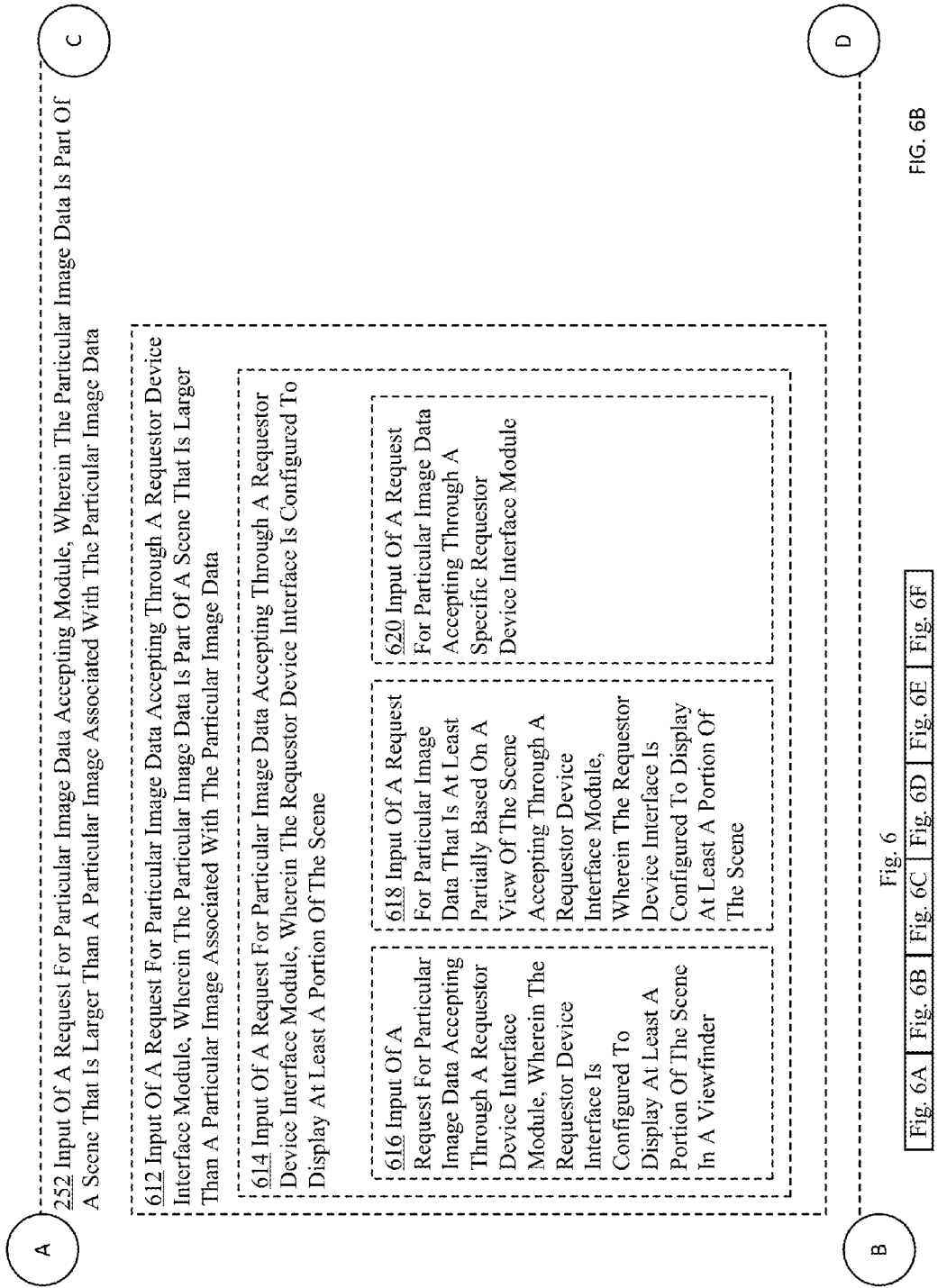
Figure 6D:
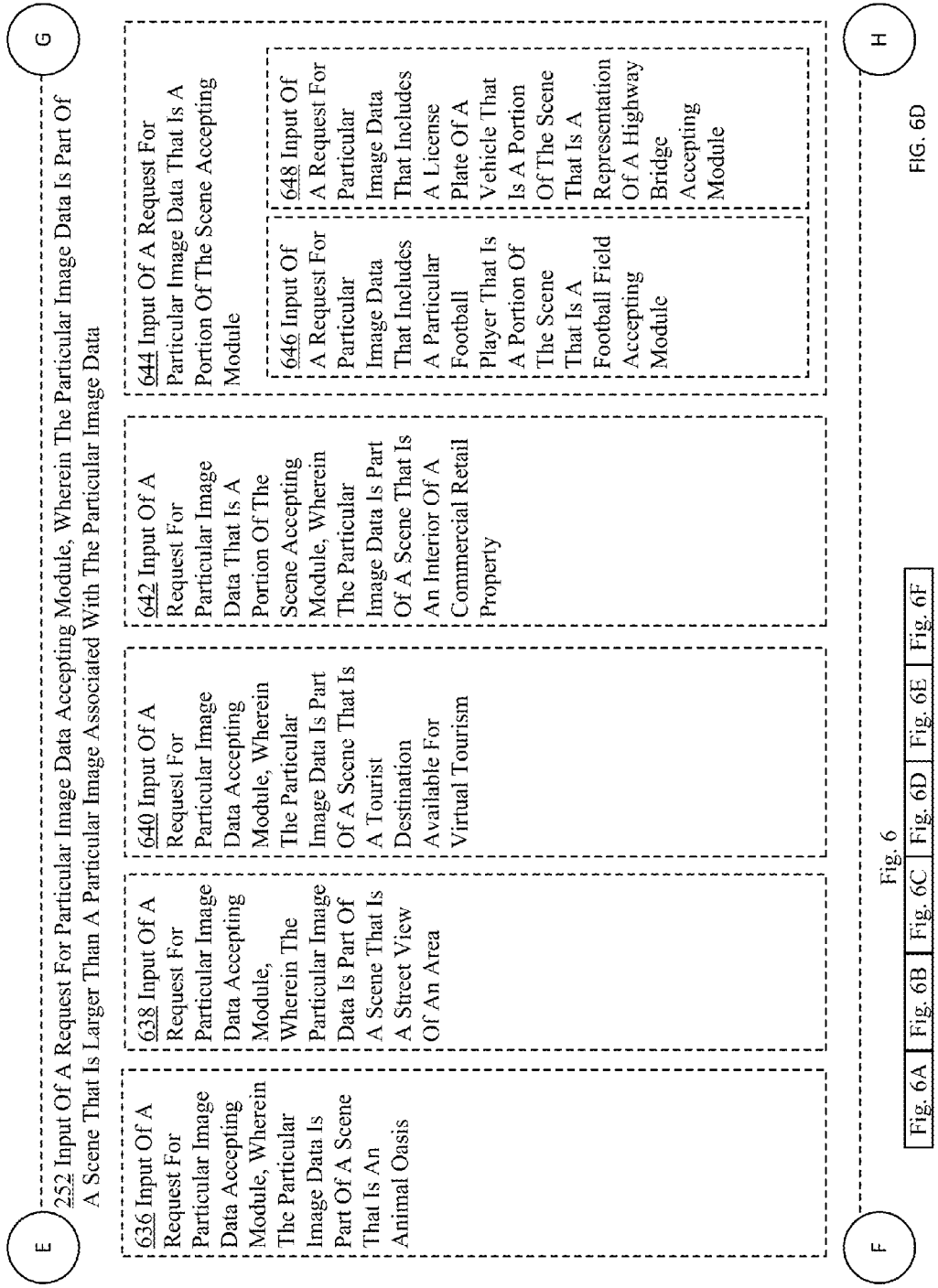

FIG. 6, including FIGS. 6A-6F, shows a particular perspective of a input of a request for particular image data accepting module 252 of processing module 251 of requestor device 250 of FIG. 2B, according to an embodiment.

FIG. 7, including FIGS. 7A-7G, shows a particular perspective of a inputted request for the particular image data transmitting module 254 of processing module 251 of requestor device 250 of FIG. 2B, according to an embodiment.

FIG. 8, including FIGS. 8A-8C, shows a particular perspective of a particular image data from the image sensor array exclusive receiving module 256 of processing module 251 of requestor device 250 of FIG. 2B, according to an embodiment.

Figure 9A:
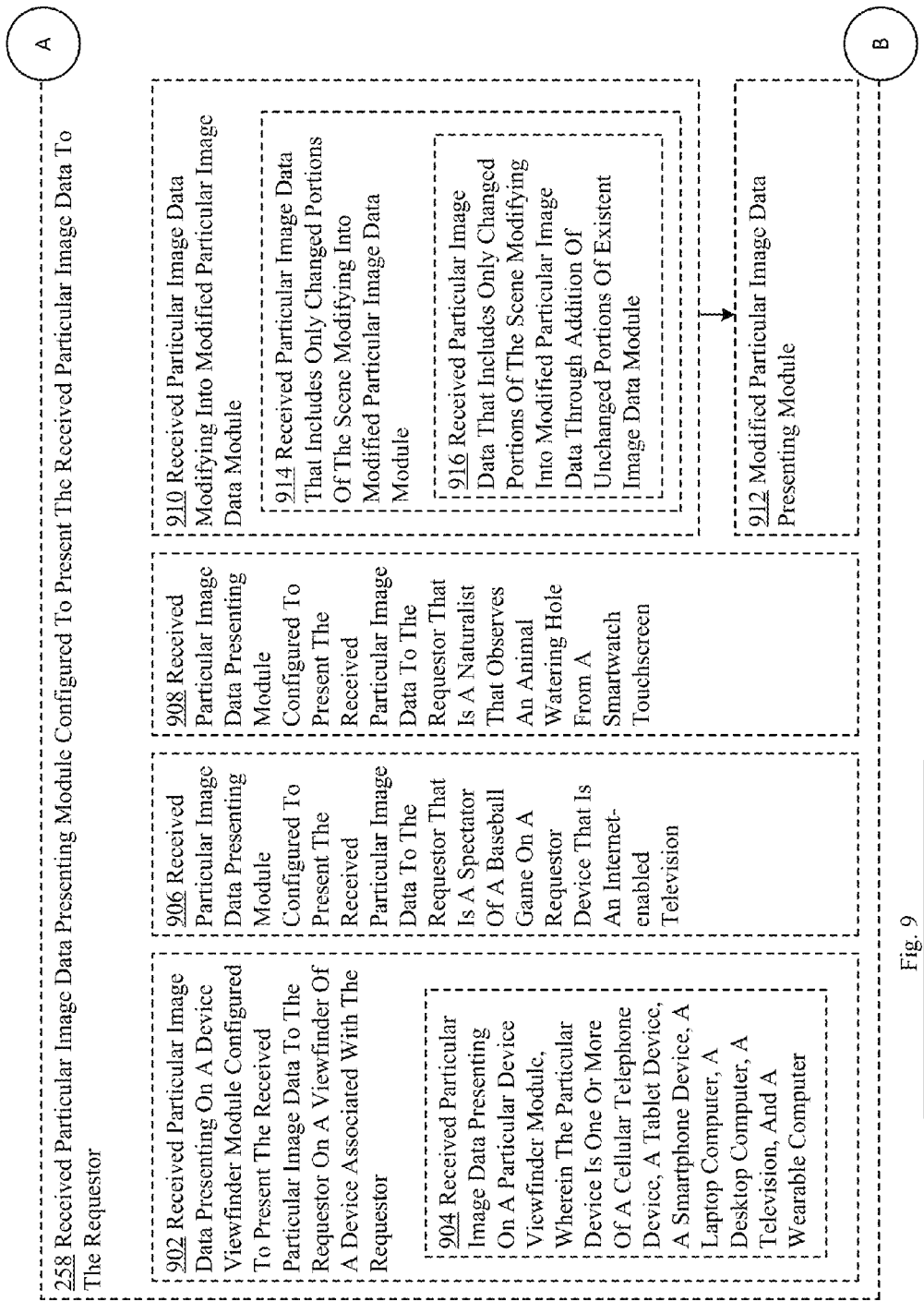
Figures 9, 9C:
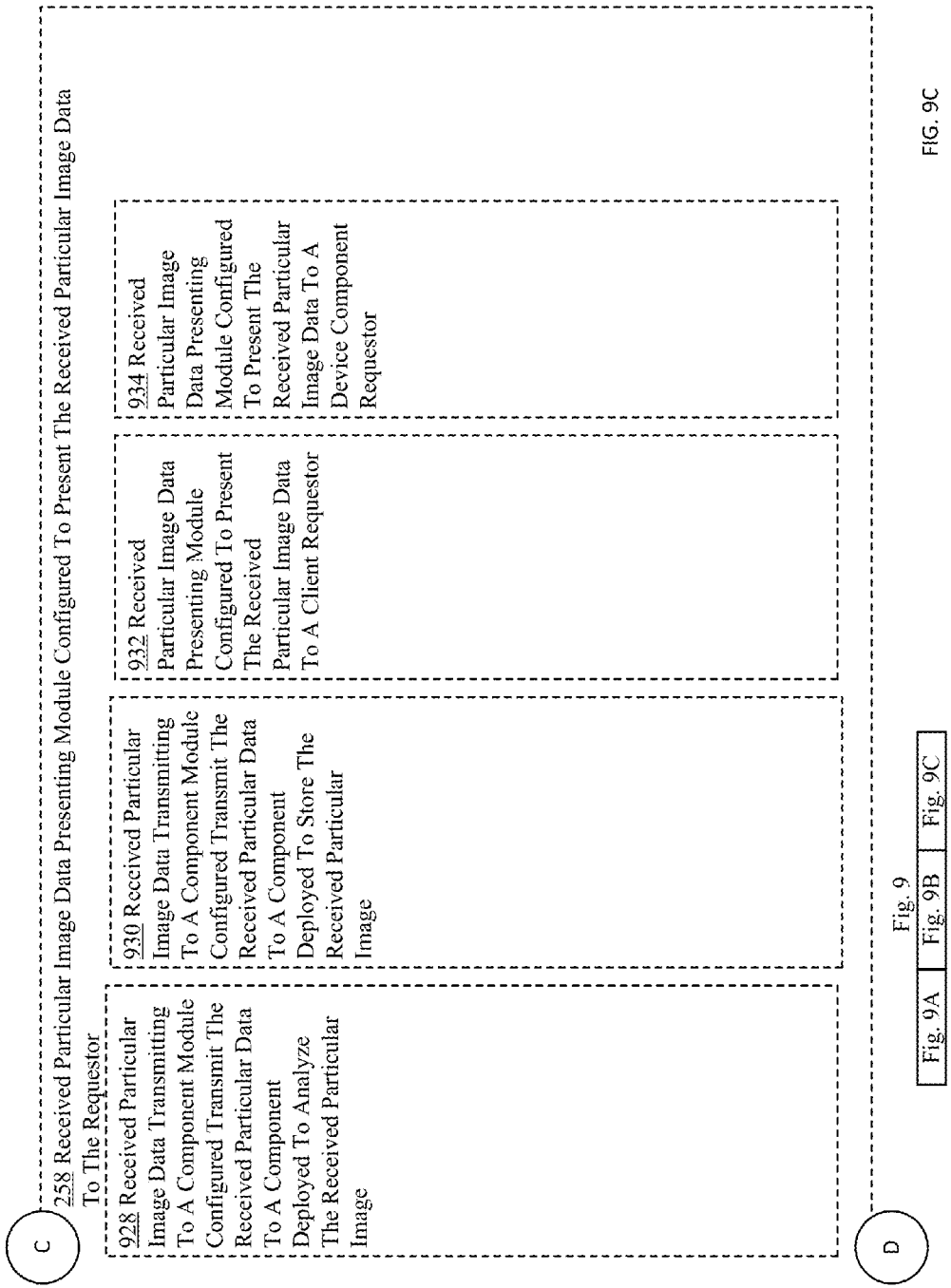

FIG. 9, including FIGS. 9A-9C, shows a particular perspective of a received particular image data presenting module 258 of processing module 251 of requestor device 250 of FIG. 2B, according to an embodiment.

Figure 10:
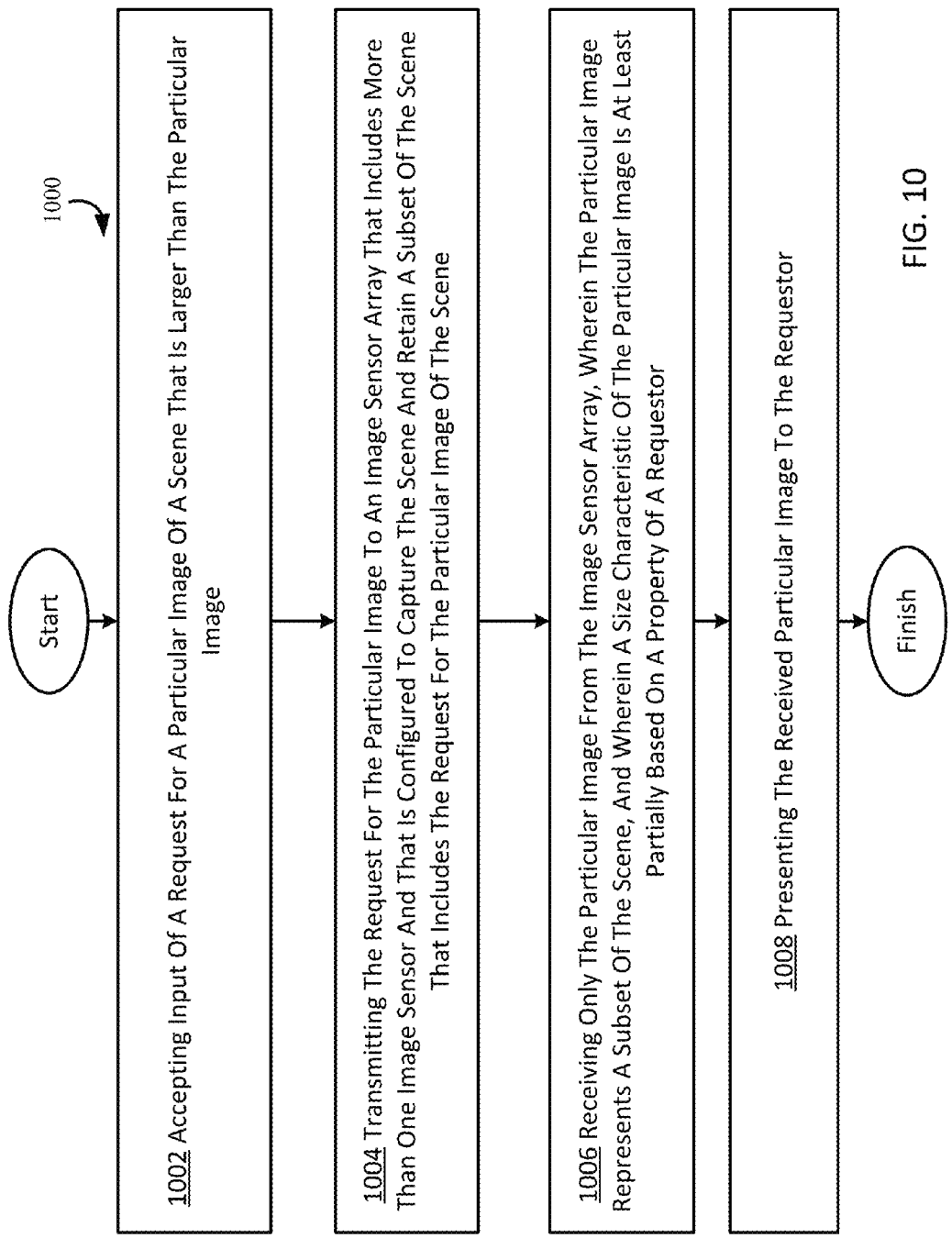

FIG. 10 is a high-level logic flowchart of a process, e.g., operational flow 1000, including one or more operations of an accepting input of a request for a particular image operation, transmitting the request for the particular image to an image sensor array operation, a receiving only the particular image from the image sensor array operation, and a presenting the received particular image operation, according to an embodiment.

Figure 11A:
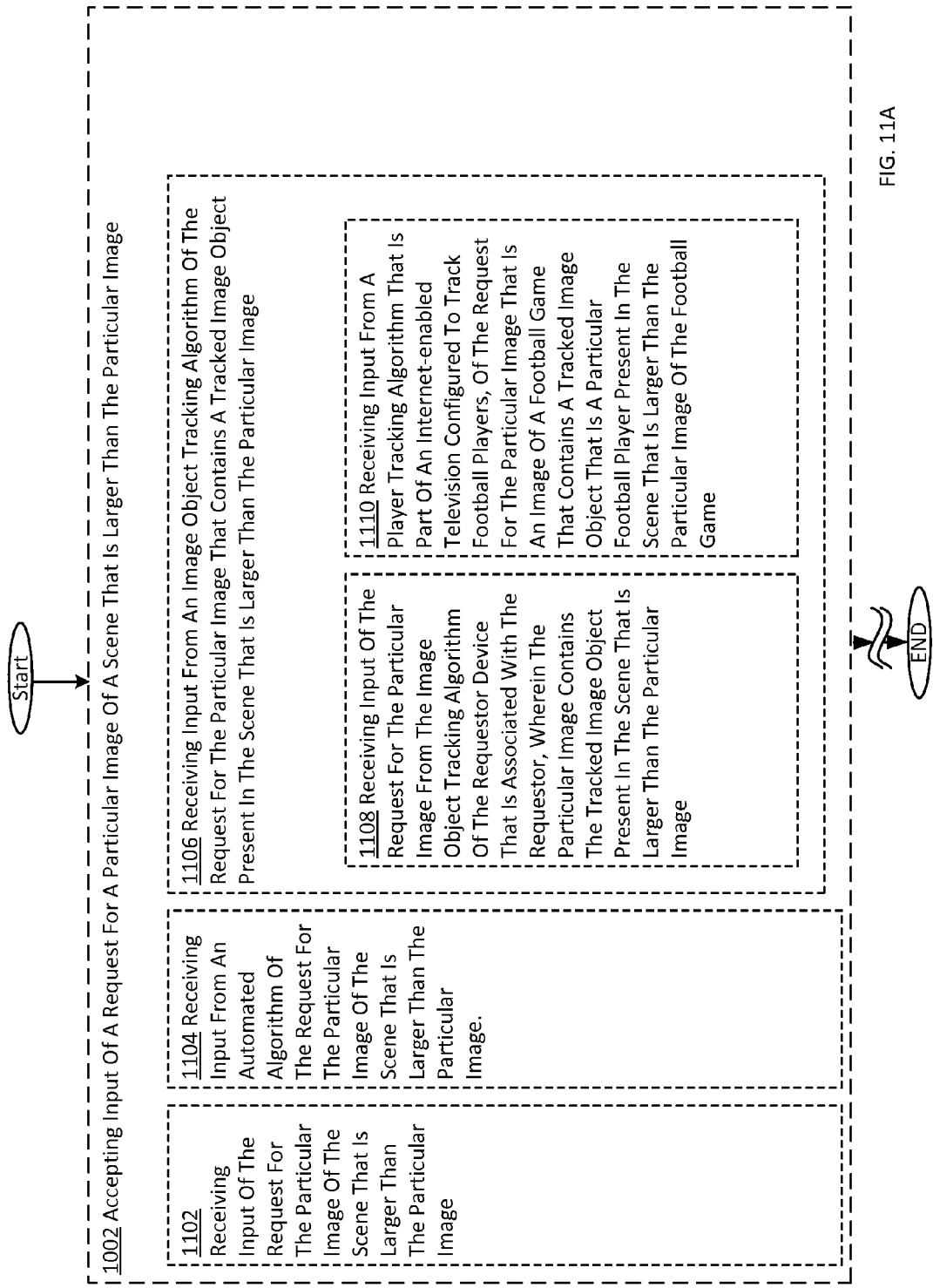

FIG. 11A is a high-level logic flow chart of a process depicting alternate implementations of an accepting input of a request for a particular image operation 1002, according to one or more embodiments.

Figure 11B:
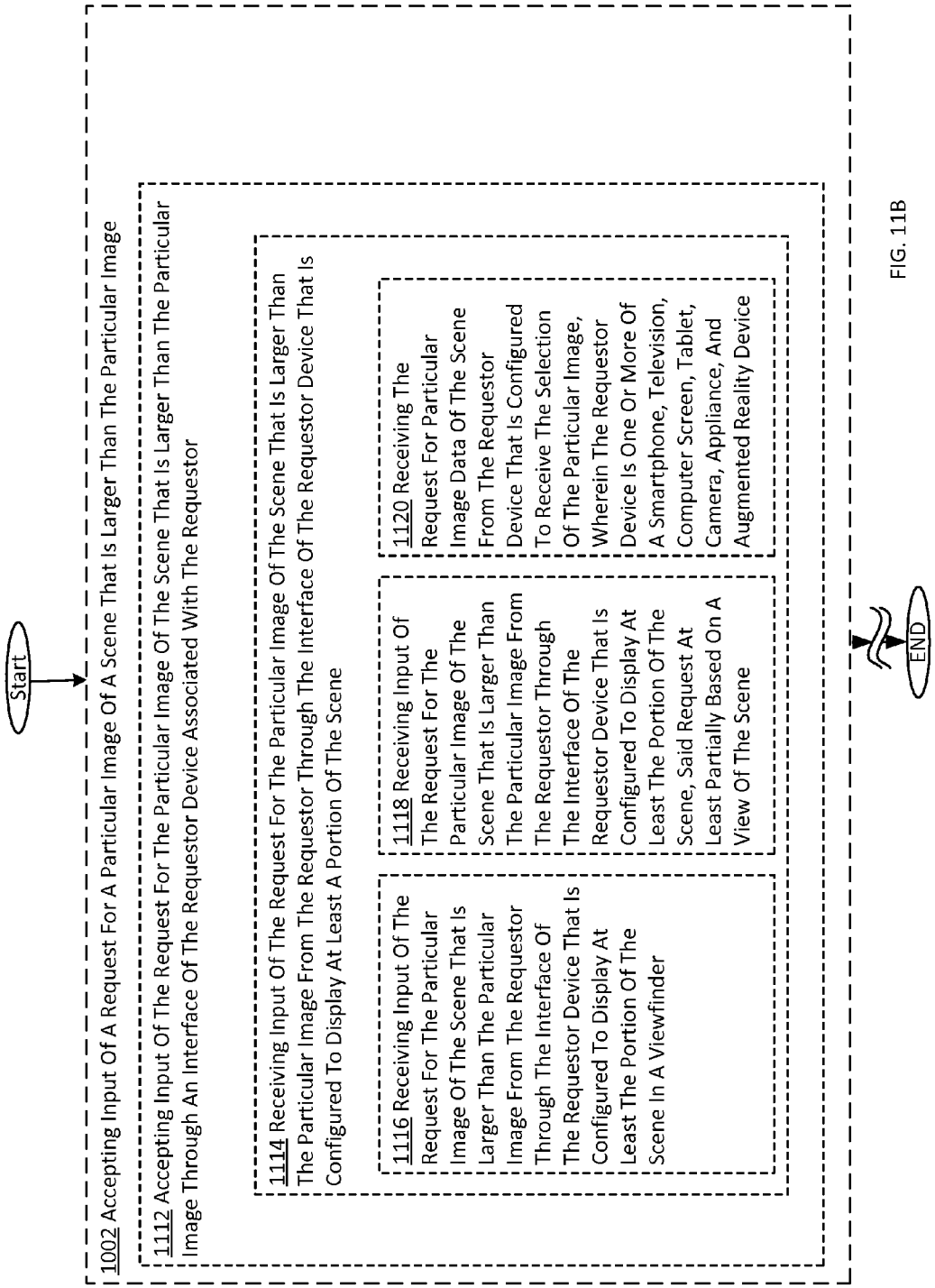

FIG. 11B is a high-level logic flow chart of a process depicting alternate implementations of an accepting input of a request for a particular image operation 1002, according to one or more embodiments.

Figure 11C:
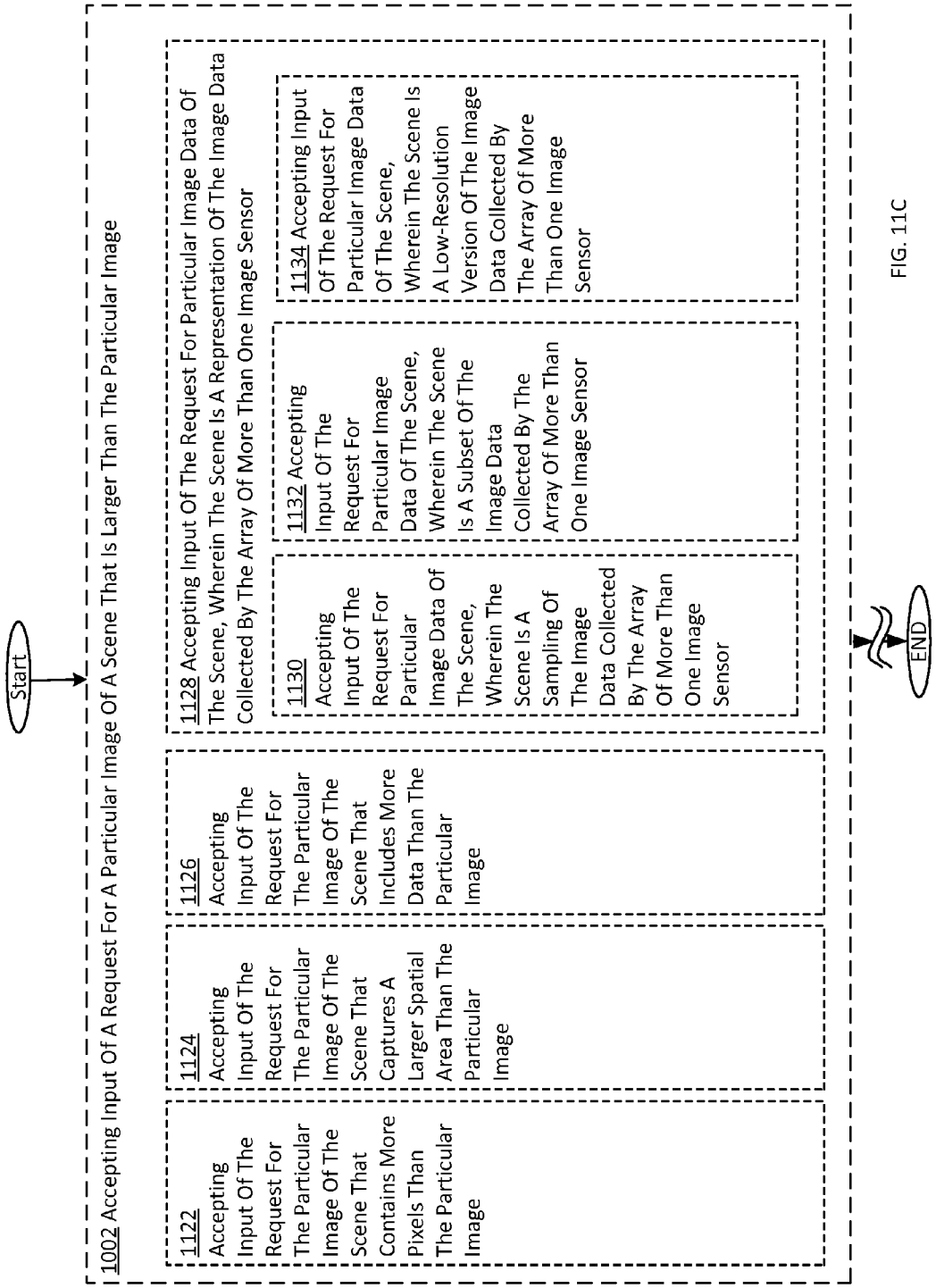

FIG. 11C is a high-level logic flow chart of a process depicting alternate implementations of an accepting input of a request for a particular image operation 1002, according to one or more embodiments.

Figure 11D:
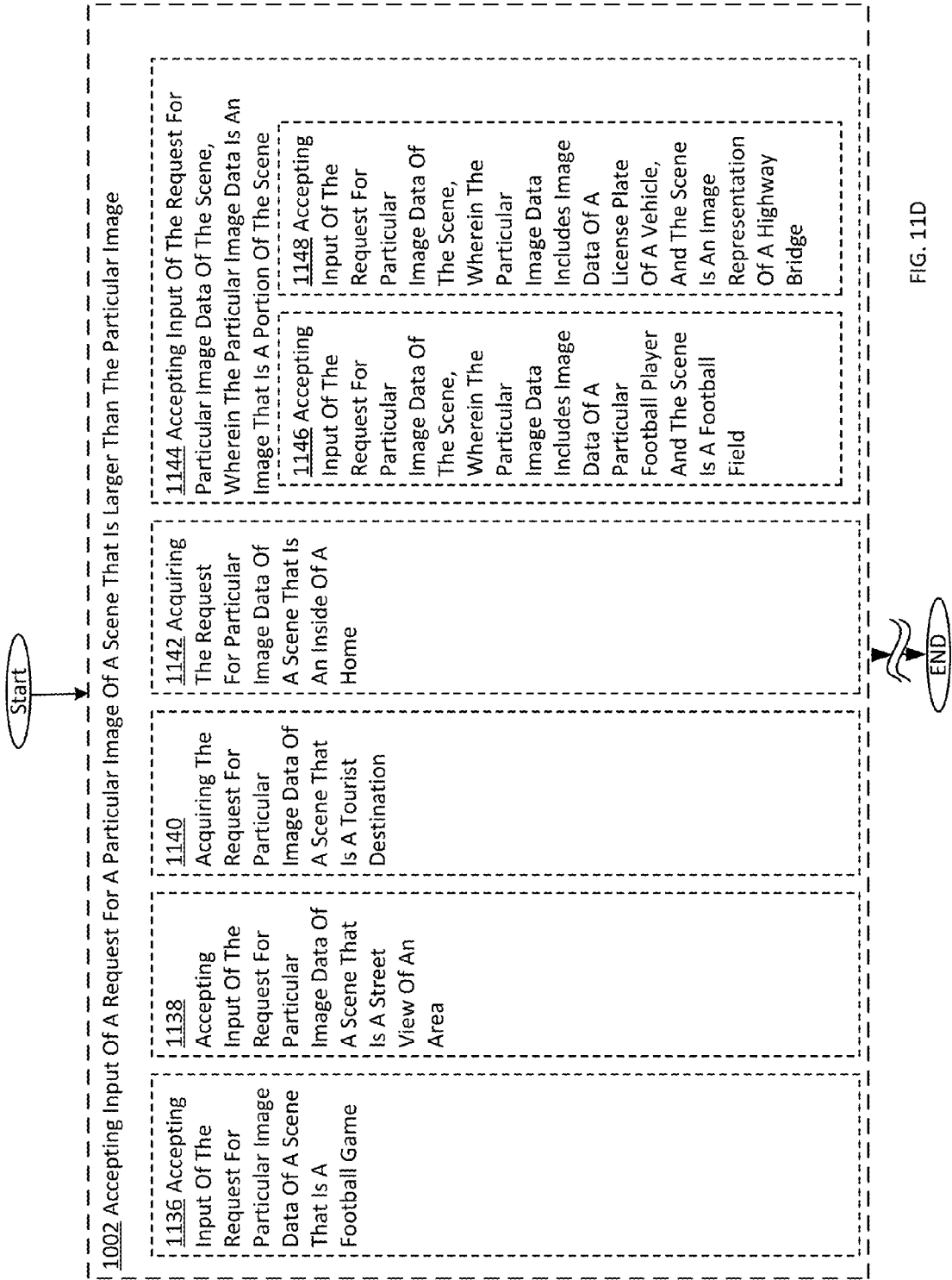

FIG. 11D is a high-level logic flow chart of a process depicting alternate implementations of an accepting input of a request for a particular image operation 1002, according to one or more embodiments.

Figure 11E:
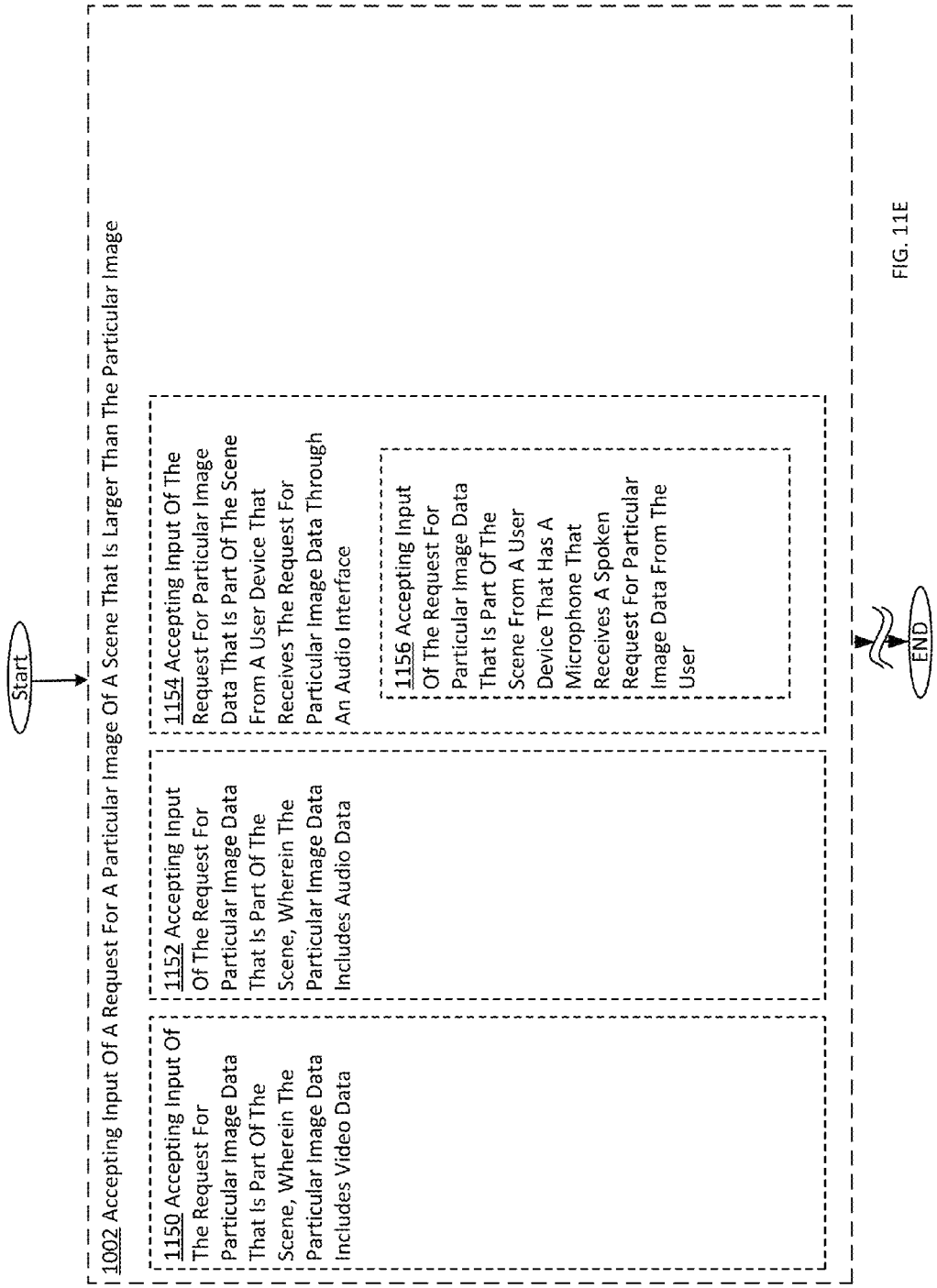

FIG. 11E is a high-level logic flow chart of a process depicting alternate implementations of an accepting input of a request for a particular image operation 1002, according to one or more embodiments.

Figure 11F:
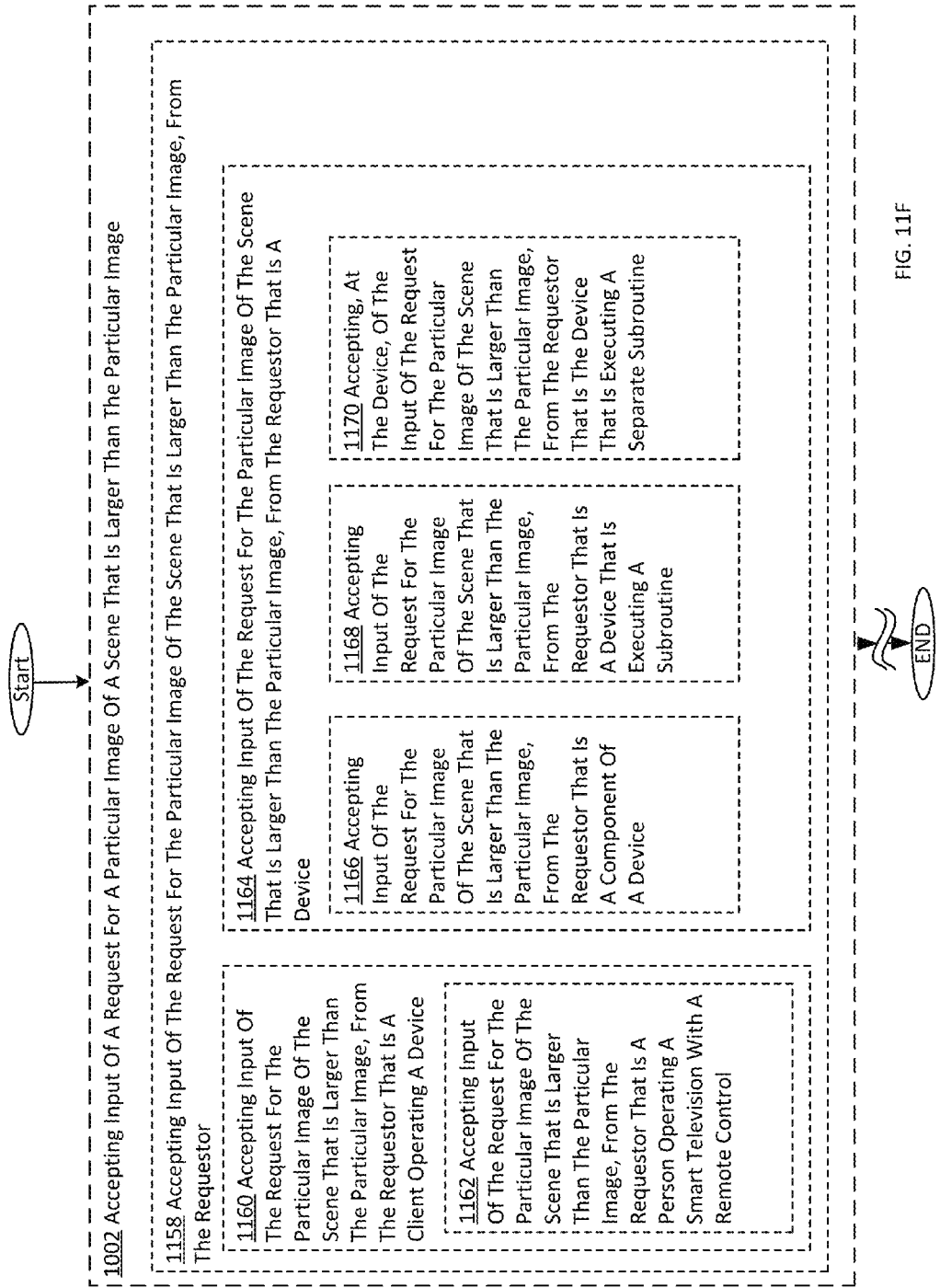

FIG. 11F is a high-level logic flow chart of a process depicting alternate implementations of an accepting input of a request for a particular image operation 1002, according to one or more embodiments.

Figure 12A:
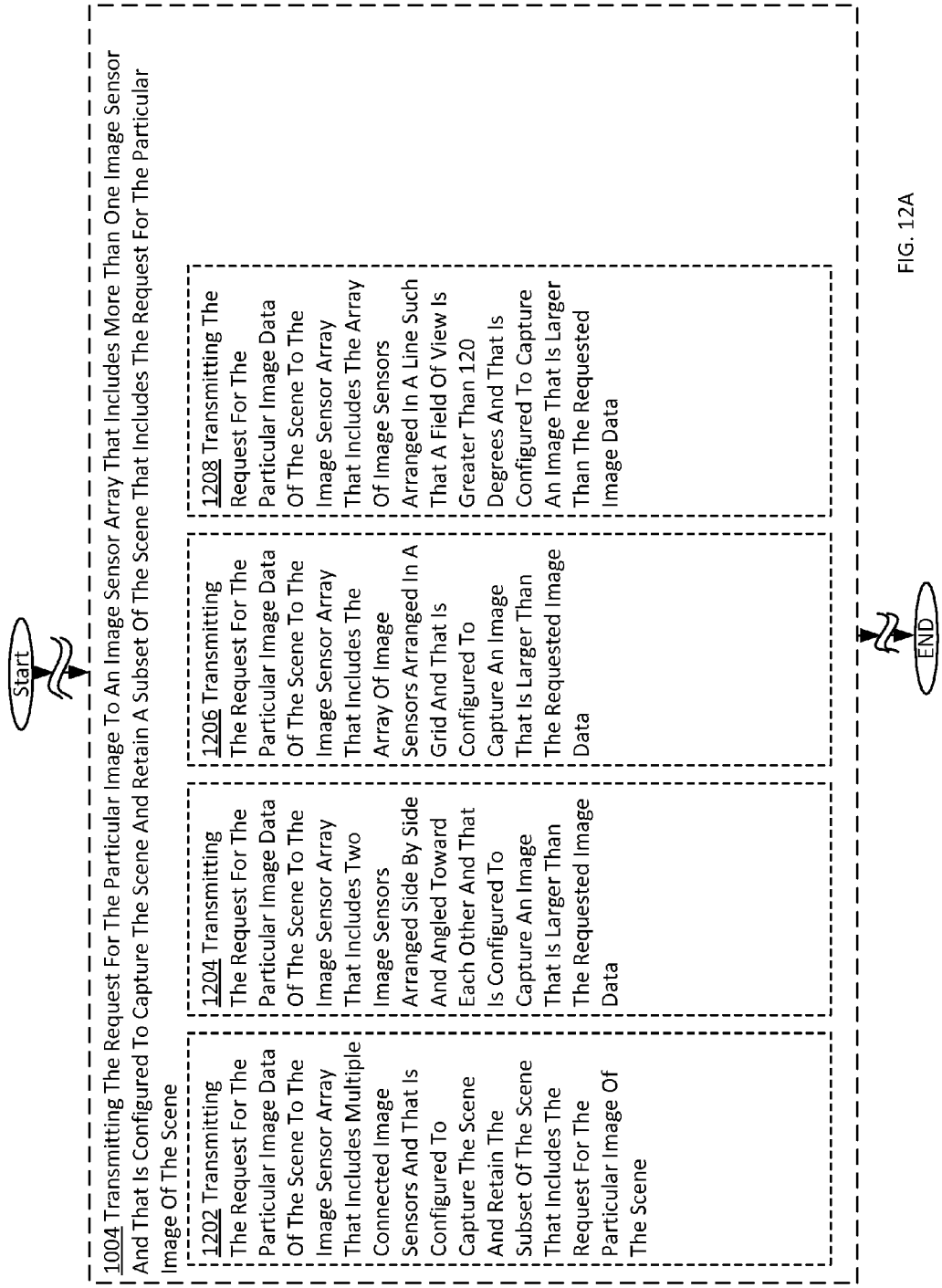

FIG. 12A is a high-level logic flow chart of a process depicting alternate implementations of transmitting the request for the particular image to an image sensor array operation 1004, according to one or more embodiments.

Figure 12B:
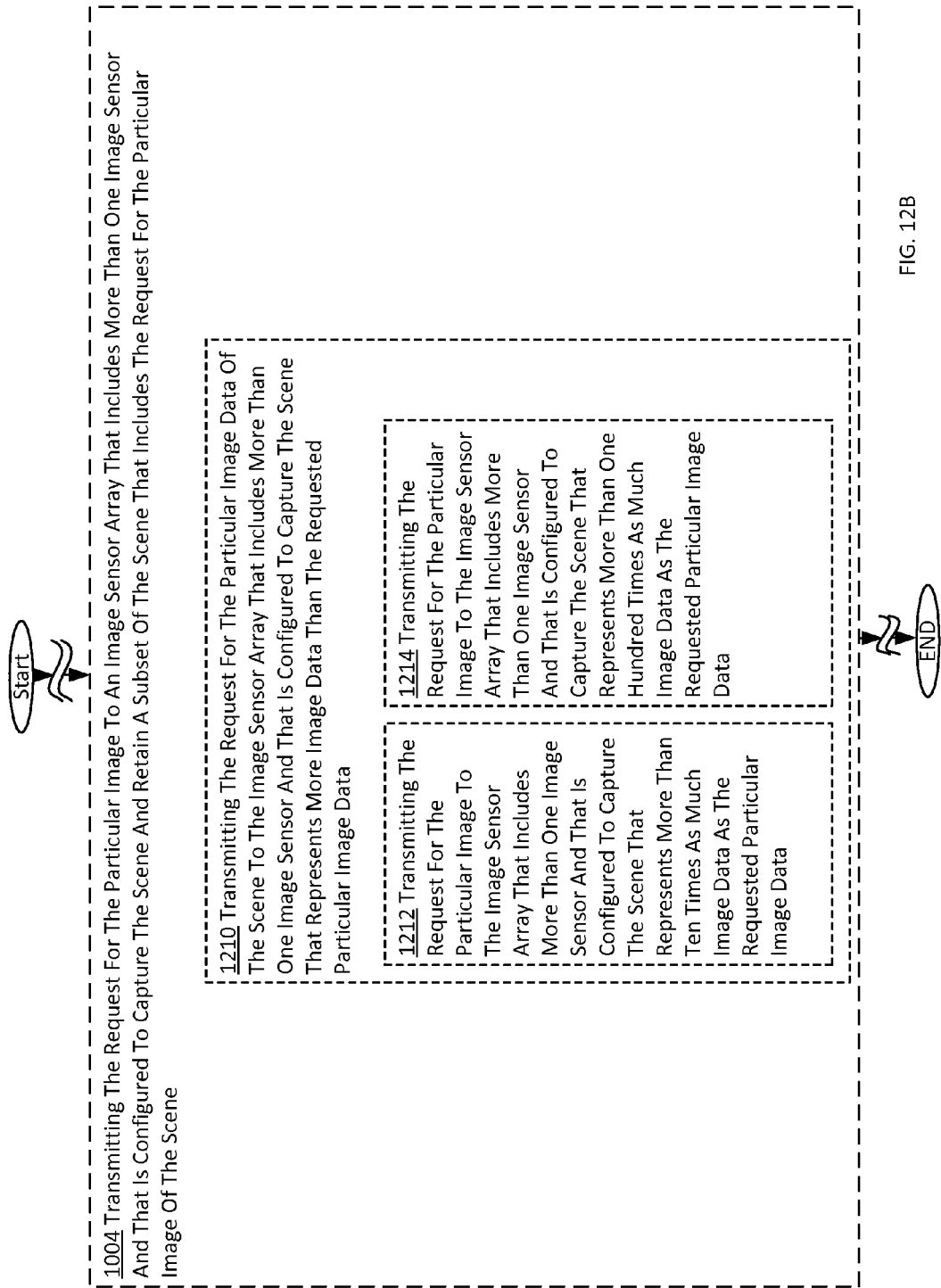

FIG. 12B is a high-level logic flow chart of a process depicting alternate implementations of transmitting the request for the particular image to an image sensor array operation 1004, according to one or more embodiments.

Figure 12C:
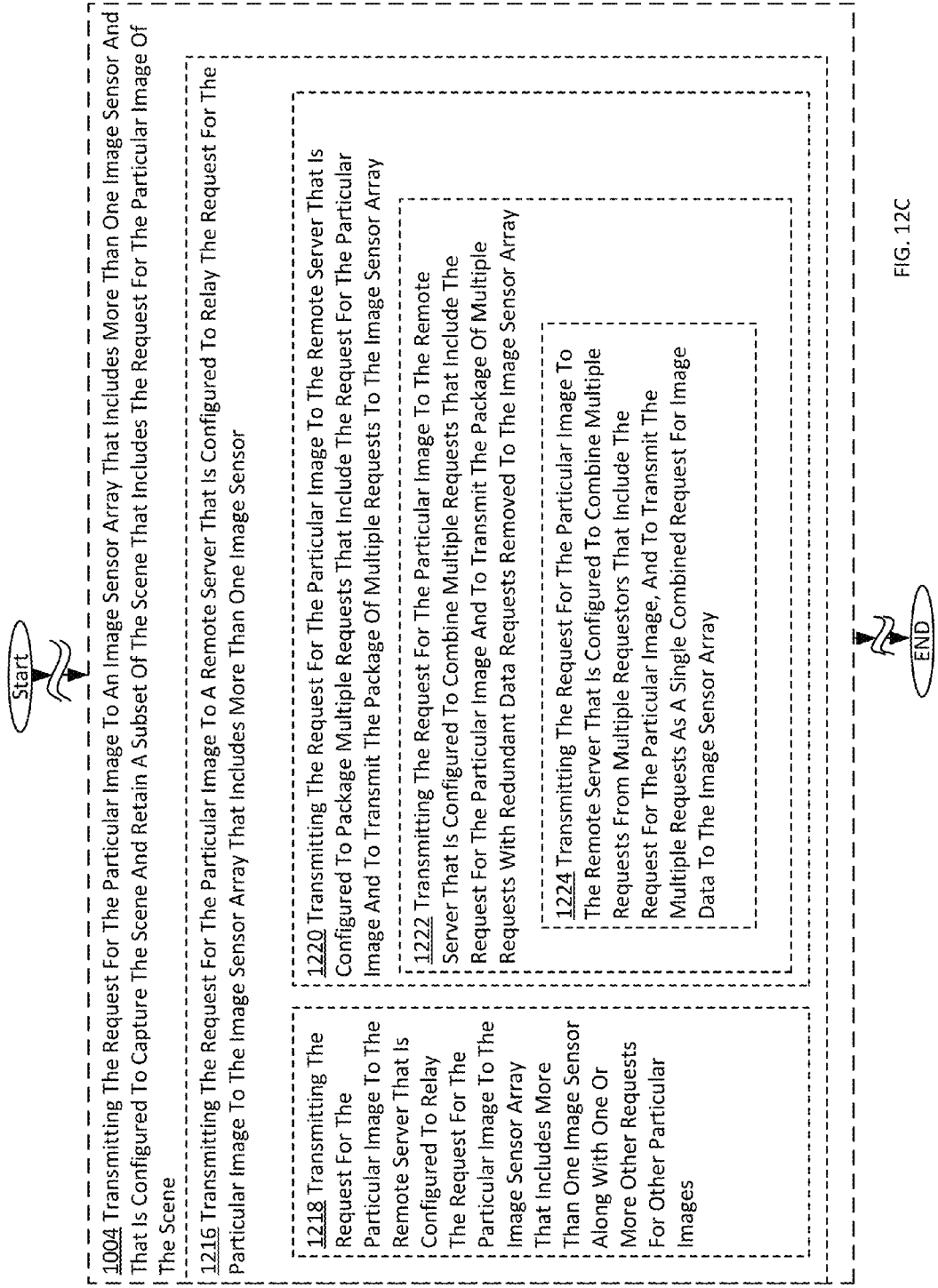

FIG. 12C is a high-level logic flow chart of a process depicting alternate implementations of transmitting the request for the particular image to an image sensor array operation 1004, according to one or more embodiments.

Figure 12D:
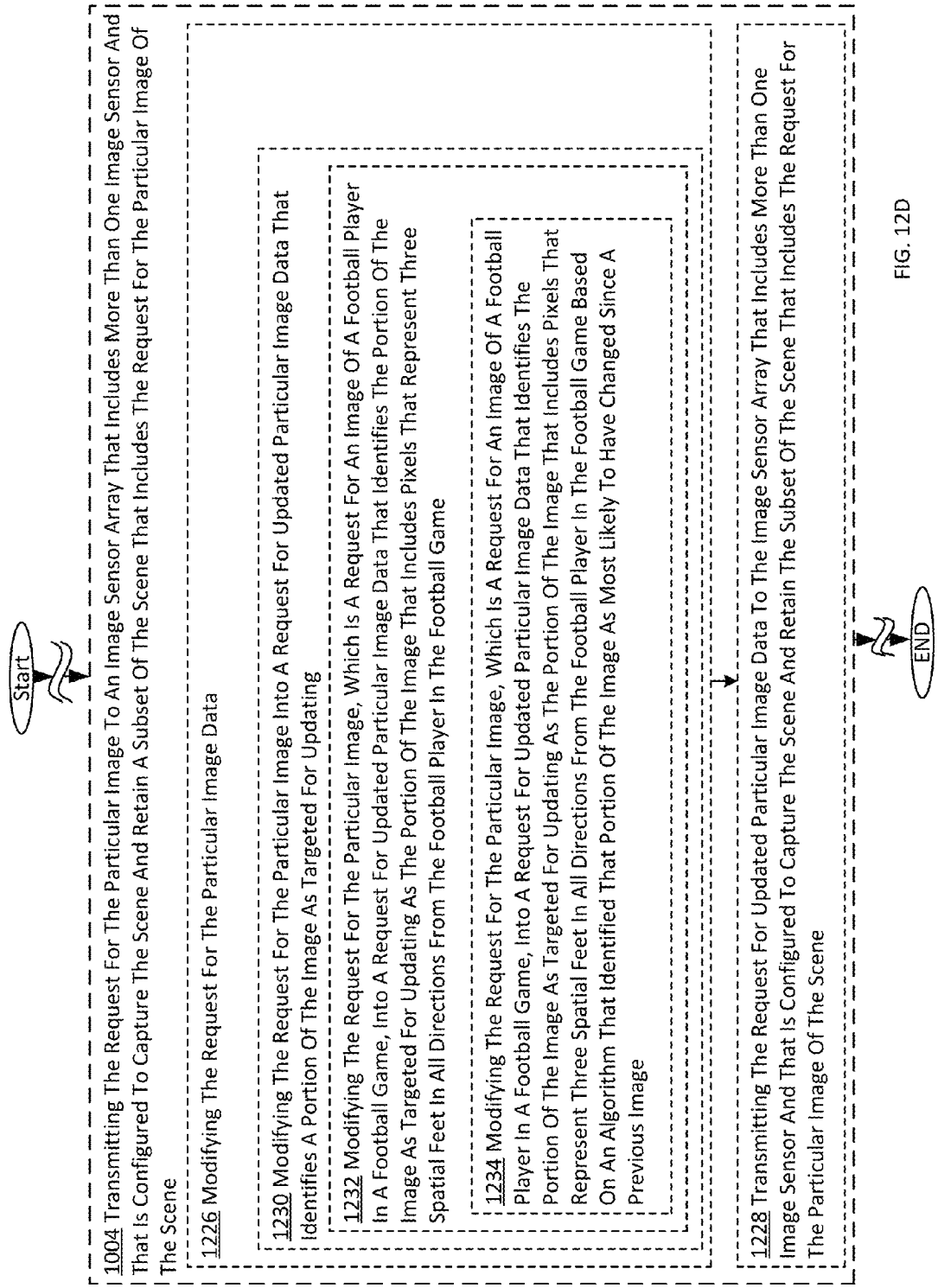

FIG. 12D is a high-level logic flow chart of a process depicting alternate implementations of transmitting the request for the particular image to an image sensor array operation 1004, according to one or more embodiments.

Figure 12E:
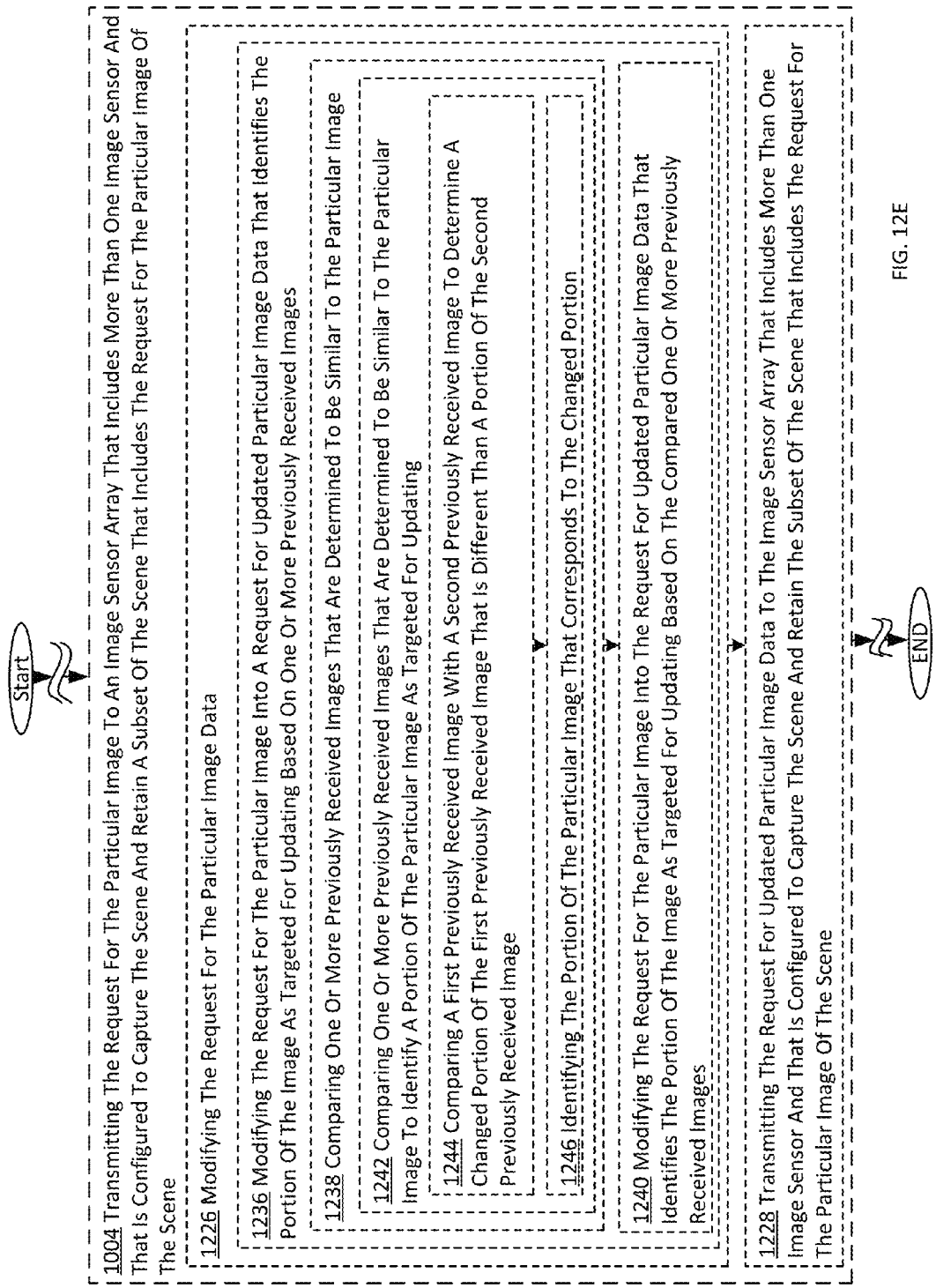

FIG. 12E is a high-level logic flow chart of a process depicting alternate implementations of transmitting the request for the particular image to an image sensor array operation 1004, according to one or more embodiments.

Figure 12F:
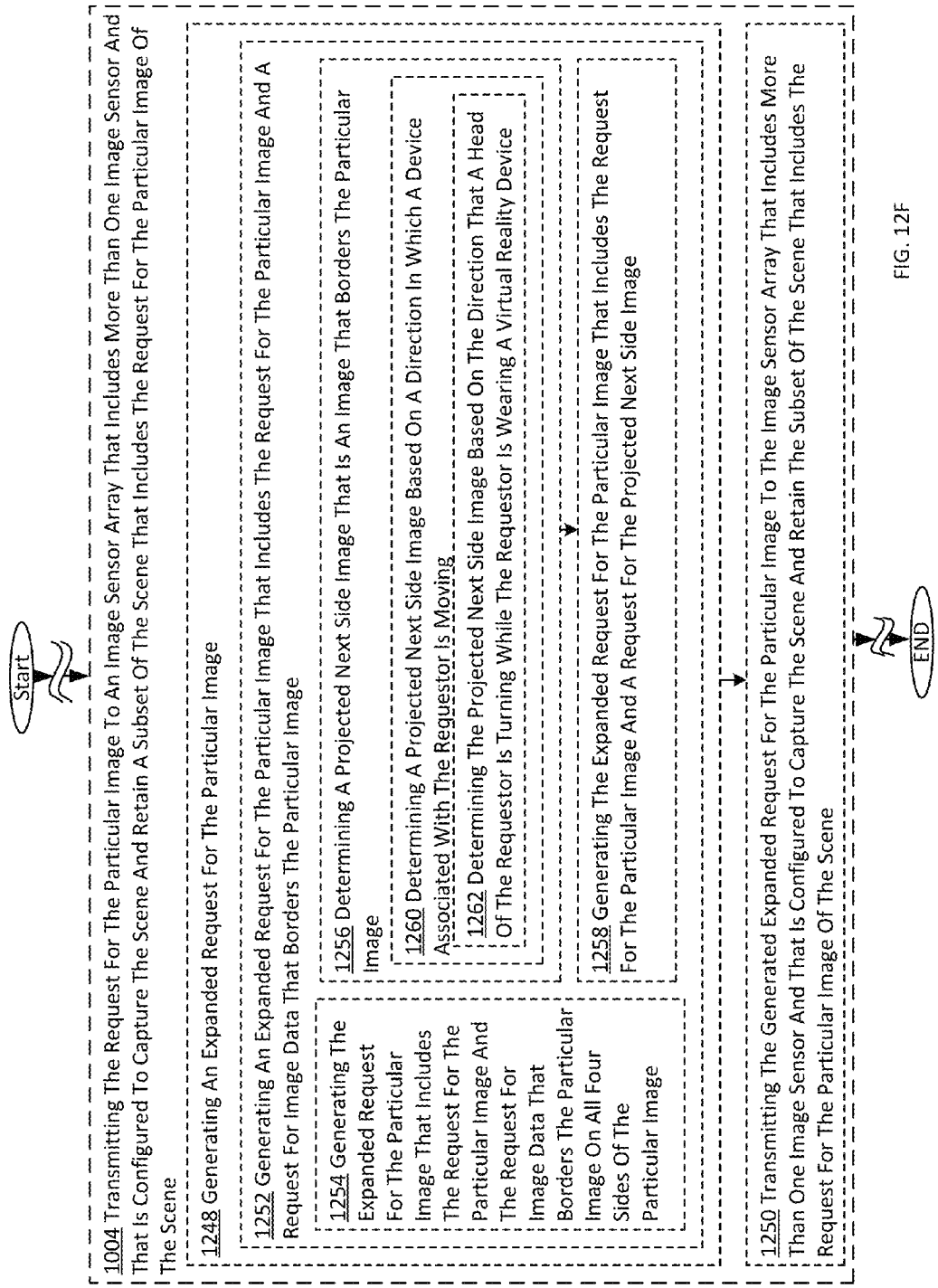

FIG. 12F is a high-level logic flow chart of a process depicting alternate implementations of transmitting the request for the particular image to an image sensor array operation 1004, according to one or more embodiments.

FIG. 12G is a high-level logic flow chart of a process depicting alternate implementations of transmitting the request for the particular image to an image sensor array operation 1004, according to one or more embodiments.

FIG. 13A is a high-level logic flow chart of a process depicting alternate implementations of a receiving only the particular image from the image sensor array operation 1006, according to one or more embodiments.

Figure 13B:
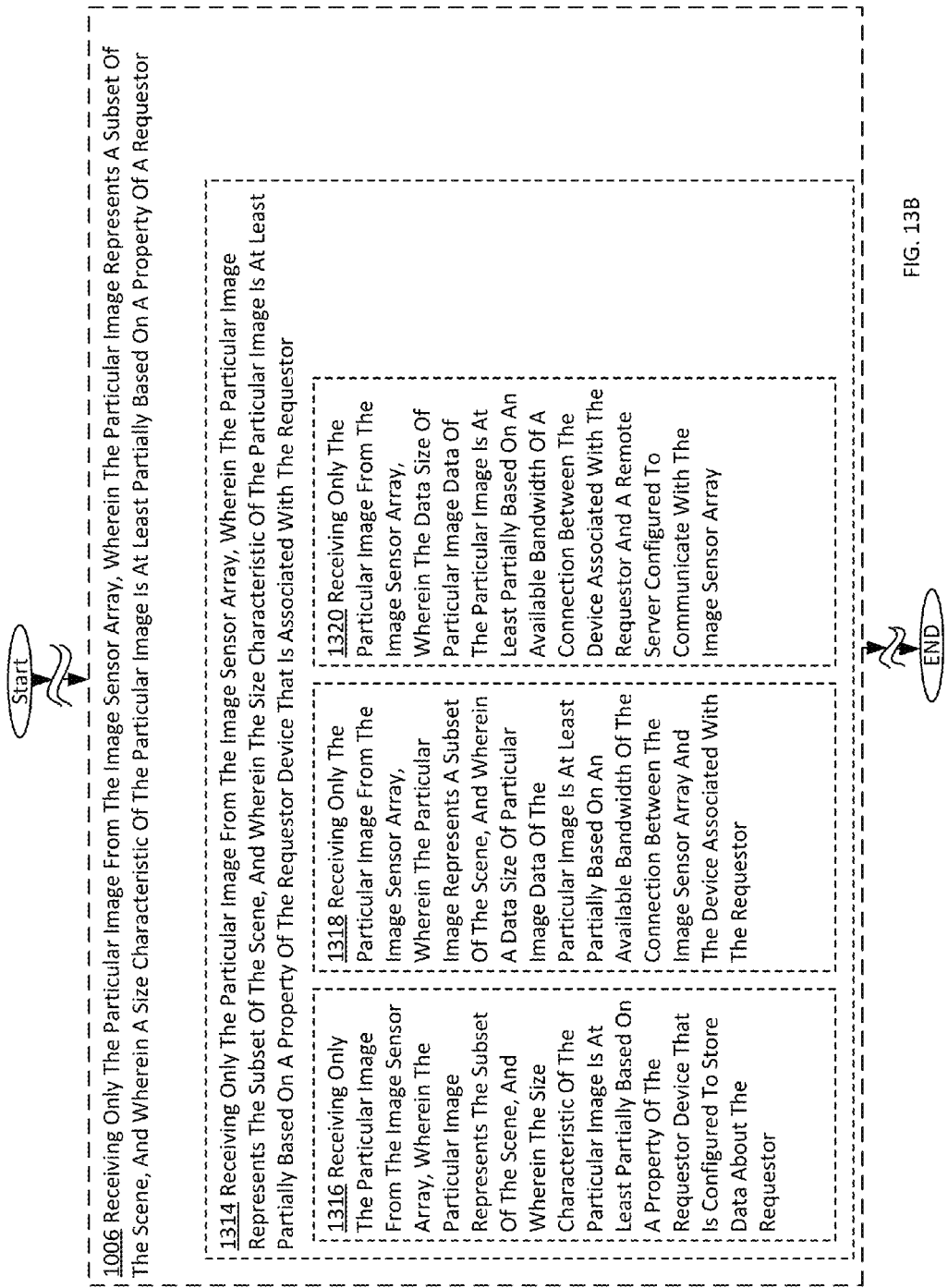

FIG. 13B is a high-level logic flow chart of a process depicting alternate implementations of a receiving only the particular image from the image sensor array operation 1006, according to one or more embodiments.

Figure 13C:
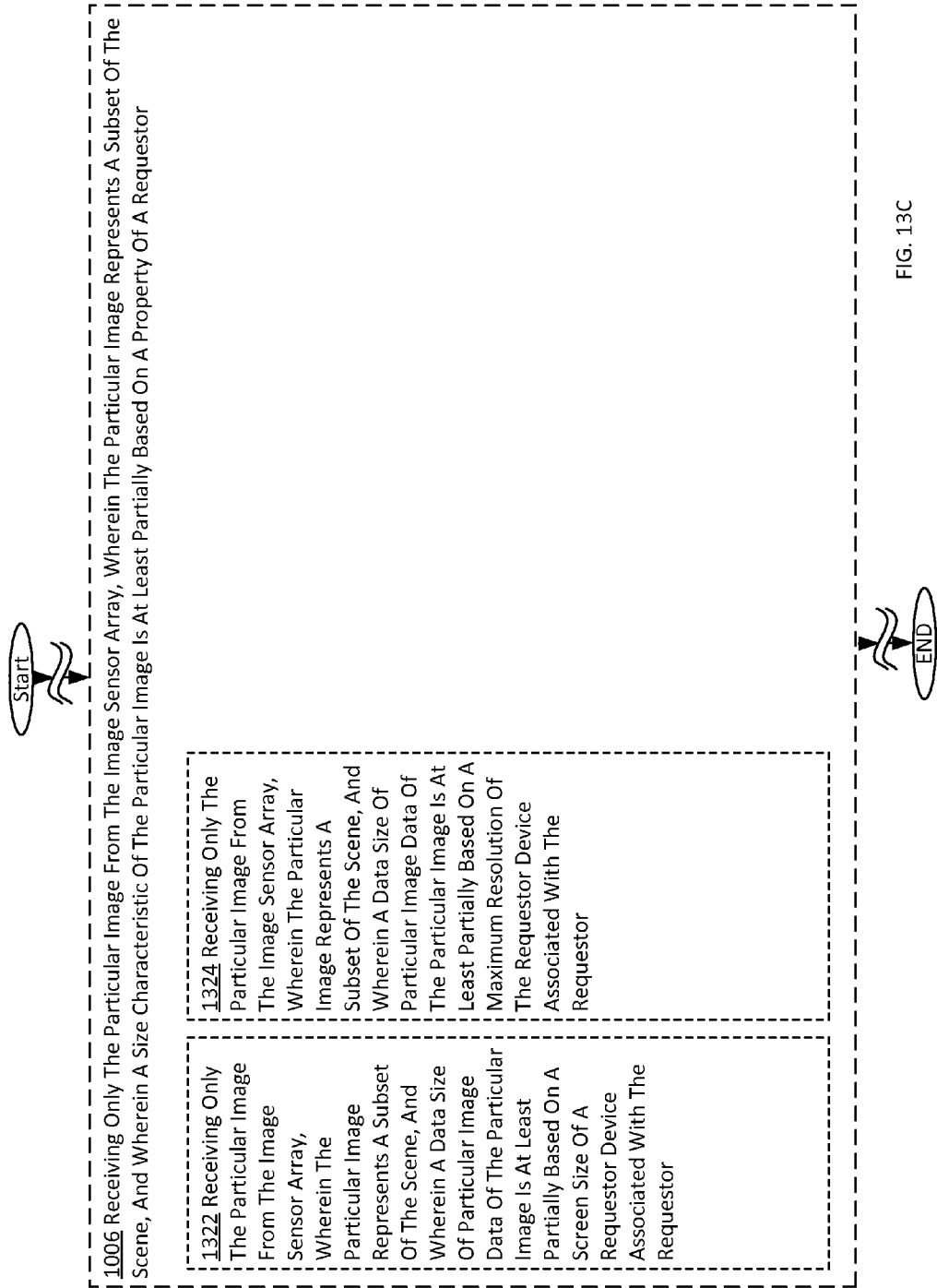

FIG. 13C is a high-level logic flow chart of a process depicting alternate implementations of a receiving only the particular image from the image sensor array operation 1006, according to one or more embodiments.

Figure 14A:
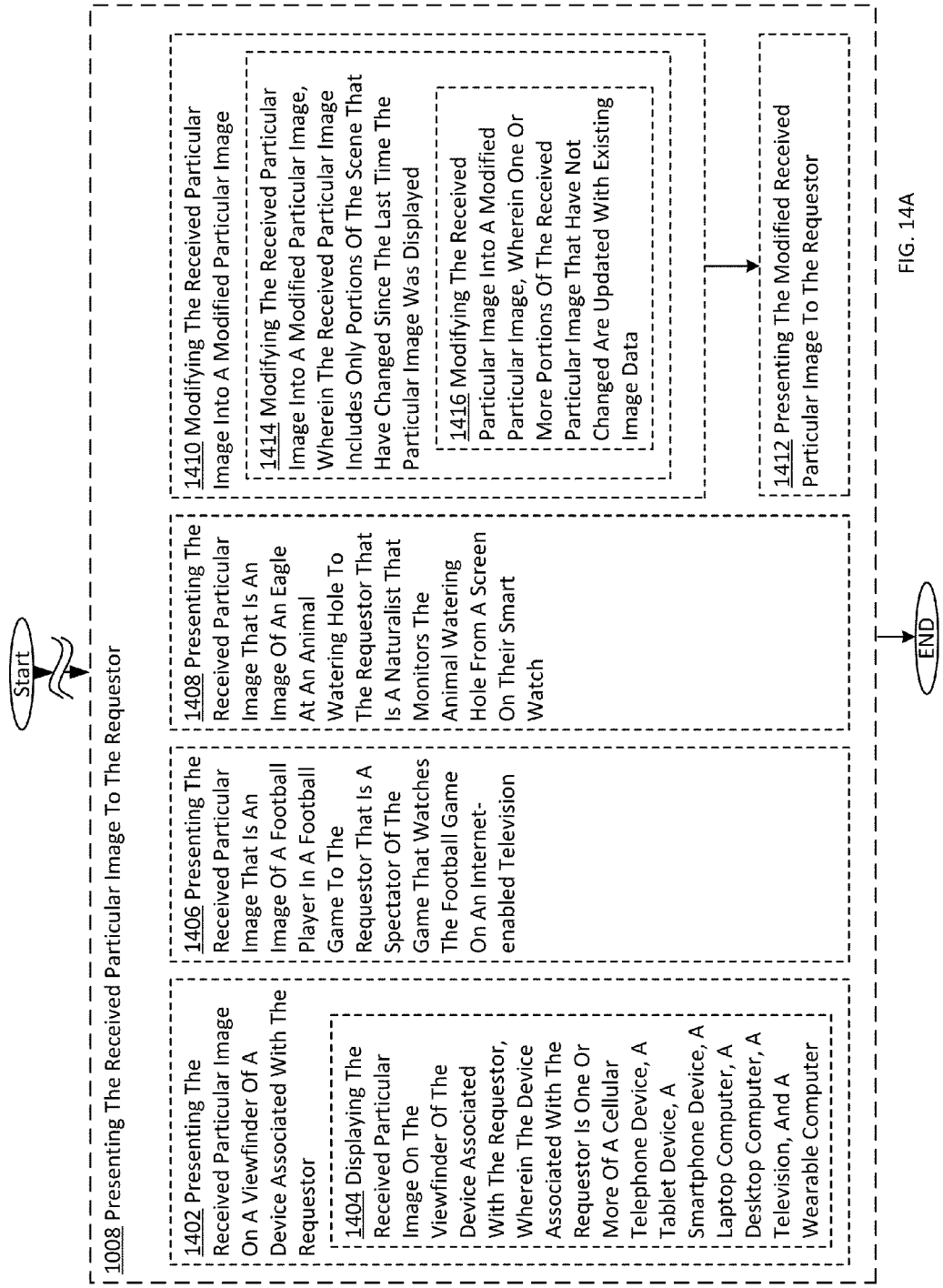

FIG. 14A is a high-level logic flow chart of a process depicting alternate implementations of a presenting the received particular image operation 1008, according to one or more embodiments.

FIG. 14B is a high-level logic flow chart of a process depicting alternate implementations of a presenting the received particular image operation 1008, according to one or more embodiments.

Figure 14C:
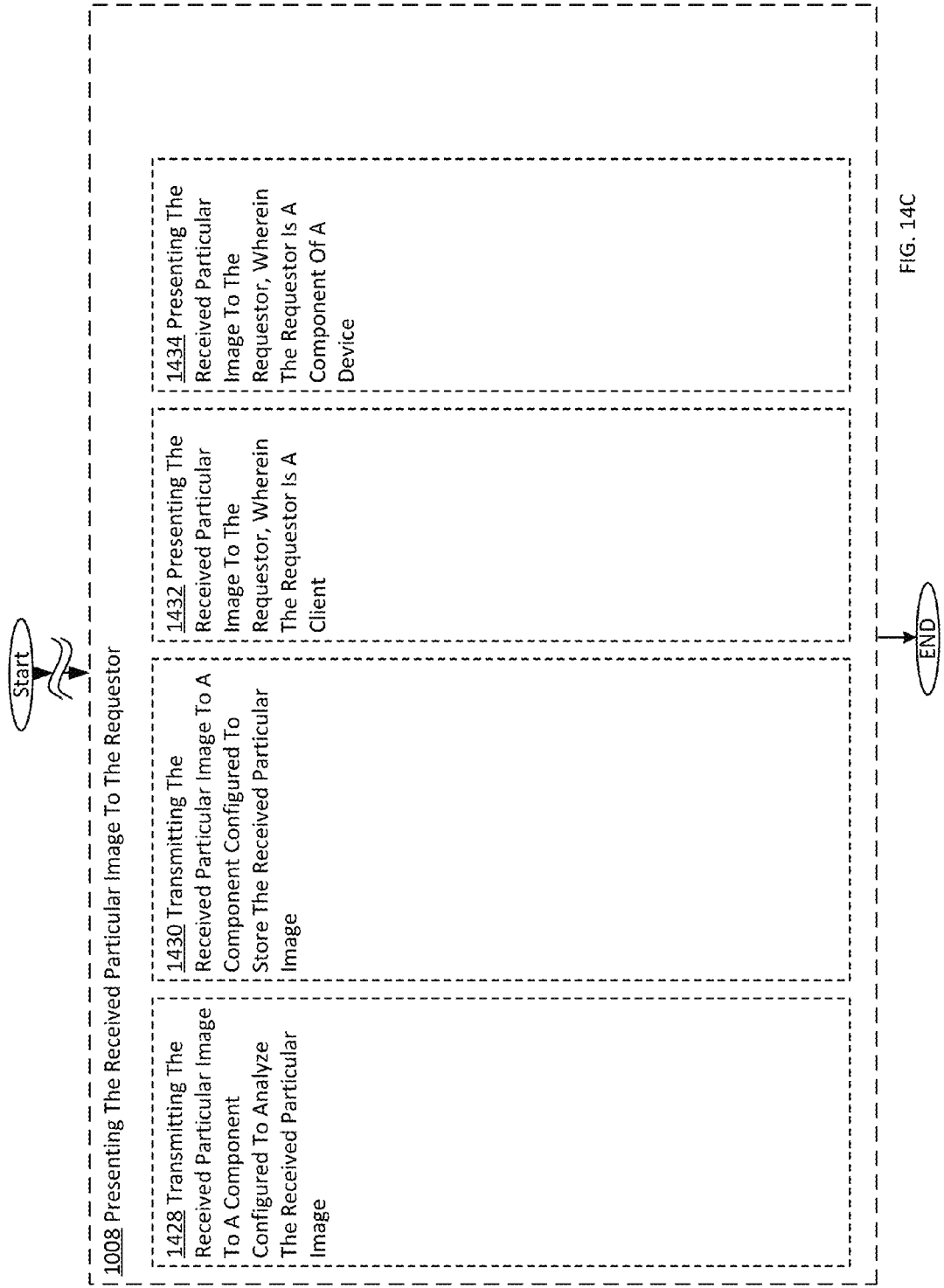

FIG. 14C is a high-level logic flow chart of a process depicting alternate implementations of a presenting the received particular image operation 1008, according to one or more embodiments.

DETAILED DESCRIPTION

Overview

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide an interface for accepting input of a request for a particular image of a scene that is larger than the particular image, transmitting the request for the particular image to an image sensor array that includes more than one image sensor and that is configured to capture the scene and retain a subset of the scene that includes the request for the particular image of the scene, and receiving only the particular image from the image sensor array, wherein the particular image represents a subset of the scene, and wherein a size characteristic of the particular image is at least partially based on a property of a requestor.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software (e.g., a high-level computer program serving as a hardware specification)).

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Operational/Functional Language is a Concrete Specification for Physical Implementation Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. In order to facilitate human comprehension, in many instances, high-level programming languages resemble or even share symbols with natural languages.

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output.

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software (e.g., a high-level computer program serving as a hardware specification), and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software (e.g., a high-level computer program serving as a hardware specification), and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software (e.g., a high-level computer program serving as a hardware specification) implementation; or, yet again alternatively, the implementer may opt for some combination of hardware, software (e.g., a high-level computer program serving as a hardware specification), and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software (e.g., a high-level computer program serving as a hardware specification), and or firmware.

In some implementations described herein, logic and similar implementations may include computer programs or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software (e.g., a high-level computer program serving as a hardware specification) or firmware, or of gate arrays or programmable hardware, such as by performing a reception of or a transmission of one or more instructions in relation to one or more operations described herein. Alternatively or additionally, in some variants, an implementation may include special-purpose hardware, software (e.g., a high-level computer program serving as a hardware specification), firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operation described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/ converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose and then, a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wire-lessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although one or more users may be shown and/or described herein, e.g., in FIG. 1, and other places, as a single illustrated figure, those skilled in the art will appreciate that one or more users may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

High-Level System Architecture

FIG. 1, including FIG. 1-A-1-AN, shows partial views that, when assembled, form a complete view of an entire system, of which at least a portion will be described in more detail. An overview of the entire system of FIG. 1 is now described herein, with a more specific reference to at least one subsystem of FIG. 1 to be described later with respect to FIGS. 2-14D.

FIG. 1 shows various implementations of the overall system. At a high level, FIG. 1 shows various implementations of a multiple user video imaging array (hereinafter interchangeably referred to as a "MUVIA"). It is noted that the designation "MUVIA" is merely shorthand and descriptive of an exemplary embodiment, and not a limiting term. Although "multiple user" appears in the name MUVIA, multiple users or even a single user are not required. Further, "video" is used in the designation "MUVIA," but MUVIA systems also may capture still images, multiple images, audio data, electromagnetic waves outside the visible spectrum, and other data as will be described herein. Further, "imaging array" may be used in the MUVIA designation, but the image sensor in MUVIA is not necessarily an array or even multiple sensors (although commonly implemented as larger groups of image sensors, single-sensor implementations are also contemplated), and "array" here does not necessarily imply any specific structure, but rather any grouping of one or more sensors.

Generally, although not necessarily required, a MUVIA system may include one or more of a user device (e.g., hereinafter interchangeably referred to as a "client device," in recognition that a user may not necessarily be a human, living, or organic"), a server, and an image sensor array. A "server" in the context of this application may refer to any device, program, or module that is not directly connected to the image sensor array or to the client device, including any and all "cloud" storage, applications, and/or processing.

For example, in an embodiment, e.g., as shown in FIG. 1-A, FIG. 1-K, FIG. 1-U, FIG. 1-AE, and FIG. 1-AF, in an embodiment, the system may include one or more of image sensor array 3200, array local storage and processing module 3300, server 4000, and user device 5200. Each of these portions will be discussed in more detail herein.

Referring now to FIG. 1-A, FIG. 1-A depicts user device 5200, which is a device that may be operated or controlled by a user of a MUVIA system. It is noted here that "user" is merely provided as a designation for ease of understanding, and does not imply control by a human or other organism, sentient or otherwise. In an embodiment, for example, in a security-type embodiment, the user device 5200 may be mostly or completely unmonitored, or may be monitored by an artificial intelligence, or by a combination of artificial intelligence, pseudo-artificial intelligence (e.g., that is intelligence amplification) and human intelligence.

User device 5200 may be, but is not limited to, a wearable device (e.g., glasses, goggles, headgear, a watch, clothing), an implant (e.g., a retinal-implant display), a computer of any kind (e.g., a laptop computer, desktop computer, mainframe, server, etc.), a tablet or other portable device, a phone or other similar device (e.g., smartphone, personal digital assistant), a personal electronic device (e.g., music player, CD player), a home appliance (e.g., a television, a refrigerator, or any other so-called "smart" device), a piece of office equipment (e.g., a copier, scanner, fax device, etc.), a camera or other camera-like device, a video game system, an entertainment/media center, or any other electrical equipment that has a functionality of presenting an image (whether visual or by other means, e.g., a screen, but also other sensory stimulating work).

User device 5200 may be capable of presenting an image, which, for purposes of clarity and conciseness will be referred to as displaying an image, although communication through forms other than generating light waves through the visible light spectrum, although the image is not required to be presented at all times or even at all. For example, in an embodiment, user device 5200 may receive images from server 4000 (or directly from the image sensor array 3200, as will be discussed herein), and may store the images for later viewing, or for processing internally, or for any other reason.

Referring again to FIG. 1-A, in an embodiment, user device 5200 may include a user selection accepting module 5210. User selection accepting module 5210 may be configured to receive user input about what the user wants to see. For example, as shown in FIG. 1-A in the exemplary interface 5212, the user selection accepting module 5210 may show an image from image sensor array 3200, and the user may "pan" and "zoom" the image using any known interface, including, but not limited to, keyboard, mouse, touch, haptic, augmented reality interface, voice command, nonverbal motion commands (e.g., as part of a video game system interface, e.g., the Microsoft Kinect). It is noted, and as will be discussed in more detail herein, the camera itself is not "zooming" or "panning," because the camera does not move. What is happening is that different pixels that are captured by the image sensor array 3200 are kept by the image sensor array 3200 and transmitted to the server 4000.

In an embodiment, the user selection accepting module may accept a selection of a particular thing—e.g., a building, an animal, or any other object whose representation is present on the screen. Moreover, a user may use a text box to "search" the image for a particular thing, and processing, done at the user device 5200 or at the server 4000, may determine the image and the zoom level for viewing that thing. The search for a particular thing may include a generic search, e.g., "search for people," or "search for penguins," or a more specific search, e.g., "search for the Space Needle," or "search for the White House." The search for a particular thing may take on any known contextual search, e.g., an address, a text string, or any other input.

In an embodiment, the "user selection" facilitated by the user selection accepting module 5210 may not involve a user at all. For example, in an embodiment, e.g., in a security embodiment, the user selection may be handled completely by machine, and may include "select any portion of the image with movement," or "select any portion of the image in which a person is recognized," or "select any portion of the image in which a particular person, e.g., a person on the FBI most wanted list" is recognized.

Referring again to FIG. 1-A, in an embodiment, user device 5200 may include a user selection transmitting module 5220. The user selection transmitting module 5220 may take the user selection from user selection transmitting module 5220, and transmit the selection to the server 4000. The transmission may include some pre-processing, for example, the user device 5200 may determine the size and parameters of the image prior to sending the request to the server 4000, or that processing may be handled by the server 4000. Following the thick-line arrow leftward from user selection transmitting module 5220 through to FIG. 1-K, the transmission goes to server 4000, as will be discussed herein. It is noted that the transmission to the server 4000 may also include data about the user device, for example, the screen resolution, the window size, the type of device, an identity of the user, a level of service the user has paid for (in embodiments in which such services are prioritized by the camera/server), other capabilities of the device, e.g., framerate, and the like.

Referring again to FIG. 1-A, FIG. 1-A also includes a selected image receiving module 5230 and a user selection presenting module 5240, which will be discussed in more detail herein, with respect to the dataflow of this embodiment.

Referring now to FIG. 1-K, FIGS. 1-K and 1-U show an embodiment of a server 4000 that communicates with one or both of user device 5200 and array local storage and processing module 3300. Sever 4000 may be a single computing device, or may be many computing devices, which may or may not be in proximity with each other.

Referring again to FIG. 1-K, server 4000 may include a user request reception module 4010. The user request reception module 4010 may receive the transmitted request from user selection transmitting module 5220. The user request reception module 4010 may then turn over processing to user request validation module 4020, which may perform, among other things, a check to make sure the user is not requesting more resolution than what their device can handle. For example, if the server has learned (e.g., through gathered information, or through information that was transmitted with the user request or in a same session as the user request), that the user is requesting a 1900×1080 resolution image, and the maximum resolution for the device is 1334× 750, then the request will be modified so that no more than the maximum resolution that can be handled by the device is requested. In an embodiment, this may conserve the bandwidth required to transmit from the MUVIA to the server 4000 and/or the user device 3200

Referring again to FIG. 1-K, in an embodiment, server 4000 may include a user request latency management module 4030. User request latency management module 4030 may, in conjunction with user device 3200, attempt to reduce the latency from the time a specific image is requested by user device 3200 to the time the request is acted upon and data is transmitted to the user. The details for this latency management will be described in more detail herein, with varying techniques that may be carried out by any or all of the devices in the chain (e.g., user device, camera array, and server). As an example, in an embodiment, a lower resolution version of the image, e.g., that is stored locally or on the server, may be sent to the user immediately upon the request, and then that image is updated with the actual image taken by the camera. In an embodiment, user request latency management module 4030 also may handle static gap-filling, that is, if the image captured by the camera is unchanging, e.g., has not changed for a particular period of time, then a new image is not necessary to be captured, and an older image, that may be stored on server 4000, may be transmitted to the user device 3200. This process also will be discussed in more detail herein.

Referring now to FIG. 1-U, which shows more of server 4000, in an embodiment, server 4000 may include a consolidated user request transmission module 4040, which may be configured to consolidate all the user requests, perform any necessary pre-processing on those requests, and send the request for particular sets of pixels to the array local storage and processing module 3300. The process for consolidating the user requests and performing pre-processing will be described in more detail herein with respect to some of the other exemplary embodiments. In this embodiment, however, server consolidated user request transmission module 4040 transmits the request (exiting leftward from FIG. 1-U and traveling downward to FIG. 1-AE, through a pathway identified in FIG. 1-AE as lower-bandwidth communication from remote server 3515. It is noted here that "lower bandwidth communication" does not necessarily mean "low bandwidth" or imply any specific number about the bandwidth—it is simply lower than the relatively higher bandwidth communication from the actual image sensor array 3505 to the array local storage and processing module 3300, which will be discussed in more detail herein.

Referring again to FIG. 1-U, server 4000 also may include requested pixel reception module 4050, user request preparation module 4060, and user request transmission module 4070 (shown in FIG. 1-T), which will be discussed in more detail herein, with respect to the dataflow of this embodiment Referring now to FIGS. 1-AE and 1-AF, FIGS. 1-AE and 1-AF show an image sensor array ("ISA") 3200 and an array local storage and processing module 3300, each of which will now be described in more detail.

Image sensor array 3200 may include one or more image sensors that may, in an embodiment, be statically pointed at a particular object or scene. Image sensor array 3200 may be a single image sensor, or more commonly, may be a group of individual image sensors 3201 that are combined to create a larger field of view. For example, in an embodiment, ten megapixel sensors may be used for each individual image sensor 3201. With twelve of these sensors, the effective field of view, loss-less zoom, and so forth may be increased substantially. These numbers are for example only, and any number of sensors and/or megapixel image sensor capacities may be used.

The use of many individual sensors may create a very large number of pixels captured for each exposure of the image sensor array 3200. Thus, these pixels are transmitted via a higher bandwidth communication 3505 to the array local storage and processing module 3300. In an embodiment, array local storage and processing module 3300 is integrated into the image sensor array 3200. In another embodiment, the array local storage and processing module 3300 is separate from, but directly connected to (e.g., via a USB 3.0 cable) to the image sensor array 3200. It is noted that "higher bandwidth communication 3505" does not require a specific amount of bandwidth, but only that the bandwidth for this communication is relatively higher than the bandwidth communication from the array local processing module 3300 to the remote server, which may be, but is not required to be, located further away temporally.

It is noted that, because of the large number of pixels captured by image sensor array 3200, mechanical changes to the image sensor array are not generally required, although such mechanical changes are not excluded from these embodiments. For example, because the array has a very large field of view, with very high resolution, "pan" and "zoom" functions may be handled optically, rather than by mechanically changing the focal point of the lenses or by physically pointing the array at a different location. This may reduce the complexity required of the device, and also may improve the speed at which different views may be generated by the image sensor array 3200.

Referring again to FIG. 1-AE, the image sensor array 3300 may capture an image that is received by image capturing module 3305. Image capturing module 3305 may take the captured image and compare it to a consolidated user request, e.g., which is provided by a consolidated user request reception module 3310. Consolidated user request reception module 3310 may receive the communication from server 4000 regarding which pixels of the image have been requested. Through use of the consolidated user request and the captured image, pixel selection module 3320 may select the pixels that have been specifically requested by the user, and mark those pixels for transmission back to the server.

After the pixels to be kept are identified, the other pixels that are not to be kept are removed, e.g., decimated at unused pixel decimation module 3330. In an embodiment, these pixels are simply discarded, e.g., not stored in a long-term memory, that is removed to a digital trash 3317. In another embodiment, some or all of these pixels are stored in a local memory, e.g., local memory 3315. From here, these pixels may be transmitted to various locations at off-peak times, may be kept for image processing by the array local processing module 3300, or may be subject to other manipulations or processing separate from the user requests.

Referring again to FIG. 1-AE, the selected pixels then may be transmitted to the server 4000 using selected pixel transmission module 3340. Selected pixel transmission module 3340 may include any transmission equipment necessary, e.g., cellular radio, wireless adapter, and the like, depending on the format of communication. In an embodiment, only those pixels which have been requested are transmitted to the server via lower-bandwidth communication 3510. Similarly to lower-bandwidth communication 3515, the lower-bandwidth communication 3510 does not refer to a specific amount of bandwidth, just that the amount of bandwidth is relatively lower than higher-bandwidth communication 3505.

It is noted that more pixels than what are specifically requested by the user may be transmitted, in certain embodiments. For example, the array local processing module 3300 may send pixels that border the user's requested area, but are outside the user's requested area. In an embodiment, as will be discussed herein, those pixels may be sent at a different resolution or using a different kind of compression. In another embodiment, the additional pixels may merely be sent the same as the requested pixels. In still another embodiment, server 4000 may expand the user requested areas, so that array local processing module 3300 may send only the requested pixels, but the requested pixels cover more area than what the user originally requested. These additional pixels may be transmitted and "cached" by the server or local device, which may be used to decrease latency times, in a process that will be discussed more herein.

Referring back to FIG. 1-U, the transmitted pixels transmitted from selected pixel transmission module 3340 of array local processing module 3300 may be received by server 4000, e.g., at requested pixel reception module 4050. Requested pixel reception module 4050 may receive the requested pixels and turn them over to user request preparation module 4060, which may "unpack" the requested pixels, e.g., determining which pixels go to which user, and at what resolutions, along with any post-processing, including image adjustment, adding in missing cached data, or adding additional data to the images (e.g., advertisements or other data). In an embodiment, server 4000 also may include a user request transmission module 4070, which may be configured to transmit the requested pixels back to the user device 5200.

Referring again to FIG. 1-A, user device 5200 may include a selected image receiving module 5230, which may receive the pixels that were sent by the server 4000, and user selection presenting module 5240, which may display the requested pixels to the user, e.g., by showing them on a screen of the device. In an embodiment, the display of the image may be carried out through the exemplary interface, which allows a cycle of user requests and new images to be shown as the user navigates through what is seen on the MUVIA, e.g., as shown in FIG. 1-A.

FIGS. 1-B, 1-C, 1-M, 1-W, 1-AG, and 1-AH show another embodiment of the MUVIA system, in which multiple user devices 5510, 5520, and 5530 may request images captured by the same image sensor array 3200.

Referring now to FIGS. 1-B and 1-C, user device 5510, user device 5520, and user device 5530 are shown. In an embodiment, user devices 5510, 5520, and 5530 may have some or all of the same components as user device 5200, but are not shown here for clarity and ease of understanding the drawing. For each of user devices 5510, 5520, and 5530, exemplary screen resolutions have been chosen. There is nothing specific about these numbers that have been chosen, however, they are merely illustrated for exemplary purposes, and any other numbers could have been chosen in their place.

For example, in an embodiment, referring to FIG. 1-B, user device 5510 may have a screen resolution of 1920× 1080 (e.g., colloquially referred to as "HD quality"). User device 5510 may send an image request to the server 4000, and may also send data regarding the screen resolution of the device.

Referring now to FIG. 1-C, user device 5520 may have a screen resolution of 1334×750. User device 5520 may send another image request to the server 4000, and, in an embodiment, instead of sending data regarding the screen resolution of the device, may send data that identifies what kind of device it is (e.g., an Apple-branded smartphone). Server 4000 may use this data to determine the screen resolution for user device 5520 through an internal database, or through contacting an external source, e.g., a manufacturer of the device or a third party supplier of data about devices.

Referring again to FIG. 1-C, user device 5530 may have a screen resolution of 640×480, and may send the request by itself to the server 4000, without any additional data. In addition, server 4000 may receive independent requests from various users to change their current viewing area on the device.

Referring now to FIG. 1-M, server 4000 may include user request reception module 4110. User request reception module 4110 may receive requests from multiple user devices, e.g., user devices 5510, 5520, and 5530. Server 4000 also may include an independent user view change request reception module 4115, which, in an embodiment, may be a part of user request reception module 4110, and may be configured to receive requests from users that are already connected to the system, to change the view of what they are currently seeing.

Referring again to FIG. 1-M, server 4000 may include relevant pixel selection module 4120 configured to combine the user selections into a single area, as shown in FIG. 1-M. It is noted that, in an embodiment, the different user devices may request areas that overlap each other. In this case, there may be one or more overlapping areas, e.g., overlapping areas 4122. In an embodiment, the overlapping areas are only transmitted once, in order to save data/transmission costs and increase efficiency.

Referring now to FIG. 1-W, server 4000 may include selected pixel transmission to ISA module 4130. Module 4130 may take the relevant selected pixels, and transmit them to the array local processing module 3400 of image sensor array 3200. Selected pixel transmission to ISA module 4130 may include communication components, which may be shared with other transmission and/or reception modules.

Referring now to FIG. 1-AG, array local processing module 3400 may communicate with image sensor array 3200. Similarly to FIGS. 1-AE and 1-AF, FIGS. 1-AG and 1-AH show array local processing module 3400 and image sensor array 3200, respectively.

Image sensor array 3200 may include one or more image sensors that may, in an embodiment, be statically pointed at a particular object or scene. Image sensor array 3200 may be a single image sensor, or more commonly, may be a group of individual image sensors 3201 that are combined to create a larger field of view. For example, in an embodiment, ten megapixel sensors may be used for each individual image sensor 3201. With twelve of these sensors, the effective field of view, loss-less zoom, and so forth may be increased substantially. These numbers are for example only, and any number of sensors and/or megapixel image sensor capacities may be used.

The use of many individual sensors may create a very large number of pixels captured for each exposure of the image sensor array 3200. Thus, these pixels are transmitted via a higher bandwidth communication 3505 to the array local storage and processing module 3400. In an embodiment, array local storage and processing module 3400 is integrated into the image sensor array. In another embodiment, the array local storage and processing module 3400 is separate from, but directly connected to (e.g., via a USB 3.0 cable) to the image sensor array 3200. It is noted that "higher bandwidth communication 3505" does not require a specific amount of bandwidth, but only that the bandwidth for this communication is relatively higher than the bandwidth communication from the array local processing module 3400 to the remote server, which may be, but is not required to be, located further away temporally.

It is noted that, because of the large number of pixels captured by image sensor array 3200, mechanical changes to the image sensor array are not generally required, although such mechanical changes are not excluded from these embodiments. For example, because the array has a very large field of view, with very high resolution, "pan" and "zoom" functions may be handled optically, rather than by mechanically changing the focal point of the lenses or by physically pointing the array at a different location. This may reduce the complexity required of the device, and also may improve the speed at which different views may be generated by the image sensor array 3200.

Referring again to FIG. 1-AG, the image sensor array 3200 may capture an image and compare it to a consolidated user request, e.g., which is provided by a consolidated user request reception module 3410. Consolidated user request reception module 3410 may receive the communication from server 4000 regarding which pixels of the image have been requested. Through use of the consolidated user request and the captured image, pixel selection module 3420 may select the pixels that have been specifically requested by the user, and mark those pixels for transmission back to the server.

After the pixels to be kept are identified, the other pixels that are not to be kept are removed, e.g., decimated at unused pixel decimation module 3430. In an embodiment, these pixels are simply discarded, e.g., not stored in a long-term memory, that is removed to a digital trash 3417. In another embodiment, some or all of these pixels are stored in a local memory, e.g., local memory 3415. From here, these pixels may be transmitted to various locations at off-peak times, may be kept for image processing by the array local processing module 3400, or may be subject to other manipulations or processing separate from the user requests.

Referring gain to FIG. 1-AG, array local processing module 3400 may include flagged selected pixel transmission module 3440, which takes the pixels identified as requested (e.g., "flagged") and transmits them back to the server 4000 for further processing. Similarly to as previously described, this transmission may utilize a lower-bandwidth channel, and module 3440 may include all necessary hardware to effect that lower-bandwidth transmission to server 4000.

Referring again to FIG. 1-W, the flagged selected pixel transmission module 3440 of array local processing module 3400 may transmit the flagged pixels to server 4000. Specifically, flagged selected pixel transmission module 3440 may transmit the pixels to flagged selected pixel reception from ISA module 4140 of server 4000, as shown in FIG. 1-W.

Referring again to FIG. 1-W, server 4000 also may include flagged selected pixel separation and duplication module 4150, which may, effectively, reverse the process of combining the pixels from the various selections, duplicating overlapping areas where necessary, and creating the requested images for each of the user devices that requested images. Flagged selected pixel separation and duplication module 4150 also may include the post-processing done to the image, including filling in cached versions of images, image adjustments based on the device preferences and/or the user preferences, and any other image post-processing.

Referring now to FIG. 1-M (as data flows "northward" from FIG. 1-W from module 4150), server 4000 may include pixel transmission to user device module 4160, which may be configured to transmit the pixels that have been separated out and processed to the specific users that requested the image. Pixel transmission to user device module 4160 may handle the transmission of images to the user devices 5510, 5520, and 5530. In an embodiment, pixel transmission to user device module 4160 may have some or all components in common with user request reception module 4110.

Following the arrow of data flow to the right and upward from module 4160 of server 4000, the requested user images arrive at user device 5510, user device 5520, and user device 5530, as shown in FIGS. 1-B and 1-C. The user devices 5510, 5520, and 5530 may present the received images as previously discussed and/or as further discussed herein.

Referring again to FIG. 1, FIGS. 1-E, 1-O, 1-Y, 1-AH, and 1-AI depict a MUVIA implementation according to an embodiment. In an embodiment, referring now to FIG. 1-E, a user device 5600 may include a target selection reception module 5610. Target selection reception module 5610 may be a component that allows the user to select a "target" from the image, that is, a point of interest from the image. For example, in the shown example, the MUVIA array is pointed at a football stadium, e.g., CenturyLink Field. As an example, a user may select one of the football players visible on the field as a "target." This may be facilitated by a target presentation module, e.g., target presentation module 5612, which may present one or more images (e.g., which may be various versions of images from MUVIA, at different resolutions or not up-to-date) from which the user may select the target, e.g., the football player.

In an embodiment, target selection reception module 5610 may include an audible target selection module 5614 which may be configured to allow the user to select a target using audible commands, without requiring physical interaction with a device.

Referring again to FIG. 1, e.g., FIG. 1-E, in an embodiment, user device 5600 may include selected target transmission module 5620. Selected target transmission module 5620 may be configured to take the target selected by the user, and transmit the selected target to the server 4000.

Referring now to FIG. 1-O, FIG. 1-O (and FIG. 1-Y to the direct "south" of FIG. 1-O) shows an embodiment of server 4000. For example, in an embodiment, server 4000 may include a selected target reception module 4210. In an embodiment, selected target reception module 4210 of server 4000 may receive the selected target from the user device 5600. The selected target data may take various formats, e.g., it may be image data, it may be metadata that identifies the selected target, it may be some other designation, e.g., an ID number, a tracking number, or a piece of information, like a license plate or a social security number. The selected target data may be an address or a physical description, or any other instantiation of data that can be used to identify something.

Referring again to FIG. 1-O, in an embodiment, server 4000 may include selected target identification module 4220, which may be configured to take the target data received by selected target reception module 4210 and determine an image that needs to be captured in order to obtain an image that contains the selected target (e.g., in the shown example, the football player). In an embodiment, selected target identification module 4220 may use images previously received (or, in an embodiment, current images) from the image sensor array 3200 to determine the parameters of an image that contains the selected target. For example, in an embodiment, lower-resolution images from the image sensor array 3200 may be transmitted to server 4000 for determining where the target is located within the image, and then specific requests for portions of the image may be transmitted to the image sensor array 3200, as will be discussed herein.

In an embodiment, server 4000 may perform processing on the selected target data, and/or on image data that is received, in order to create a request that is to be transmitted to the image sensor array 3200. For example, in the given example, the selected target data is a football player. The server 4000, that is, selected target identification module 4220 may perform image recognition on one or more images captured from the image sensor array to determine a "sector" of the entire scene that contains the selected target. In another embodiment, the selected target identification module 4220 may use other, external sources of data to determine where the target is. In yet another embodiment, the selected target data was selected by the user from the scene displayed by the image sensor array, so such processing may not be necessary.

Referring again to FIG. 1-O, in an embodiment, server 4000 may include pixel information selection module 4230, which may select the pixels needed to capture the target, and which may determine the size of the image that should be transmitted from the image sensor array. The size of the image may be determined based on a type of target that is selected, one or more parameters (set by the user, by the device, or by the server, which may or may not be based on the selected target), by the screen resolution of the device, or by any other algorithm. Pixel information selection module 4230 may determine the pixels to be captured in order to express the target, and may update based on changes in the target's status (e.g., if the target is moving, e.g., in the football example, once a play has started and the football player is moving in a certain direction).

Referring now to FIG. 1-Y, FIG. 1Y includes more of server 4000 according to an embodiment. In an embodiment, server 4000 may include pixel information transmission to ISA module 4240. Pixel information transmission to ISA module 4240 may transmit the selected pixels to the array local processing module 3500 associated with image sensor array 3200.

Referring now to FIGS. 1-AH and 1-AI, FIG. 1-AH depicts an image sensor array 3200, which in this example is pointed at a football stadium, e.g., CenturyLink field. Image sensor array 3200 may include one or more image sensors that may, in an embodiment, be statically pointed at a particular object or scene. Image sensor array 3200 may be a single image sensor, or more commonly, may be a group of individual image sensors 3201 that are combined to create a larger field of view. For example, in an embodiment, ten megapixel sensors may be used for each individual image sensor 3201. With twelve of these sensors, the effective field of view, loss-less zoom, and so forth may be increased substantially. These numbers are for example only, and any number of sensors and/or megapixel image sensor capacities may be used.

The use of many individual sensors may create a very large number of pixels captured for each exposure of the image sensor array 3200. Thus, these pixels are transmitted via a higher bandwidth communication 3505 to the array local storage and processing module 3500. In an embodiment, array local storage and processing module 3500 is integrated into the image sensor array. In another embodiment, the array local storage and processing module 3500 is separate from, but directly connected to (e.g., via a USB 3.0 cable) to the image sensor array 3200. It is noted that "higher bandwidth communication 3505" does not require a specific amount of bandwidth, but only that the bandwidth for this communication is relatively higher than the bandwidth communication from the array local processing module 3500 to the remote server, which may be, but is not required to be, located further away temporally.

It is noted that, because of the large number of pixels captured by image sensor array 3200, mechanical changes to the image sensor array are not generally required, although such mechanical changes are not excluded from these embodiments. For example, because the array has a very large field of view, with very high resolution, "pan" and "zoom" functions may be handled optically, rather than by mechanically changing the focal point of the lenses or by physically pointing the array at a different location. This may reduce the complexity required of the device, and also may improve the speed at which different views may be generated by the image sensor array 3200.

Referring again to FIG. 1-AE, the image sensor array 3200 may capture an image that is received by image capturing module 3305. Image capturing module 3305 may take the captured image and compare it to a consolidated user request, e.g., which is provided by a consolidated user request reception module 3510. Consolidated user request reception module 3510 may receive the communication from server 4000 regarding which pixels of the image have been requested. Through use of the consolidated user request and the captured image, pixel selection module 3320 may select the pixels that have been specifically requested by the user, and mark those pixels for transmission back to the server.

After the pixels to be kept are identified, the other pixels that are not to be kept are removed, e.g., decimated at unused pixel decimation module 3330. In an embodiment, these pixels are simply discarded, e.g., not stored in a long-term memory, that is removed to a digital trash 3317. In another embodiment, some or all of these pixels are stored in a local memory, e.g., local memory 3315. From here, these pixels may be transmitted to various locations at off-peak times, may be kept for image processing by the array local processing module 3300, or may be subject to other manipulations or processing separate from the user requests. In an embodiment, unused pixel decimation module 3330 may include or communicate with a lower resolution module 3314, which may, in some embodiments, be used to transmit a lower-resolution version of more of the image (e.g., an entire scene, or more of the field of view surrounding the target) to the server 4000, so that the server 4000 may accurately determine which images are required to capture the target selected by the user.

Referring again to FIG. 1-AE, the selected pixels then may be transmitted to the server 4000 using selected pixel transmission module 3340. Selected pixel transmission module 3340 may include any transmission equipment necessary, e.g., cellular radio, wireless adapter, and the like, depending on the format of communication. In an embodiment, only those pixels which have been requested are transmitted to the server via lower-bandwidth communication 3510. Similarly to lower-bandwidth communication 3515, the lower-bandwidth communication 3510 does not refer to a specific amount of bandwidth, just that the amount of bandwidth is relatively lower than higher-bandwidth communication 3505.

Referring now again to FIG. 1-Y, server 4000 may include a requested image reception from ISA module 4250. Requested image reception from ISA module 4250 may receive the image data from the array local processing module 3500 (e.g., in the arrow coming "north" from FIG. 1-AI. That image, as depicted in FIG. 1-Y, may include the target (e.g., the football player), as well as some surrounding area (e.g., the area of the field around the football player). The "surrounding area" and the specifics of what is included/transmitted from the array local processing module may be specified by the user (directly or indirectly, e.g., through a set of preferences), or may be determined by the server, e.g., in the pixel information selection module 4230 (shown in FIG. 1-O).

Referring again to FIG. 1-Y, server 4000 may also include a requested image transmission to user device module 4260. Requested image transmission to user device module 4260 may transmit the requested image to the user device 5600. Requested image transmission to user device module 4260 may include components necessary to communicate with user device 5600 and may, in some embodiments, share components with one or more other modules of server 4000, e.g., a network interface, or a wireless antenna.

Referring again to FIG. 1-Y, server 4000 may include a server cached image updating module 4270. Server cached image updating module 4270 may take the images received from the array local processing module 3500 (e.g., which may include the image to be sent to the user), and compare the received images with stored or "cached" images on the server, in order to determine if the cached images should be updated. This process may happen frequently or infrequently, depending on embodiments, and may be continuously ongoing as long as there is a data connection, in some embodiments. In some embodiments, the frequency of the process may depend on the available bandwidth to the array local processing module 3500, e.g., that is, at off-peak times, the frequency may be increased. In an embodiment, server cached image updating module 4270 compares an image received from the array local processing module 3500, and, if the image has changes, replaces the cached version of the image with the newer image.

Referring now again to FIG. 1-E, FIG. 1-E shows user device 5600. In an embodiment, user device 5600 includes image containing selected target receiving module 5630 that may be configured to receive the image from server 4000, e.g., requested image transmission to user device module 4260 of server 4000 (e.g., depicted in FIG. 1-Y, with the data transmission indicated by a rightward-upward arrow passing through FIG. 1-Y and FIG. 1-O (to the north) before arriving at FIG. 1-E.

Referring again to FIG. 1-E, FIG. 1-E shows received image presentation module 5640, which may display the requested pixels that include the selected target to the user, e.g., by showing them on a screen of the device. In an embodiment, the display of the image may be carried out through an exemplary interface that allows the user to monitor the target, and which also may display information about the target (e.g., in an embodiment, as shown in the figures, the game statistics for the football player also may be shown), which allows a cycle of user requests and new images to be shown as the user navigates through what is seen on the MUVIA, e.g., as shown in FIG. 1-A.

Referring again to FIG. 1, FIGS. 1-F, 1-P, 1-Z, and 1-AJ depict a MUVIA implementation according to an embodiment. This embodiment may be colloquially known as "live street view" in which one or more MUVIA systems allow for a user to move through an area similarly to the well known Google-branded Maps (or Google-Street), except with the cameras working in real time. For example, in an embodiment, referring now to FIG. 1-F, a user device 5700 may include a target selection reception module 5710. Target selection reception module 5710 may be a component that allows the user to select a "target" from the image, that is, a point of interest from the image. For example, in the shown example, the MUVIA may be focused on a city, and the target may be an address, a building, a car, or a person in the city. As an example, a user may select a street address as a "target." This may be facilitated by a target presentation module, e.g., image selection presentation module 5712, which may present one or more images (e.g., which may be various versions of images from MUVIA, at different resolutions or not up-to-date) from which the user may select the target, e.g., the street address. In an embodiment, image selection presentation module 5712 may use static images that may or may not be sourced by the MUVIA system, and, in another embodiment, image selection presentation module 5712 may use current or cached views from the MUVIA system.

In an embodiment, image selection presentation module 5712 may include an audible target selection module 5714 which may be configured to allow the user to select a target using audible commands, without requiring physical interaction with a device.

Referring again to FIG. 1, e.g., FIG. 1-F, in an embodiment, user device 5700 may include selected target transmission module 5720. Selected target transmission module 5720 may be configured to take the target selected by the user, and transmit the selected target to the server 4000.

Referring now to FIG. 1-P, FIG. 1-P depicts a server 4000 of the MUVIA system according to embodiments. In an embodiment, server 4000 may include a selected target reception module 4310. Selected target reception module 4310 may receive the selected target from the user device 3700. In an embodiment, server 4000 may provide all or most of the data that facilitates the selection of the target, that is, the images and the interface, which may be provided, e.g., through a web portal.

Referring again to FIG. 1-P, in an embodiment, server 4000 may include a selected image pre-processing module 4320. Selected image pre-processing module 4320 may perform one or more tasks of pre-processing the image, some of which are described herein for exemplary purposes. For example, in an embodiment, selected image pre-processing module 4320 may include a resolution determination module 4322 which may be configured to determine the resolution for the image in order to show the target (and here, resolution is merely a stand-in for any facet of the image, e.g., color depth, size, shadow, pixilation, filter, etc.). In an embodiment, selected image pre-processing module 4320 may include a cached pixel fill-in module 4324. Cached pixel fill-in module 4324 may be configured to manage which portions of the requested image are recovered from a cache, and which are updated, in order to improve performance. For example, if a view of a street is requested, certain features of the street (e.g., buildings, trees, etc., may not need to be retrieved each time, but can be filled in with a cached version, or, in another embodiment, can be filled in by an earlier version. A check can be done to see if a red parked car is still in the same spot as it was in an hour ago; if so, that part of the image may not need to be updated. Using lower resolution/prior images stored in a memory 4215, as well as other image processing techniques, cached pixel fill-in module determines which portions of the image do not need to be retrieved, thus reducing bandwidth load on the connection between the array local processing module 3600 and the server 4000.

Referring again to FIG. 1-P, in an embodiment, selected image pre-processing module 4320 of server 4000 may include a static object obtaining module 4326, which may operate similarly to cached pixel fill-in module 4324. For example, as in the example shown in FIG. 1-B, static object obtaining module 4326 may obtain prior versions of static objects, e.g., buildings, trees, fixtures, landmarks, etc., which may save bandwidth load on the connection between the array local processing module 3600 and the server 4000.

Referring again to FIG. 1-P, in an embodiment, pixel information transmission to ISA module 4330 may transmit the request for pixels (e.g., an image, after the pre-processing) to the array local processing module 3600 (e.g., as shown in FIGS. 1-Z and 1-AI, with the downward extending dataflow arrow).

Referring now to FIGS. 1-Z and 1-AI, in an embodiment, an array local processing module 3600, that may be connected by a higher bandwidth connection to an image sensor array 3200, may be present.

Image sensor array 3200 may include one or more image sensors that may, in an embodiment, be statically pointed at a particular object or scene. Image sensor array 3200 may be a single image sensor, or more commonly, may be a group of individual image sensors 3201 that are combined to create a larger field of view. For example, in an embodiment, ten megapixel sensors may be used for each individual image sensor 3201. With twelve of these sensors, the effective field of view, loss-less zoom, and so forth may be increased substantially. These numbers are for example only, and any number of sensors and/or megapixel image sensor capacities may be used.

The use of many individual sensors may create a very large number of pixels captured for each exposure of the image sensor array 3200. Thus, these pixels are transmitted via a higher bandwidth communication 3605 to the array local storage and processing module 3600. In an embodiment, array local storage and processing module 3600 is integrated into the image sensor array. In another embodiment, the array local storage and processing module 3600 is separate from, but directly connected to (e.g., via a USB 3.0 cable) to the image sensor array 3200. It is noted that "higher bandwidth communication 3605" does not require a specific amount of bandwidth, but only that the bandwidth for this communication is relatively higher than the bandwidth communication from the array local processing module 3600 to the remote server, which may be, but is not required to be, located further away temporally.

It is noted that, because of the large number of pixels captured by image sensor array 3200, mechanical changes to the image sensor array are not generally required, although such mechanical changes are not excluded from these embodiments. For example, because the array has a very large field of view, with very high resolution, "pan" and "zoom" functions may be handled optically, rather than by mechanically changing the focal point of the lenses or by physically pointing the array at a different location. This may reduce the complexity required of the device, and also may improve the speed at which different views may be generated by the image sensor array 3200.

Referring again to FIG. 1-AJ and FIG. 1-Z, the image sensor array 3200 may capture an image that is received by image capturing module 3605. Image capturing module 3605 may take the captured image and compare it to a consolidated user request, e.g., which is provided by a consolidated user request reception module 3610. Consolidated user request reception module 3610 may receive the communication from server 4000 regarding which pixels of the image have been requested. Through use of the consolidated user request and the captured image, pixel selection module 3620 may select the pixels that have been specifically requested by the user, and mark those pixels for transmission back to the server.

After the pixels to be kept are identified, the other pixels that are not to be kept are removed, e.g., decimated at unused pixel decimation module 3630. In an embodiment, these pixels are simply discarded, e.g., not stored in a long-term memory, that is removed to a digital trash 3617. In another embodiment, some or all of these pixels are stored in a local memory, e.g., local memory 3615. From here, these pixels may be transmitted to various locations at off-peak times, may be kept for image processing by the array local processing module 3600, or may be subject to other manipulations or processing separate from the user requests. In an embodiment, unused pixel decimation module may include or communicate with a lower resolution module 3614, which may, in some embodiments, be used to transmit a lower-resolution version of more of the image (e.g., an entire scene, or more of the field of view surrounding the target) to the server 4000, so that the server 4000 may accurately determine which images are required to capture the target selected by the user.

Referring again to FIG. 1-AJ, the selected pixels then may be transmitted to the server 4000 using selected pixel transmission module 3640. Selected pixel transmission module 3640 may include any transmission equipment necessary, e.g., cellular radio, wireless adapter, and the like, depending on the format of communication. In an embodiment, only those pixels which have been requested are transmitted to the server via lower-bandwidth communication 3510. Similarly to lower-bandwidth communication 3515, the lower-bandwidth communication 3510 does not refer to a specific amount of bandwidth, just that the amount of bandwidth is relatively lower than higher-bandwidth communication 3505.

It is noted that more pixels than what are specifically requested by the user may be transmitted, in certain embodiments. For example, the array local processing module 3600 may send pixels that border the user's requested area, but are outside the user's requested area. In an embodiment, as will be discussed herein, those pixels may be sent at a different resolution or using a different kind of compression. In another embodiment, the additional pixels may merely be sent the same as the requested pixels. In still another embodiment, server 4000 may expand the user requested areas, so that array local processing module 3600 may send only the requested pixels, but the requested pixels cover more area than what the user originally requested. These additional pixels may be transmitted and "cached" by the server or local device, which may be used to decrease latency times, in a process that will be discussed more herein.

Referring now again to FIG. 1-P, in an embodiment, server 4000 may include image receiving from ISA module 4340. Image receiving from ISA module 4340 may receive the image data from the array local processing module 3600 (e.g., in the arrow coming "north" from FIG. 1-AJ via FIG. 1-Z). The image may include the pixels that were requested from the image sensor array 3200. In an embodiment, server 4000 also may include received image post-processing module 4350, which may, among other post-processing tasks, fill in objects and pixels into the image that were determined not to be needed by selected image pre-processing module 4320, as previously described. In an embodiment, server 4000 may include received image transmission to user device module 4360, which may be configured to transmit the requested image to the user device 5700. Requested image transmission to user device module 4360 may include components necessary to communicate with user device 5700 and may, in some embodiments, share components with one or more other modules of server 4000, e.g., a network interface, or a wireless antenna.

Referring now again to FIG. 1-F, user device 5700 may include a server image reception module 5730. Server image reception module 5730 may receive an image from sent by the server 4000, and user selection presenting module 5240, which may display the requested pixels to the user, e.g., by showing them on a screen of the device. In an embodiment, the display of the image may be carried out through the exemplary interface, which allows a cycle of user requests and new images to be shown as the user navigates through what is seen on the MUVIA, e.g., as shown in FIG. 1-F.

In an embodiment, as shown in FIGS. 1-F and 1-G, server image reception module 5730 may include an audio stream reception module 5732 and a video stream reception module 5734. In an embodiment, as discussed throughout this application, the MUVIA system may capture still images, video, and also sound, as well as other electromagnetic waves and other signals and data. In an embodiment, the audio signals and the video signals may be handled together, or they may be handled separately, as separate streams. Although not every module in the instant diagram separately shows audio streams and video streams, it is noted here that all implementations of MUVIA contemplate both audio and video coverage, as well as still image and other data collection.

Referring now to FIG. 1-G, which shows another portion of user device 5700, FIG. 1-G may include a display 5755 and a memory 5765, which may be used to facilitate presentation and/or storage of the received images.

FIGS. 1-H, 1-R, 1-AA, and 1-AB show an embodiment of a MUVIA implementation. For example, referring now to FIG. 1-H, FIG. 1-H shows an embodiment of a user device 5800. For exemplary purposes, the user device 5800 may be an augmented reality device that shows a user looking down a "street" at which the user is not actually present, e.g., a "virtual tourism" where the user may use their augmented reality device (e.g., googles, e.g., an Oculus Rift-type headgear device) which may be a wearable computer. It is noted that this embodiment is not limited to wearable computers or augmented reality, but as in all of the embodiments described in this disclosure, may be any device. The use of a wearable augmented/virtual reality device is merely used to for illustrative and exemplary purposes.

In an embodiment, user device 5800 may have a field of view 5810, as shown in FIG. 1-H. The field of view for the user 5810 may be illustrated in FIG. 1-H as follows. The most internal rectangle, shown by the dot hatching, represents the user's "field of view" as they look at their "virtual world." The second most internal rectangle, with the straight line hatching, represents the "nearest" objects to the user, that is, a range where the user is likely to "look" next, by turning their head or moving their eyes. In an embodiment, this area of the image may already be loaded on the device, e.g., through use of a particular codec, which will be discussed in more detail herein. The outermost rectangle, which is the image without hatching, represents further outside the user's viewpoint. This area, too, may already be loaded on the device. By loading areas where the user may eventually look, the system can reduce latency and make a user's motions, e.g., movement of head, eyes, and body, appear "natural" to the system.

Referring now to FIGS. 1-AA and 1-AB, these figures show an array local processing module 3700 that is connected to an image sensor array 3200 (e.g., as shown in FIG. 1-AK, and "viewing" a city as shown in FIG. 1-AJ). The image sensor array 3200 may operate as previously described in this document. In an embodiment, array local processing module 3700 may include a captured image receiving module 3710, which may receive the entire scene captured by the image sensor array 3200, through the higher-bandwidth communication channel 3505. As described previously in this application, these pixels may be "cropped" or "decimated" into the relevant portion of the captured image, as described by one or more of the user device 5800, the server 4000, and the processing done at the array local processing module 3700. This process may occur as previously described. The relevant pixels may be handled by relevant portion of captured image receiving module 3720.

Referring now to FIG. 1-AB, in an embodiment, the relevant pixels for the image that are processed by relevant portion of captured image receiving module 3720 may be encoded using a particular codec at relevant portion encoding module 3730. In an embodiment, the codec may be configured to encode the innermost rectangle, e.g., the portion that represents the current user's field of view, e.g., portion 3716, at a higher resolution, or a different compression, or a combination of both. The codec may be further configured to encode the second rectangle, e.g., with the vertical line hashing, e.g., portion 3714, at a different resolution and/or a different (e.g., a higher) compression. Similarly, the outermost portion of the image, e.g., the clear portion 3712, may again be coded at still another resolution and/or a different compression. In an embodiment, the codec itself handles the algorithm for encoding the image, and as such, in an embodiment, the codec may include information about user device 5800.

As shown in FIG. 1-AB, the encoded portion of the image, including portions 3716, 3714, and 3712, may be transmitted using encoded relevant portion transmitting module 3740. It is noted that "lower compression," "more compression," and "higher compression," are merely used as one example for the kind of processing done by the codec. For example, instead of lower compression, a different sampling algorithm or compacting algorithm may be used, or a lossier algorithm may be implemented for various parts of the encoded relevant portion.

Referring now to FIG. 1-R, FIG. 1-R depicts a server 4000 in a MUVIA system according to an embodiment. For example, as shown in FIG. 1-R, server 4000 may include, in addition to portions previously described, an encoded image receiving module 4410. Encoded image receiving module 4410 may receive the encoded image, encoded as previously described, from encoded relevant portion transmitting module 3740 of array local processing module 3700.

Referring again to FIG. 1-R, server 4000 may include an encoded image transmission controlling module 4420. Encoded image transmission controlling module 4420 may transmit portions of the image to the user device 5800. In an embodiment, at least partially depending on the bandwidth and the particulars of the user device, the server may send all of the encoded image to the user device, and let the user device decode the portions as needed, or may decode the image and send portions in piecemeal, or with a different encoding, depending on the needs of the user device, and the complexity that can be handled by the user device.

Referring again to FIG. 1-H, user device 5800 may include an encoded image transmission receiving module 5720, which may be configured to receive the image that is coded in a particular way, e.g., as will be disclosed in more detail herein. FIG. 1-H also may include an encoded image processing module 5830 that may handle the processing of the image, that is, encoding and decoding portions of the image, or other processing necessary to provide the image to the user.

Referring now to FIG. 1-AL, FIG. 1-AL shows an implementation of an Application Programming Interface (API) for the various MUVIA components. Specifically, image sensor array API 7800 may include, among other elements, a programming specification 7810, that may include, for example, libraries, classes, specifications, templates, or other coding elements that generally make up an API, and an access authentication module 7820 that governs API access to the various image sensor arrays. The API allows third party developers to access the workings of the image sensor array and the array local processing module 3700, so that the third party developers can write applications for the array local processing module 3700, as well as determine which data captured by the image sensor array 3200 (which often may be multiple gigabytes or more of data per second) should be kept or stored or transmitted. In an embodiment, API access to certain functions may be limited. For example, a tiered system may allow a certain number of API calls to the MUVIA data per second, per minute, per hour, or per day. In an embodiment, a third party might pay fees or perform a registration that would allow more or less access to the MUVIA data. In an embodiment, the third party could host their application on a separate web site, and let that web site access the image sensor array 3200 and/or the array local processing module 3700 directly.

Referring again to FIG. 1, FIGS. 1-I, 1-J, 1-S, 1-T, 1-AC, 1-AD, 1-AM, and 1-AN, in an embodiment, show a MUVIA implementation that allows insertion of advertising (or other context-sensitive material) into the images displayed to the user.

Referring again to FIG. 1-I, in an embodiment, user device 5900 may include a user selection accepting module 5910. User selection accepting module 5910 may be configured to receive user input about what the user wants to see. For example, as shown in FIG. 1-I, the user selection accepting module 5910 may show an image from image sensor array 3200, and the user may "pan" and "zoom" the image using any known interface, including, but not limited to, keyboard, mouse, touch, haptic, augmented reality interface, voice command, nonverbal motion commands (e.g., as part of a video game system interface, e.g., the Microsoft Kinect). It is noted, and as will be discussed in more detail herein, the camera itself is not "zooming" or "panning," because the camera does not move. What is happening is that different pixels that are captured by the image sensor array 3200 are kept by the image sensor array 3200 and transmitted to the server 4000.

In an embodiment, the "user selection" facilitated by the user selection accepting module 5910 may not involve a user at all. For example, in an embodiment, e.g., in a security embodiment, the user selection may be handled completely by machine, and may include "select any portion of the image with movement," or "select any portion of the image in which a person is recognized," or "select any portion of the image in which a particular person, e.g., a person on the FBI most wanted list" is recognized.

Referring again to FIG. 1-I, in an embodiment, user device 5900 may include a user selection transmitting module 5920. The user selection transmitting module 5920 may take the user selection from user selection transmitting module 5920, and transmit the selection to the server 4000. The transmission may include some pre-processing, for example, the user device 5900 may determine the size and parameters of the image prior to sending the request to the server 4000, or that processing may be handled by the server 4000. Following the thick-line arrow leftward from user selection transmitting module 5920 through to FIG. 1-K, the transmission goes to server 4000, as will be discussed herein. It is noted that the transmission to the server 4000 may also include data about the user device, for example, the screen resolution, the window size, the type of device, an identity of the user, a level of service the user has paid for (in embodiments in which such services are prioritized by the camera/server), other capabilities of the device, e.g., framerate, and the like.

Referring again to FIG. 1-I, FIG. 1-I also includes a selected image receiving module 5930 and a user selection presenting module 5940, which will be discussed in more detail herein, with respect to the dataflow of this embodiment.

Referring now to FIG. 1-T (graphically represented as "down" and "to the right" of FIG. 1-I), in an embodiment, a server 4000 may include a selected image reception module 4510. In an embodiment, selected image reception module 4510 of server 4000 may receive the selected target from the user device 5900. The selected target data may take various formats, e.g., it may be image data, it may be metadata that identifies the selected target, it may be some other designation, e.g., an ID number, a tracking number, or a piece of information, like a license plate or a social security number. The selected target data may be an address or a physical description, or any other instantiation of data that can be used to identify something.

Referring again to FIG. 1-T, in an embodiment, server 4000 may include selected image pre-processing module 4520. Selected image pre-processing module 4520 may perform one or more tasks of pre-processing the image, some of which have been previously described with respect to other embodiments. In an embodiment, server 4000 also may include pixel information transmission to ISA module 4330 configured to transmit the image request data to the image search array 3200, as has been previously described.

Referring now to FIGS. 1-AD and 1-AN, array local processing module 3700 may be connected to an image sensor array 3200 through a higher-bandwidth communication link 3505, e.g., a USB or PCI port. In an embodiment, image sensor array 3200 may include a request reception module 3710. Request reception module 3710 may receive the request for an image from the server 4000, as previously described. Request reception module 3710 may transmit the data to a pixel selection module 3720, which may receive the pixels captured from image sensor array 3200, and select the ones that are to be kept. That is, in an embodiment, through use of the (sometimes consolidated) user requests and the captured image, pixel selection module 3720 may select the pixels that have been specifically requested by the user, and mark those pixels for transmission back to the server.

After the pixels to be kept are identified, the other pixels that are not to be kept are removed, e.g., decimated at unused pixel decimation module 3730. In an embodiment, these pixels are simply discarded, e.g., not stored in a long-term memory, that is removed to a digital trash 3717. In another embodiment, some or all of these pixels are stored in a local memory, e.g., local memory 3715. From here, these pixels may be transmitted to various locations at off-peak times, may be kept for image processing by the array local processing module 3700, or may be subject to other manipulations or processing separate from the user requests, as described in previous embodiments. In an embodiment, unused pixel decimation module 3730 may be used to transmit a lower-resolution version of more of the image (e.g., an entire scene, or more of the field of view surrounding the target) to the server 4000, so that the server 4000 may accurately determine which images are required to fulfill the request of the user.

Referring again to FIG. 1-AN, the selected pixels then may be transmitted to the server 4000 using selected pixel transmission module 3740. Selected pixel transmission module 3740 may include any transmission equipment necessary, e.g., cellular radio, wireless adapter, and the like, depending on the format of communication. In an embodiment, only those pixels which have been requested are transmitted to the server via lower-bandwidth communication 3710. Similarly to lower-bandwidth communication 3715, the lower-bandwidth communication 3710 does not refer to a specific amount of bandwidth, just that the amount of bandwidth is relatively lower than higher-bandwidth communication 3505.

It is noted that more pixels than what are specifically requested by the user may be transmitted, in certain embodiments. For example, the array local processing module 3700 may send pixels that border the user's requested area, but are outside the user's requested area. In an embodiment, as will be discussed herein, those pixels may be sent at a different resolution or using a different kind of compression. In another embodiment, the additional pixels may merely be sent the same as the requested pixels. In still another embodiment, server 4000 may expand the user requested areas, so that array local processing module 3700 may send only the requested pixels, but the requested pixels cover more area than what the user originally requested. These additional pixels may be transmitted and "cached" by the server or local device, which may be used to decrease latency times, in a process that will be discussed more herein.

Referring now again to FIG. 1-T, in an embodiment, server 4000 may include received image post-processing module 4550. Received image post-processing module 4550 may receive the image data from the array local processing module 3700 (e.g., in the arrow coming "north" from FIG. 1-AN via FIG. 1-AD). The image may include the pixels that were requested from the image sensor array 3200.

In an embodiment, server 4000 also may include advertisement insertion module 4560. Advertisement insertion module 4560 may insert an advertisement into the received image. The advertisement may be based one or more of the contents of the image, a characteristic of a user or the user device, or a setting of the advertisement server component 7700 (see, e.g., FIG. 1-AC, as will be discussed in more detail herein). The advertisement insertion module 4560 may place the advertisement into the image using any known image combination techniques, or, in another embodiment, the advertisement image may be in a separate layer, overlay, or any other data structure. In an embodiment, advertisement insertion module 4560 may include context-based advertisement insertion module 4562, which may be configured to add advertisements that are based on the context of the image. For example, if the image is a live street view of a department store, the context of the image may show advertisements related to products sold by that department store, e.g., clothing, cosmetics, or power tools.

Referring again to FIG. 1-T, server 4000 may include a received image with advertisement transmission to user device module 4570 configured to transmit the image 5900. Received image with advertisement transmission to user device module 4570 may include components necessary to communicate with user device 5900 and may, in some embodiments, share components with one or more other modules of server 4000, e.g., a network interface, or a wireless antenna.

Referring again to FIG. 1-I, user device 5900 may include a selected image receiving module 5930, which may receive the pixels that were sent by the server 4000, and user selection presenting module 5940, which may display the requested pixels to the user, including the advertisement, e.g., by showing them on a screen of the device. In an embodiment, the display of the image may be carried out through the exemplary interface, which allows a cycle of user requests and new images to be shown as the user navigates through what is seen on the MUVIA, e.g., as shown in FIG. 1-I.

Referring now to FIG. 1-AC, FIG. 1-AC shows an advertisement server component 7700 configured to deliver advertisements to the server 4000 for insertion into the images prior to delivery to the user. In an embodiment, advertisement server component 7700 may be integrated with server 4000. In another embodiment, advertisement server component may be separate from server 4000 and may communicate with server 4000. In yet another embodiment, rather than interacting with server 4000, advertisement server component 7700 may interact directly with the user device 5900, and insert the advertisement into the image after the image has been received, or, in another embodiment, cause the user device to display the advertisement concurrently with the image (e.g., overlapping or adjacent to). In such embodiments, some of the described modules of server 4000 may be incorporated into user device 5900, but the functionality of those modules would operate similarly to as previously described.

Referring again to FIG. 1-AC, in an embodiment, advertisement server component 7700 may include a user data collection module 7705. User data collection module 7705 may collect data from user device 5900, and use that data to drive placement of advertisements (e.g., based on a user's browser history, e.g., to sports sites, and the like).

Referring again to FIG. 1-AC, in an embodiment, advertisement server component 7700 may include advertisement database 7715 which includes advertisements that are ready to be inserted into images. In an embodiment, these advertisements may be created on the fly.

Referring again to FIG. 1-AC, in an embodiment, advertisement server component 7700 may include an advertisement request reception module 7710 which receives a request to add an advertisement into the drawing (the receipt of the request is not shown to ease understanding of the drawings). In an embodiment, advertisement server component 7700 may include advertisement selection module 7720, which may include an image analysis module 7722 configured to analyze the image to determine the best context-based advertisement to place into the image. In an embodiment, that decision may be made by the server 4000, or partly at the server 4000 and partly at the advertisement server component 7700 (e.g., the advertisement server component may have a set of advertisements from which a particular one may be chosen). In an embodiment, various third parties may compensate the operators of server component 7700, server 4000, or any other component of the system, in order to receive preferential treatment.

Referring again to FIG. 1-AC, in an embodiment, advertisement server component 7700 may include a selected advertisement transmission module 7730, which may transmit the selected advertisement (or a set of selected advertisements) to the server 4000. In an embodiment, selected advertisement transmission module 7730 may send the complete image with the advertisement overlaid, e.g., in an implementation in which the advertisement server component 7700 also handles the placement of the advertisement. In an embodiment in which advertisement server component 7700 is integrated with server 4000, this module may be an internal transmission module, as may all such transmission/reception modules.

Exemplary Environment 200

Referring now to FIG. 2A, FIG. 2A illustrates an example environment 200 in which methods, systems, circuitry, articles of manufacture, and computer program products and architecture, in accordance with various embodiments, may be implemented by at least one requestor device 250. Image device 220 may include a number of individual sensors that capture data. Although commonly referred to throughout this application as "image data," this is merely shorthand for data that can be collected by the sensors. Other data, including video data, audio data, electromagnetic spectrum data (e g, infrared, ultraviolet, radio, microwave data), thermal data, and the like, may be collected by the sensors.

Referring again to FIG. 2A, in an embodiment, image device 220 may operate in an environment 200. Specifically, in an embodiment, image device 220 may capture a scene 215. The scene 215 may be captured by a number of sensors 243. Sensors 243 may be grouped in an array, which in this context means they may be grouped in any pattern, on any plane, but have a fixed position relative to one another. Sensors 243 may capture the image in parts, which may be stitched back together by processor 222. There may be overlap in the images captured by sensors 243 of scene 215, which may be removed.

Upon capture of the scene 215 in image device 220, in processes and systems that will be described in more detail herein, the requested pixels are selected.

Specifically, pixels that have been identified by a remote user, by a server, by the local device, by another device, by a program written by an outside user with an API, by a component or other hardware or software in communication with the image device 220, and the like, are transmitted to a remote location via a communications network 240. The pixels that are to be transmitted may be illustrated in FIG. 2A as selected portion 255, however, this is a simplified expression meant for illustrative purposes only.

Referring again to FIG. 2A, in an embodiment, server device 230 may be any device or group of devices that is connected to a communication network. Although in some examples, server device 230 is distant from image device 220, that is not required. Server device 230 may be "remote" from image device 220, which may be that they are separate components, but does not necessarily imply a specific distance. The communications network may be a local transmission component, e.g., a PCI bus. Server device 230 may include a request handling component 232 that handles requests for images from user devices, e.g., requestor device 250 and 250B. Request handling component 232 also may handle other remote computers and/or users that want to take active control of the image device, e.g., through an API, or through more direct control.

Server device 230 also may include an image device management module, which may perform some of the processing to determine which of the captured pixels of image device 220 are kept. For example, image device management component 234 may do some pattern recognition, e.g., to recognize objects of interest in the scene, e.g., a particular football player, as shown in the example of FIG. 2A. In other embodiments, this processing may be handled at the image device 220 or at the requestor device 250. In an embodiment, server device 230 limits a size of the selected portion by a screen resolution of the requesting user device.

Server device 230 then may transmit the requested portions to the requestor devices, e.g., requestor device 250 and requestor device 250B. In another embodiment, the user device or devices may directly communicate with image device 220, cutting out server device 230 from the system.

In an embodiment, requestor device 250 and 250B are shown, however, user devices may be any electronic device or combination of devices, which may be located together or spread across multiple devices and/or locations. Requestor device 250 may be a server device, or may be a user-level device, e.g., including, but not limited to, a cellular phone, a network phone, a smartphone, a tablet, a music player, a walkie-talkie, a radio, an augmented reality device (e.g., augmented reality glasses and/or headphones), wearable electronics, e.g., watches, belts, earphones, or "smart" clothing, earphones, headphones, audio/visual equipment, media player, television, projection screen, flat screen, monitor, clock, appliance (e.g., microwave, convection oven, stove, refrigerator, freezer), a navigation system (e.g., a Global Positioning System ("GPS") system), a medical alert device, a remote control, a peripheral, an electronic safe, an electronic lock, an electronic security system, a video camera, a personal video recorder, a personal audio recorder, and the like. Requestor device 250 may include a device interface which may allow the requestor device 250 to receive input and to output data to the client in sensory (e.g., visual or any other sense) form, and/or allow the requestor device 250 to receive data from the client, e.g., through touch, typing, or moving a pointing device (e.g., a mouse). Requestor device 250 may include a viewfinder or a viewport that allows a user to "look" through the lens of image device 220, either optically or digitally, regardless of whether the user device 250 is spatially close to the image device 220 or whether they are directly connected (e.g., requestor device 250 may have a sole connection to image device 220 solely by server device 230.

Referring again to FIG. 2A, in various embodiments, the communication network 240 may include one or more of a local area network (LAN), a wide area network (WAN), a metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, and so forth. The communication networks 240 may be wired, wireless, or a combination of wired and wireless networks. It is noted that "communication network" as it is used in this application refers to one or more communication networks, which may or may not interact with each other.

Referring now to FIG. 2B, FIG. 2B shows a more detailed version of requestor device 250, according to an embodiment. The requestor device 250 may include a device memory 245. In an embodiment, device memory 245 may include memory, random access memory ("RAM"), read only memory ("ROM"), flash memory, hard drives, disk-based media, disc-based media, magnetic storage, optical storage, volatile memory, nonvolatile memory, and any combination thereof. In an embodiment, device memory 245 may be separated from the device, e.g., available on a different device on a network, or over the air. For example, in a networked system, there may be more than one requestor device 250 whose device memories 245 may be located at a central server that may be a few feet away or located across an ocean. In an embodiment, device memory 245 may include of one or more of one or more mass storage devices, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In an embodiment, memory 245 may be located at a single network site. In an embodiment, memory 245 may be located at multiple network sites, including sites that are distant from each other. In an embodiment, device memory 245 may include one or more of cached images 245A and previously retained image data 245B, as will be discussed in more detail further herein.

Referring again to FIG. 2B, in an embodiment, requestor device 250 may include an optional viewport 247, which may be used to view images captured by image device 220. This optional viewport 247 may be physical (e.g., glass) or electrical (e.g., LCD screen), or may be at a distance from one or both of server device 230 and image device 220.

Referring again to FIG. 2B, FIG. 2B shows a more detailed description of requestor device 250. In an embodiment, requestor device 250 may include a processor 222. Processor 222 may include one or more microprocessors, Central Processing Units ("CPU"), a Graphics Processing Units ("GPU"), Physics Processing Units, Digital Signal Processors, Network Processors, Floating Point Processors, and the like. In an embodiment, processor 222 may be a server. In an embodiment, processor 222 may be a distributed-core processor. Although processor 222 is as a single processor that is part of a single device 220, processor 222 may be multiple processors distributed over one or many devices 220, which may or may not be configured to operate together.

Processor 222 is illustrated as being configured to execute computer readable instructions in order to execute one or more operations described above, and as illustrated in FIG. 10, FIGS. 11A-11F, FIGS. 12A-12G, FIGS. 13A-13C, and FIGS. 14A-14C. In an embodiment, processor 222 is designed to be configured to operate as processing module 251, which may include one or more of an input of a request for particular image data accepting module 252, wherein the particular image data is part of a scene that is larger than a particular image associated with the particular image data, an inputted request for the particular image data transmitting module 254 configured to transmit the request for the particular image data to an image sensor array that includes more than one image sensor and that is configured to capture the scene and to retain a subset of the scene that includes the request for the particular image data of the scene, a particular image data from the image sensor array exclusive receiving module 256 configured to receive only the particular image data from the image sensor array, wherein the particular image represents a subset of the scene and wherein a size characteristic of the particular image data is at least partially based on a feature of a requestor, and a received particular image data presenting module 258 configured to present the received particular image data to the requestor.

Exemplary Environment 300A

Referring now to FIG. 3A, FIG. 3A shows an exemplary embodiment of an image device, e.g., image device 220A operating in an environment 300A. In an embodiment, image device 220A may include an array 310 of image sensors 312 as shown in FIG. 3. The array of image sensors 310 in this image is shown in a rectangular grid, however this is merely exemplary to show that image sensors 312 may be arranged in any format. In an embodiment, each image sensor 312 may capture a portion of scene 315, which portions are then processed by processor 350. Although processor 350 is shown as local to image device 220A, it may be remote to image device 220A, with a sufficiently high-bandwidth connection to receive all of the data from the array of image sensors 310 (e.g., multiple USB 3.0 lines). In an embodiment, the selected portions from the scene (e.g., the portions shown in the shaded box, e.g., selected portion 315), may be transmitted to a remote device 330, which may be a user device or a server device, as previously described. In an embodiment, the pixels that are not transmitted to remote device 330 may be stored in a local memory 340 or discarded.

Exemplary Environment 300B

Referring now to FIG. 3B, FIG. 3B shows an exemplary embodiment of an image device, e.g., image device 220B operating in an environment 300B. In an embodiment, image device 220B may include an image sensor array 320B, e.g., an array of image sensors, which, in this example, are arranged around a polygon to increase the field of view that can be captured, that is, they can capture scene 315B, illustrated in FIG. 3B as a natural landmark that can be viewed in a virtual tourism setting. Processor 322B receives the scene 315B and selects the pixels from the scene 315B that have been requested by a user, e.g., requested portions 317B. Requested portions 317B may include an overlapping area 324B that is only transmitted once. In an embodiment, the requested portions 317B may be transmitted to a remote location via communications network 240.

Exemplary Environment 300C

Referring now to FIG. 3C, FIG. 3C shows an exemplary embodiment of an image device, e.g., image device 220C operating in an environment 300C. In an embodiment, image device 220C may capture a scene, of which a part of the scene, e.g., scene portion 315C, as previously described in other embodiments (e.g., some parts of image device 220C are omitted for simplicity of drawing). In an embodiment, e.g., scene portion 315C may show a street-level view of a busy road, e.g., for a virtual tourism or virtual reality simulator. In an embodiment, different portions of the scene portion 315C may be transmitted at different resolutions or at different times. For example, in an embodiment, a central part of the scene portion 315C, e.g., portion 316, which may correspond to what a user's eyes would see, is transmitted at a first resolution, or "full" resolution relative to what the user's device can handle. In an embodiment, an outer border outside portion 316, e.g., portion 314, may be transmitted at a second resolution, which may be lower, e.g., lower than the first resolution. In another embodiment, a further outside portion, e.g., portion 312, may be discarded, transmitted at a still lower rate, or transmitted asynchronously.

Exemplary Environment 400A

Referring now to FIG. 4A, FIG. 4A shows an exemplary embodiment of a server device, e.g., server device 430A. In an embodiment, an image device, e.g., image device 420A may capture a scene 415. Scene 415 may be stored in local memory 440. The portions of scene 415 that are requested by the server device 430A may be transmitted (e.g., through requested image transfer 465) to requested pixel reception module 432 of server device 430A. In an embodiment, the requested pixels transmitted to requested pixel reception module 432 may correspond to images that were requested by various users and/or devices (not shown) in communication with server device 430A.

Referring again to FIG. 4A, in an embodiment, pixels not transmitted from local memory 440 of image device 420A may be stored in untransmitted pixel temporary storage 440B. These untransmitted pixels may be stored and transmitted to the server device 430A at a later time, e.g., an off-peak time for requests for images of scene 415. For example, in an embodiment, the pixels stored in untransmitted pixel temporary storage 440B may be transmitted to the unrequested pixel reception module 434 of server device 430A at night, or when other users are disconnected from the system, or when the available bandwidth to transfer pixels between image device 420A and server device 430A reaches a certain threshold value.

In an embodiment, server device 430A may analyze the pixels received by unrequested pixel reception module 434, for example, to provide a repository of static images from the scene 415 that do not need to be transmitted from the image device 420A each time certain portions of scene 415 are requested.

Exemplary Environment 400B

Referring now to FIG. 4B, FIG. 4A shows an exemplary embodiment of a server device, e.g., server device 430B. In an embodiment, an image device, e.g., image device 420B may capture a scene 415B. Scene 415B may be stored in local memory 440B. In an embodiment, image device 420B may capture the same scene 415B multiple times. In an embodiment, scene 415B may include an unchanged area 416A, which is a portion of the image that has not changed since the last time the scene 415B was captured by the image device 420B. In an embodiment, scene 415B also may include a changed area 416B, which may be a portion of the image that has changed since the last time the scene 415B was captured by the image device 420B. Although changed area 416B is illustrated as polygonal and contiguous in FIG. 4B, this is merely for illustrative purposes, and changed area 416B may be, in some embodiments, nonpolygonal and/or noncontiguous.

In an embodiment, image device 420B, upon capturing scene 415B, may use an image previously stored in local memory 440B to compare the previous image, e.g., previous image 441B, to the current image, e.g., current image 442B, and may determine which areas of the scene 415B have been changed. The changed areas may be transmitted to server device 430B, e.g., to changed area reception module 432B. This may occur through a changed area transmission 465, as indicated in FIG. 4B.

Referring again to FIG. 4B, in an embodiment, requestor device 450B receives the changed area at changed area reception module 432B. Requestor device 450B also may include an unchanged area addition module 434B, which adds the unchanged areas that were previously stored in a memory of server device 430B or requestor device 450B (not shown) from a previous transmission from image device 420B.

Exemplary Environment 500A

Referring now to FIG. 5A, FIG. 5A shows an exemplary embodiment of a server device, e.g., server device 530A. In an embodiment, an image device 520A may capture a scene 515 through use of an image sensor array 530, as previously described. The image may be temporarily stored in a local memory 540 (as pictured), or may be partially or wholly stored in a local memory before transmission to a server device 530A. In an embodiment, server device 530A may include an image data reception module 532A. Image data reception module 532A may receive the image from image device 520A. In an embodiment, server device 530A may include data addition module 534A, which may add additional data to the received image data. In an embodiment, the additional data may be visible or invisible, e.g., pixel data or metadata, for example. In an embodiment, the additional data may be advertising data. In an embodiment, the additional data may be context-dependent upon the image data, for example, if the image data is of a football player, the additional data may be statistics about that player, or an advertisement for an online shop that sells that player's jersey.

In an embodiment, the additional data may be stored in a memory of server device 530A (not shown). In another embodiment, the additional data may be retrieved from an advertising server or another data server. In an embodiment, the additional data may be tailored to one or more characteristics of the user or the user device, e.g., the user may have a setting that labels each player displayed on the screen with that player's last name. Referring again to FIG. 5A, in an embodiment, server device 530A may include a modified data transmission module 536A, which may receive the modified data from data addition module 534A, and transmit the modified data to a user device, e.g., a user device that requested the image data, e.g., user device 550A. to the server device 430A at a later time, e.g., an off-peak time for requests for images of scene 415. For example, in an embodiment, the pixels stored in untransmitted pixel temporary storage 440B may be transmitted to the unrequested pixel reception module 434 of server device 430A at night, or when other users are disconnected from the system, or when the available bandwidth to transfer pixels between image device 420A and server device 430A reaches a certain threshold value.

In an embodiment, server device 430A may analyze the pixels received by unrequested pixel reception module 434, for example, to provide a repository of static images from the scene 415 that do not need to be transmitted from the image device 420A each time certain portions of scene 415 are requested.

Exemplary Environment 500B

Referring now to FIG. 5B, FIG. 5B shows an exemplary embodiment of a server device, e.g., server device 530B. In an embodiment, multiple user devices, e.g., user device 502A, user device 502B, and user device 502C, each may send a request for image data from a scene, e.g., scene 515B.

Each user device may send a request to a server device, e.g., server device 530B. Server device 530B may consolidate the requests, which may be for various resolutions, shapes, sizes, and other features, into a single combined request 570. Overlapping portions of the request, e.g., as shown in overlapping area 572, may be combined.

In an embodiment, server device 530B transmits the combined request 570 to the image device 520B. In an embodiment, image device 520B uses the combined request 570 to designate selected pixels 574, which then may be transmitted back to the server device 530B, where the process of combining the requests may be reversed, and each user device 502A, 502B, and 502C may receive the requested image. This process will be discussed in more detail further herein.

Exemplary Environment 500C

Referring now to FIG. 5C, FIG. 5C shows an exemplary embodiment of a requestor device, e.g., requestor device 550C. In an embodiment, requestor device 550C receives a particular image 580C, e.g., from a server device (not pictured) or an image sensor array (not pictured). The requestor device 550C has previously requested the received particular image 580C which is larger than the field of view 581C, e.g., the area that the user can currently view. The particular image 580C also includes image data that is the anticipated next field of view 582C. The anticipated next field of view 582C may be a portion of the image that the requestor device 550C may anticipate will be requested next. For example, in an embodiment in which requestor device 550C is a virtual reality helmet, the user's head may be turning in that direction. In another example, some characteristic of the image, e.g., relation to the current field of view, may cause the requestor device 550C to select that portion of the scene as the anticipated next field of view 582C. For example, if it is a football game, and the user's designated favorite player has just walked onto the field, the requestor device 550C may detect that occurrence and flag those pixels as the anticipated next field of view 582C. Although the field of view 581C and the anticipated next field of view 582C are shown as contiguous in FIG. 5C, this is not necessary or required.

Referring again to FIG. 5C, FIG. 5C shows that, in an embodiment, the received particular image 580C also may include a border field of view 583C. The border field of view 583C may be the parts of the image that border the field of view 581C, and thus they may be cached for quick retrieval. In an embodiment, the requestor device 550C is configured to present the portions of the received particular image that are in the field of view 581C, and to cache one or more portions of the border field of view 583C and/or anticipated field of view 581C. In this manner, the requestor device 550C may supply requested particular images to the requestor without waiting on transmissions from a remote server or an image sensor array. In an embodiment, one or more of the anticipated next field of view 582C and the border of field of view 583C are stored at a lower resolution and/or displayed and/or received at a lower resolution until higher-resolution images can be obtained from a remote server or from the image sensor array.

Exemplary Environment 500D

Referring now to FIG. 5D, FIG. 5D shows a requestor device 550D according to various embodiments. In an embodiment, requestor device 550D receives a request for a particular image from a requestor (not shown). The initial request for the particular image 592 of the scene portion 515D is shown in FIG. 5D. The requestor device 550D then may expand the request to include one or more of the expanded request 594 and the further expanded request 596, which may border the initially-requested particular image 592. In an embodiment, the request for the particular image 592 may be at a first resolution, the expanded request 594 may be at a second resolution, which may be less than the first, and the further expanded request 596, if present, may be at a third resolution, which may be less than or equal to the second resolution. It is noted that these resolutions may mirror the resolution captured in FIG. 3C, but this is merely for illustrative/exemplary purposes and is not required.

Exemplary Embodiments of the Various Modules of Portions of Processor 251

FIGS. 6-9 illustrate exemplary embodiments of the various modules that form portions of processor 250. In an embodiment, the modules represent hardware, either that is hard-coded, e.g., as in an application-specific integrated circuit ("ASIC") or that is physically reconfigured through gate activation described by computer instructions, e.g., as in a central processing unit.

Referring now to FIG. 6, FIG. 6 illustrates an exemplary implementation of the input of a request for particular image data accepting module 252. As illustrated in FIG. 6, the input of a request for particular image data accepting module may include one or more sub-logic modules in various alternative implementations and embodiments. For example, as shown in FIG. 6, e.g., FIG. 6A, in an embodiment, module 252 may include one or more of input of a request for particular image data accepting module, wherein the particular image data is part of a scene that is larger than a particular image associated with the particular image data 602, input of a request for particular image data accepting module configured to accept input from an automated component for the request for particular image data 604, and input of a request from an image object tracking algorithm for particular image data accepting module, wherein the particular image data is part of a scene that is larger than a particular image associated with the particular image data and the requested particular image data includes a tracked image object present in the scene 606. In an embodiment, module 606 may include one or more of image object tracking algorithm for particular image data accepting through a requestor device interface module, wherein the particular image data is part of a scene that is larger than a particular image associated with the particular image data and the requested particular image data includes a tracked image object present in the scene 608 and image object tracking algorithm for particular image data accepting through an interface of an Internet-enabled television device interface module, wherein the particular image data is part of a scene that is larger than a particular image associated with the particular image data and the requested particular image data includes a tracked image object that is a football player present in the scene that is a football field 610.

Referring again to FIG. 6, e.g., FIG. 6B, as described above, in an embodiment, module 252 may include input of a request for particular image data accepting through a requestor device interface module, wherein the particular image data is part of a scene that is larger than a particular image associated with the particular image data 612. In an embodiment, module 612 may include input of a request for particular image data accepting through a requestor device interface module, wherein the requestor device interface is configured to display at least a portion of the scene 614. In an embodiment, module 614 may include one or more of input of a request for particular image data accepting through a requestor device interface module, wherein the requestor device interface is configured to display at least a portion of the scene in a viewfinder 616, input of a request for particular image data that is at least partially based on a view of the scene accepting through a requestor device interface module, wherein the requestor device interface is configured to display at least a portion of the scene 618, and input of a request for particular image data accepting through a specific requestor device interface module 620.

Referring again to FIG. 6, e.g., FIG. 6C, in an embodiment, module 252 may include one or more of input of the request for particular image data that is part of the scene that contains more pixels than the particular image associated with the particular image data accepting module 622, input of the request for particular image data that is part of the scene is a larger spatial area than the particular image associated with the particular image data accepting module 624, input of the request for particular image data that is part of the scene that contains more data than the particular image associated with the particular image data accepting module 626, and input of a request for particular image data accepting module, wherein the particular image data is part of a scene that is a representation of the image data collected by the array of more than one image sensor 628. In an embodiment, module 628 may include one or more of input of a request for particular image data accepting module, wherein the particular image data is part of a scene that is a sampling of the image data collected by the array of more than one image sensor 630, input of a request for particular image data accepting module, wherein the particular image data is part of a scene that is a subset of the image data collected by the array of more than one image sensor 632, and input of a request for particular image data accepting module, wherein the particular image data is part of a scene that is a lower resolution expression of the image data collected by the array of more than one image sensor 634.

Referring again to FIG. 6, e.g., FIG. 6D, in an embodiment, module 252 may include one or more of input of a request for particular image data accepting module, wherein the particular image data is part of a scene that is an animal oasis 636, input of a request for particular image data accepting module, wherein the particular image data is part of a scene that is a street view of an area 638, input of a request for particular image data accepting module, wherein the particular image data is part of a scene that is a tourist destination available for virtual tourism 640, input of a request for particular image data that is a portion of the scene accepting module, wherein the particular image data is part of a scene that is an interior of a commercial retail property 642, and input of a request for particular image data that is a portion of the scene accepting module 644. In an embodiment, module 644 may include one or more of input of a request for particular image data that includes a particular football player that is a portion of the scene that is a football field accepting module 646 and input of a request for particular image data that includes a license plate of a vehicle that is a portion of the scene that is a representation of a highway bridge accepting module 648.

Referring again to FIG. 6, e.g., FIG. 6E, in an embodiment, module 252 may include one or more of input of a request for particular image video data accepting module, wherein the particular image video data is part of the scene that is larger than at least the particular image associated with the particular image video data 650, input of a request for particular image audio data accepting module, wherein the particular image audio data is part of the scene that is larger than at least the particular image associated with the particular image audio data 652, and input of a request for particular image data accepting through an audio interface module, wherein the particular image data is part of the scene that is larger than the particular image associated with the particular image data 654. In an embodiment, module 654 may include input of a request for particular image data accepting through a microphone audio interface module, wherein the particular image data is part of the scene that is larger than the particular image associated with the particular image data 656.

Referring again to FIG. 6, e.g., FIG. 6F, in an embodiment, module 252 may include input of a request for particular image data accepting from the requestor module 658. In an embodiment, module 658 may include one or more of input of a request for particular image data accepting from the requestor module, wherein the requestor is a client operating a device 660 and input of a request for particular image data accepting from a requestor device module, wherein the requestor is a device 664. In an embodiment, module 660 may include input of a request for particular image data accepting from the requestor module, wherein the requestor is a user operating a smart television with a remote control 662. In an embodiment, module 664 may include one or more of input of a request for particular image data accepting from a requestor device component module, wherein the requestor is a component of a device 666, input of a request for particular image data accepting from a requestor device component module, wherein the requestor a device configured to carry out a request subroutine 668, and input of a request for particular image data accepting at the requestor device module, wherein the requestor is the requestor device that is executing a separate subroutine 670.

Referring now to FIG. 7, FIG. 7 illustrates an exemplary implementation of inputted request for the particular image data transmitting module 254. As illustrated in FIG. 7, the inputted request for the particular image data transmitting module 254 may include one or more sub-logic modules in various alternative implementations and embodiments. For example, as shown in FIG. 7, e.g., FIG. 7A, in an embodiment, module 254 may include one or more of request for particular image data transmitting to an image sensor array module configured to transmit the request to the image sensor array that includes multiple connected image sensors and that is configured to capture the scene and retain the subset of the scene that includes the request for the particular image of the scene 702, request for particular image data transmitting to the image sensor array that includes two inline image sensors angled toward each other module configured to transmit the request to the image sensor array that includes more than one image sensor and that is configured to capture the scene that is larger than the requested particular image data 704, request for particular image data transmitting to the image sensor array that includes a pattern of image sensors arranged in a grid module configured to transmit the request to the image sensor array that includes more than one image sensor and that is configured to capture the scene that is larger than the requested particular image data 706, and request for particular image data transmitting to the image sensor array that includes a pattern of image sensors arranged in a line module configured to transmit the request to the image sensor array that has a field of view greater than one hundred twenty degrees and that is configured to capture the scene that is larger than the requested particular image data 708.

Referring again to FIG. 7, e.g., FIG. 7B, in an embodiment, module 254 may include request for particular image data transmitting to the image sensor array module configured to transmit the request to the image sensor array that includes more than one image sensor and that is configured to capture the scene that represents more image data than the requested particular image data 710. In an embodiment, module 710 may include one or more of request for particular image data transmitting to the image sensor array module configured to transmit the request to the image sensor array that includes more than one image sensor and that is configured to capture the scene that represents ten times more image data than the requested particular image data 712 and request for particular image data transmitting to the image sensor array module configured to transmit the request to the image sensor array that includes more than one image sensor and that is configured to capture the scene that represents more than one hundred times more image data than the requested particular image data 714.

Referring again to FIG. 7, e.g., FIG. 7C, in an embodiment, module 254 may include request for particular image data transmitting to a remote server deployed to relay the request to the image sensor array module configured to transmit the request to the remote server that is configured to package the request for particular image data and relay the request for particular image data to the image sensor array 716. In an embodiment, module 716 may include one or more of request for particular image data transmitting to a remote server deployed to relay the request to the image sensor array module configured to transmit the request to the remote server that is configured to package the request for particular image data and relay the request for particular image data along with one or more other image data requests to the image sensor array 718 and request for particular image data transmitting to a remote server deployed to relay the request to the image sensor array module configured to transmit the request to the remote server that is configured to package multiple requests that include the request for particular image data and relay the package of multiple requests to the image sensor array 720. In an embodiment, module 720 may include request for particular image data transmitting to a remote server deployed to relay the request to the image sensor array module configured to transmit the request to the remote server that is configured to package multiple requests that include the request for particular image data and relay the package of multiple requests to the image sensor array 722. In an embodiment, module 722 may include request for particular image data transmitting to a remote server deployed to relay the request to the image sensor array module configured to transmit the request to the remote server that is configured to combine multiple requests that include the request for particular image data and transmit the combined multiple requests as a single combined request for image data to the image sensor array 724.

Referring again to FIG. 7, e.g., FIG. 7D, in an embodiment, module 254 may include one or more of request for particular image data modifying into updated request for particular image data module 726 and request for updated particular image data transmitting to the image sensor array module 728. In an embodiment, module 726 may include request for particular image data modifying into updated request for particular image data that identifies a portion of the image data as update-targeted module 730. In an embodiment, module 730 may include request for particular image data modifying into updated request for particular image data that identifies a portion of the image data as update-targeted module wherein the request for particular image data is a request for an image of an eagle that circles an animal oasis and the updated request for particular image data identifies a twenty foot spatial radius around the eagle as the portion of the image data that is update-targeted 732. In an embodiment, module 732 may include request for particular image data modifying into updated request for particular image data that identifies a portion of the image data as update-targeted module wherein the request for particular image data is a request for an image of an eagle that circles an animal oasis and the updated request for particular image data identifies a twenty foot spatial radius around the eagle as the portion of the image data that is update-targeted based on an algorithm that determined that portion of the image data as likely to have changed since a previous reception of image data 734.

Referring again to FIG. 7, e.g., FIG. 7E, in an embodiment, module 254 may include one or more of module 726 and module 728, as previously described. In an embodiment, module 726 may include request for particular image data modifying into updated request for particular image data based on one or more previously received images module 736. In an embodiment, module 736 may include one or more of particular image data request to previous image data that contains one or more previously received images determined to be similar to the previous image data comparing module 738 and particular image data request modifying based on compared previous image data module 740. In an embodiment, module 738 may include particular image data request to previous image data that contains one or more previously received images determined to be similar to the previous image data comparing to identify an update-targeted portion of the particular image data module 742. In an embodiment, module 742 may include one or more of first previously received image data with second previously received image data and request for particular image data delta determining module 744 and particular image data request portion that corresponds to determined delta identifying module 746.

Referring again to FIG. 7, e.g., FIG. 7F, in an embodiment, module 254 may include one or more of expanded request for particular image data generating module 748 and expanded request for particular image data transmitting to the image sensor array module configured to transmit the request to the image sensor array that includes more than one image sensor and that is configured to capture the scene that is larger than the requested particular image data 750. In an embodiment, module 748 may include expanded request for particular image data that includes the request for particular image data and border image data that borders the particular image data generating module 752. In an embodiment, module 752 may include one or more of expanded request for particular image data that includes the request for particular image data and border image data that borders the particular image data on all four sides generating module 754, projected next side image data that is image data corresponding to an image that borders the particular image of the particular image data determining module 756, and expanded request for particular image data that includes the request for particular image data and next side image data generating module 758. In an embodiment, module 756 may include projected next side image data that is image data corresponding to an image that borders the particular image of the particular image data determining at least partially based on a detected motion of the device associated with the requestor module 760. In an embodiment, module 760 may include projected next side image data that is image data corresponding to an image that borders the particular image of the particular image data determining at least partially based on a detected head turn of the requestor that wears the device associated with the requestor module 762.

Referring again to FIG. 7, e.g., FIG. 7G, in an embodiment, module 254 may include module 748, module 750, and module 752, as previously described. In an embodiment, module 752 may include expanded request for particular image data that includes the request for particular image data, first border image data that borders the particular image data, and second border image data that borders the first border image data generating module 764. In an embodiment, module 764 may include expanded request for particular image data that includes the request for particular image data, first border image data that borders the particular image data, and second border image data that borders the first border image data generating module configured to generate the expanded request for the particular image data that includes the request for the particular image data at a first resolution, the request for the first border image data at a second resolution less than the first resolution, and the request for the second border image data at a third resolution less than or equal to the second resolution 766.

Referring now to FIG. 8, FIG. 8 illustrates an exemplary implementation of particular image data from the image sensor array exclusive receiving module 256. As illustrated in FIG. 8A, the particular image data from the image sensor array exclusive receiving module 256 may include one or more sub-logic modules in various alternative implementations and embodiments. For example, as shown in FIG. 8, e.g., FIG. 8A, in an embodiment, module 256 may include one or more of particular image data from the image sensor array exclusive receiving module configured to receive only the particular image data that represents fewer pixels than the scene from the image sensor array 802, particular image data from the image sensor array exclusive receiving module configured to receive only the particular image data that represents a smaller geographic area than the scene from the image sensor array 804, particular image data from the image sensor array exclusive receiving from a remote server module, wherein the remote server received the portion of the scene that included the request for the particular image data and a second request for second particular image data that is at least partially different than the particular image data 806, particular image data from the image sensor array exclusive receiving from a remote server module, wherein the image sensor array discarded portions of the scene other than the particular image data 808, particular image data from the image sensor array exclusive receiving from a remote server module, wherein portions of the scene other than the particular image data are stored at the image sensor array 810, and particular image data from the image sensor array exclusive receiving module configured to receive only the particular image data from a remote server deployed to communicate with the image sensor array, wherein a first portion of the scene data other than the particular image data is stored at the image sensor array and a second portion of the scene data other than the particular image data is stored at the remote server 812.

Referring again to FIG. 8, e.g., FIG. 8B, in an embodiment, module 256 may include particular image data from the image sensor array exclusive receiving module configured to receive only the particular image data from the image sensor array, wherein the particular image represents a subset of the scene and wherein a size characteristic of the particular image data is at least partially based on a feature of a requestor device that is associated with the requestor 814. Module 814 may include one or more of particular image data from the image sensor array exclusive receiving module configured to receive only the particular image data from the image sensor array, wherein the size characteristic of the particular image data is at least partially based on a feature of a requestor device that is deployed to store data about with the requestor 816, particular image data from the image sensor array exclusive receiving module configured to receive only the particular image data from the image sensor array, wherein the size characteristic of the particular image data is at least partially based on a bandwidth available to the requestor device 818, and particular image data from the image sensor array exclusive receiving module configured to receive only the particular image data from the image sensor array, wherein the size characteristic of the particular image data is at least partially based on a bandwidth between the requestor device and a remote server that communicates with the image sensor array 820.

Referring again to FIG. 8, e.g., FIG. 8C, in an embodiment, module 256 may include one or more of particular image data from the image sensor array exclusive receiving module configured to receive only the particular image data from the image sensor array, wherein the particular image represents a subset of the scene and wherein a size characteristic of the particular image data is at least partially based on a screen size of a requestor device that is associated with the requestor 822 and particular image data from the image sensor array exclusive receiving module configured to receive only the particular image data from the image sensor array, wherein the particular image represents a subset of the scene and wherein a size characteristic of the particular image data is at least partially based on a maximum resolution of a requestor device that is associated with the requestor 824.

Referring now to FIG. 9, FIG. 9 illustrates an exemplary implementation of received particular image data presenting module 258. As illustrated in FIG. 9A, the received particular image data presenting module 258 may include one or more sub-logic modules in various alternative implementations and embodiments. For example, as shown in FIG. 9, e.g., FIG. 9A, in an embodiment, module 258 may include one or more of received particular image data presenting on a device viewfinder module configured to present the received particular image data to the requestor on a viewfinder of a device associated with the requestor 902, received particular image data presenting module configured to present the received particular image data to the requestor that is a spectator of a baseball game on a requestor device that is an internet-enabled television 906, received particular image data presenting module configured to present the received particular image data to the requestor that is a naturalist that observes an animal watering hole from a smartwatch touchscreen 908, received particular image data modifying into modified particular image data module 910, and modified particular image data presenting module 912. In an embodiment, module 902 may include received particular image data presenting on a particular device viewfinder module, wherein the particular device is one or more of a cellular telephone device, a tablet device, a smartphone device, a laptop computer, a desktop computer, a television, and a wearable computer 904. In an embodiment, module 910 may include received particular image data that includes only changed portions of the scene modifying into modified particular image data module 914. In an embodiment, module 914 may include received particular image data that includes only changed portions of the scene modifying into modified particular image data through addition of unchanged portions of existent image data module 916.

Referring again to FIG. 9, e.g., FIG. 9B, in an embodiment, module 258 may include portion of received particular image data presenting module configured to present a portion of the received particular image data to the requestor 918. In an embodiment, module 918 may include one or more of first portion of the received particular image data presenting module 920 and second portion of the received particular image data storing module 922. In an embodiment, module 922 may include one or more of second portion of the received particular image data that is adjacent to the first portion of the received particular image data and is configured to be used as cached image data storing module 924 and second portion of the received particular image data that is adjacent to the first portion of the received particular image data and is received at a lower resolution than the first portion of the received particular image data storing module 926.

Referring again to FIG. 9, e.g., FIG. 9C, in an embodiment, module 258 may include one or more of received particular image data transmitting to a component module configured transmit the received particular data to a component deployed to analyze the received particular image 928, received particular image data transmitting to a component module configured transmit the received particular data to a component deployed to store the received particular image 930, received particular image data presenting module configured to present the received particular image data to a client requestor 932, and received particular image data presenting module configured to present the received particular image data to a device component requestor 934.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Exemplary Operational Implementation of Processor 250 and Exemplary Variants Further, in FIG. 10 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 10 as well as the other operations to be described herein may be performed by at least one of a machine, an article of manufacture, or a composition of matter.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

Referring now to FIG. 10, FIG. 10 shows operation 1000, e.g., an example operation of message processing device 230 operating in an environment 200. In an embodiment, operation 1000 may include operation 1002 depicting accepting input of a request for a particular image of a scene that is larger than the particular image. For example, FIG. 6, e.g., FIG. 6B, shows input of a request for particular image data accepting module 252 accepting (e.g., receiving, retrieving, facilitating the reception of, interacting with an input/output interface) input (e.g., the input could take many forms, e.g., a person interacting with an input/output device, e.g., a keyboard, mouse, touchscreen, haptic interface, virtual reality interface, augmented reality interface, audio interface, body-motion interface, or similar, or in the form of one device sending a request to another device, for example a monitoring device sending a request for a particular image, or in the form of an internal communication in a device (e.g., a subroutine of a device inputs the request to a different portion of the device (which may use the same CPU and/or other components), or any other form) of a request (e.g., a command, suggestion, or description, which may be narrow or specific, e.g., "these pixels are the pixels that are requested," or "request all pixels that contain image objects of herring birds in them," or "request all pixels that indicate an image object has moved since the last image was captured") for a particular image (e.g., an image, or image data (which may be used substantially interchangeably throughout, but noted that here "image" and "image data" may include still pixel data, video data, audio data, metadata regarding any of the previous data, or other processing/cataloging data associated with the digital capture of external stimuli in the universe), whether in the visible spectrum or not (e.g., also including infrared, ultraviolet, and all other waves on the electromagnetic spectrum) of a scene (e.g., in this context the scene refers to the data captured by the image sensor array, which as described in more detail herein, may be substantially reduced or modified before it reaches a destination, of which the particular image is part) that is larger than the particular image).

Referring again to FIG. 10, operation 1000 may include operation 1004 depicting transmitting the request for the particular image to an image sensor array that includes more than one image sensor and that is configured to capture the scene and retain a subset of the scene that includes the request for the particular image of the scene. For example, FIG. 2, e.g., FIG. 2B, shows inputted request for the particular image data transmitting module 254. In an embodiment, transmitting may describe, e.g., sending, or facilitating sending, to the destination, or to an intermediary that may act autonomously. It is noted that in several embodiments of the system, the request for the particular image is not transmitted directly to the image sensor array, but rather to a remote server that communicates with the image sensor array. The transmitting device may not know the actual location or other data about the image sensor array, e.g., the remote server may be configured to act as an intermediary, however, this is also considered "transmitting" to the image sensor array for the purposes of one or more embodiments listed herein. The "request for the particular image" may be a request (e.g., a command, suggestion, or description, which may be narrow or specific, e.g., "these pixels are the pixels that are requested," or "request all pixels that contain image objects of herring birds in them," or "request all pixels that indicate an image object has moved since the last image was captured") for a particular image (e.g., an image, or image data (which may be used substantially interchangeably throughout, but noted that here "image" and "image data" may include still pixel data, video data, audio data, metadata regarding any of the previous data, or other processing/cataloging data associated with the digital capture of external stimuli in the universe), whether in the visible spectrum or not (e.g., also including infrared, ultraviolet, and all other waves on the electromagnetic spectrum)). In an embodiment, the "image sensor array" may be, e.g., a set of one or more image sensors that are grouped together, whether spatially grouped or linked electronically or through a network, in any arrangement or configuration, whether contiguous or noncontiguous, and whether in a pattern or not, and which image sensors may or may not be uniform throughout the array. In an embodiment, the scene, e.g., in this context the scene refers to the data captured by the image sensor array, which as described in more detail herein, may be substantially reduced or modified before it reaches a destination, of which the particular image is part.

Referring again to FIG. 10, operation 1000 may include operation 1006 depicting receiving only the particular image from the image sensor array, wherein the particular image represents a subset of the scene, and wherein a size characteristic of the particular image is at least partially based on a property of a requestor. For example, FIG. 2 e.g., FIG. 2B shows particular image data from the image sensor array exclusive receiving module 256 receiving only (e.g., the ultimate destination of the data receives only the particular image, although more data may be received at intermediaries, e.g., the remote server), from the image sensor array (e.g., a set of one or more image sensors that are grouped together, whether spatially grouped or linked electronically or through a network, in any arrangement or configuration, whether contiguous or noncontiguous, and whether in a pattern or not, and which image sensors may or may not be uniform throughout the array), wherein the particular image represents a subset (e.g., in this context "subset" merely means that the particular image is some part, possibly all, of the scene) of the scene (e.g., the data captured by the image sensor array, which as described in more detail herein, may be substantially reduced or modified before it reaches a destination, of which the particular image is part), and wherein a size characteristic (e.g., a data size, or a real-world correspondent size (e.g., spatial distance) of the particular image is at least partially based on a property of a requestor (e.g., a requestor is the entity that made the request, e.g., via a device, and the property of the requestor may include properties of the device, for example, if the requestor made the request on a cellular telephone device with a maximum resolution of 800×600 pixels, then that property of the requestor would limit the size characteristic of the particular image to a resolution of 800×600)).

Referring again to FIG. 10, operation 1000 may include operation 1006 depicting receiving only the particular image from the image sensor array, wherein the particular image represents a subset of the scene, and wherein a size characteristic of the particular image is at least partially based on a property of a requestor. For example, FIG. 2 e.g., FIG. 2B shows particular image data from the image sensor array exclusive receiving module 256 receiving only (e.g., the ultimate destination of the data receives only the particular image, although more data may be received at intermediaries, e.g., the remote server), from the image sensor array (e.g., a set of one or more image sensors that are grouped together, whether spatially grouped or linked electronically or through a network, in any arrangement or configuration, whether contiguous or noncontiguous, and whether in a pattern or not, and which image sensors may or may not be uniform throughout the array), wherein the particular image represents a subset (e.g., in this context "subset" merely means that the particular image is some part, possibly all, of the scene) of the scene (e.g., the data captured by the image sensor array, which as described in more detail herein, may be substantially reduced or modified before it reaches a destination, of which the particular image is part), and wherein a size characteristic (e.g., a data size, or a real-world correspondent size (e.g., spatial distance) of the particular image is at least partially based on a property of a requestor (e.g., a requestor is the entity that made the request, e.g., via a device, and the property of the requestor may include properties of the device, for example, if the requestor made the request on a cellular telephone device with a maximum resolution of 800×600 pixels, then that property of the requestor would limit the size characteristic of the particular image to a resolution of 800×600).

Referring again to FIG. 10, operation 1000 may include operation 1008 depicting presenting the received particular image to the requestor. For example, FIG. 2, e.g., FIG. 2B, shows received particular image data presenting module 258 presenting (e.g., transmitting, storing, displaying, or taking some other action in accordance with the configuration/wishes of the requestor, e.g., if the requestor intends to store the particular image, then "presenting" is "transmitting" or "copying," but if the requestor intends to view the particular image, then "presenting" may mean "displaying") the received particular image to the requestor.

FIGS. 11A-11F depict various implementations of operation 1002, depicting accepting input of a request for a particular image of a scene that is larger than the particular image according to embodiments. Referring now to FIG. 11A, operation 1002 may include operation 1102 depicting receiving input of the request for the particular image of the scene that is larger than the particular image. For example, FIG. 6, e.g., FIG. 6A shows input of a request for particular image data accepting module accepting input (e.g., receiving a vocal order spoken into a microphone) of a request for a particular image (e.g., "show me the corner of 59th and Vine in New York" of a scene that is larger than the particular image (e.g., the scene may be the entire area of New York captured by the image sensor array, which is larger than the street corner (e.g., depending on the array, it may be blocks, or square miles, or even larger, limited only by the array)). In an embodiment, other image sensor arrays may combine into a larger image sensor array, or pass off control from one to the other so that it appears they are a single image sensor array, which is also included here in one or more embodiments.

Referring again to FIG. 11A, operation 1002 may include operation 1104 depicting receiving input from an automated component, of the request for the particular image of the scene that is larger than the particular image. For example, FIG. 6, e.g., FIG. 6A, shows input of a request for particular image data accepting module configured to accept input from an automated component for the request for particular image data 604 receiving input from an automated component (e.g., an algorithm (e.g., an algorithm that runs on a hardware component without further human interaction required, e.g., the algorithm is programmed to execute instructions, and a human may cause the algorithm/component to execute, in an embodiment, the human may need to take no further action) of the request for the particular image (e.g., an image of any motion that was detected in front of a warehouse at night) of the scene (e.g., the front of the warehouse) that is larger than the particular image (e.g., an image of where motion was detected). For example, in an embodiment, a separate motion sensor may detect motion in front of the warehouse, and may send a request for the particular image in the form of "transmit the image where motion was detected." In another embodiment, the scene data may be used to detect motion, e.g., if pixels have changed in the scene, and the request may be generated internally, e.g., "collect the portion of the image where motion was detected as the particular image").

Referring again to FIG. 11A, operation 1002 may include operation 1106 depicting receiving input from an image object tracking component, of the request for the particular image that contains a tracked image object present in the scene that is larger than the particular image. For example, FIG. 6, e.g., FIG. 6A, shows input of a request from an image object tracking algorithm for particular image data accepting module 606 receiving input from an image object tracking component (e.g., a component designed to track an image object as it moves through the scene, e.g., a flying bird (the particular image) through an animal oasis (the scene), or a moving car (the particular image) crossing a highway (the scene), or a specific person (the particular image) walking down a street corner (e.g., the scene)). These examples are merely exemplary and not exhaustive. The request for the particular image that contains a tracked image object (e.g., the specific person) present in the scene (e.g., the street corner). In an embodiment, the tracked image object may be tracked through automated image analysis (e.g., image object detection) or through human/automation/artificial intelligence/intelligence amplification intervention (e.g., a human selecting the place where the person is), or some combination thereof.

Referring again to FIG. 11A, operation 1106 may include operation 1108 depicting receiving input of the request for the particular image from the image object tracking component, of the requestor device that is associated with the requestor, wherein the particular image contains the tracked image object present in the scene that is larger than the particular image. For example, FIG. 6, e.g., FIG. 6A, shows image object tracking algorithm for particular image data accepting through a requestor device interface module 608 receiving input of the request for the particular image from the image object tracking component, of the requestor device receiving input of the request for the particular image from the image object tracking component, of the requestor device that is associated with the requestor, wherein the particular image contains the tracked image object (e.g., tracking a person walking through a stadium environment) present in the scene (e.g., the stadium environment, e.g., a concourse of a stadium) that is larger than the particular image.

Referring again to FIG. 11A, operation 1106 may include operation 1110 depicting receiving input from a player tracking component, that is part of an Internet-enabled television configured to track football players, of the request for the particular image that is an image of a football game that contains a tracked image object that is a particular football player present in the scene that is larger than the particular image of the football game. For example, FIG. 6, e.g., FIG. 6A, shows image object tracking algorithm for particular image data accepting through an interface of an Internet-enabled television device interface module 610 receiving input from a player tracking component, that is part of an Internet-enabled television configured to track football players, of the request for the particular image that is an image of a football game that contains a tracked image object that is a particular football player present in the scene that is larger than the particular image of the football game.

Referring now to FIG. 11B, operation 1002 may include operation 1112 depicting accepting input of the request for the particular image of the scene that is larger than the particular image through an interface of a requestor device associated with the requestor. For example, FIG. 6, e.g., FIG. 6B, shows input of a request for particular image data accepting through a requestor device interface module 612 accepting input of the request for the particular image (e.g., an image of panda bears) of the scene (e.g., an animal oasis/watering hole) that is larger than the particular image through an interface (e.g., a touchscreen) of a requestor device (e.g., a smartphone) associated with (e.g., operated by) the requestor (e.g., a person who wants to watch the pandas at the watering hole).

Referring again to FIG. 11B, operation 1112 may include operation 1114 depicting receiving input of the request for the particular image of the scene that is larger than the particular image from the requestor through the interface of the requestor device that is configured to display at least a portion of the scene. For example, FIG. 6, e.g., FIG. 6B, shows input of a request for particular image data accepting through a requestor device interface module 614 receiving input of the request for the particular image (e.g., a specific area of a downward-looking view of a city block in a "live street view" context) of the scene (e.g., a downward-looking view of a city block) that is larger than the particular image (e.g., a specific area of the city block, e.g., a hot dog stand area) from the requestor (e.g., a person viewing on their computer) through the interface of the requestor device that is configured to display at least a portion of the scene (e.g., the computer shows a low-resolution, condensed version of the scene, that is, the city block, and the user clicks on the area that contains the hot dog stand, and that input is received and the particular image of the hot dog stand is selected).

Referring again to FIG. 11B, operation 1114 may include operation 1116 depicting receiving input of the request for the particular image of the scene that is larger than the particular image from the requestor through the interface of the requestor device that is configured to display at least the portion of the scene in a viewfinder. For example, FIG. 6, e.g., FIG. 6B, shows input of a request for particular image data accepting through a requestor device interface module 616 receiving input of the request for the particular image of the scene that is larger than the particular image from the requestor through the interface of the requestor device that is configured to display at least the portion of the scene in a viewfinder (e.g., either optically or digitally, a condensed version of the scene is shown in a viewfinder, and a remote (or local) requestor can select the portion of the scene to be accepted as input of the request for the particular image, for example, the user can select a particular animal at a watering hole, or a football player at a football game).

Referring again to FIG. 11B, operation 1114 may include operation 1118 depicting receiving input of the request for the particular image of the scene that is larger than the particular image from the requestor through the interface of the requestor device that is configured to display at least the portion of the scene, said request at least partially based on a view of the scene. For example, FIG. 6, e.g., FIG. 6B, shows input of a request for particular image data that is at least partially based on a view of the scene accepting through a requestor device interface module 618 receiving input of the request for the particular image of the scene that is larger than the particular image from the requestor through the interface of the requestor device that is configured to display at least the portion of the scene, said request at least partially based on a view of the scene (e.g., a view of the scene is given to the requestor so that the requestor can select a portion of the scene as the particular image).

Referring again to FIG. 11B, operation 1114 may include operation 1120 depicting receiving the request for particular image data of the scene from the requestor device that is configured to receive the selection of the particular image, wherein the requestor device is one or more of a smartphone, television, computer screen, tablet, camera, appliance, and augmented reality device. For example, FIG. 6, e.g., FIG. 6B, shows input of a request for particular image data accepting through a specific requestor device interface module 620 receiving the request for particular image data of the scene from the requestor device that is configured to receive the selection of the particular image (e.g., a view of the interior of the house that can be viewed remotely), wherein the requestor device is one or more of a smartphone, television, computer screen, tablet, camera, appliance, and augmented reality device.

Referring now to FIG. 11C, operation 1002 may include operation 1122 depicting accepting input of the request for the particular image of the scene that contains more pixels than the particular image. For example, FIG. 6, e.g., FIG. 6C, shows input of the request for particular image data that is part of the scene that contains more pixels than the particular image associated with the particular image data accepting module 622 accepting input of the request (e.g., a requestor pushes a button on a remote control to control the smart television that is showing images) for the particular image (e.g., a particular player on a person's fantasy football team) of the scene (e.g., a football stadium) that contains more pixels than the particular image.

Referring again to FIG. 11C, operation 1002 may include operation 1124 depicting accepting input of the request for the particular image of the scene that captures a larger spatial area than the particular image. For example, FIG. 6, e.g., FIG. 6C, shows input of the request for particular image data that is part of the scene is a larger spatial area than the particular image associated with the particular image data accepting module 622 accepting input (e.g., a touchscreen input in which the requestor touches a representation of the scene at a particular portion) of the request for the particular image (e.g., the image data at the location touched by the requestor) of the scene (e.g., a street-level view of downtown Washington D.C.) that captures a larger spatial area (e.g., the depiction of the scene is a larger geographic area than the depiction of the particular image) than the particular image (e.g., an image of a particular intersection in downtown Washington D.C.).

Referring again to FIG. 11C, operation 1002 may include operation 1126 depicting accepting input of the request for the particular image of the scene that includes more data than the particular image. For example, FIG. 6, e.g., FIG. 6C, shows input of the request for particular image data that is part of the scene that contains more data than the particular image associated with the particular image data accepting module 626 accepting input of the request for the particular image of the scene that includes more data than the particular image (e.g., an image of a lion at the watering hole). It is noted that, in an embodiment, the scene represents the total data captured by the image sensor array, much of which may be discarded at the image sensor array.

Referring again to FIG. 11C, operation 1002 may include operation 1128 depicting accepting input of the request for particular image data of the scene, wherein the scene is a representation of the image data collected by the array of more than one image sensor. For example, FIG. 6, e.g., FIG. 6C, shows input of a request for particular image data accepting module, wherein the particular image data is part of a scene that is a representation of the image data collected by the array of more than one image sensor 628 accepting input of the request for particular image data of the scene (e.g., a virtual tourism display of the Great Pyramids), wherein the scene is a representation of the image data collected by the array of more than one image sensor.

Referring again to FIG. 11C, operation 1128 may include operation 1130 depicting accepting input of the request for particular image data of the scene, wherein the scene is a sampling of the image data collected by the array of more than one image sensor. For example, FIG. 6, e.g., FIG. 6C, shows input of a request for particular image data accepting module 630 accepting input of the request for particular image data of the scene, wherein the scene is a sampling (e.g., every other pixel, or every tenth pixel, or any subset of the entirety of the data collected by the image sensor array (e.g., for example, if the image sensor array also collects audio data, then a sampling in this context could mean only the pixel data, or only the audio data, or some combination thereof)).

Referring again to FIG. 11C, operation 1128 may include operation 1132 depicting accepting input of the request for particular image data of the scene, wherein the scene is a subset of the image data collected by the array of more than one image sensor. For example, FIG. 6, e.g., FIG. 6C, shows input of a request for particular image data accepting module 632 accepting input of the request for particular image data of the scene, wherein the scene is a subset (e.g., any set of data that is less than or equal to the total amount of data captured by the image sensor array, e.g., at a moment in time) of the image data (e.g., which, as stated above, may include visible and invisible spectrum data, audio data, video data, and metadata) collected by the array of more than one image sensor.

Referring again to FIG. 11C, operation 1128 may include operation 1134 depicting accepting input of the request for particular image data of the scene, wherein the scene is a low-resolution version of the image data collected by the array of more than one image sensor. For example, FIG. 6, e.g., FIG. 6C, shows input of a request for particular image data accepting module 634 accepting input of the request for particular image data of the scene, wherein the scene is a low-resolution version of the image data collected by the array of more than one image sensor.

Referring now to FIG. 11D, operation 1002 may include operation 1136 depicting accepting input of the request for particular image data of a scene that is a football game. For example, FIG. 6, e.g., FIG. 6D, shows input of a request for particular image data accepting module 636 accepting input of the request for particular image data (e.g., a particular football player) of a scene that is a football game.

Referring again to FIG. 11D, operation 1002 may include operation 1138 depicting accepting input of the request for particular image data of a scene that is a street view of an area. For example, FIG. 6, e.g., FIG. 6D, shows input of a request for particular image data accepting module 638 accepting input of the request for particular image data (e.g., an image of a storefront where a targeted person is walking in) of a scene that is a street view of an area (e.g., a "live" street view of a busy intersection in Washington, D.C.).

Referring again to FIG. 11D, operation 1002 may include operation 1140 acquiring the request for particular image data of a scene that is a tourist destination. For example, FIG. 6, e.g., FIG. 6D, shows input of a request for particular image data accepting module 640 acquiring the request for particular image data (e.g., a view from a top of the Eiffel Tower) of a scene that is a tourist destination (e.g., the Eiffel Tower).

Referring again to FIG. 11D, operation 1002 may include operation 1142 depicting acquiring the request for particular image data of a scene that is an inside of a home. For example, FIG. 6, e.g., FIG. 6D, shows input of a request for particular image data accepting module 642 acquiring the request for particular image data (e.g., inside the kitchen) of a scene that is an inside of a home.

Referring again to FIG. 11D, operation 1002 may include operation 1144 depicting accepting input of the request for particular image data of the scene, wherein the particular image data is an image that is a portion of the scene. For example, FIG. 6, e.g., FIG. 6D, shows input of a request for particular image data that is a portion of the scene accepting module 644 accepting input (e.g., touchscreen input) of the request for particular image data (e.g., audio and video data of a lion at the watering hole) of the scene (e.g., an animal watering hole), wherein the particular image data is an image (e.g., a word which in this context also can include video and text) that is a portion of the scene (e.g., the animal watering hole).

Referring again to FIG. 11D, operation 1144 may include operation 1146 depicting accepting input of the request for particular image data of the scene, wherein the particular image data includes image data of a particular football player and the scene is a football field. For example, FIG. 6, e.g., FIG. 6D, shows input of a request for particular image data that includes a particular football player that is a portion of the scene that is a football field accepting module 644 accepting input of the request for particular image data of the scene, wherein the particular image data includes image data of a particular football player and the scene is a football field.

Referring again to FIG. 11D, operation 1144 may include operation 1148 depicting accepting input of the request for particular image data of the scene, wherein the particular image data includes image data of a license plate of a vehicle, and the scene is an image representation of a highway bridge. For example, FIG. 6, e.g., FIG. 6D, shows input of a request for particular image data that includes a license plate of a vehicle that is a portion of the scene that is a representation of a highway bridge accepting module 648 accepting input of the request for particular image data of the scene, wherein the particular image data includes image data of a license plate of a vehicle, and the scene is an image representation of a highway bridge.

Referring now to FIG. 11E, operation 1002 may include operation 1150 depicting accepting input of the request for particular image data that is part of the scene, wherein the particular image data includes video data. For example, FIG. 6, e.g., FIG. 6E, shows input of a request for particular image video data accepting module 650 accepting input (e.g., through a human-body interaction, e.g., similar to the Microsoft Kinect) of the request for particular image data (e.g., data of a rhinoceros on the African steppe) that is part of the scene, wherein the particular image data includes video data.

Referring again to FIG. 11E, operation 1002 may include operation 1152 depicting accepting input of the request for particular image data that is part of the scene, wherein the particular image data includes audio data. For example, FIG. 6, e.g., FIG. 6E, shows input of a request for particular image audio data accepting module 652 accepting input (e.g., through interaction with an augmented reality construct that is being projected to the requestor and overlayed with reality) of the request for particular image data (e.g., virtual tourism data of the inside of the Smithsonian Museum of Art) that is part of the scene, wherein the particular image data includes video data.

Referring again to FIG. 11E, operation 1002 may include operation 1154 depicting accepting input of the request for particular image data that is part of the scene from a requestor device that receives the request for particular image data through an audio interface. For example, FIG. 6, e.g., FIG. 6E, shows input of a request for particular image data accepting through an audio interface module 654 accepting input of the request for particular image data that is part of the scene from a requestor device (e.g., a tablet device) that receives the request for particular image data through an audio interface (e.g., an interactive virtual companion, e.g., Microsoft's "Cortana" or Apple's "Siri").

Referring again to FIG. 11E, operation 1154 may include operation 1156 depicting accepting input of the request for particular image data that is part of the scene from the requestor device that has a microphone that receives a spoken request for particular image data from the requestor. For example, FIG. 6, e.g., FIG. 6E, shows input of a request for particular image data accepting through a microphone audio interface module 656 accepting input of the request for particular image data that is part of the scene from the requestor device (e.g., a cellular smartphone) that has a microphone that receives a spoken request for particular image data from the requestor (e.g., the person interacting with the cell phone device with a microphone).

Referring now to FIG. 11F, operation 1002 may include operation 1158 depicting accepting input of the request for the particular image of the scene that is larger than the particular image, from the requestor. For example, FIG. 6, e.g., FIG. 6F, shows input of a request for particular image data accepting from the requestor module 658 accepting input of the request (e.g., a request to transmit an image) for the particular image (e.g., an image of the object that is moving in the scene) of the scene (e.g., the area around a front door to a secured compound) that is larger than the particular image, from the requestor (e.g., a device configured to store an image from a security camera of any object that moves within fifty feet of a door to a secured compound).

Referring again to FIG. 11F, operation 1158 may include operation 1160 depicting accepting input of the request for the particular image of the scene that is larger than the particular image, from the requestor that is a client operating a device. For example, FIG. 6, e.g., FIG. 6F, shows input of a request for particular image data accepting from the requestor module 660 accepting input of the request for the particular image of the scene that is larger than the particular image, from the requestor that is a client (e.g., a person) operating a device (e.g., a laptop computer with a keyboard and a mouse).

Referring again to FIG. 11F, operation 1160 may include operation 1162 depicting accepting input of the request for the particular image of the scene that is larger than the particular image, from the requestor that is a person operating a smart television with a remote control. For example, FIG. 6, e.g., FIG. 6F, shows input of a request for particular image data accepting from the requestor module 662 accepting input of the request for the particular image (e.g., a specific swimmer in an Olympic race) of the scene (e.g., the inside of a pool at an Olympics) that is larger than the particular image, from the requestor that is a person operating a smart television with a remote control.

Referring again to FIG. 11F, operation 1158 may include operation 1164 depicting accepting input of the request for the particular image of the scene that is larger than the particular image, from the requestor that is a device. For example, FIG. 6, e.g., FIG. 6F, shows input of a request for particular image data accepting from a requestor device module 664 accepting input of the request for the particular image (e.g., pictures of license plates of cars that pass a toll bridge) of the scene (e.g., a point on a toll bridge where vehicles can pass) that is larger than the particular image, from the requestor that is a device (e.g., the requestor is a separate device that records and tracks license plate numbers of vehicles that pass and the tolls that are paid, so that when a toll is not paid, the requestor device can initiate automation to receive the particular image that will show the license plate).

Referring again to FIG. 11F, operation 1164 may include operation 1166 depicting accepting input of the request for the particular image of the scene that is larger than the particular image, from the requestor that is a component of a device. For example, FIG. 6, e.g., FIG. 6F, shows input of a request for particular image data accepting from a requestor device component module 666 accepting input of the request for the particular image of the scene that is larger than the particular image, from the requestor that is a component (e.g., an algorithm, a subroutine, a program, a chip, a module, or any combination thereof) of a device.

Referring again to FIG. 11F, operation 1164 may include operation 1168 depicting accepting input of the request for the particular image of the scene that is larger than the particular image, from the requestor that is a device that is executing a subroutine. For example, FIG. 6, e.g., FIG. 6F, shows input of a request for particular image data accepting from a requestor device component module 668 accepting input (e.g., an electronic transmission from device to device) of the request for the particular image (e.g., an image of a warehouse door) of the scene (e.g., the entire warehouse) that is larger than the particular image, from the requestor that is a device that is executing a subroutine (e.g., a device that is executing a subroutine to check all the entry points of a warehouse at given intervals, without human intervention or direction).

Referring again to FIG. 11F, operation 1164 may include operation 1170 depicting accepting, at the device, of the input of the request for the particular image of the scene that is larger than the particular image, from the requestor that is the device that is executing a separate subroutine. For example, FIG. 6, e.g., FIG. 6F, shows input of a request for particular image data accepting at the requestor device module 670 accepting, at the device (e.g., a command computer in charge of security at a warehouse), of the input of the request for the particular image (e.g., a front door of the warehouse) of the scene that is larger than the particular image, from the requestor that is the device that is executing a separate subroutine (e.g., the same device that accepts the request for the image of the warehouse door also runs the subroutine that requests the image of the warehouse door at particular intervals, in a separate subroutine, which may share some of the programming logic and/or hardware as the acceptance of the request for the image).

FIGS. 12A-12G depict various implementations of operation 1004, depicting transmitting the request for the particular image to an image sensor array that includes more than one image sensor and that is configured to capture the scene and retain a subset of the scene that includes the request for the particular image of the scene, according to embodiments. Referring now to FIG. 12A, operation 1004 may include operation 1202 depicting transmitting the request for the particular image data of the scene to the image sensor array that includes multiple connected image sensors and that is configured to capture the scene and retain the subset of the scene that includes the request for the particular image of the scene. For example, FIG. 7, e.g., FIG. 7A, shows request for particular image data transmitting to an image sensor array module 702 configured to transmit the request to the image sensor array that includes multiple connected image sensors and that is configured to capture the scene and retain the subset of the scene that includes the request for the particular image of the scene, said module 702 transmitting the request for the particular image data of the scene to the image sensor array that includes multiple connected image sensors (e.g., the image sensors send data to a common processor) and that is configured to capture the scene and retain the subset of the scene that includes the request for the particular image (e.g., an image of a living room of a home) of the scene.

Referring again to FIG. 12A, operation 1004 may include operation 1204 depicting transmitting the request for the particular image data of the scene to the image sensor array that includes two image sensors arranged side by side and angled toward each other and that is configured to capture the scene that is larger than the requested image data. For example, FIG. 7, e.g., FIG. 7A, shows request for particular image data transmitting to an image sensor array that includes two inline image sensors angled toward each other module 704 configured to transmit the request to the image sensor array that includes more than one image sensor and that is configured to capture the scene that is larger than the requested particular image data, said module 704 transmitting the request for the particular image data (e.g., an image of the drummer at a music concert) of the scene (e.g., the stage of a big music concert) to the image sensor array that includes two image sensors (e.g., CMOS sensors that are ten megapixels each) arranged side by side and angled toward each other, and that is configured to capture the scene (e.g., the stage of a music concert) that is larger than the requested image data.

Referring again to FIG. 12A, operation 1004 may include operation 1206 depicting transmitting the request for the particular image data of the scene to the image sensor array that includes the array of image sensors arranged in a grid and that is configured to capture the scene that is larger than the requested image data. For example, FIG. 7, e.g., FIG. 7A, shows request for particular image data transmitting to the image sensor array that includes a pattern of image sensors arranged in a grid module 706 configured to transmit the request to the image sensor array that includes more than one image sensor and that is configured to capture the scene that is larger than the requested particular image data, said module 706 transmitting the request for the particular image data of the scene to the image sensor array that includes the array of image sensors arranged in a grid (e.g., a 10×10 grid of three-megapixel image sensors) and that is configured to capture the scene that is larger than the requested image data.

Referring again to FIG. 12A, operation 1004 may include operation 1208 depicting transmitting the request for the particular image data of the scene to the image sensor array that includes the array of image sensors arranged in a line such that a field of view is greater than 120 degrees and that is configured to capture the scene that is larger than the requested image data. For example, FIG. 7, e.g., FIG. 7A, shows request for particular image data transmitting to the image sensor array that includes a pattern of image sensors arranged in a line module 708 configured to transmit the request to the image sensor array that has a field of view greater than one hundred twenty degrees and that is configured to capture the scene that is larger than the requested particular image data, said module 708 transmitting the request for the particular image data of the scene to the image sensor array that includes the array of image sensors arranged in a line such that a field of view is greater than 120 degrees and that is configured to capture the scene (e.g., a soccer field where a youth soccer game is occurring) that is larger than the requested image data (e.g., an image of a particular parent's child at a youth soccer game).

Referring now to FIG. 12B, operation 1004 may include operation 1210 depicting transmitting the request for the particular image to the image sensor array that includes more than one image sensor and that is configured to capture the scene that represents more image data than the requested particular image data. For example, FIG. 7, e.g., FIG. 7B, shows request for particular image data transmitting to the image sensor array module 710 configured to transmit the request to the image sensor array that includes more than one image sensor and that is configured to capture the scene that represents more image data than the requested particular image data, said module 710 transmitting the request for the particular image to the image sensor array that includes more than one image sensor and that is configured to capture the scene that represents more image data (e.g., the scene represents a larger area and more data, even if the requestor is viewing a smaller part of it) than the requested particular image data (e.g., an image of a cubicle in an office that is part of an office employee productivity monitoring system).

Referring again to FIG. 12B, operation 1210 may include operation 1212 depicting transmitting the request for the particular image to the image sensor array that includes more than one image sensor and that is configured to capture the scene that represents more than ten times as much image data as the requested particular image data. For example, FIG. 7, e.g., FIG. 7B, shows request for particular image data transmitting to the image sensor array module 712 configured to transmit the request to the image sensor array that includes more than one image sensor and that is configured to capture the scene that represents ten times more image data than the requested particular image data, said module 712 transmitting the request for the particular image (e.g., a satellite with a mounted version of the image sensor array is moved to a militarily important target and the particular image is of potential enemy combatants that are detected in the scene) to the image sensor array that includes more than one image sensor and that is configured to capture the scene (e.g., high-resolution satellite data of the militarily important and targeted area) that represents more than ten times as much image data as the requested particular image data.

Referring again to FIG. 12B, operation 1210 may include operation 1214 depicting transmitting the request for the particular image to the image sensor array that includes more than one image sensor and that is configured to capture the scene that represents more than one hundred times as much image data as the requested particular image data. For example, FIG. 7, e.g., FIG. 7B, shows request for particular image data transmitting to the image sensor array module 714 configured to transmit the request to the image sensor array that includes more than one image sensor and that is configured to capture the scene that represents more than one hundred times more image data than the requested particular image data, said module 714 transmitting the request for the particular image (e.g., a drone/UAV with a mounted version of the image sensor array is moved to a militarily important target and the particular image is of potential enemy combatants that are detected in the scene) to the image sensor array that includes more than one image sensor and that is configured to capture the scene (e.g., high-resolution drone/UAV data of the militarily important and targeted area) that represents more than one hundred times as much image data as the requested particular image data.

Referring now to FIG. 12C, operation 1004 may include operation 1216 depicting transmitting the request for the particular image to a remote server that is configured to relay the request for the particular image to the image sensor array that includes more than one image sensor. For example, FIG. 7, e.g., FIG. 7C, shows request for particular image data transmitting to a remote server configured to relay the request to the image sensor array module 716 configured to transmit the request to the remote server that is configured to package the request for particular image data and relay the request for particular image data to the image sensor array, said module 716 transmitting the request for the particular image to a remote server that is configured to relay the request for the particular image (e.g., an image of a lion at a watering hole) to the image sensor array that includes more than one image sensor.

Referring again to FIG. 12C, operation 1216 may include operation 1218 depicting transmitting the request for the particular image to the remote server that is configured to relay the request for the particular image to the image sensor array that includes more than one image sensor along with one or more other requests for other particular images. For example, FIG. 7, e.g., FIG. 7C, shows request for particular image data transmitting to a remote server configured to relay the request to the image sensor array module configured to transmit the request to the remote server that is configured to package the request for particular image data and relay the request for particular image data along with one or more other image data requests to the image sensor array, said module 718 transmitting the request for the particular image (e.g., an image of a running back football player during a football game) to the remote server (e.g., a piece of hardware, that may be spatially distant, or not, from the image sensor array, but which has insufficient bandwidth to collect 100% of the data from the image sensor array as it is collected) that is configured to relay the request for the particular image to the image sensor array that includes more than one image sensor along with one or more requests for other particular images (e.g., another request might be for the quarterback football player, or for the defensive end football player, etc.).

Referring again to FIG. 12C, operation 1216 may include operation 1220 depicting transmitting the request for the particular image to the remote server that is configured to package multiple requests that include the request for the particular image and to transmit the package of multiple requests to the image sensor array. For example, FIG. 7, e.g., FIG. 7C, shows request for particular image data transmitting to a remote server configured to relay the request to the image sensor array module 720 configured to transmit the request to the remote server that is configured to package multiple requests that include the request for particular image data and relay the package of multiple requests to the image sensor array, said module 720 transmitting the request for the particular image to the remote server that is configured to package multiple requests that include the request for the particular image and to transmit the package of multiple requests to the image sensor array.

Referring again to FIG. 12C, operation 1220 may include operation 1222 depicting transmitting the request for the particular image to the remote server that is configured to combine multiple requests that include the request for the particular image and to transmit the package of multiple requests with redundant data requests removed to the image sensor array. For example, FIG. 7, e.g., FIG. 7C, shows request for particular image data transmitting to a remote server deployed to relay the request to the image sensor array module 722 configured to transmit the request to the remote server that is configured to package multiple requests that include the request for particular image data and relay the package of multiple requests to the image sensor array, said module 722 transmitting the request for the particular image to the remote server that is configured to combine multiple requests that include the request for the particular image and to transmit the package of multiple requests with redundant data requests removed to the image sensor array, e.g., as shown in FIG. 3B, for example.

Referring again to FIG. 12C, operation 1222 may include operation 1224 depicting transmitting the request for the particular image to the remote server that is configured to combine multiple requests from multiple requestors that include the request for the particular image, and to transmit the multiple requests as a single combined request for image data to the image sensor array. For example, FIG. 7, e.g., FIG. 7C, shows request for particular image data transmitting to a remote server deployed to relay the request to the image sensor array module 724 configured to transmit the request to the remote server that is configured to combine multiple requests that include the request for particular image data and transmit the combined multiple requests as a single combined request for image data to the image sensor array, said module 724 transmitting the request for the particular image to the remote server that is configured to combine multiple requests from multiple requestors that include the request for the particular image, and to transmit the multiple requests as a single combined request for image data to the image sensor array, as shown in FIGS. 3B and 5B.

Referring now to FIG. 12D, operation 1004 may include operation 1226 depicting modifying the request for the particular image into an updated request for particular image data. For example, FIG. 7, e.g., FIG. 7D, shows request for particular image data modifying into updated request for particular image data module 726 modifying the request for the particular image into a request for updated particular image data (e.g., here "updated request means that the original request from the requestor has been modified, e.g., added to, altered, subtracted from, appended to, e.g., whether the actual request is changed or simply more data is added).

Referring again to FIG. 12D, operation 1004 may include operation 1228, which may appear in conjunction with operation 1226, operation 1228 depicting transmitting the updated request for particular image data to the image sensor array that includes more than one image sensor and that is configured to capture the scene and retain the subset of the scene that includes the request for the particular image of the scene. For example, FIG. 7, e.g., FIG. 7D, shows request for updated particular image data transmitting to the image sensor array module 728 transmitting the updated request for particular image data (e.g., for image data of the eagle at the animal watering hole) to the image sensor array that includes more than one image sensor and that is configured to capture the scene (e.g., the animal watering hole) and retain the subset of the scene that includes the request for the particular image of the scene.

Referring again to FIG. 12D, operation 1226 may include operation 1230 depicting modifying the request for the particular image into an updated request for particular image data that identifies a portion of the image as targeted for updating. For example, FIG. 7, e.g., FIG. 7D, shows request for particular image data modifying into updated request for particular image data that identifies a portion of the image data as update-targeted module 730 modifying the request for the particular image (e.g., a request for an image of a bird circling an oasis) into an updated request for particular image data that identifies a portion of the image as targeted for updating (e.g., using the area around the bird, or calculating the bird's flight path, to modify the request for the particular image to include more data around the bird, so that more of the bird may be captured and cached locally, or displayed as needed).

Referring again to FIG. 12D, operation 1230 may include operation 1232 depicting modifying the request for the particular image, which is a request for an image of a football player in a football game, into an updated request for particular image data that identifies the portion of the image as targeted for updating as the portion of the image that includes pixels that represent three spatial feet in all directions from the football player in the football game. For example, FIG. 7, e.g., FIG. 7D, shows request for particular image data modifying into updated request for particular image data that identifies a portion of the image data as update-targeted module 732 modifying the request for the particular image, which is a request for an image of a football player in a football game, into an updated request for particular image data that identifies the portion of the image as targeted for updating as the portion of the image that includes pixels that represent three spatial feet in all directions from the football player in the football game.

Referring again to FIG. 12D, operation 1232 may include operation 1234 depicting modifying the request for the particular image, which is a request for an image of a football player in a football game, into an updated request for particular image data that identifies the portion of the image as targeted for updating as the portion of the image that includes pixels that represent three spatial feet in all directions from the football player in the football game based on an algorithm that identified that portion of the image as most likely to have changed since a previous image. For example, FIG. 7, e.g., FIG. 7D, shows request for particular image data modifying into updated request for particular image data that identifies a portion of the image data as update-targeted based on an applied algorithm module 734 modifying the request for the particular image, which is a request for an image of a football player in a football game, into an updated request for particular image data that identifies the portion of the image as targeted for updating as the portion of the image that includes pixels that represent three spatial feet in all directions from the football player in the football game based on an algorithm that identified that portion of the image as most likely to have changed since a previous image.

Referring now to FIG. 12E, operation 1226 may include operation 1236 depicting modifying the request for the particular image into an updated request for particular image data that identifies the portion of the image as targeted for updating based on one or more previously received images. For example, FIG. 7, e.g., FIG. 7E, shows request for particular image data modifying into updated request for particular image data based on one or more previously received images module 736 modifying the request for the particular image into an updated request for particular image data that identifies the portion of the image as targeted for updating based on one or more previously received images (e.g., the request for the particular image comes in, and it's a request for a particular street, then the request is modified to only include those parts of the street that might have changed, e.g., a building has not changed, but the area around the hot dog stand might have, and in another embodiment, this could be extended to cars that have been parked in the same spot for more than a week, etc., in order to reduce the amount of data that is required to be requested by eliminating image data that is already stored locally and is not likely to have changed).

Referring again to FIG. 12E, operation 1236 may include operation 1238 depicting comparing one or more previously received images that are determined to be similar to the particular image. For example, FIG. 7, e.g., FIG. 7E, shows particular image data request to previous image data that contains one or more previously received images determined to be similar to the previous image data comparing module 752 comparing one or more previously received images (e.g., images of the same street corner as what is currently being requested) that are determined (e.g., through analysis of the image and/or the image properties (e.g., size, resolution, geolocation, color distribution, hue, saturation, etc.) to be similar to the particular image (e.g., the image of the street corner)).

Referring again to FIG. 12E, operation 1236 may include operation 1240, which may appear in conjunction with operation 1238, operation 1240 depicting modifying the request for the particular image into the updated request for particular image data that identifies the portion of the image as targeted for updating based on the compared one or more previously received images. For example, FIG. 7, e.g., FIG. 7E, shows particular image data request modifying based on compared previous image data module 740 modifying the request for the particular image into the updated request for the particular image data that identifies the portion of the image as targeted for updating (e.g., the portion that is likely to have changed) based on the compared one or more previously received images (e.g., if a portion of the image has not changed in the last, e.g., five, received images, then it can be decided that the portion does not need updating, e.g., in other embodiments, it may be as few as two unchanged portions, or as large as one thousand, or any countable number depending on implementation, and also, in some embodiments, depending on condition, e.g., if the bandwidth is lower, then there may be a more aggressive determination of portions that are not likely to have changed).

Referring again to FIG. 12E, operation 1238 may include operation 1242 depicting comparing one or more previously received images that are determined to be similar to the particular image to identify a portion of the particular image as targeted for updating. For example, FIG. 7, e.g., FIG. 7E, shows particular image data request to previous image data that contains one or more previously received images determined to be similar to the previous image data comparing to identify an update-targeted portion of the particular image data module 742 comparing one or more previously received images that are determined to be similar to the particular image to identify a portion of the particular image as targeted for updating (e.g., a portion of the image, e.g., of the watering hole, where various animals have frequented, may need updating).

Referring again to FIG. 12E, operation 1242 may include operation 1244 depicting comparing a first previously received image with a second previously received image to determine a changed portion of the first previously received image that is different than a portion of the second previously received image. For example, FIG. 7, e.g., FIG. 7E, shows first previously received image data with second previously received image data and request for particular image data delta determining module 744 comparing a first previously received image with a second previously received image to determine a changed portion (e.g., where a hot dog stand used to be before the owner moved on, on a particular image of a street corner) of the first previously received image that is different than a portion of the second previously received image.

Referring again to FIG. 12E, operation 1242 may include operation 1246, which may appear in conjunction with operation 1244, operation 1246 depicting identifying the portion of the particular image that corresponds to the changed portion. For example, FIG. 7, e.g., FIG. 7E, shows particular image data request portion that corresponds to determined delta identifying module 746 identifying the portion of the particular image (e.g., a portion of the street view image where the hot dog vendor has left) that corresponds to the changed portion (e.g., the portion identified in previous images as where the hot dog vendor is moving).

Referring now to FIG. 12F, operation 1004 may include operation 1248 depicting generating an expanded request for the particular image. For example, FIG. 7, e.g., FIG. 7E, shows expanded request for particular image data generating module 748 generating an expanded (e.g., a request for more) request for the particular image.

Referring again to FIG. 12F, operation 1004 may include operation 1250, which may appear in conjunction with operation 1248, operation 1250 depicting transmitting the generated expanded request for the particular image to the image sensor array that includes more than one image sensor and that is configured to capture the scene and retain the subset of the scene that includes the request for the particular image of the scene. For example, FIG. 7, e.g., FIG. 7F, shows expanded request for particular image data transmitting to the image sensor array module 750 configured to transmit the request to the image sensor array that includes more than one image sensor and that is configured to capture the scene that is larger than the requested particular image data, said module 750 transmitting the generated expanded request for the particular image to the image sensor array that includes more than one image sensor and that is configured to capture the scene and retain the subset of the scene that includes the request for the particular image of the scene.

Referring again to FIG. 12F, operation 1248 may include operation 1252 depicting generating an expanded request for the particular image that includes the request for the particular image and a request for image data that borders the particular image. For example, FIG. 7, e.g., FIG. 7F, shows expanded request for particular image data that includes the request for particular image data and border image data that borders the particular image data generating module 752 generating an expanded request for the particular image (e.g., an image of a hallway in a museum as part of a virtual tourism exhibit) and a request for image data that borders the particular image (e.g., the image data that is spatially located in the scene near the request for the particular image in the scene).

Referring again to FIG. 12F, operation 1252 may include operation 1254 depicting generating the expanded request for the particular image that includes the request for the particular image and the request for image data that borders the particular image on all four sides of the particular image. For example, FIG. 7, e.g., FIG. 7F, shows expanded request for particular image data that includes the request for particular image data and border image data that borders the particular image data on all four sides generating module 754 generating the expanded request for the particular image that includes the request for the particular image (e.g., a request for a particular view in an augmented reality setting of a forest path) and the request for image data that borders (e.g., is spatially adjacent to, in the scene) the particular image on all four sides of the particular image (e.g., the request for the particular view in the augmented reality setting of a forest path).

Referring again to FIG. 12F, operation 1252 may include operation 1256 depicting determining a projected next side image that is an image that borders the particular image. For example, FIG. 7, e.g., FIG. 7F, shows projected next side image data that is image data corresponding to an image that borders the particular image of the particular image data module 756 determining a projected next side image (e.g., an image that is determined, e.g., projected to be the next particular image requested) that is an image that borders the particular image (e.g., is spatially located next to the particular image in the scene). An example of this is shown as anticipated next field of view 582C in FIG. 5C.

Referring again to FIG. 12F, operation 1252 may include operation 1258, which may appear in conjunction with operation 1256, operation 1258 depicting generating the expanded request for the particular image that includes the request for the particular image and a request for the projected next side image. For example, FIG. 7, e.g., FIG. 7F, shows expanded request for particular image data that includes the request for particular image data and next side image data generating module 758 generating the expanded request for the particular image that includes the request for the particular image and a request for the projected next side image (e.g., an image that is determined, e.g., projected to be the next particular image requested) that is an image that borders the particular image (e.g., is spatially located next to the particular image in the scene). An example of this is shown as anticipated next field of view 582C in FIG. 5C.

Referring again to FIG. 12F, operation 1256 may include operation 1260 depicting determining a projected next side image based on a direction in which a device associated with the requestor is moving. For example, FIG. 7, e.g., FIG. 7F, shows projected next side image data that is image data corresponding to an image that borders the particular image of the particular image data determining at least partially based on a detected motion of the device associated with the requestor module 760 determining a projected next side image based on a direction in which a device (e.g., a virtual reality helmet) associated with (e.g., being worn by) the requestor is moving (e.g., if the helmet is moving to the left, then the next requested image will be the next view from the left).

Referring again to FIG. 12F, operation 1260 may include operation 1262 depicting determining the projected next side image based on the direction that a head of the requestor is turning while the requestor is wearing a virtual reality device. For example, FIG. 7, e.g., FIG. 7F, shows projected next side image data that is image data corresponding to an image that borders the particular image of the particular image data determining at least partially based on a detected head turn of the requestor that wears the device associated with the requestor module 762 determining the projected next side image based on the direction that a head of the requestor is turning while the requestor is wearing a virtual reality device (e.g., a headset).

Referring now to FIG. 12G, operation 1252 may include operation 1264 depicting generating an expanded request for the particular image that includes the request for the particular image, a request for border image data that borders the particular image on each side, and a request for secondary border image data that borders the border image data. For example, FIG. 7, e.g., FIG. 7F, shows expanded request for particular image data that includes the request for particular image data, first border image data that borders the particular image data, and second border image data that borders the first border image data generating module 764 generating an expanded request for the particular image that includes the request for the particular image (e.g., initial request 592 from FIG. 5D, a request for border image data that borders the particular image on each side (e.g., expanded request 594 from FIG. 5D), and a request for secondary border image data that borders the border image data (e.g., a further expanded request 596 from FIG. 5D)).

Referring again to FIG. 12G, operation 1264 may include operation 1266 depicting generating the expanded request for the particular image that includes the request for the particular image at a first resolution, the request for the border image data at a second resolution less than the first resolution, and the request for the secondary border image data at a third resolution less than or equal to the second resolution. For example, FIG. 7, e.g., FIG. 7G, shows expanded request for particular image data that includes the request for particular image data, first border image data that borders the particular image data, and second border image data that borders the first border image data generating module 766 configured to generate the expanded request for the particular image data that includes the request for the particular image data at a first resolution, the request for the first border image data at a second resolution less than the first resolution, and the request for the second border image data at a third resolution less than or equal to the second resolution, said module 766 generating the expanded request for the particular image that includes the request for the particular image at a first resolution (e.g., the initial request 592 from FIG. 5D), the request for the border image data at a second resolution less than the first resolution (e.g., the expanded request 594 from FIG. 5D), and the request for the secondary border image data (e.g., the further expanded request 596) at a third resolution less than or equal to the second resolution.

FIGS. 13A-13C depict various implementations of operation 1006, depicting receiving only the particular image from the image sensor array, wherein the particular image represents a subset of the scene, and wherein a size characteristic of the particular image is at least partially based on a property of a requestor, according to embodiments. Referring now to FIG. 13A, operation 1006 may include operation 1302 depicting receiving only the particular image from the image sensor array, wherein the particular image represents fewer pixels than the scene. For example, FIG. 8, e.g., FIG. 8A, shows particular image data from the image sensor array exclusive receiving module 802, configured to receive only the particular image data that represents fewer pixels than the scene from the image sensor array, said module 802 receiving only (e.g., at a particular time, or at a particular resolution or rate, no other data is received, although this does not exclude other data being received at other times or at other resolutions or in other formats), wherein the particular image (e.g., an image of a lion at a watering hole) represents fewer pixels than the scene (e.g., the watering hole).

Referring again to FIG. 13A, operation 1006 may include operation 1304 depicting receiving only the particular image from the image sensor array, wherein the particular image represents a smaller geographic area than a geographic area represented by the scene. For example, FIG. 8, e.g., FIG. 8A, shows particular image data from the image sensor array exclusive receiving module 804 configured to receive only the particular image data that represents a smaller geographic area than the scene from the image sensor array, said module 804 receiving only the particular image (e.g., a corner view of Old Faithful the geyser) from the image sensor array, wherein the particular image represents a smaller geographic area (e.g., an image that includes an area twenty feet by twenty feet) than a geographic area represented by the scene (e.g., data that includes an area five thousand feet by five thousand feet).

Referring again to FIG. 13A, operation 1006 may include operation 1306 depicting receiving only the particular image from a remote server that received a portion of the scene, wherein the remote server received the portion of the scene that included the request for the particular image and a second request for a second particular image that is at least partially different than the first particular image. For example, FIG. 8, e.g., FIG. 8A, shows particular image data from the image sensor array exclusive receiving from a remote server module 806 receiving only the particular image from a remote server (e.g., a server, e.g., server 230, as described in various embodiments), that may act as a communications intermediary between the image sensor array and a device of the requestor, and which may, in some embodiments, perform processing on the request for the particular image, or to the particular image that received a portion of the scene (e.g., the remote server may have received a portion of the scene that is the same as the particular image, or it may have received a portion of the scene that includes the particular image and other images that were requested at the same time as the particular image), wherein the remote server received the portion of the scene that included the request for the particular image (e.g., an image of a lion at the watering hole) and a second request for a second particular image (e.g., an image of an eagle at the watering hole) that is at least partially different than the first particular image.

Referring again to FIG. 13A, operation 1006 may include operation 1308 depicting receiving only the particular image from the image sensor array, wherein the particular image represents the subset of the scene, and wherein the image sensor array discarded portions of the scene other than the particular image. For example, FIG. 8, e.g., FIG. 8A, shows particular image data from the image sensor array exclusive receiving from a remote server module 808 receiving only the particular image from the image sensor array, wherein the particular image represents the subset of the scene, said module 808 receiving only the particular image from the image sensor array, wherein the particular image represents the subset of the scene, and wherein the image sensor array discarded (e.g., the data may not be stored, or, in an embodiment, may be stored, at least temporarily, but is not stored in a place where overwriting will be prevented, as in a persistent memory) portions of the scene other than the particular image (e.g., pixels that were not part of the request for the particular image, or part of another request, may be discarded, that is, no steps may be taken to prevent their overwriting/deletion.

Referring again to FIG. 13A, operation 1006 may include operation 1310 depicting receiving only the particular image data from the image sensor array, wherein data from the scene other than the particular image data is stored at the image sensor array. For example, FIG. 8, e.g., FIG. 8A, shows particular image data from the image sensor array exclusive receiving from a remote server module 810 receiving only the particular image data (e.g., an image of Old Faithful near the eastern corner) from the image sensor array, wherein data from the scene other than the particular image data (e.g., data that was not part of the request for the particular image) is stored at the image sensor array (e.g., in an embodiment, the image sensor array may have a large storage to keep the data that was not requested, because storage costs may be cheap relative to bandwidth costs, thus that data is kept locally at the image sensor array where storage is inexpensive, and not transmitted to the requestor, either directly or via the remote server).

Referring again to FIG. 13A, operation 1006 may include operation 1312 depicting receiving only the particular image data from a remote server configured to communicate with the image sensor array, wherein a first portion of the scene data other than the particular image is stored at the image sensor array, and a second portion of the scene data other than the particular image is stored at the remote server. For example, FIG. 8, e.g., FIG. 8A, shows particular image data from the image sensor array exclusive receiving from a remote server module 812 configured to receive only the particular image data from a remote server deployed to communicate with the image sensor array, wherein a first portion of the scene data other than the particular image data is stored at the image sensor array and a second portion of the scene data other than the particular image data is stored at the remote server, said module 812 receiving only the particular image data from a remote server configured to communicate with the image sensor array, wherein a first portion of the scene data other than the particular image is stored at the image sensor array, and a second portion of the scene data other than the particular image is stored at the remote server. For example, in an embodiment, some of the data gathered by the image sensor array but not requested by the requestor may be deemed to be "useful" by the remote server, e.g., for caching purposes, analysis purposes, or other purposes. Thus, a second portion of the scene data, e.g., non-requested data may be transmitted to the remote server and stored there, and a first portion of the scene data, e.g., non-requested data, may be stored at the image sensor array. In an embodiment, the transmission to the remote server may take a lower priority than the transmission to the requestor (a transmission which may include the remote server), or may be transmitted at a different time than the transmission to the requestor, or transmitted with different specifications (e.g., different compression, different codec, or different resolution).

Referring now to FIG. 13B, operation 1006 may include operation 1314 depicting receiving only the particular image from the image sensor array, wherein the particular image represents the subset of the scene, and wherein the size characteristic of the particular image is at least partially based on a property of a requestor device that is associated with the requestor. For example, FIG. 8, e.g., FIG. 8B, shows particular image data from the image sensor array exclusive receiving module 814 configured to receive only the particular image data from the image sensor array, wherein the particular image represents a subset of the scene and wherein a size characteristic of the particular image data is at least partially based on a feature of a requestor device that is associated with the requestor, said module 814 receiving only the particular image from the image sensor array, wherein the particular image represents the subset of the scene, and wherein the size characteristic of the particular image is at least partially based on a property (e.g., an available bandwidth to the requestor device) of the requestor device (e.g., a laptop computer device) that is associated with the requestor (e.g., that is operated by the requestor).

Referring again to FIG. 13B, operation 1314 may include operation 1316 depicting receiving only the particular image from the image sensor array, wherein the particular image represents the subset of the scene, and wherein the size characteristic of the particular image is at least partially based on a property of the requestor device that is configured to store data about the requestor. For example, FIG. 8, e.g., FIG. 8B, shows particular image data from the image sensor array exclusive receiving module 816 configured to receive only the particular image data from the image sensor array, wherein the size characteristic of the particular image data is at least partially based on a feature of a requestor device that is deployed to store data about with the requestor, said module 816 receiving only the particular image from the image sensor array, wherein the particular image represents the subset of the scene, and wherein the size characteristic of the particular image is at least partially based on a property of the requestor device (e.g., a cellular smartphone device that is linked to a 4G LTE network) that is configured to store data about the requestor.

Referring again to FIG. 13B, operation 1314 may include operation 1318 depicting receiving only the particular image from the image sensor array, wherein the particular image represents a subset of the scene, and wherein a data size of particular image data of the particular image is at least partially based on an available bandwidth of the connection between the image sensor array and the device associated with the requestor. For example, FIG. 8, e.g., FIG. 8B, shows particular image data from the image sensor array exclusive receiving module 818 configured to receive only the particular image data from the image sensor array, wherein the size characteristic of the particular image data is at least partially based on a bandwidth available to the requestor device, said module 818 receiving only the particular image from the image sensor array, wherein the particular image (e.g., an image of a lion at a watering hole) represents a subset of the scene (e.g., an image of the watering hole), and wherein a data size (e.g., measured in an electronic measure, e.g., bytes) of particular image data of the particular image is at least partially based on an available bandwidth (e.g., a speed, reliability, or any other factor involving the transmission of data between two devices) of the connection between the image sensor array (e.g., which may use the remote server as an intermediary) and the device associated with the requestor (e.g., a tablet device, e.g., an Apple iPad).

Referring again to FIG. 13B, operation 1314 may include operation 1320 depicting receiving only the particular image from the image sensor array, wherein the data size of particular image data of the particular image is at least partially based on an available bandwidth of a connection between the device associated with the requestor and a remote server configured to communicate with the image sensor array. For example, FIG. 8, e.g., FIG. 8B, shows particular image data from the image sensor array exclusive receiving module 820 configured to receive only the particular image data from the image sensor array, wherein the size characteristic of the particular image data is at least partially based on a bandwidth between the requestor device and a remote server that communicates with the image sensor array, said module 820 receiving only the particular image from the image sensor array, wherein the particular image (e.g., an image of a car crossing a highway bridge) represents a subset of the scene (e.g., an image of the bridge), and wherein a data size (e.g., measured in an electronic measure, e.g., bytes) of particular image data of the particular image is at least partially based on an available bandwidth (e.g., a speed, reliability, or any other factor involving the transmission of data between two devices) of the connection between the device associated with the requestor (e.g., a tablet device) and a remote server configured to communicate with the image sensor array.

Referring now to FIG. 13C, operation 1006 may include operation 1322 depicting receiving only the particular image from the image sensor array, wherein the particular image represents a subset of the scene, and wherein a data size of particular image data of the particular image is at least partially based on a screen size of a requestor device associated with the requestor. For example, FIG. 8, e.g., FIG. 8C, shows particular image data from the image sensor array exclusive receiving module 822 configured to receive only the particular image data from the image sensor array, wherein the particular image represents a subset of the scene and wherein a size characteristic of the particular image data is at least partially based on a screen size of a requestor device that is associated with the requestor, said module 822 receiving only the particular image from the image sensor array, wherein the particular image (e.g., an image of a car on a highway bridge) represents a subset of the scene (e.g., the highway bridge), and wherein a data size (e.g., a size in pixels, megabytes, or any other measure, compressed or uncompressed, with allowances made for types of transmission and parallelization) of particular image data of the particular image is at least partially based on a screen size (e.g., how large is the screen) of the requestor device (e.g., a television) associated with the requestor (e.g., the person who requested the image of the car). For example, it is conventionally assumed that, for a given screen size, and distance of eye from the screen, there is a resolution past which the human eye cannot resolve any additional data. Accordingly, in an embodiment, the screen size of the device, coupled with an estimate of the average viewing distance, may serve to bound the resolution of the image that is transmitted, to avoid transmitting more data than can be used.

Referring again to FIG. 13C, operation 1006 may include operation 1324 depicting receiving only the particular image from the image sensor array, wherein the particular image represents a subset of the scene, and wherein a data size of particular image data of the particular image is at least partially based on a maximum resolution of the requestor device associated with the requestor. For example, FIG. 8, e.g., FIG. 8C, shows particular image data from the image sensor array exclusive receiving module 824 configured to receive only the particular image data from the image sensor array, wherein the particular image represents a subset of the scene and wherein a size characteristic of the particular image data is at least partially based on a maximum resolution of a requestor device that is associated with the requestor, said module 824 receiving only the particular image from the image sensor array, wherein the particular image represents a subset of the scene, and wherein a data size of particular image data of the particular image is at least partially based on a maximum resolution of the requestor device associated with the requestor. For example, a higher-resolution version of the image than what the requestor device can display will not be transmitted, because that would be a waste of data that the device cannot use, in certain embodiments (e.g., assuming no further analysis is done on the data). Thus, the maximum resolution of the requestor device can set the size of the transmission by bounding the resolution of the received particular image. For example, in an embodiment, if a smartphone device with a resolution of 800×600 and a computer with a screen resolution of 2560×1900 each request the same image, the smartphone device will get a much smaller, downgraded version of the image than the computer, because the smartphone would have to downgrade the larger image to display it anyway.

FIGS. 14A-14C depict various implementations of operation 1008, depicting presenting the received particular image to the requestor, according to embodiments. Referring now to FIG. 14A, operation 1008 may include operation 1402 depicting presenting the received particular image on a viewfinder of a device associated with the requestor. For example, FIG. 9, e.g., FIG. 9A, shows received particular image data presenting on a device viewfinder module 902 presenting the received particular image on a viewfinder (e.g., a portion of a device capable of showing images, whether optically or digitally, in proximate area or far away) of a device associated with the requestor (e.g., a smartphone device).

Referring again to FIG. 14A, operation 1402 may include operation 1404 depicting displaying the received particular image on the viewfinder of the device associated with the requestor, wherein the device associated with the requestor is one or more of a cellular telephone device, a tablet device, a smartphone device, a laptop computer, a desktop computer, a television, and a wearable computer. For example, FIG. 9, e.g., FIG. 9A, shows received particular image data presenting on a particular device viewfinder module 904 displaying the received particular image on the viewfinder of the device associated with the requestor, wherein the device associated with the requestor is one or more of a cellular telephone device, a tablet device, a smartphone device, a laptop computer, a desktop computer, a television, and a wearable computer.

Referring again to FIG. 14A, operation 1008 may include operation 1406 depicting presenting the received particular image that is an image of a football player in a football game to the requestor that is a spectator of the game that watches the football game on an Internet-enabled television. For example, FIG. 9, e.g., FIG. 9A, shows received particular image data presenting module 906 presenting the received particular image that is an image of a football player in a football game to the requestor that is a spectator of the game that watches the football game on an Internet-enabled television (e.g., the requestor selects a particular football player that the requestor wants to focus in on, e.g., the quarterback for the Washington D.C. team, using the remote or giving an oral command to the television).

Referring again to FIG. 14A, operation 1008 may include operation 1408 depicting presenting the received particular image that is an image of an eagle at an animal watering hole to the requestor that is a naturalist that monitors the animal watering hole from a screen on their smart watch. For example, FIG. 9, e.g., FIG. 9A, shows received particular image data presenting module 908

Referring again to FIG. 14A, operation 1008 may include operation 1410 depicting modifying the received particular image into a modified particular image. For example, FIG. 9, e.g., FIG. 9A, shows received particular image data modifying into modified particular image data module 910

Referring again to FIG. 14A, operation 1008 may include operation 1412, which may appear in conjunction with operation 1410, operation 1412 depicting presenting the modified received particular image to the requestor. For example, FIG. 9, e.g., FIG. 9A, shows modified particular image data presenting module 912

Referring again to FIG. 14A, operation 1410 may include operation 1414 depicting modifying the received particular image into a modified particular image, wherein the received particular image includes only portions of the scene that have changed since the last time the particular image was displayed. For example, FIG. 9, e.g., FIG. 9A, shows received particular image data that includes only changed portions of the scene modifying into modified particular image data module 914 modifying the received particular image into a modified particular image, wherein the received particular image includes only portions of the scene that have changed since the last time the particular image was displayed (e.g., where persons have moved, for example, on a soccer field, the entire field does not need to be retransmitted each time).

Referring again to FIG. 14A, operation 1414 may include operation 1416 depicting modifying the received particular image into a modified particular image, wherein one or more portions of the received particular image that have not changed are updated with existing image data. For example, FIG. 9, e.g., FIG. 9A, shows received particular image data that includes only changed portions of the scene modifying into modified particular image data through addition of unchanged portions of existent image data module 916 modifying the received particular image into a modified particular image, wherein one or more portions of the received particular image that have not changed (e.g., static portions of the image, e.g., rocks, streets, buildings) are updated with existing image data (e.g., image data taken from a previously captured image of the same spot, e.g., in a live street view setting, the roads and buildings do not change, so that data can be added at the local device rather than transmitted from the image sensor array, in an embodiment).

Referring now to FIG. 14B, operation 1008 may include operation 1418 depicting presenting a portion of the received particular image to the requestor. For example, FIG. 9, e.g., FIG. 9B, shows portion of received particular image data presenting module 918 presenting (e.g., displaying, e.g., displaying as part of an augmented reality device in which the person can take a "virtual tour" of the Egyptian pyramids of Giza) a portion of the received particular image to the requestor.

Referring again to FIG. 14B, operation 1418 may include operation 1420 depicting presenting a first portion of the received particular image to the requestor. For example, FIG. 9, e.g., FIG. 9B, shows first portion of the received particular image data presenting module 920 presenting a first portion (e.g., a portion that represents a person's field of view in the area they are currently looking at, e.g., for a virtual tourism application or for an augmented reality/virtual reality game) of the received particular image (e.g., an image of the interior of one of the Egyptian pyramids) to the requestor (e.g., a person wearing a virtual tourism helmet that displays virtual reality type images).

Referring again to FIG. 14B, operation 1418 may include operation 1422, which may appear in conjunction with operation 1420, operation 1422 depicting storing a second portion of the received particular image. For example, FIG. 9, e.g., FIG. 9B, shows second portion of the received particular image data storing module 916 storing a second portion (e.g., a portion that is just outside the field of view of the person who is wearing the virtual tourism helmet, but which might come into view if the person swings their head, so to allow seamless transition, this second portion that is outside the field of view is stored and cached for quick deployment if necessary).

Referring again to FIG. 14B, operation 1422 may include operation 1424 depicting storing a second portion of the received particular image that is adjacent to the first portion of the received particular image and is configured to be used as cached image data when the requestor requests an image corresponding to the second portion of the received particular image. For example, FIG. 9, e.g., FIG. 9B, shows second portion of the received particular image data that is adjacent to the first portion of the received particular image data and is configured to be used as cached image data storing module 924 storing a second storing a second portion of the received particular image that is adjacent to the first portion of the received particular image and is configured to be used as cached image data when the requestor requests an image corresponding to the second portion of the received particular image (e.g., a portion that is just outside the field of view of the person who is wearing the virtual tourism helmet, but which might come into view if the person swings their head, so to allow seamless transition, this second portion that is outside the field of view is stored and cached for quick deployment if necessary).

Referring again to FIG. 14B, operation 1422 may include operation 1426 depicting storing a second portion of the received particular image, wherein the second portion of the received particular image is received at a lower resolution than the first portion of the received particular image. For example, FIG. 9, e.g., FIG. 9B, shows second portion of the received particular image data that is adjacent to the first portion of the received particular image data and is received at a lower resolution than the first portion of the received particular image data storing module 926 storing a second portion of the received particular image (e.g., a portion that is determined by an algorithm to be likely to be the next requested image from the user, e.g., because it is next up in the user's field of view, or because it relates to something the user just looked at, for example), wherein the second portion of the received particular image is received at a lower resolution than the first portion of the received particular image.

Referring now to FIG. 14C, operation 1008 may include operation 1428 depicting transmitting the received particular image to a component configured to analyze the received particular image. For example, FIG. 9, e.g., FIG. 9C, shows received particular image data transmitting to a component module configured transmit the received particular data to a component deployed to analyze the received particular image 928 transmitting the received particular image (e.g., a set of images of a particularly busy on-ramp to an interstate) to a component (e.g., a traffic analysis computer that uses the captured images at various points on the roads to determine traffic patterns and bottlenecks) configured to analyze (e.g., determine how many cars are in the image, where the cars are going to, how fast the cars are moving, etc.) the particular image (e.g., a set of images of cars on a busy on-ramp to the interstate).

Referring again to FIG. 14C, operation 1008 may include operation 1430 depicting transmitting the received particular image to a component configured to store the received particular image. For example, FIG. 9, e.g., FIG. 9C, shows received particular image data transmitting to a component module configured to transmit the received particular data to a component deployed to store the received particular image 930 transmitting the received particular image (e.g., an image of an interior of a person's refrigerator) to a component (e.g., a home monitoring system that stores images of appliance interiors, among other things, to facilitate diet tracking, food ordering, etc., as part of a smart home system) configured to store the received particular image (e.g., the image of the interior of the person's refrigerator).

Referring again to FIG. 14C, operation 1008 may include operation 1432 depicting presenting the received particular image to the requestor, wherein the requestor is a client. For example, FIG. 9, e.g., FIG. 9C, shows received particular image data presenting module configured to present the received particular image data to a client requestor 932 presenting the received particular image (e.g., the image of a lion drinking at the watering hole) to the requestor (e.g., a person watching the watering hole on their television, who has used their smart remote to select a box around the lion to indicate that they want to watch the lion), wherein the requestor is a client (e.g., the person watching their television).

Referring again to FIG. 14C, operation 1008 may include operation 1434 depicting presenting the received particular image to the requestor, wherein the requestor is a component of a device. For example, FIG. 9, e.g., FIG. 9C, shows received particular image data presenting module configured to present the received particular image data to a device component requestor 934 presenting (e.g., storing in a memory of) the received particular image (e.g., a security image of a person walking outside of a building) to the requestor (e.g., a subroutine that instructs to capture the faces of all persons leaving a specific building that is owned by the Federal Bureau of Investigation), wherein the requestor is a component (e.g., a subroutine, whether part of the requestor device or separate from the requestor device) of a device.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.)

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," 'in one embodiment," "in an embodiment," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A computationally-implemented method, comprising:
accepting input of a request for a particular image of a scene that is larger than the particular image;
comparing one or more previously received images that are determined to be similar to the particular image to determine a changed portion;
identifying a portion of the particular image that corresponds to the changed portion;
determining an updated request that identifies the portion of the particular image that corresponds to the changed portion as targeted for updating; and
transmitting the updated request that identifies the portion of the particular image to an image sensor array device that includes more than one image sensor and that is configured to capture the scene and retain a subset of the scene that includes the portion of the particular image;
receiving the portion of the particular image from the image sensor array device; and
transmitting to a requestor device at least the portion of the particular image for presentation of the particular image of the scene.

2. A system comprising:
circuitry configured for accepting an input of a request for a particular image that is part of a scene that is larger than the particular image;
circuitry configured for comparing one or more previously received images determined to be similar;
circuitry configured for modifying the request for the particular image into an updated request that identifies a portion of the scene targeted for updating based on a comparison of the one or more previously received images determined to be similar;
circuitry configured for transmitting the updated request to an image sensor array device that includes more than one image sensor and that is configured to capture the scene and to retain the portion of the scene targeted for updating;
circuitry configured for receiving from the image sensor array device the portion of the scene targeted for updating; and
circuitry configured for outputting at least the portion of the scene targeted for updating for presentation at a requestor device.

3. The system of claim 2, wherein said circuitry configured for accepting an input of a request for a particular image that is part of a scene that is larger than the particular image comprises:
circuitry configured for receiving from an automated component an input of a request for a particular image that is part of a scene that is larger than the particular image.

4. The system of claim 3, wherein said circuitry configured for receiving from an automated component an input of a request for a particular image that is part of a scene that is larger than the particular image comprises:
circuitry configured for receiving from an object tracking component an input of a request for a particular image of a tracked object, which particular image is part of a scene that is larger than the particular image.

5. The system of claim 2, wherein said circuitry configured for transmitting the updated request to an image sensor array device that includes more than one image sensor and that is configured to capture the scene and to retain the portion of the scene targeted for updating comprises:

circuitry configured for transmitting the updated request via a relay to an image sensor array device that includes more than one image sensor and that is configured to capture the scene and to retain the portion of the scene targeted for updating.

6. The system of claim 2, further comprising:
circuitry configured for combining the updated request with at least one other request.

7. The system of claim 6, wherein said circuitry configured for combining the updated request with at least one other request comprises:
circuitry configured for combining the updated request with at least one other request such that one or more redundant portions are removed.

8. The system of claim 2, wherein the circuitry configured for comparing one or more previously received images determined to be similar comprises:
circuitry configured for comparing one or more previously received images determined to be similar to the part of the scene associated with the request for the particular image.

9. The system of claim 2, wherein said circuitry configured for comparing one or more previously received images determined to be similar comprises:
circuitry configured for comparing one or more previously received images determined to be similar to identify the portion of the scene targeted for updating.

10. The system of claim 2, wherein said circuitry configured for comparing one or more previously received images determined to be similar comprises:
circuitry configured for comparing one or more previously received images determined to be similar including at least comparing a first previously received image with a second previously received image to determine a changed portion; and
circuitry configured for identifying the portion of the scene targeted for updating that corresponds to the changed portion.

11. The system of claim 2, further comprising:
circuitry configured for generating an expanded request.

12. The system of claim 11, wherein said circuitry configured for generating an expanded request comprises:
circuitry configured for generating an expanded request that includes at least a request for a border image.

13. The system of claim 12, wherein said circuitry configured for generating an expanded request that includes at least a request for a border image comprises:
circuitry configured for generating an expanded request that includes at least a request for a border image that borders the particular image on one or more sides.

14. The system of claim 11, wherein said circuitry configured for generating an expanded request comprises:
circuitry configured for determining an image projected to be subject to a future request; and
circuitry configured for generating an expanded request that identifies a portion of the scene corresponding to the image.

15. The system of claim 14, wherein said circuitry configured for determining an image projected to be subject to a future request comprises:
circuitry configured for determining an image projected to be subject to a future request based at least partly on a direction in which a requestor device is moving.

16. The system of claim 11, wherein said circuitry configured for generating an expanded request comprises:
circuitry configured for generating an expanded request that includes at least a request for a border image that borders the particular image and a request for a secondary border image that borders the border image.

17. The system of claim 16, wherein said circuitry configured for generating an expanded request that includes at least a request for a border image that borders the particular image and a request for a secondary border image that borders the border image comprises:
circuitry configured for generating an expanded request that includes at least the request for the particular image at a first resolution, a request for a border image that borders the particular image at a second resolution that is less than the first resolution, and a request for a secondary border image that borders the border image at a third resolution that is less than the second resolution.

18. The system of claim 2, wherein said circuitry configured for receiving from the image sensor array device the portion of the scene targeted for updating comprises:
circuitry configured for receiving from the image sensor array device the portion of the scene targeted for updating, wherein the image sensor array device discarded portions of the scene other than the portion of the scene targeted for updating.

19. The system of claim 2, wherein said circuitry configured for receiving from the image sensor array device the portion of the scene targeted for updating comprises:
circuitry configured for receiving from the image sensor array device the portion of the scene targeted for updating, wherein a size characteristic of the portion of the scene targeted for updating is at least partially based on a property of the requestor device.

20. The system of claim 2, further comprising:
circuitry configured for modifying the portion of the scene received from the image sensor array device.

21. The system of claim 20, wherein said circuitry configured for modifying the portion of the scene received from the image sensor array device comprises:
circuitry configured for combining the portion of the scene received from the image sensor array device with existing image data.

22. The system of claim 2, further comprising:
circuitry configured for storing at least some of the portion of the scene received from the image sensor array device to be used as cached image data for at least partly satisfying a subsequent image request.

23. The system of claim 2, wherein the circuitry configured for receiving from the image sensor array device the portion of the scene targeted for updating comprises:
circuitry configured for receiving from the image sensor array device only the portion of the scene targeted for updating.

24. The system of claim 2, wherein the circuitry configured for accepting an input of a request for a particular image that is part of a scene that is larger than the particular image comprises:
circuitry configured for accepting an input of a request for a particular video that is part of a scene that is larger than the particular video.

25. The system of claim 2, further comprising:
the image sensor array device that includes more than one image sensor.

26. The system of claim 2, further comprising:
the requestor device, wherein the requestor device includes at least one of a smartphone or tablet computer.

27. The system of claim 2, wherein the circuitry configured for comparing one or more previously received images determined to be similar comprises:
    circuitry configured for comparing one or more previously received images determined to be similar to identify one or more portions that are likely to have changed.

28. The system of claim 27, wherein the circuitry configured for modifying the request for the particular image into an updated request that identifies a portion of the scene targeted for updating based on a comparison of the one or more previously received images determined to be similar comprises:
    circuitry configured for modifying the request for the particular image into an updated request that identifies a portion of the scene targeted for updating that corresponds to the one or more portions that are likely to have changed and one or more specified areas around the one or more portions that are likely to have changed.

29. The system of claim 2, wherein the circuitry configured for accepting an input of a request for a particular image that is part of a scene that is larger than the particular image comprises:
    circuitry configured for accepting from the requestor device a user input of a request for a particular image that is part of a scene that is larger than the particular image.

30. The system of claim 2, wherein the circuitry configured for accepting an input of a request for a particular image that is part of a scene that is larger than the particular image comprises:
    circuitry configured for accepting an input of a request for a particular image associated with at least one of an object, target, field of view, pan, zoom, or scroll.

31. The system of claim 2, further comprising:
    circuitry configured for receiving during one or more off-peak periods imagery of one or more static objects associated with the scene.

32. The system of claim 2, wherein the circuitry configured for outputting at least the portion of the scene targeted for updating for presentation at a requestor device comprises:
    circuitry configured for outputting at least the portion of the scene targeted for updating for presentation at a requestor device, the at least the portion of the scene including inserted alphanumeric or pictorial content.

33. The system of claim 2, wherein the circuitry configured for modifying the request for the particular image into an updated request that identifies a portion of the scene targeted for updating based on a comparison of the one or more previously received images determined to be similar comprises:
    circuitry configured for modifying the request for the particular image into an updated request that identifies a portion of the scene targeted for updating based on a comparison of the one or more previously received images determined to be similar because at least one of content, field of view, location, or a property.

34. The system of claim 2, wherein the circuitry configured for transmitting the updated request to an image sensor array device that includes more than one image sensor and that is configured to capture the scene and to retain the portion of the scene targeted for updating comprises:
    circuitry configured for transmitting the updated request to an image sensor array device that includes more than one image sensor and that is configured to capture the scene and temporarily retain the portion of the scene targeted for updating.

35. The system of claim 2, wherein the circuitry configured for outputting at least the portion of the scene targeted for updating for presentation at a requestor device comprises:
    circuitry configured for transmitting at least the portion of the scene targeted for updating for presentation at a requestor device.

36. The system of claim 2, wherein the circuitry configured for receiving from the image sensor array device the portion of the scene targeted for updating comprises:
    circuitry configured for receiving from the image sensor array device the portion of the scene targeted for updating at a pixel resolution that is bounded by a screen resolution capability of the requestor device.

37. A system comprising:
one or more computer readable memory bearing one or more executable program instructions; and
at least one computer processor configured by the one or more executable program instructions to perform operations including at least:
    accepting an input of a request for a particular image that is part of a scene that is larger than the particular image;
    comparing one or more previously received images determined to be similar;
    modifying the request for the particular image into an updated request that identifies a portion of the scene targeted for updating based on a comparison of the one or more previously received images determined to be similar;
    transmitting the updated request to an image sensor array device that includes more than one image sensor and that is configured to capture the scene and to retain the portion of the scene targeted for updating;
    receiving from the image sensor array device the portion of the scene targeted for updating; and
    outputting at least the portion of the scene targeted for updating for presentation at a requestor device.

* * * * *